(12) United States Patent
Zheng et al.

(10) Patent No.: US 12,237,919 B2
(45) Date of Patent: Feb. 25, 2025

(54) RATELESS CODING AT LAYER TWO PROTOCOL LAYER

(71) Applicant: QUALCOMM Incorporated, San Diego, CA (US)

(72) Inventors: Ruiming Zheng, Beijing (CN); Changlong Xu, Beijing (CN); Jian Li, Shanghai (CN); Kangqi Liu, San Diego, CA (US); Liangming Wu, Beijing (CN); Peng Cheng, Beijing (CN); Hao Xu, Beijing (CN); Xipeng Zhu, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 18/004,648

(22) PCT Filed: Jul. 23, 2021

(86) PCT No.: PCT/CN2021/108260
§ 371 (c)(1),
(2) Date: Jan. 6, 2023

(87) PCT Pub. No.: WO2022/017521
PCT Pub. Date: Jan. 27, 2022

(65) Prior Publication Data
US 2023/0269026 A1  Aug. 24, 2023

(30) Foreign Application Priority Data

Jul. 24, 2020 (WO) ............... PCT/CN2020/104027
Jul. 24, 2020 (WO) ............... PCT/CN2020/104029
(Continued)

(51) Int. Cl.
*H04L 1/00* (2006.01)
*H04L 1/1607* (2023.01)
(Continued)

(52) U.S. Cl.
CPC .......... *H04L 1/0076* (2013.01); *H04L 1/1614* (2013.01); *H04L 1/1685* (2013.01);
(Continued)

(58) Field of Classification Search
CPC ..... H04L 69/22; H04L 1/1685; H04L 1/1614; H04L 1/1848; H04L 1/0076; H04L 1/187; H04L 1/1832; H04L 2001/0093
(Continued)

(56) References Cited

U.S. PATENT DOCUMENTS

2008/0130619 A1  6/2008  Cha et al.
2008/0317243 A1  12/2008  Ramprashad
(Continued)

FOREIGN PATENT DOCUMENTS

CN  103001739 A  3/2013
CN  104135345 A  11/2014
(Continued)

OTHER PUBLICATIONS

Alcatel, et al., "General Clarifications", Tdoc R2-011882, 3GPP TSG-RAN WG2 Meeting #23, Finland, Helsinki, Aug. 27-31, 2001, Aug. 31, 2001 (Aug. 31, 2001) the Whole Document, pp. 1-78.
(Continued)

*Primary Examiner* — John J Tabone, Jr.
(74) *Attorney, Agent, or Firm* — Holland & Hart LLPQualcomm Incorporated

(57) ABSTRACT

Methods, systems, and devices for wireless communications are described. A transmitting device may receive one or more service data units (SDUs) at a layer two (L2) layer of the transmitting device. The transmitting device may encode, at the L2 layer, the one or more SDUs according to one or more network coding parameters to obtain at least one encoded protocol data unit (PDU), the one or more network coding parameters comprising a rateless code. The trans-
(Continued)

mitting device may generate, for the at least one encoded PDU, at least one corresponding PDU header. The transmitting device may output the at least one encoded PDU and the at least one corresponding PDU header from the L2 layer to a lower layer of the transmitting device for transmission to one or more receiving devices.

30 Claims, 61 Drawing Sheets

(30) Foreign Application Priority Data

| Jul. 24, 2020 | (WO) | ................ PCT/CN2020/104093 |
| Jul. 24, 2020 | (WO) | ................ PCT/CN2020/104543 |
| Aug. 4, 2020 | (WO) | ................ PCT/CN2020/106718 |

(51) Int. Cl.
  *H04L 1/1829* (2023.01)
  *H04L 1/1867* (2023.01)
  *H04L 69/22* (2022.01)

(52) U.S. Cl.
  CPC .......... *H04L 1/1832* (2013.01); *H04L 1/1848* (2013.01); *H04L 1/187* (2013.01); *H04L 69/22* (2013.01); *H04L 2001/0093* (2013.01)

(58) Field of Classification Search
  USPC ................................ 714/712, 748, 749, 821
  See application file for complete search history.

(56) References Cited

U.S. PATENT DOCUMENTS

| 2015/0236819 | A1 | 8/2015 | Zhovnirnovsky et al. |
| 2016/0308776 | A1 | 10/2016 | Ozturk et al. |
| 2017/0142077 | A1 | 5/2017 | Zhang et al. |
| 2017/0171060 | A1 | 6/2017 | Liu et al. |
| 2018/0062795 | A1 | 3/2018 | Torsner et al. |
| 2018/0262950 | A1 | 9/2018 | Malkamaki et al. |
| 2019/0081746 | A1 | 3/2019 | Han et al. |
| 2019/0149274 | A1 | 5/2019 | Freda et al. |
| 2019/0150224 | A1 | 5/2019 | Han et al. |
| 2019/0174576 | A1 | 6/2019 | Palat et al. |
| 2019/0182660 | A1 | 6/2019 | Lee et al. |
| 2019/0200273 | A1* | 6/2019 | Pedersen ............... H04L 1/1835 |
| 2019/0357196 | A1* | 11/2019 | Majmundar ........ H04L 49/3072 |
| 2023/0155725 | A1* | 5/2023 | Wu ....................... H04L 1/0045 370/328 |
| 2023/0269026 | A1* | 8/2023 | Zheng ..................... H04L 69/22 714/726 |
| 2023/0283411 | A1 | 9/2023 | Zheng et al. |

FOREIGN PATENT DOCUMENTS

| CN | 104753627 A | 7/2015 |
| CN | 104836646 A | 8/2015 |
| CN | 105306165 A | 2/2016 |
| CN | 106411478 A | 2/2017 |
| CN | 106464435 A | 2/2017 |
| CN | 107769887 A | 3/2018 |
| CN | 107950071 A | 4/2018 |
| CN | 109076475 A | 12/2018 |
| CN | 109314597 A | 2/2019 |
| CN | 110830163 A | 2/2020 |
| CN | 111031574 A | 4/2020 |
| CN | 111373791 A | 7/2020 |
| EP | 3073661 A1 | 9/2016 |
| EP | 3541021 A1 | 9/2019 |
| WO | WO-2009116783 A1 | 9/2009 |
| WO | WO-2017032338 A1 | 3/2017 |
| WO | WO-2017035727 A1 | 3/2017 |
| WO | WO-2018082816 A1 | 5/2018 |

OTHER PUBLICATIONS

Digital Fountain, et al., "Permanent Document on: Simulation Guidelines for the Evaluation of FEC Methods for MBMS Download and Streaming Services," 3GPP TSG-SA4#31 meeting, S4-040348, May 17-21, 2004, Montreal, Canada, May 21, 2004 (May 21, 2004), the whole document, 28 pages.
International Search Report and Written Opinion—PCT/CN2020/104027—ISA/EPO—Apr. 26, 2021.
International Search Report and Written Opinion—PCT/CN2021/108240—ISA/EPO—Oct. 21, 2021.
International Search Report and Written Opinion—PCT/CN2021/108260—ISA/EPO—Oct. 25, 2021.
Rapporteur (Ericsson): "Running CR for 38.322 for NR V2X", R2-1916449, 3GPP TSG-RAN WG2 #108, Reno, USA, Nov. 18-22, 2019, Nov. 22, 2019 (Nov. 22, 2019) the Whole Document, 38 Pages.
Huawei, et al., "Clarification on RLC Status PDU Construction", 3GPP Draft, 3GPP TSG-RAN WG2 #100, R2-1712320, Reno, USA , Nov. 27-Dec. 1, 2017, 2 Pages.
International Search Report and Written Opinion—PCT/CN2020/104543—ISA/EPO—Apr. 22, 2021.
International Search Report and Written Opinion—PCT/CN2020/104029—ISA/EPO—Apr. 26, 2021.
International Search Report and Written Opinion—PCT/CN2020/104093—ISA/EPO—Apr. 7, 2021.
International Search Report and Written Opinion—PCT/CN2020/106718—ISA/EPO—Apr. 29, 2021.
Qualcomm Incorporated: "Introduction of NB-IoT Functionality to PDCP protocol", 3GPP TSG-RAN WG2 Meeting #93, R2-161489, Feb. 19, 2016 (Feb. 19, 2016), 32 Pages, the whole document.
Supplementary Partial European Search Report—EP21847381—Search Authority—Munich—Jul. 17, 2024.
Razavi R., et al., "Block-Based Rateless Coding for Energy-Efficient Video Streaming over Bluetooth", IEEE Symposium on Computers and Communications, Piscataway, NJ, USA, Jul. 6, 2008, 6 pages, XP031321506, ISBN: 978-1-4244-2702-4, Sections II, III-C.
Supplementary European Search Report—EP21847381—Search Authority—Munich—Nov. 15, 2024.

* cited by examiner

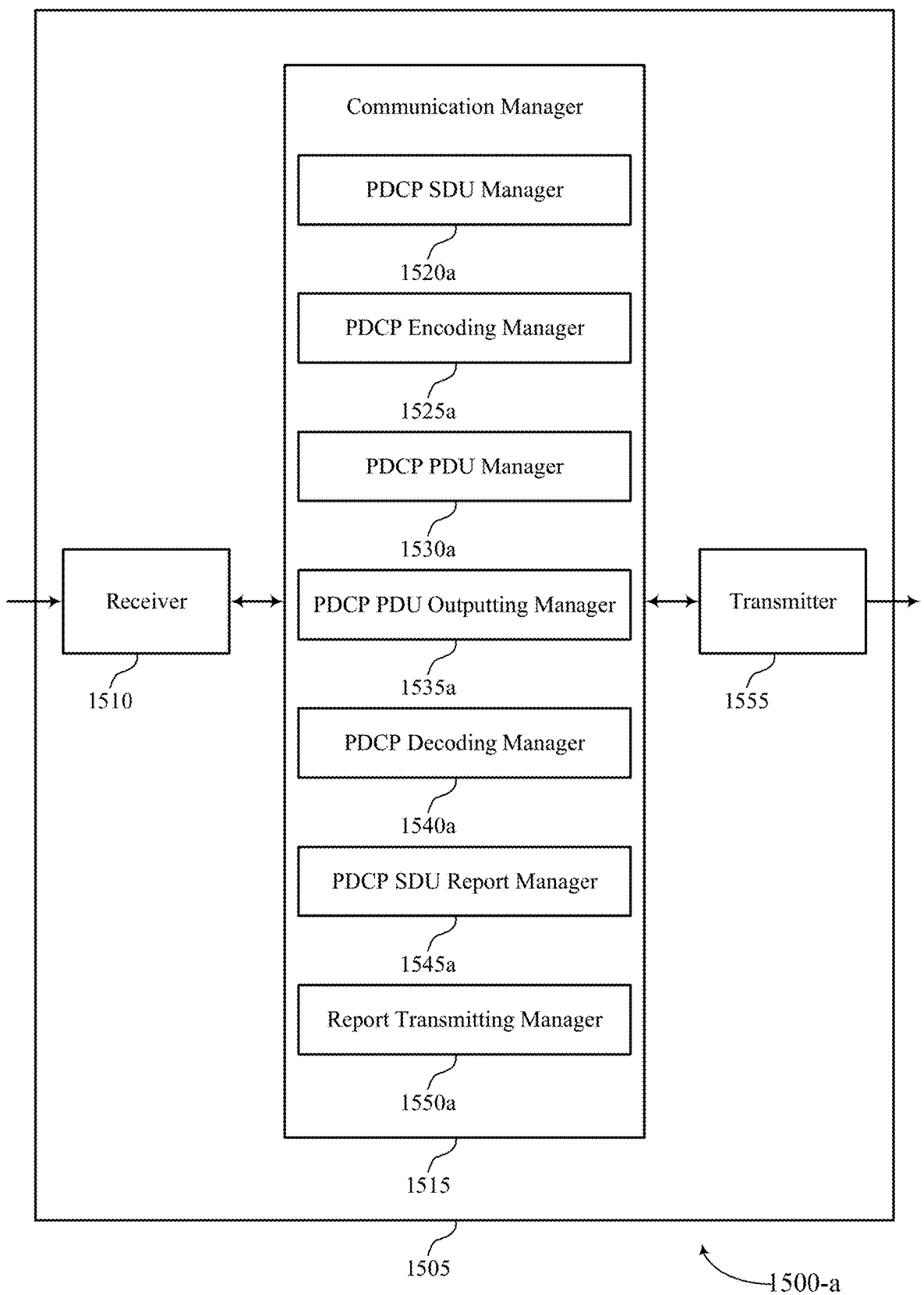
FIG. 15-A

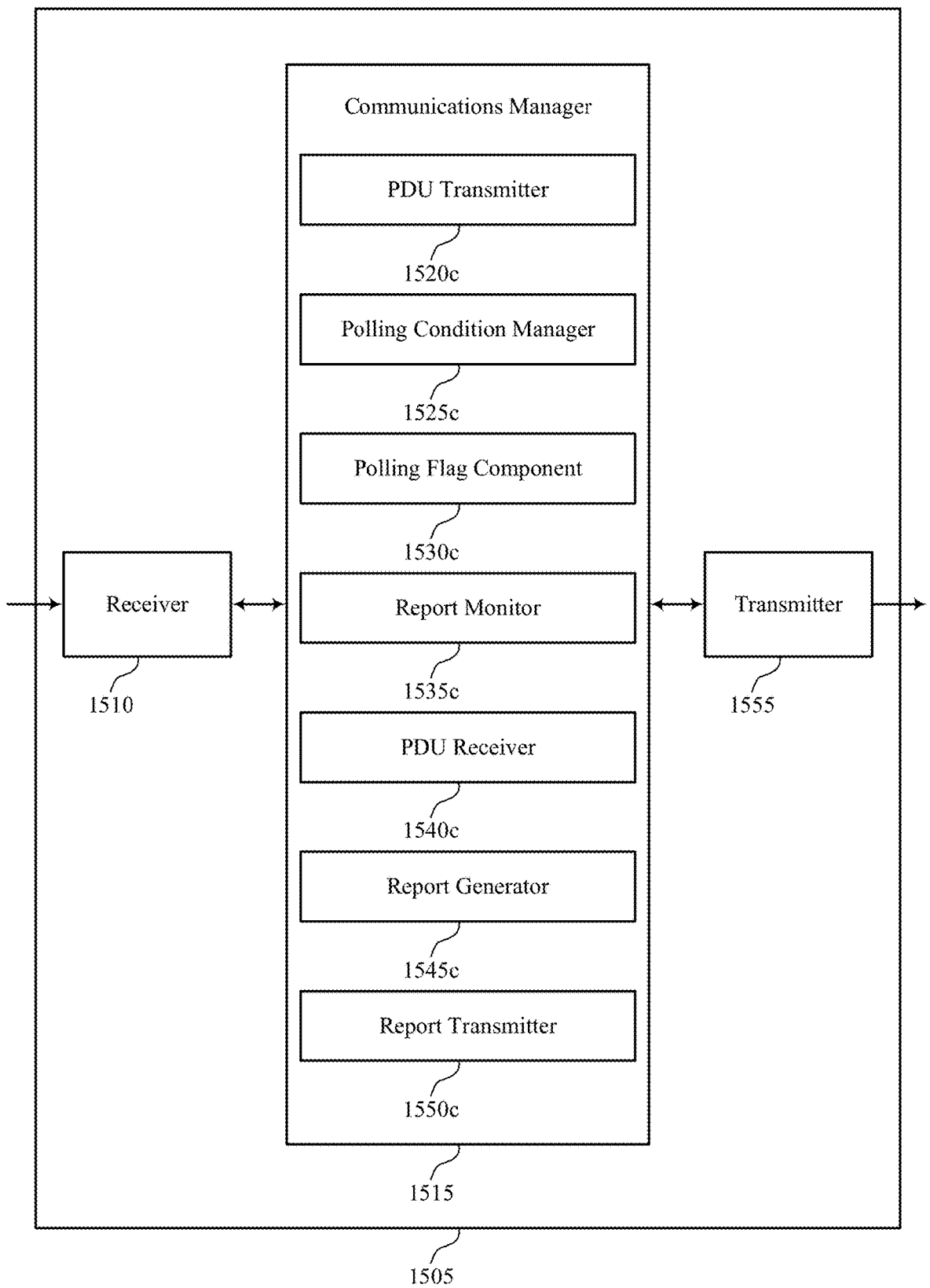
FIG. 15-C

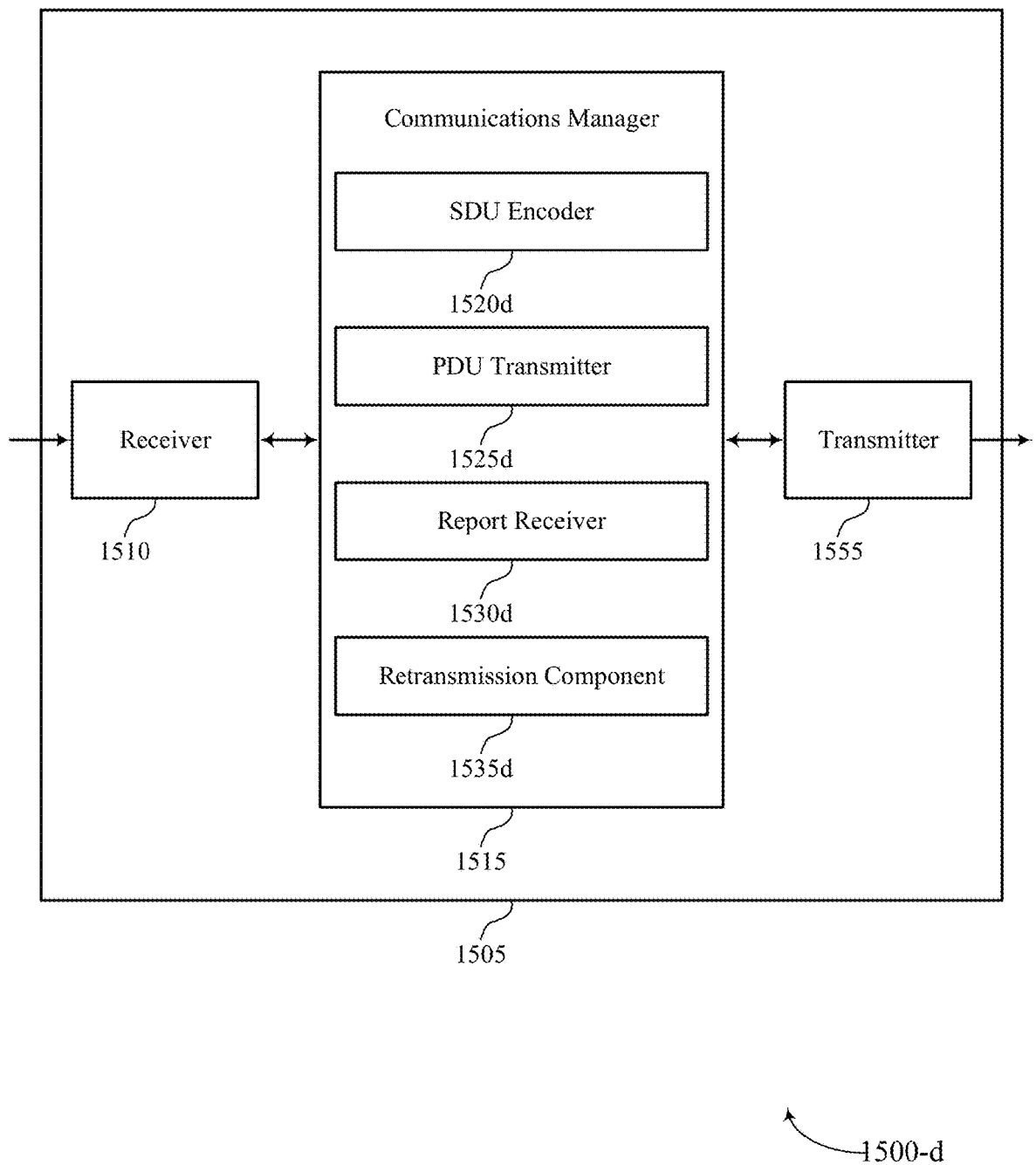
FIG. 15-D

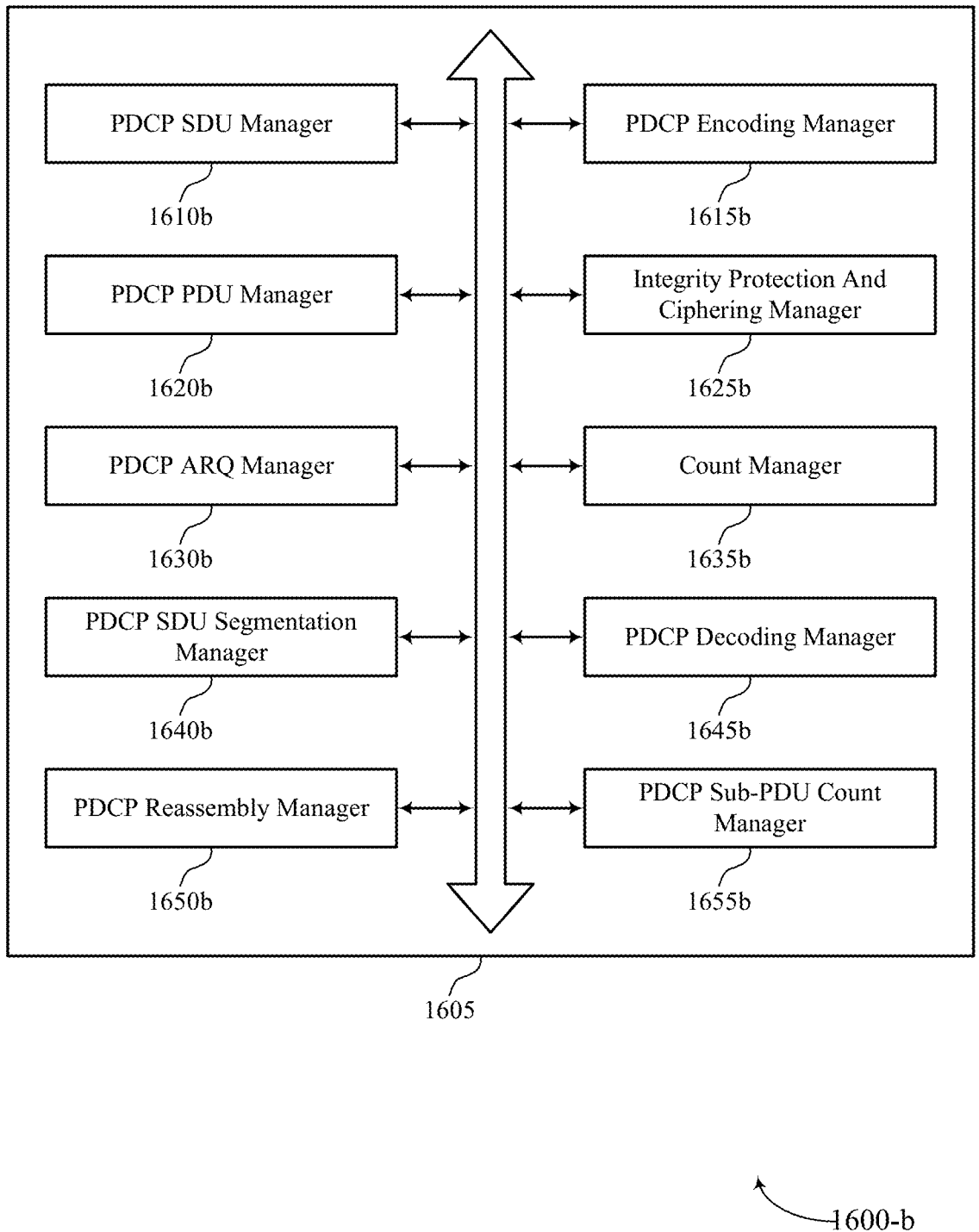
FIG. 16-B

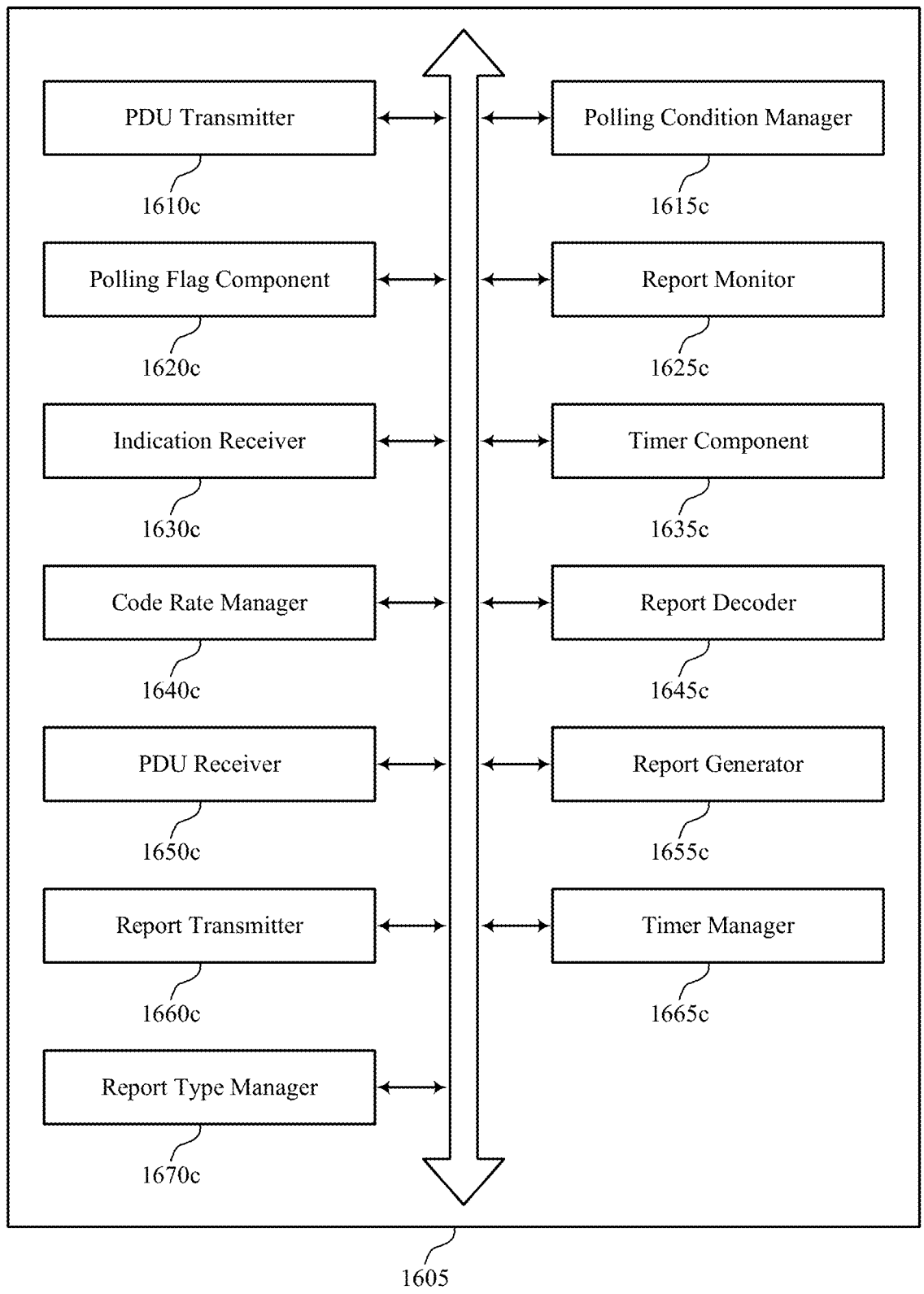
FIG. 16-C

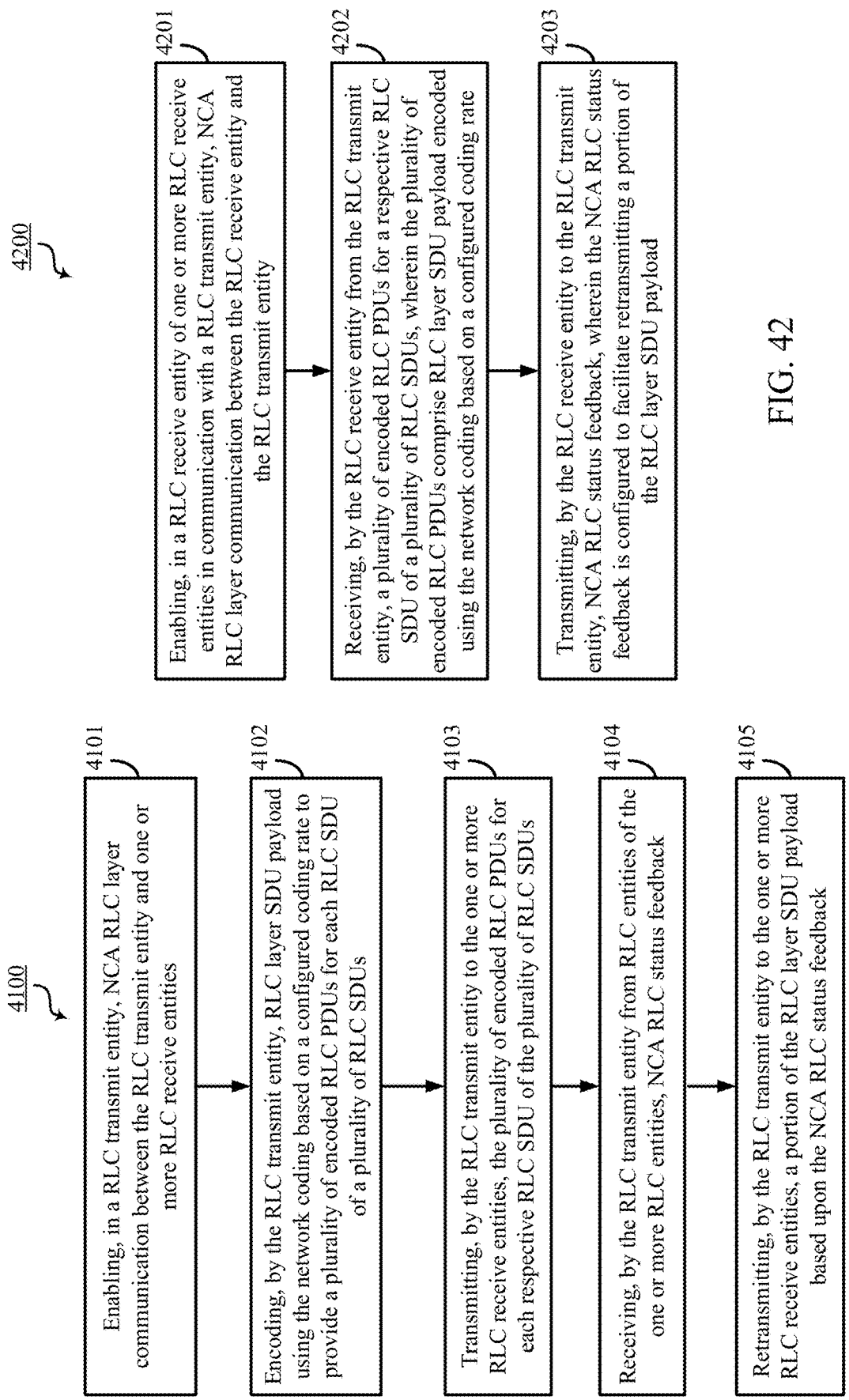

4500-a

RATELESS CODING AT LAYER TWO PROTOCOL LAYER

CROSS REFERENCE TO RELATED APPLICATIONS

The present application is a 371 national stage filing of International PCT Application No. PCT/CN2021/108260 by Zheng et al. entitled "RATELESS CODING AT LAYER TWO PROTOCOL LAYER," filed Jul. 23, 2021; and claims priority to International Patent Application No. PCT/CN2020/104027 by Zheng et al., entitled "RATELESS CODING AT A PACKET DATA CONVERGENCE PROTOCOL LAYER," filed Jul. 24, 2020, and to International Patent Application No. PCT/CN2020/104093 by Zheng et al., entitled "OUTER CODING AT A PACKET DATA CONVERGENCE PROTOCOL LAYER," filed Jul. 24, 2020, and to International Patent Application No. PCT/CN/2020/104029 by Zheng et al., entitled "POLLING AND STATUS REPORTING FOR NETWORK CODING," filed Jul. 24, 2020, and to International Patent Application No. PCT/CN2020/104543 by Zheng et al., entitled "RETRANSMISSION PROCEDURES AT A PACKET DATA CONVERGENCE PROTOCOL LAYER," filed Jul. 24, 2020, and to International Patent Application No. PCT/CN2020/106718 by Zheng et al., entitled "NETWORK CODING AUGMENTED RADIO LINK CONTROL (RLC) LAYER COMMUNICATION," filed Aug. 4, 2020, each of which is assigned to the assignee hereof, and each of which is expressly incorporated by reference in its entirety herein.

FIELD OF TECHNOLOGY

The following relates to wireless communications, including rateless coding at a layer two (L2) protocol layer, outer coding at an L2 protocol layer, polling and status reporting for network coding, retransmission procedures at an L2 protocol layer, communication of L2 protocol layer payloads, and the like.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support rateless coding at (e.g., in) a layer two (L2) protocol layer, such as a packet data convergence protocol (PDCP) layer or a radio link control (RLC) layer. The described techniques further relate to improved methods, systems, devices, and apparatuses that support polling and status reporting for network (e.g., rateless) coding, such as network coding as performed at an L2 layer. The described techniques further relate to improved methods, systems, devices, and apparatuses that support retransmission procedures at an L2 layer.

For example, at the L2 layer and in at least some cases after integrity protection and ciphering, a service data unit (SDU) may be segmented into one or more L2 packet data units (PDUs), and the L2 PDUs may be encoded using a rateless code (e.g., a network code, outer code, etc.). For example, a transmitting device (e.g., a user equipment (UE) and/or base station performing a transmission) may receive a set of L2 SDUs at the L2 layer. The set of L2 SDUs may correspond to a payload of data (e.g., packets) for transmission to receiving device(s) (e.g., a UE(s) and/or base station(s) receiving the transmission). The transmitting device may use the rateless code to encode an L2 SDU to generate, create, obtain, etc., a set of encoded L2 PDUs, including source L2 PDUs and parity L2 PDUs. The set of encoded L2 PDUs are then passed down to one or more lower layer(s) for transmission to the receiving devices.

The receiving device may receive the transmission and provide the set of encoded L2 PDUs to the L2 layer for decoding. The receiving device may decode the set of encoded L2 PDUs to obtain an L2 SDU. For example, the receiving device may receive (e.g. via radio resource control (RRC) signaling) a threshold quantity of L2 PDUs of an L2 SDU (e.g., source PDUs and parity PDUs), rearrange/reassemble the L2 PDUs, and then use the rateless code to decode the set of encoded L2 PDUs to obtain the corresponding L2 SDU. The L2 SDU (e.g., obtained based on decoding using the rateless code) may be passed or otherwise provided to integrity protection and ciphering then an upper layer of the receiving device for further processing/recovery of the L2 SDU. In some cases, if the receiving device is able to successfully reassemble the L2 SDU, the receiving device may discard and refrain from decoding any additional L2 PDUs associated with the L2 SDU.

As another example, at the L2 layer and in at least some cases before integrity protection and ciphering, the L2 PDU may be encoded using a rateless code (e.g., a network code, outer code, etc.). For example, a transmitting device (e.g., a UE and/or base station performing a transmission) may receive a set of L2 SDUs at the L2 layer. The set of L2 SDUs may correspond to a payload of data (e.g., packets) for transmission to receiving device(s) (e.g., a UE(s) and/or base station(s) receiving the transmission). The transmitting device may use the rateless code to encode the set of L2 SDUs to generate, create, obtain, etc., a set of encoded L2 PDUs. The set of encoded L2 PDUs are then passed down to one or more lower layer(s) for transmission to the receiving devices.

The receiving device may receive the transmission and provide the set of encoded L2 PDUs to the L2 layer (e.g., after integrity protection and ciphering) for decoding. The receiving device may decode the set of encoded L2 PDUs to obtain the set of L2 PDUs. For example, the receiving device may receive a threshold quantity of L2 sub-PDUs of an L2 PDU (e.g., source sub-PDUs and parity sub-PDUs), rearrange/reassemble the L2 sub-PDUs, and then use the rateless code to decode the L2 PDU to obtain the corresponding L2 SDU. The set of L2 SDUs (e.g., obtained based on decoding using the rateless code) may be passed or otherwise provided to an upper layer of the receiving device for further processing/recovery of the L2 SDU.

As another example, the described techniques provide for reducing latency by enabling feedback (e.g., automatic repeat request (ARQ) procedures) at an L2 layer of a device in a wireless communications system. A transmitting device (e.g., a base station) may perform L2 polling, and a receiving device (e.g., a UE) may perform L2 status PDU reporting as part of the ARQ procedures.

For example, a receiving device may receive a set of L2 PDUs at an L2 layer from a transmitting device. The set of L2 PDUs may correspond to one or more L2 SDUs. The receiving device may generate a report indicating a status of the set of L2 PDUs or the one or more L2 SDUs at the L2 layer. For instance, the status may indicate whether one or more L2 PDUs or L2 SDUs were successfully or unsuccessfully received by the receiving device. The receiving device may transmit the report to the transmitting device. In some cases, the receiving device may receive an L2 PDU that includes a polling flag from the transmitting device, and the report may be generated based on the polling flag. Additionally or alternatively, the report may be generated based on the expiration of a timer at the receiving device.

As another example, the described techniques provide for reducing latency by enabling feedback (e.g., ARQ procedures) at an L2 layer of a device in a wireless communications system. A transmitting device (e.g., a base station) may transmit a set of L2 PDUs to a receiving device, and a receiving device (e.g., a UE) may configure and transmit a report to the transmitting device (e.g., perform L2 status PDU reporting) as part of the ARQ procedures. The report may include one or more indications associated with the set of L2 PDUs. Based on the received report, the transmitting device may configure a second set of L2 PDUs to transmit to the receiving device.

For example, a transmitting device may encode, at an L2 layer of the transmitting device, a set of L2 SDUs according to a set of network coding parameters to obtain a first set of L2 PDUs. The transmitting device may transmit, to one or more receiving devices (e.g., via a broadcast or multicast message), the first set of L2 PDUs and receive, from a receiving device of the one or more receiving devices, a report indicating an L2 SDU of the set of L2 SDUs that was unsuccessfully received (which, as used herein, may mean not successfully obtained for any reason, such as a failure of reception or a failure of decoding) at the receiving device. In some cases, the report may additionally include a bitmap indicating which L2 SDUs were successfully received, and which L2 SDUs were not successfully received. Additionally or alternatively to the bitmap, the report may include an indication of the number of L2 PDUs the receiving device used to assemble one L2 SDU. Based on the received report, the transmitting device may transmit, to the one or more receiving devices, a second set of L2 PDUs corresponding to at least the L2 SDU of the set of L2 SPDUs. In some cases, the transmitting device may receive a feedback report from more than one device, and may determine the second set of L2 PDUs based on the multiple feedback reports.

A method for wireless communication at a transmitting device is described. The method may include receiving one or more SDUs at an L2 layer of the transmitting device, encoding, at the L2 layer, the one or more SDUs according to one or more network coding parameters to obtain at least one encoded PDU, the one or more network coding parameters including a rateless code, generating, for the at least one encoded PDU, at least one corresponding PDU header, and outputting the at least one encoded PDU and the at least one corresponding PDU header from the L2 layer to a lower layer of the transmitting device for transmission to one or more receiving devices.

An apparatus for wireless communication at a transmitting device is described. The apparatus may include a processor, memory coupled with the processor, and instructions stored in the memory. The instructions may be executable by the processor to cause the apparatus to receive one or more SDUs at an L2 layer of the transmitting device, encode, at the L2 layer, the one or more SDUs according to one or more network coding parameters to obtain at least one encoded PDU, the one or more network coding parameters including a rateless code, generate, for the at least one encoded PDU, at least one corresponding PDU header, and output the at least one encoded PDU and the at least one corresponding PDU header from the L2 layer to a lower layer of the transmitting device for transmission to one or more receiving devices.

Another apparatus for wireless communication at a transmitting device is described. The apparatus may include means for receiving one or more SDUs at an L2 layer of the transmitting device, means for encoding, at the L2 layer, the one or more SDUs according to one or more network coding parameters to obtain at least one encoded PDU, the one or more network coding parameters including a rateless code, means for generating, for the at least one encoded PDU, at least one corresponding PDU header, and means for outputting the at least one encoded PDU and the at least one corresponding PDU header from the L2 layer to a lower layer of the transmitting device for transmission to one or more receiving devices.

A non-transitory computer-readable medium storing code for wireless communication at a transmitting device is described. The code may include instructions executable by a processor to receive one or more SDUs at an L2 layer of the transmitting device, encode, at the L2 layer, the one or more SDUs according to one or more network coding parameters to obtain at least one encoded PDU, the one or more network coding parameters including a rateless code, generate, for the at least one encoded PDU, at least one corresponding PDU header, and output the at least one encoded PDU and the at least one corresponding PDU header from the L2 layer to a lower layer of the transmitting device for transmission to one or more receiving devices.

Some examples of the method, apparatuses, and non-transitory computer-readable medium described herein may further include operations, features, means, or instructions for segmenting an SDU of the one or more SDUs into a set of PDUs at the L2 layer, where encoding the one or more SDUs to obtain the at least one encoded PDU includes encoding the set of PDUs according to the one or more network coding parameters to obtain a set of encoded PDUs, generating the at least corresponding PDU header includes generating, for the set of encoded PDUs, a corresponding set of PDU headers, and outputting the at least one encoded PDU and the at least one corresponding PDU header includes outputting the set of encoded PDUs and the corresponding set of PDU headers from the L2 layer to the lower layer.

Some examples of the method, apparatuses, and non-transitory computer-readable medium described herein may further include operations, features, means, or instructions for performing, at the L2 layer and before the encoding, an integrity protection and ciphering function on the SDU.

In some examples of the method, apparatuses, and non-transitory computer-readable medium described herein, the set of PDUs includes a set of source PDUs, and encoding the set of PDUs includes encoding the set of source PDUs to obtain a set of encoded source PDUs and a set of encoded parity PDUs.

In some examples of the method, apparatuses, and non-transitory computer-readable medium described herein, the one or more network coding parameters include a minimum code rate for the set of encoded PDUs, and a quantity of encoded PDUs included in the set of encoded PDUs is based at least in part on the minimum code rate.

In some examples of the method, apparatuses, and non-transitory computer-readable medium described herein, generating the set of PDU headers includes setting, within each PDU header of the set of PDU headers, a field indicating an index for an associated encoded PDU corresponding to the SDU, where the index corresponds to an ordering for the set of encoded PDUs.

In some examples of the method, apparatuses, and non-transitory computer-readable medium described herein, generating the set of PDU headers includes setting, within a PDU header of the set of PDU headers, a flag indicating that an associated encoded PDU is a last encoded PDU of the set of encoded PDUs corresponding to the SDU.

In some examples of the method, apparatuses, and non-transitory computer-readable medium described herein, generating the set of PDU headers includes setting, within each PDU header of the set of PDU headers, a repair field indicating whether an associated encoded PDU is a repaired PDU.

Some examples of the method, apparatuses, and non-transitory computer-readable medium described herein may further include operations, features, means, or instructions for receiving, from the receiving device, an indication of a quantity of encoded PDUs used by the receiving device to obtain the SDU, and adjusting a code rate of the one or more network coding parameters based at least in part on the indicated quantity of encoded PDUs.

In some examples of the method, apparatuses, and non-transitory computer-readable medium described herein, the one or more SDUs include a set of SDUs, encoding the one or more SDUs to obtain the at least one encoded PDU includes encoding the set of SDUs according to the one or more network coding parameters to obtain a set of encoded PDUs, and outputting the at least one encoded PDU and the at least one corresponding PDU header includes outputting the set of encoded PDUs from the L2 layer to the lower layer.

Some examples of the method, apparatuses, and non-transitory computer-readable medium described herein may further include operations, features, means, or instructions for performing, at the L2 layer and after the encoding, an integrity protection and ciphering function on the set of encoded PDUs.

In some examples of the method, apparatuses, and non-transitory computer-readable medium described herein, encoding the set of SDUs includes segmenting an SDU of the set of SDUs into a set of sub-protocol data units (sub-PDUs), each sub-PDU having a same size, encoding the set of sub-PDUs using the rateless code to obtain a set of source sub-PDUs, and encoding at least a subset of the sub-PDUs using the rateless code to obtain a set of parity sub-PDUs, the set of source sub-PDUs and the set of parity sub-PDUs collectively including an encoded PDU of the set of encoded PDUs.

Some examples of the method, apparatuses, and non-transitory computer-readable medium described herein may further include operations, features, means, or instructions for receiving a report indicating a quantity of sub-PDUs the receiving device decoded and used to attempt to reassemble the SDU, and adjusting a code rate of the encoding using the rateless code based at least in part on the report.

In some examples of the method, apparatuses, and non-transitory computer-readable medium described herein, the L2 layer includes a PDCP layer or an RLC layer.

A method for wireless communication at a receiving device is described. The method may include receiving, at an L2 layer of the receiving device, one or more PDUs and one or more corresponding PDU headers from a transmitting device, the one or more PDUs and the one or more corresponding PDU headers corresponding to one or more SDUs, decoding, at the L2 layer, at least a subset of the one or more PDUs based at least in part on one or more network coding parameters and the one or more corresponding PDU headers, the one or more network coding parameters including a rateless code, generating a report based at least in part on the decoding, where the report indicates whether an SDU of the one or more SDUs was obtained via the decoding, and transmitting the report to the transmitting device.

An apparatus for wireless communication at a receiving device is described. The apparatus may include a processor, memory coupled with the processor, and instructions stored in the memory. The instructions may be executable by the processor to cause the apparatus to receive, at an L2 layer of the receiving device, one or more PDUs and one or more corresponding PDU headers from a transmitting device, the one or more PDUs and the one or more corresponding PDU headers corresponding to one or more SDUs, decode, at the L2 layer, at least a subset of the one or more PDUs based at least in part on one or more network coding parameters and the one or more corresponding PDU headers, the one or more network coding parameters including a rateless code, generate a report based at least in part on the decoding, where the report indicates whether an SDU of the one or more SDUs was obtained via the decoding, and transmit the report to the transmitting device.

Another apparatus for wireless communication at a receiving device is described. The apparatus may include means for receiving, at an L2 layer of the receiving device, one or more PDUs and one or more corresponding PDU headers from a transmitting device, the one or more PDUs and the one or more corresponding PDU headers corresponding to one or more SDUs, decoding, at the L2 layer, at least a subset of the one or more PDUs based at least in part on one or more network coding parameters and the one or more corresponding PDU headers, the one or more network coding parameters including a rateless code, generating a report based at least in part on the decoding, where the report indicates whether an SDU of the one or more SDUs was obtained via the decoding, and transmitting the report to the transmitting device.

A non-transitory computer-readable medium storing code for wireless communication at a receiving device is described. The code may include instructions executable by a processor to receive, at an L2 layer of the receiving device, one or more PDUs and one or more corresponding PDU headers from a transmitting device, the one or more PDUs and the one or more corresponding PDU headers corresponding to one or more SDUs, decode, at the L2 layer, at least a subset of the one or more PDUs based at least in part on one or more network coding parameters and the one or more corresponding PDU headers, the one or more network coding parameters including a rateless code, generate a report based at least in part on the decoding, where the report indicates whether an SDU of the one or more SDUs was obtained via the decoding, and transmit the report to the transmitting device.

In some examples of the method, apparatuses, and non-transitory computer-readable medium described herein, receiving the one or more PDUs and the one or more corresponding PDU headers includes receiving a set of PDUs and a corresponding set of PDU headers, the set of PDUs and the corresponding set of PDU headers corresponding to the SDU, and decoding at least the subset of the one or more PDUs includes decoding at least a subset of the set of PDUs and is based at least in part on the corresponding set of PDU headers.

Some examples of the method, apparatuses, and non-transitory computer-readable medium described herein may further include operations, features, means, or instructions for determining that at least a minimum quantity of PDUs of the set of PDUs has been received, where the decoding is based at least in part on determining that at least the minimum quantity of PDUs has been received.

Some examples of the method, apparatuses, and non-transitory computer-readable medium described herein may further include operations, features, means, or instructions for receiving an indication of the minimum quantity of PDUs in the set of PDUs via radio resource control signaling.

Some examples of the method, apparatuses, and non-transitory computer-readable medium described herein may further include operations, features, means, or instructions for identifying, within each PDU header of the set of PDU headers, a field indicating an index for an associated PDU corresponding to the SDU, where the set of PDUs are decoded based at least in part on an ordering corresponding to the index.

Some examples of the method, apparatuses, and non-transitory computer-readable medium described herein may further include operations, features, means, or instructions for identifying, within a PDU header of the set of PDU headers, a flag indicating that an associated PDU is a last PDU of the set of PDUs corresponding to the SDU.

Some examples of the method, apparatuses, and non-transitory computer-readable medium described herein may further include operations, features, means, or instructions for identifying, within each PDU header of the set of PDU headers, a repair field indicating whether an associated PDU is a repaired PDU.

In some examples of the method, apparatuses, and non-transitory computer-readable medium described herein, the one or more network coding parameters include a minimum quantity of PDUs of the set of PDUs for receipt prior to decoding, and the method, apparatuses, and non-transitory computer-readable medium described herein may further include operations, features, means, or instructions for receiving an indication of the minimum quantity of PDUs via radio resource control signaling.

Some examples of the method, apparatuses, and non-transitory computer-readable medium described herein may further include operations, features, means, or instructions for performing, at the L2 layer and after decoding at least the subset of the one or more PDUs to obtain the at least one SDU, an integrity verification and deciphering function on the at least one SDU.

Some examples of the method, apparatuses, and non-transitory computer-readable medium described herein may further include operations, features, means, or instructions for performing, at the L2 layer and before the decoding, an integrity verification and deciphering function on the one or more PDUs.

Some examples of the method, apparatuses, and non-transitory computer-readable medium described herein may further include operations, features, means, or instructions for obtaining the SDU from the subset of the one or more PDUs via the decoding, and refraining from decoding a remaining subset of the one or more PDUs based at least in part on obtaining the SDU.

In some examples of the method, apparatuses, and non-transitory computer-readable medium described herein, the report includes an indication of a quantity of PDUs used by the receiving device to obtain the SDU, a bitmap indicating for each PDCP SDU in a set of PDCP SDUs having a sequence number greater than the sequence number of the PDCP SDU whether the receiving device was able to successfully obtain or was not able to obtain a respective PDCP SDU, or both.

In some examples of the method, apparatuses, and non-transitory computer-readable medium described herein, where the receiving device is unable to obtain a set of SDUs included in the one or more SDUs, the report includes a sequence number of the SDU based at least in part on the SDU having a lowest sequence number among the set of SDUs that the receiving device is unable to obtain.

In some examples of the method, apparatuses, and non-transitory computer-readable medium described herein, the one or more PDUs comprise a set of sub-PDUs corresponding to the SDU, the set of sub-PDUs received at the L2 layer from a lower layer of the receiving device, and the SDU is obtained via the decoding based at least in part on the set of sub-PDUs and without one or more additional sub-PDUs corresponding to the SDU being received at the L2 layer.

In some examples of the method, apparatuses, and non-transitory computer-readable medium described herein, the L2 layer includes a PDCP layer or an RLC layer.

A method for wireless communication at a transmitting device is described. The method may include encoding, at an L2 layer of the transmitting device, a set of SDUs according to a set of network coding parameters to obtain a first set of PDUs, transmitting, to one or more receiving devices, the first set of PDUs, receiving, from a receiving device of the one or more receiving devices, a report indicating an SDU of the set of SDUs that was unsuccessfully received at the receiving device, and transmitting, to the one or more receiving devices, based at least in part on the received report, a second set of one or more PDUs corresponding to at least the SDU of the set of SDUs.

An apparatus for wireless communication at a transmitting device is described. The apparatus may include a processor, memory coupled with the processor, and instructions stored in the memory. The instructions may be executable by the processor to cause the apparatus to encode, at an L2 layer of the transmitting device, a set of SDUs according to a set of network coding parameters to obtain a first set of PDUs, transmit, to one or more receiving devices, the first set of PDUs, receive, from a receiving device of the one or more receiving devices, a report indicating an SDU of the set of SDUs that was unsuccessfully received at the receiving device, and transmit, to the one or more receiving devices, based at least in part on the received report, a second set of one or more PDUs corresponding to at least the SDU of the set of SDUs.

Another apparatus for wireless communication at a transmitting device is described. The apparatus may include means for encoding, at an L2 layer of the transmitting device, a set of SDUs according to a set of network coding parameters to obtain a first set of PDUs, transmitting, to one or more receiving devices, the first set of PDUs, receiving, from a receiving device of the one or more receiving devices, a report indicating an SDU of the set of SDUs that was unsuccessfully received at the receiving device, and transmitting, to the one or more receiving devices, based at least in part on the received report, a second set of one or more PDUs corresponding to at least the SDU of the set of SDUs.

A non-transitory computer-readable medium storing code for wireless communication at a transmitting device is described. The code may include instructions executable by a processor to encode, at an L2 layer of the transmitting device, a set of SDUs according to a set of network coding parameters to obtain a first set of PDUs, transmit, to one or more receiving devices, the first set of PDUs, receive, from a receiving device of the one or more receiving devices, a report indicating an SDU of the set of SDUs that was unsuccessfully received at the receiving device, and transmit, to the one or more receiving devices, based at least in part on the received report, a second set of one or more PDUs corresponding to at least the SDU of the set of SDUs.

Some examples of the method, apparatuses, and non-transitory computer-readable medium described herein may further include operations, features, means, or instructions for receiving, from a second receiving device of the one or more receiving devices, a second report indicating a second SDU of the set of SDUs that was unsuccessfully received at the second receiving device, and determining an earliest SDU between the SDU and the second SDU based at least in part on respective sequence numbers associated with the SDU and the second SDU, where at least some of the second set of one or more PDUs correspond to the earliest SDU based at least in part on the determining.

In some examples of the method, apparatuses, and non-transitory computer-readable medium described herein, the second set of one or more PDUs further corresponds to each SDU of the set of SDUs having a sequence number greater than an earliest SDU.

In some examples of the method, apparatuses, and non-transitory computer-readable medium described herein, the report includes a sequence number associated with the SDU and the second report includes a sequence number associated with the second SDU.

In some examples of the method, apparatuses, and non-transitory computer-readable medium described herein, the report and the second report each include an indication of a quantity of PDUs or sub-PDUs used by the respective receiving device to obtain an SDU of the set of SDUs, and the method, apparatuses, and non-transitory computer-readable medium described herein may further include operations, features, means, or instructions for adjusting a code rate for encoding SDUs at the L2 layer based at least in part on the indication of the quantity of PDUs.

In some examples of the method, apparatuses, and non-transitory computer-readable medium described herein, the report and the second report each include an indication of an average quantity of PDUs or sub-PDUs used by the respective receiving device to obtain one or more SDUs of the set of SDUs, and the method, apparatuses, and non-transitory computer-readable medium described herein may further include operations, features, means, or instructions for adjusting a code rate for encoding SDUs at the L2 layer based at least in part on the indication of the average quantity of PDUs.

In some examples of the method, apparatuses, and non-transitory computer-readable medium described herein, the report and the second report each include a bitmap indicating, for each SDUs of the set of SDUs having a sequence number greater than the respective indicated sequence number, whether the respective receiving device was successful or unsuccessful in obtaining a respective SDU.

Some examples of the method, apparatuses, and non-transitory computer-readable medium described herein may further include operations, features, means, or instructions for determining the second set of one or more PDUs based at least in part on respective bitmaps of the report and the second report, the second set of one or more PDUs corresponding to the earliest SDU and one or more SDUs unsuccessfully received by at least one of the receiving device and the second receiving device.

Some examples of the method, apparatuses, and non-transitory computer-readable medium described herein may further include operations, features, means, or instructions for re-encoding at least a subset of the set of SDUs to obtain the second set of one or more PDUs based at least in part on the report, or the second report, or both.

In some examples of the method, apparatuses, and non-transitory computer-readable medium described herein, each PDU in the second set of one or more PDUs includes a field indicating whether the PDU is a retransmitted PDU.

In some examples of the method, apparatuses, and non-transitory computer-readable medium described herein, the report includes PDU level information for the SDU that was unsuccessfully received, the PDU level information comprising a sequence number (SN), a sub-SN, and segment offset (SO) information for an encoded PDU for the SDU that was unsuccessfully received, and transmitting the second set of one or more PDUs includes re-encoding a subset of a set of PDUs corresponding to the SDU that was unsuccessfully received to obtain one or more re-encoded PDUs and transmitting the one or more re-encoded PDUs.

In some examples of the method, apparatuses, and non-transitory computer-readable medium described herein, the report includes a sequence number associated with the SDU.

Some examples of the method, apparatuses, and non-transitory computer-readable medium described herein may further include operations, features, means, or instructions for determining that a polling condition at the transmitting device has been met, and setting, based at least in part on determining that the polling condition has been met, a polling flag within the second set of one or more PDUs corresponding to at least the SDU of the set of SDUs.

In some examples of the method, apparatuses, and non-transitory computer-readable medium described herein, determining that the polling condition has been met includes determining that a quantity of PDUs included in the first set of PDUs satisfies a threshold.

Some examples of the method, apparatuses, and non-transitory computer-readable medium described herein may further include operations, features, means, or instructions for receiving an indication of the threshold via radio resource control signaling.

In some examples of the method, apparatuses, and non-transitory computer-readable medium described herein, determining that the polling condition has been met includes determining that a quantity of data included in the first set of PDUs satisfies a threshold.

Some examples of the method, apparatuses, and non-transitory computer-readable medium described herein may further include operations, features, means, or instructions for receiving an indication of the threshold via radio resource control signaling.

Some examples of the method, apparatuses, and non-transitory computer-readable medium described herein may further include operations, features, means, or instructions for initiating a timer based at least in part on transmitting a prior PDU that includes a prior polling flag, where determining that the polling condition has been met includes identifying an expiration of the timer.

In some examples of the method, apparatuses, and non-transitory computer-readable medium described herein, the L2 layer includes a PDCP layer or an RLC layer.

A method for wireless communication at a receiving device is described. The method may include receiving, at an L2 layer of the receiving device, a set of PDUs from a transmitting device, the set of PDUs corresponding to one or more SDUs, generating, at the L2 layer, a report indicating a status of the set of PDUs or the one or more SDUs at the receiving device, and transmitting the report to the transmitting device.

An apparatus for wireless communication at a receiving device is described. The apparatus may include a processor, memory coupled with the processor, and instructions stored in the memory. The instructions may be executable by the processor to cause the apparatus to receive, at an L2 layer of the receiving device, a set of PDUs from a transmitting device, the set of PDUs corresponding to one or more SDUs, generate, at the L2 layer, a report indicating a status of the set of PDUs or the one or more SDUs at the receiving device, and transmit the report to the transmitting device.

Another apparatus for wireless communication at a transmitting device is described. The apparatus may include means for receiving, at an L2 layer of the receiving device, a set of PDUs from a transmitting device, the set of PDUs corresponding to one or more SDUs, generating, at the L2 layer, a report indicating a status of the set of PDUs or the one or more SDUs at the receiving device, and transmitting the report to the transmitting device.

A non-transitory computer-readable medium storing code for wireless communication at a transmitting device is described. The code may include instructions executable by a processor to receive, at an L2 layer of the receiving device, a set of PDUs from a transmitting device, the set of PDUs corresponding to one or more SDUs, generate, at the L2 layer, a report indicating a status of the set of PDUs or the one or more SDUs at the receiving device, and transmit the report to the transmitting device.

Some examples of the method, apparatuses, and non-transitory computer-readable medium described herein may further include operations, features, means, or instructions for receiving, from the transmitting device after receiving the set of PDUs, a subsequent PDU that includes a polling flag, where generating the report is based at least in part on the polling flag.

Some examples of the method, apparatuses, and non-transitory computer-readable medium described herein may further include operations, features, means, or instructions for receiving, via radio resource control signaling, an indication of a report type for the receiving device to use to indicate a status of PDUs at the receiving device, the indicated report type one of a plurality of report types, where the report is of the indicated report type.

In some examples of the method, apparatuses, and non-transitory computer-readable medium described herein, the report indicates the report type to the transmitting device.

In some examples of the method, apparatuses, and non-transitory computer-readable medium described herein, the report type is a first report type of the plurality of report types, the report including a sequence number of the SDU based at least in part on the SDU having a lowest sequence number among a subset of one or more SDU that the receiving device is unable to obtain among the one or more SDUs.

In some examples of the method, apparatuses, and non-transitory computer-readable medium described herein, the report type is a second report type of the plurality of report types, the report including the sequence number of the SDU based at least in part on the SDU having a lowest sequence number among a subset of one or more SDU that the receiving device is unable to obtain among the one or more SDUs, and the report further including at least one of an indication of a quantity of PDUs or sub-PDUs used by the receiving device to obtain a SDU or an indication of an average quantity of PDUs or sub-PDUs used by the receiving device to obtain each SDU of a set of SDUs.

In some examples of the method, apparatuses, and non-transitory computer-readable medium described herein, the report type is a third report type of the plurality of report types, the report including the indication of the sequence number for the SDU of the one or more SDUs based at least in part on the SDU having a lowest sequence number among a subset of one or more SDU that the receiving device is unable to obtain among the one or more SDUs, the report further including at least one of the indication of the quantity of PDUs or sub-PDUs used by the receiving device to obtain the SDU or the indication of the average quantity of PDUs or sub-PDUs used by the receiving device to obtain each SDU of the set of SDUs, and the report further including a bitmap indicating, for each SDU among the one or more SDUs having a sequence number greater than the sequence number of the SDU, whether the receiving device was successful or unsuccessful in receiving a respective SDU.

In some examples of the method, apparatuses, and non-transitory computer-readable medium described herein, the report type is a fourth report type of the plurality of report types, the report including PDU level information for a corresponding SDU of the one or more SDUs, the corresponding SDU determined to be missing, and the PDU level information comprising a sequence number (SN), a sub-SN, and segment offset (SO) information for an encoded PDU for the corresponding SDU.

A method for wireless communication at a transmitting device is described. The method may include segmenting a PDCP SDU into a set of PDCP PDUs at a PDCP layer of the transmitting device, encoding, at the PDCP layer, the set of PDCP PDUs according to one or more network coding parameters to obtain a set of encoded PDCP PDUs, the one or more network coding parameters including a rateless code, generating, for the set of encoded PDCP PDUs, a corresponding set of PDU headers, and outputting the set of encoded PDCP PDUs and the corresponding set of PDU headers from the PDCP layer to a lower layer of the transmitting device for transmission to one or more receiving devices.

An apparatus for wireless communication at a transmitting device is described. The apparatus may include a processor, memory coupled with the processor, and instructions stored in the memory. The instructions may be executable by the processor to cause the apparatus to segment a PDCP SDU into a set of PDCP PDUs at a PDCP layer of the transmitting device, encode, at the PDCP layer, the set of PDCP PDUs according to one or more network coding parameters to obtain a set of encoded PDCP PDUs, the one or more network coding parameters including a rateless code, generate, for the set of encoded PDCP PDUs, a corresponding set of PDU headers, and output the set of encoded PDCP PDUs and the corresponding set of PDU headers from the PDCP layer to a lower layer of the transmitting device for transmission to one or more receiving devices.

Another apparatus for wireless communication at a transmitting device is described. The apparatus may include means for segmenting a PDCP SDU into a set of PDCP PDUs at a PDCP layer of the transmitting device, means for encoding, at the PDCP layer, the set of PDCP PDUs according to one or more network coding parameters to obtain a set of encoded PDCP PDUs, the one or more network coding parameters including a rateless code, means for generating, for the set of encoded PDCP PDUs, a corresponding set of PDU headers, and means for outputting the set of encoded PDCP PDUs and the corresponding set of PDU headers from the PDCP layer to a lower layer of the transmitting device for transmission to one or more receiving devices.

A non-transitory computer-readable medium storing code for wireless communication at a transmitting device is described. The code may include instructions executable by a processor to segment a PDCP SDU into a set of PDCP PDUs at a PDCP layer of the transmitting device, encode, at the PDCP layer, the set of PDCP PDUs according to one or more network coding parameters to obtain a set of encoded PDCP PDUs, the one or more network coding parameters including a rateless code, generate, for the set of encoded PDCP PDUs, a corresponding set of PDU headers, and output the set of encoded PDCP PDUs and the corresponding set of PDU headers from the PDCP layer to a lower layer of the transmitting device for transmission to one or more receiving devices.

Some examples of the method, apparatuses, and non-transitory computer-readable medium described herein may further include operations, features, means, or instructions for performing, at the PDCP layer and before the encoding, an integrity protection and ciphering function on the PDCP SDU.

In some examples of the method, apparatuses, and non-transitory computer-readable medium described herein, the set of PDCP PDUs includes a set of source PDCP PDUs, and encoding the set of PDCP PDUs may include operations, features, means, or instructions for encoding the set of source PDCP PDUs to obtain a set of encoded source PDCP PDUs and a set of encoded parity PDCP PDUs.

In some examples of the method, apparatuses, and non-transitory computer-readable medium described herein, generating the set of PDU headers may include operations, features, means, or instructions for setting, within each PDU header of the set of PDU headers, a field indicating an index for an associated encoded PDCP PDU corresponding to the PDCP SDU, where the index corresponds to an ordering for the set of encoded PDUs.

In some examples of the method, apparatuses, and non-transitory computer-readable medium described herein, generating the set of PDU headers may include operations, features, means, or instructions for setting, within a PDU header of the set of PDU headers, a flag indicating that an associated encoded PDCP PDU may be a last encoded PDCP PDU of the set of encoded PDUs corresponding to the PDCP SDU.

In some examples of the method, apparatuses, and non-transitory computer-readable medium described herein, generating the set of PDU headers may include operations, features, means, or instructions for setting, within each PDU header of the set of PDU headers, a repair field indicating whether an associated encoded PDCP PDU may be a repaired PDCP PDU.

In some examples of the method, apparatuses, and non-transitory computer-readable medium described herein, the one or more network coding parameters include a minimum code rate for the set of encoded PDCP PDUs, and where a quantity of encoded PDCP PDUs included in the set of encoded PDCP PDUs may be based on the minimum code rate.

Some examples of the method, apparatuses, and non-transitory computer-readable medium described herein may further include operations, features, means, or instructions for receiving an indication of the minimum code rate for the set of encoded PDCP PDUs via radio resource control signaling.

Some examples of the method, apparatuses, and non-transitory computer-readable medium described herein may further include operations, features, means, or instructions for storing the PDCP SDU or the set of encoded PDCP PDUs in a retransmission buffer implemented at the PDCP layer.

Some examples of the method, apparatuses, and non-transitory computer-readable medium described herein may further include operations, features, means, or instructions for receiving, from a receiving device of the one or more receiving devices, feedback for the set of encoded PDCP PDUs indicating that the receiving device was unable to obtain the PDCP SDU.

Some examples of the method, apparatuses, and non-transitory computer-readable medium described herein may further include operations, features, means, or instructions for retrieving, based on the feedback, the set of encoded PDCP PDUs from a retransmission buffer implemented at the PDCP layer, and retransmitting the set of encoded PDCP PDUs to the one or more receiving devices based on the retrieving.

Some examples of the method, apparatuses, and non-transitory computer-readable medium described herein may further include operations, features, means, or instructions for retrieving, based on the feedback, the PDCP SDU from a retransmission buffer implemented at the PDCP layer, encoding the set of PDCP PDUs according to the one or more network coding parameters to obtain a set of re-encoded PDCP PDUs based on the retrieving, and transmitting the set of re-encoded PDCP PDUs to the one or more receiving devices.

Some examples of the method, apparatuses, and non-transitory computer-readable medium described herein may further include operations, features, means, or instructions for receiving, from a receiving device of the one or more receiving devices, feedback for the set of encoded PDCP PDUs indicating that the receiving device was able to obtain the PDCP SDU.

Some examples of the method, apparatuses, and non-transitory computer-readable medium described herein may further include operations, features, means, or instructions for receiving, from the receiving device, an indication of a quantity of encoded PDCP PDUs used by the receiving device to obtain the PDCP SDU, and adjusting a code rate of the one or more network coding parameters based on the indicated quantity of encoded PDCP PDUs.

Some examples of the method, apparatuses, and non-transitory computer-readable medium described herein may further include operations, features, means, or instructions for configuring a radio link control layer at the transmitting device to operate a transparent mode or an unacknowledged mode, where the encoding at the PDCP layer may be based on the configuring.

A method for wireless communication at a receiving device is described. The method may include receiving, at a PDCP layer of the receiving device, a set of PDCP PDUs and a corresponding set of PDCP PDU headers from a transmitting device, the set of PDCP PDUs and the corresponding set of PDCP PDU headers corresponding to a PDCP SDU, decoding, at the PDCP layer, at least a subset of the set of PDCP PDUs based on one or more network coding parameters and the corresponding set of PDCP PDU headers, the one or more network coding parameters including a rateless code, generating a report based on the decoding, where the report indicates whether the PDCP SDU was obtained from the set of PDCP PDUs, and transmitting the report to the transmitting device.

An apparatus for wireless communication at a receiving device is described. The apparatus may include a processor, memory coupled with the processor, and instructions stored in the memory. The instructions may be executable by the processor to cause the apparatus to receive, at a PDCP layer of the receiving device, a set of PDCP PDUs and a corresponding set of PDCP PDU headers from a transmitting device, the set of PDCP PDUs and the corresponding set of PDCP PDU headers corresponding to a PDCP SDU, decode, at the PDCP layer, at least a subset of the set of PDCP PDUs based on one or more network coding parameters and the corresponding set of PDCP PDU headers, the one or more network coding parameters including a rateless code, generate a report based on the decoding, where the report indicates whether the PDCP SDU was obtained from the set of PDCP PDUs, and transmit the report to the transmitting device.

Another apparatus for wireless communication at a receiving device is described. The apparatus may include means for receiving, at a PDCP layer of the receiving device, a set of PDCP PDUs and a corresponding set of PDCP PDU headers from a transmitting device, the set of PDCP PDUs and the corresponding set of PDCP PDU headers corresponding to a PDCP SDU, means for decoding, at the PDCP layer, at least a subset of the set of PDCP PDUs based on one or more network coding parameters and the corresponding set of PDCP PDU headers, the one or more network coding parameters including a rateless code, means for generating a report based on the decoding, where the report indicates whether the PDCP SDU was obtained from the set of PDCP PDUs, and means for transmitting the report to the transmitting device.

A non-transitory computer-readable medium storing code for wireless communication at a receiving device is described. The code may include instructions executable by a processor to receive, at a PDCP layer of the receiving device, a set of PDCP PDUs and a corresponding set of PDCP PDU headers from a transmitting device, the set of PDCP PDUs and the corresponding set of PDCP PDU headers corresponding to a PDCP SDU, decode, at the PDCP layer, at least a subset of the set of PDCP PDUs based on one or more network coding parameters and the corresponding set of PDCP PDU headers, the one or more network coding parameters including a rateless code, generate a report based on the decoding, where the report indicates whether the PDCP SDU was obtained from the set of PDCP PDUs, and transmit the report to the transmitting device.

Some examples of the method, apparatuses, and non-transitory computer-readable medium described herein may further include operations, features, means, or instructions for performing, at the PDCP layer after decoding at least the subset of the set of PDCP PDUs and obtaining the PDCP SDU, an integrity verification and deciphering function on the PDCP SDU.

Some examples of the method, apparatuses, and non-transitory computer-readable medium described herein may further include operations, features, means, or instructions for determining that at least a minimum quantity of PDCP PDUs of the set of PDCP PDUs may have been received, where the decoding may be based on determining that at least the minimum quantity of PDCP PDUs may have been received.

Some examples of the method, apparatuses, and non-transitory computer-readable medium described herein may further include operations, features, means, or instructions for receiving an indication of the minimum quantity of PDCP PDUs in the set of PDCP PDUs via radio resource control signaling.

Some examples of the method, apparatuses, and non-transitory computer-readable medium described herein may further include operations, features, means, or instructions for obtaining the PDCP SDU from the subset of the set of PDCP PDUs, and refraining from decoding a remaining subset of the set of PDCP PDUs based on obtaining the PDCP SDU.

Some examples of the method, apparatuses, and non-transitory computer-readable medium described herein may further include operations, features, means, or instructions for indicating, to the transmitting device, a quantity of PDCP PDUs used by the receiving device to obtain the PDCP SDU.

Some examples of the method, apparatuses, and non-transitory computer-readable medium described herein may further include operations, features, means, or instructions for determining that the PDCP SDU cannot be obtained from the set of PDCP PDUs, where the report indicates that the receiving device was unable to obtain the PDCP SDU.

Some examples of the method, apparatuses, and non-transitory computer-readable medium described herein may further include operations, features, means, or instructions for monitoring for a retransmission of the set of PDCP PDUs based on transmitting the report.

In some examples of the method, apparatuses, and non-transitory computer-readable medium described herein, the determining may be based on receiving all PDCP PDUs of the set of PDCP PDUs.

In some examples of the method, apparatuses, and non-transitory computer-readable medium described herein, the PDCP SDU may be included in a set of PDCP SDUs, the receiving device may be unable to obtain one or more PDCP SDUs in the set of PDCP SDUs, and the report includes a sequence number of the PDCP SDU based on the PDCP SDU having a lowest sequence number among the one or more PDCP SDUs that the receiving device may be unable to obtain.

In some examples of the method, apparatuses, and non-transitory computer-readable medium described herein, the report further includes a bitmap indicating, for each PDCP SDU in a set of PDCP SDUs having a sequence number greater than the sequence number of the PDCP SDU, whether the receiving device was able to successfully obtain or was not able to obtain a respective PDCP SDU.

Some examples of the method, apparatuses, and non-transitory computer-readable medium described herein may further include operations, features, means, or instructions for identifying, within each PDU header of the set of PDU headers, a field indicating an index for an associated PDCP PDU corresponding to the PDCP SDU, where the set of PDCP PDUs may be decoded based on an ordering corresponding to the index.

Some examples of the method, apparatuses, and non-transitory computer-readable medium described herein may further include operations, features, means, or instructions for identifying, within a PDU header of the set of PDU headers, a flag indicating that an associated PDCP PDU may be a last PDCP PDU of the set of PDCP PDUs corresponding to the PDCP SDU.

Some examples of the method, apparatuses, and non-transitory computer-readable medium described herein may further include operations, features, means, or instructions for identifying, within each PDU header of the set of PDU headers, a repair field indicating whether an associated PDCP PDU may be a repaired PDCP PDU.

Some examples of the method, apparatuses, and non-transitory computer-readable medium described herein may further include operations, features, means, or instructions for configuring a radio link control layer at the receiving device for a transparent mode or an unacknowledged mode, where the decoding at the PDCP layer may be based on the configuring.

In some examples of the method, apparatuses, and non-transitory computer-readable medium described herein, receiving the set of PDCP PDUs may include operations, features, means, or instructions for receiving a set of source PDCP PDUs and a set of parity PDCP PDUs.

A method of wireless communication at a transmitting device is described. The method may include receiving, at a PDCP layer of the transmitting device, a set of PDCP SDUs corresponding to a payload of data for transmission to one or more receiving devices, encoding, at the PDCP layer, the set of PDCP SDUs according to a set of network coding parameters to obtain a set of encoded PDCP PDUs, the network coding parameters including at least a rateless code, and providing the set of encoded PDCP PDUs to a lower layer of the transmitting device for transmission to the one or more receiving devices.

An apparatus for wireless communication at a transmitting device is described. The apparatus may include a processor, memory coupled with the processor, and instructions stored in the memory. The instructions may be executable by the processor to cause the apparatus to receive, at a PDCP layer of the transmitting device, a set of PDCP SDUs corresponding to a payload of data for transmission to one or more receiving devices, encode, at the PDCP layer, the set of PDCP SDUs according to a set of network coding parameters to obtain a set of encoded PDCP PDUs, the network coding parameters including at least a rateless code, and provide the set of encoded PDCP PDUs to a lower layer of the transmitting device for transmission to the one or more receiving devices.

Another apparatus for wireless communication at a transmitting device is described. The apparatus may include means for receiving, at a PDCP layer of the transmitting device, a set of PDCP SDUs corresponding to a payload of data for transmission to one or more receiving devices, encoding, at the PDCP layer, the set of PDCP SDUs according to a set of network coding parameters to obtain a set of encoded PDCP PDUs, the network coding parameters including at least a rateless code, and providing the set of encoded PDCP PDUs to a lower layer of the transmitting device for transmission to the one or more receiving devices.

A non-transitory computer-readable medium storing code for wireless communication at a transmitting device is described. The code may include instructions executable by a processor to receive, at a PDCP layer of the transmitting device, a set of PDCP SDUs corresponding to a payload of data for transmission to one or more receiving devices, encode, at the PDCP layer, the set of PDCP SDUs according to a set of network coding parameters to obtain a set of encoded PDCP PDUs, the network coding parameters including at least a rateless code, and provide the set of encoded PDCP PDUs to a lower layer of the transmitting device for transmission to the one or more receiving devices.

Some examples of the method, apparatuses, and non-transitory computer-readable medium described herein may further include operations, features, means, or instructions for performing, at the PDCP layer and after the encoding, an integrity protection and ciphering function on the set of encoded PDCP PDUs.

In some examples of the method, apparatuses, and non-transitory computer-readable medium described herein, encoding the set of PDCP SDUs for each PDCP SDU may include operations, features, means, or instructions for determining, based on a retransmission buffer implemented at the PDCP layer, that a report for a previously transmitted encoded PDCP PDU includes a negative acknowledgement for the encoded PDCP PDU, determining that at least one PDCP SDU in the set of PDCP SDUs correspond to the previously transmitted encoded PDCP PDU, and encoding, based on the negative acknowledgment, the PDCP SDU as a repaired PDCP SDU.

In some examples of the method, apparatuses, and non-transitory computer-readable medium described herein, encoding the set of PDCP SDUs may include operations, features, means, or instructions for associating, for each PDCP SDU in the set of PDCP SDUs, at the PDCP layer and before the encoding, a count value corresponding to a next transmission field to a PDCP SDU, performing, at the PDCP layer and after the encoding, an integrity protection and ciphering function on the encoded PDCP PDU, and providing the encoded PDCP PDU to the lower layer for transmission to the one or more receiving devices.

In some examples of the method, apparatuses, and non-transitory computer-readable medium described herein, encoding the set of PDCP SDUs may include operations, features, means, or instructions for segmenting a PDCP SDU into a set of sub-PDUs, each sub-PDU including a same size, encoding the set of sub-PDUs using the rateless code to obtain a set of source sub-PDUs, and encoding at least a subset of the sub-PDUs using the rateless code to obtain a set of parity sub-PDUs, the set of source sub-PDUs and the set of parity sub-PDUs collectively including a PDCP PDU for transmission to the one or more receiving devices.

Some examples of the method, apparatuses, and non-transitory computer-readable medium described herein may further include operations, features, means, or instructions for receiving a report indicating a quantity of sub-PDUs the receiving device decoded and used to attempt to reassemble the PDCP SDU, and adjusting a code rate of the encoding using the rateless code based on the report.

Some examples of the method, apparatuses, and non-transitory computer-readable medium described herein may further include operations, features, means, or instructions for receiving a RRC configuration signal indicating a minimum code rate for the encoding using the rateless code, and adjusting the code rate for the encoding using the rateless code based on the RRC configuration signal.

In some examples of the method, apparatuses, and non-transitory computer-readable medium described herein, a header for the PDCP PDU indicates a quantity of sub-PDUs included in the PDCP PDU, the PDCP PDU including the set of source sub-PDUs and the set of parity sub-PDUs.

A method of wireless communication at a receiving device is described. The method may include receiving, at a protocol data convergence protocol (PDCP) layer of the receiving device, a set of encoded PDCP PDUs from a transmitting device, decoding, at the PDCP layer, the set of encoded PDCP PDUs according to a set of network coding parameters to obtain a set of PDCP SDUs corresponding to a payload of data, the set of network coding parameters including at least a rateless code, and providing the set of PDCP SDUs to an upper layer of receiving device, the upper layer being a higher layer than the PDCP layer of the receiving device.

An apparatus for wireless communication at a receiving device is described. The apparatus may include a processor, memory coupled with the processor, and instructions stored in the memory. The instructions may be executable by the processor to cause the apparatus to receive, at a protocol data convergence protocol (PDCP) layer of the receiving device, a set of encoded PDCP PDUs from a transmitting device, decode, at the PDCP layer, the set of encoded PDCP PDUs according to a set of network coding parameters to obtain a set of PDCP SDUs corresponding to a payload of data, the set of network coding parameters including at least a rateless code, and provide the set of PDCP SDUs to an upper layer of receiving device, the upper layer being a higher layer than the PDCP layer of the receiving device.

Another apparatus for wireless communication at a receiving device is described. The apparatus may include means for receiving, at a protocol data convergence protocol (PDCP) layer of the receiving device, a set of encoded PDCP PDUs from a transmitting device, decoding, at the PDCP layer, the set of encoded PDCP PDUs according to a set of network coding parameters to obtain a set of PDCP SDUs corresponding to a payload of data, the set of network coding parameters including at least a rateless code, and providing the set of PDCP SDUs to an upper layer of receiving device, the upper layer being a higher layer than the PDCP layer of the receiving device.

A non-transitory computer-readable medium storing code for wireless communication at a receiving device is described. The code may include instructions executable by a processor to receive, at a protocol data convergence protocol (PDCP) layer of the receiving device, a set of encoded PDCP PDUs from a transmitting device, decode, at the PDCP layer, the set of encoded PDCP PDUs according to a set of network coding parameters to obtain a set of PDCP SDUs corresponding to a payload of data, the set of network coding parameters including at least a rateless code, and provide the set of PDCP SDUs to an upper layer of receiving device, the upper layer being a higher layer than the PDCP layer of the receiving device.

Some examples of the method, apparatuses, and non-transitory computer-readable medium described herein may further include operations, features, means, or instructions for performing, at the PDCP layer and before the decoding, an integrity verification and deciphering function on the set of encoded PDCP PDUs.

In some examples of the method, apparatuses, and non-transitory computer-readable medium described herein, decoding the set of encoded PDCP PDUs for each encoded PDCP PDU may include operations, features, means, or instructions for determining that at least one of the encoded PDCP PDUs was unable to be successfully received and decoded, and transmitting a report indicating that the at least one encoded PDCP PDU was unable to be successfully received and decoded.

In some examples of the method, apparatuses, and non-transitory computer-readable medium described herein, the report indicates a sequence number of a next encoded PDCP PDU in the set of encoded PDCP PDUs that may have yet to be received.

In some examples of the method, apparatuses, and non-transitory computer-readable medium described herein, the report includes a bitmap indicating, for each encoded PDCP PDU in the set of encoded PDCP PDUs having a sequence number greater than the sequence number of the next encoded PDCP PDU, whether the encoded PDCP PDU was successfully received and decoded.

In some examples of the method, apparatuses, and non-transitory computer-readable medium described herein, the report indicates a quantity of sub-PDUs the receiving device decoded and used to attempt to obtain the at least one encoded PDCP PDU.

In some examples of the method, apparatuses, and non-transitory computer-readable medium described herein, decoding the set of encoded PDCP PDUs may include operations, features, means, or instructions for determining, for each encoded PDCP PDU of the set of encoded PDCP PDUs, that a threshold quantity of sub-PDUs of the encoded PDCP PDU may have been received, where attempting to decode the encoded PDCP PDU may be in response to determining that the threshold quantity of sub-PDUs may have been received.

Some examples of the method, apparatuses, and non-transitory computer-readable medium described herein may further include operations, features, means, or instructions for receiving a set of sub-PDUs of the encoded PDCP PDU prior to receiving a header of the encoded PDCP PDU, and rearranging the sub-PDUs in the set of sub-PDUs according to a decoding order including the header first followed by the sub-PDUs of the set of sub-PDUs.

Some examples of the method, apparatuses, and non-transitory computer-readable medium described herein may further include operations, features, means, or instructions for receiving a RRC signal indicating the threshold quantity of sub-PDUs of the encoded PDCP PDU that may be to be received before the receiving device attempts to decode the encoded PDCP PDU.

Some examples of the method, apparatuses, and non-transitory computer-readable medium described herein may further include operations, features, means, or instructions for identifying, based on the header, a total quantity of sub-PDUs corresponding to the encoded PDCP PDU.

In some examples of the method, apparatuses, and non-transitory computer-readable medium described herein, decoding the set of encoded PDCP PDUs may include operations, features, means, or instructions for determining, for each encoded PDCP PDU of the set of encoded PDCP PDUs, that each sub-PDU of the encoded PDCP PDU may have been received.

A method of wireless communications at a transmitting device is described. The method may include transmitting, to one or more receiving devices, a set of PDCP PDUs corresponding to one or more PDCP SDUs, determining that a polling condition at the transmitting device has been met, setting, based on determining that the polling condition has been met, a polling flag within a subsequent PDCP PDU, transmitting the subsequent PDCP PDU to the one or more receiving devices, and monitoring for a report from a receiving device of the one or more receiving devices based on transmitting the subsequent PDCP PDU, the report indicating a status of the transmitted set of PDCP PDUs or the one or more PDCP SDUs.

An apparatus for wireless communications at a transmitting device is described. The apparatus may include a processor, memory coupled with the processor, and instructions stored in the memory. The instructions may be executable by the processor to cause the apparatus to transmit, to one or more receiving devices, a set of PDCP PDUs corresponding to one or more PDCP SDUs, determine that a polling condition at the transmitting device has been met, set, based on determining that the polling condition has been met, a polling flag within a subsequent PDCP PDU, transmit the subsequent PDCP PDU to the one or more receiving devices, and monitor for a report from a receiving device of the one or more receiving devices based on transmitting the subsequent PDCP PDU, the report indicating a status of the transmitted set of PDCP PDUs or the one or more PDCP SDUs.

Another apparatus for wireless communications at a transmitting device is described. The apparatus may include means for transmitting, to one or more receiving devices, a set of PDCP PDUs corresponding to one or more PDCP SDUs, determining that a polling condition at the transmitting device has been met, setting, based on determining that the polling condition has been met, a polling flag within a subsequent PDCP PDU, transmitting the subsequent PDCP PDU to the one or more receiving devices, and monitoring for a report from a receiving device of the one or more receiving devices based on transmitting the subsequent PDCP PDU, the report indicating a status of the transmitted set of PDCP PDUs or the one or more PDCP SDUs.

A non-transitory computer-readable medium storing code for wireless communications at a transmitting device is described. The code may include instructions executable by a processor to transmit, to one or more receiving devices, a set of PDCP PDUs corresponding to one or more PDCP SDUs, determine that a polling condition at the transmitting device has been met, set, based on determining that the polling condition has been met, a polling flag within a subsequent PDCP PDU, transmit the subsequent PDCP PDU to the one or more receiving devices, and monitor for a report from a receiving device of the one or more receiving devices based on transmitting the subsequent PDCP PDU, the report indicating a status of the transmitted set of PDCP PDUs or the one or more PDCP SDUs.

In some examples of the method, apparatuses, and non-transitory computer-readable medium described herein, determining that the polling condition may have been met may include operations, features, means, or instructions for determining that a quantity of PDCP PDUs included in the set of PDCP PDUs satisfies a threshold.

Some examples of the method, apparatuses, and non-transitory computer-readable medium described herein may further include operations, features, means, or instructions for receiving an indication of the threshold via radio resource control signaling.

In some examples of the method, apparatuses, and non-transitory computer-readable medium described herein, determining that the polling condition may have been met may include operations, features, means, or instructions for determining that a quantity of data included in the set of PDCP PDUs satisfies a threshold.

Some examples of the method, apparatuses, and non-transitory computer-readable medium described herein may further include operations, features, means, or instructions for receiving an indication of the threshold via radio resource control signaling.

Some examples of the method, apparatuses, and non-transitory computer-readable medium described herein may further include operations, features, means, or instructions for initiating a timer based on transmitting a prior PDCP PDU that includes a prior polling flag, where determining that the polling condition may have been met includes identifying an expiration of the timer.

Some examples of the method, apparatuses, and non-transitory computer-readable medium described herein may further include operations, features, means, or instructions for receiving an indication to enable or disable the timer via radio resource control signaling, and enabling or disabling the timer based on the indication.

In some examples of the method, apparatuses, and non-transitory computer-readable medium described herein, the indication may be an indication to disable the timer, and where the indication to disable the timer includes an indication of an infinite duration for the timer.

Some examples of the method, apparatuses, and non-transitory computer-readable medium described herein may further include operations, features, means, or instructions for receiving an indication of a duration for the timer via radio resource control signaling, and configuring the duration for the timer based on the indication.

Some examples of the method, apparatuses, and non-transitory computer-readable medium described herein may further include operations, features, means, or instructions for receiving the report based on the monitoring, where the report includes an indication of a quantity of PDCP PDUs or PDCP sub-PDUs used by the receiving device to obtain a PDCP SDU, and adjusting a code rate for encoding PDCP SDUs at the PDCP layer based on the indicated quantity of PDCP PDUs or PDCP sub-PDUs.

In some examples of the method, apparatuses, and non-transitory computer-readable medium described herein, the report further includes a bitmap indicating, for each PDCP SDU of the one or more PDCP SDUs having a sequence number greater than the indicated sequence number, whether the receiving device was successful or unsuccessful in obtaining a respective PDCP SDU.

Some examples of the method, apparatuses, and non-transitory computer-readable medium described herein may further include operations, features, means, or instructions for receiving the report based on the monitoring, where the report includes an indication of an average quantity of PDCP PDUs or PDCP sub-PDUs used by the receiving device to obtain each PDCP SDU of a set of PDCP SDUs, and adjusting a code rate for encoding PDCP SDUs at the PDCP layer based on the indicated average quantity of PDCP PDUs or PDCP sub-PDUs.

Some examples of the method, apparatuses, and non-transitory computer-readable medium described herein may further include operations, features, means, or instructions for receiving the report based on the monitoring, where the report includes an indication of a sequence number for a PDCP SDU of the one or more PDCP SDUs, the indication of the sequence number indicating that the receiving device was able to obtain each of the one or more PDCP SDUs having a sequence number lower than the indicated sequence number.

In some examples of the method, apparatuses, and non-transitory computer-readable medium described herein, a header of the subsequent PDCP PDU includes the polling flag.

Some examples of the method, apparatuses, and non-transitory computer-readable medium described herein may further include operations, features, means, or instructions for receiving the report based on the monitoring, where the report includes an indication of a report type for the report, the indicated report type one of a set of report types, and decoding the report based on least in part on the indication of the report type for the report.

In some examples of the method, apparatuses, and non-transitory computer-readable medium described herein, the report type may be a first report type of the set of report types, the report including an indication of a sequence number for a PDCP SDU of the one or more PDCP SDUs, the indication of the sequence number indicating that the receiving device was able to obtain each of the one or more PDCP SDUs having a sequence number lower than the indicated sequence number, the report type may be a second report type of the set of report types, the report including the indication of the sequence number for the PDCP SDU of the one or more PDCP SDUs, and the report further including at least one of an indication of a quantity of PDCP PDUs or PDCP sub-PDUs used by the receiving device to obtain a PDCP SDU or an indication of an average quantity of PDCP PDUs or PDCP sub-PDUs used by the receiving device to obtain each PDCP SDU of a set of PDCP SDUs, or the report type may be a third report type of the set of report types, the report including the indication of the sequence number for the PDCP SDU of the one or more PDCP SDUs, the report further including at least one of the indication of a quantity of PDCP PDUs or PDCP sub-PDUs used by the receiving device to obtain a PDCP SDU or the indication of the average quantity of PDCP PDUs or PDCP sub-PDUs used by the receiving device to obtain each PDCP SDU of the set of PDCP SDUs, and the report further including a bitmap indicating, for each PDCP SDU of the one or more PDCP SDUs having a sequence number greater than the indicated sequence number, whether the receiving device was successful or unsuccessful in obtaining a respective PDCP SDU.

A method of wireless communications at a receiving device is described. The method may include receiving, at a packet data convergence protocol (PDCP) layer of the receiving device, a set of PDCP PDUs from a transmitting device, the set of PDPC PDUs corresponding to one or more PDCP SDUs, generating, at a PDCP layer, a report indicating a status of the set of PDCP PDUs or the one or more PDCP SDUs at the receiving device, and transmitting the report to the transmitting device.

An apparatus for wireless communications at a receiving device is described. The apparatus may include a processor, memory coupled with the processor, and instructions stored in the memory. The instructions may be executable by the processor to cause the apparatus to receive, at a packet data convergence protocol (PDCP) layer of the receiving device, a set of PDCP PDUs from a transmitting device, the set of PDPC PDUs corresponding to one or more PDCP SDUs, generate, at a PDCP layer, a report indicating a status of the set of PDCP PDUs or the one or more PDCP SDUs at the receiving device, and transmit the report to the transmitting device.

Another apparatus for wireless communications at a receiving device is described. The apparatus may include means for receiving, at a packet data convergence protocol (PDCP) layer of the receiving device, a set of PDCP PDUs from a transmitting device, the set of PDPC PDUs corresponding to one or more PDCP SDUs, generating, at a PDCP layer, a report indicating a status of the set of PDCP PDUs or the one or more PDCP SDUs at the receiving device, and transmitting the report to the transmitting device.

A non-transitory computer-readable medium storing code for wireless communications at a receiving device is described. The code may include instructions executable by a processor to receive, at a packet data convergence protocol (PDCP) layer of the receiving device, a set of PDCP PDUs from a transmitting device, the set of PDPC PDUs corresponding to one or more PDCP SDUs, generate, at a PDCP layer, a report indicating a status of the set of PDCP PDUs or the one or more PDCP SDUs at the receiving device, and transmit the report to the transmitting device.

Some examples of the method, apparatuses, and non-transitory computer-readable medium described herein may further include operations, features, means, or instructions for receiving, from the transmitting device after receiving the set of PDCP PDUs, a subsequent PDCP PDU that includes a polling flag, where generating the report may be based on the polling flag.

Some examples of the method, apparatuses, and non-transitory computer-readable medium described herein may further include operations, features, means, or instructions for initiating a timer at the receiving device, where generating the report may be based on an expiration of the timer.

Some examples of the method, apparatuses, and non-transitory computer-readable medium described herein may further include operations, features, means, or instructions for receiving an indication to enable or disable the timer via radio resource control signaling, and enabling or disabling the timer based on the indication.

In some examples of the method, apparatuses, and non-transitory computer-readable medium described herein, the indication may be an indication to disable the timer, and where the indication to disable the timer includes an indication of an infinite duration for the timer.

Some examples of the method, apparatuses, and non-transitory computer-readable medium described herein may further include operations, features, means, or instructions for receiving an indication of a duration for the timer via radio resource control signaling, and configuring the duration for the timer based on the indication.

Some examples of the method, apparatuses, and non-transitory computer-readable medium described herein may further include operations, features, means, or instructions for receiving a PDCP PDU of the set of PDCP PDUs at an empty buffer of the receiving device, where initiating the timer may be based on receiving the PDU at the empty buffer.

Some examples of the method, apparatuses, and non-transitory computer-readable medium described herein may further include operations, features, means, or instructions for transmitting, to the transmitting device before transmitting the report, a prior report indicating a status of a prior set of PDCP PDUs, where initiating the timer may be based on transmitting the prior report.

Some examples of the method, apparatuses, and non-transitory computer-readable medium described herein may further include operations, features, means, or instructions for receiving, via radio resource control signaling, an indication of a report type for the receiving device to use to indicate a status of PDCP PDUs at the receiving device, the indicated report type one of a set of report types, where the report may be of the indicated report type.

In some examples of the method, apparatuses, and non-transitory computer-readable medium described herein, the report indicates the report type to the transmitting device.

In some examples of the method, apparatuses, and non-transitory computer-readable medium described herein, the report type may be a first report type of the set of report types, the report including a sequence number of the PDCP SDU based on the PDCP SDU having a lowest sequence number among a subset of one or more PDCP SDU that the receiving device may be unable to obtain among the one or more PDCP SDUs, the report type may be a second report type of the set of report types, the report including the sequence number of the PDCP SDU, and the report further including at least one of an indication of a quantity of PDCP PDUs or PDCP sub-PDUs used by the receiving device to obtain a PDCP SDU or an indication of an average quantity of PDCP PDUs or PDCP sub-PDUs used by the receiving device to obtain each PDCP SDU of a set of PDCP SDUs, or the report type may be a third report type of the set of report types, the report including the indication of the sequence number for the PDCP SDU of the one or more PDCP SDUs, the report further including at least one of the indication of the quantity of PDCP PDUs or PDCP sub-PDUs used by the receiving device to obtain the PDCP SDU or the indication of the average quantity of PDCP PDUs or PDCP sub-PDUs used by the receiving device to obtain each PDCP SDU of the set of PDCP SDUs, and the report further including a bitmap indicating, for each PDCP SDU among the one or more PDCP SDUs having a sequence number greater than the sequence number of the PDCP SDU, whether the receiving device was successful or unsuccessful in receiving a respective PDCP SDU.

In some examples of the method, apparatuses, and non-transitory computer-readable medium described herein, the receiving device may be unable to obtain a PDCP SDU of the one or more PDCP SDUs, and the report includes a sequence number of the PDCP SDU based on the PDCP SDU having a lowest sequence number among a subset of one or more PDCP SDU that the receiving device may be unable to obtain among the one or more PDCP SDUs.

In some examples of the method, apparatuses, and non-transitory computer-readable medium described herein, the report further includes a bitmap indicating, for each PDCP SDU among the one or more PDCP SDUs having a sequence number greater than the sequence number of the PDCP SDU, whether the receiving device was successful or unsuccessful in obtaining a respective PDCP SDU.

In some examples of the method, apparatuses, and non-transitory computer-readable medium described herein, the report includes an indication of a quantity of PDCP PDUs or PDCP sub-PDUs used by the receiving device to obtain a PDCP SDU.

In some examples of the method, apparatuses, and non-transitory computer-readable medium described herein, the report includes an indication of an average quantity of PDCP PDUs or PDCP sub-PDUs used by the receiving device to obtain each PDCP SDU of a set of PDCP SDUs.

A method of wireless communications at a transmitting device is described. The method may include encoding, at a PDCP layer of the transmitting device, a set of PDCP SDUs according to a set of network coding parameters to obtain a first set of PDCP PDUs, transmitting, to one or more receiving devices, the first set of PDCP PDUs, receiving, from a receiving device of the one or more receiving devices, a report indicating a PDCP SDU of the set of PDCP SDUs that was unsuccessfully received at the receiving device, and transmitting, to the one or more receiving devices, based on the received report, a second set of PDCP PDUs corresponding to at least the PDCP SDU of the set of PDCP SDUs.

An apparatus for wireless communications at a transmitting device is described. The apparatus may include a processor, memory coupled with the processor, and instructions stored in the memory. The instructions may be executable by the processor to cause the apparatus to encode, at a PDCP layer of the transmitting device, a set of PDCP SDUs according to a set of network coding parameters to obtain a first set of PDCP PDUs, transmit, to one or more receiving devices, the first set of PDCP PDUs, receive, from a receiving device of the one or more receiving devices, a report indicating a PDCP SDU of the set of PDCP SDUs that was unsuccessfully received at the receiving device, and transmit, to the one or more receiving devices, based on the received report, a second set of PDCP PDUs corresponding to at least the PDCP SDU of the set of PDCP SDUs.

Another apparatus for wireless communications at a transmitting device is described. The apparatus may include means for encoding, at a PDCP layer of the transmitting device, a set of PDCP SDUs according to a set of network coding parameters to obtain a first set of PDCP PDUs, transmitting, to one or more receiving devices, the first set of PDCP PDUs, receiving, from a receiving device of the one or more receiving devices, a report indicating a PDCP SDU of the set of PDCP SDUs that was unsuccessfully received at the receiving device, and transmitting, to the one or more receiving devices, based on the received report, a second set of PDCP PDUs corresponding to at least the PDCP SDU of the set of PDCP SDUs.

A non-transitory computer-readable medium storing code for wireless communications at a transmitting device is described. The code may include instructions executable by a processor to encode, at a PDCP layer of the transmitting device, a set of PDCP SDUs according to a set of network coding parameters to obtain a first set of PDCP PDUs, transmit, to one or more receiving devices, the first set of PDCP PDUs, receive, from a receiving device of the one or more receiving devices, a report indicating a PDCP SDU of the set of PDCP SDUs that was unsuccessfully received at the receiving device, and transmit, to the one or more receiving devices, based on the received report, a second set of PDCP PDUs corresponding to at least the PDCP SDU of the set of PDCP SDUs.

Some examples of the method, apparatuses, and non-transitory computer-readable medium described herein may further include operations, features, means, or instructions for receiving, from a second receiving device of the one or more receiving devices, a second report indicating a second PDCP SDU of the set of PDCP SDUs that was unsuccessfully received at the second receiving device, and determining an earliest PDCP SDU between the PDCP SDU and the second PDCP SDU based on respective sequence numbers associated with the PDCP SDU and the second PDCP SDU, where at least some of the second set of PDCP PDUs correspond to the earliest PDCP SDU based on the determining.

In some examples of the method, apparatuses, and non-transitory computer-readable medium described herein, the second set of PDCP PDUs further corresponds to each PDCP SDU between the earliest PDCP SDU and each PDCP SDU of the set of PDCP SDUs having a sequence number greater than the earliest PDCP SDU.

In some examples of the method, apparatuses, and non-transitory computer-readable medium described herein, the report includes a sequence number associated with the PDCP SDU and the second report includes a sequence number associated with the second PDCP SDU.

In some examples of the method, apparatuses, and non-transitory computer-readable medium described herein, the report and the second report each may include operations, features, means, or instructions for adjusting a code rate for encoding PDCP SDUs at the PDCP layer based on the indication of the quantity of PDCP PDUs.

In some examples of the method, apparatuses, and non-transitory computer-readable medium described herein, the report and the second report each may include operations, features, means, or instructions for adjusting a code rate for encoding PDCP SDUs at the PDCP layer based on the indication of the average quantity of PDCP PDUs.

In some examples of the method, apparatuses, and non-transitory computer-readable medium described herein, the report and the second report each includes a bitmap indicating, for each PDCP SDUs of the set of PDCP SDUs having a sequence number greater than the respective indicated sequence number, whether the respective receiving device was successful or unsuccessful in obtaining a respective PDCP SDU.

Some examples of the method, apparatuses, and non-transitory computer-readable medium described herein may further include operations, features, means, or instructions for determining the second set of PDCP PDUs based on respective bitmaps of the report and the second report, the second set of PDCP PDUs corresponding to the earliest PDCP SDU and one or more PDCP SDUs unsuccessfully received by at least one of the receiving device and the second receiving device.

Some examples of the method, apparatuses, and non-transitory computer-readable medium described herein may further include operations, features, means, or instructions for re-encoding at least a subset of the set of PDCP SDUs to obtain the second set of PDCP PDUs based on the report, or the second report, or both.

In some examples of the method, apparatuses, and non-transitory computer-readable medium described herein, each PDCP PDU in the second set of PDCP PDUs includes a field indicating whether the PDCP PDU may be a retransmitted PDCP PDU.

In some examples of the method, apparatuses, and non-transitory computer-readable medium described herein, the report includes a sequence number associated with the PDCP PDU.

In some examples of the method, apparatuses, and non-transitory computer-readable medium described herein, encoding the set of PDCP SDUs according to the set of network coding parameters may include operations, features, means, or instructions for encoding the set of PDCP SDUs using a rateless code.

In one aspect of the disclosure, a method of wireless communication is provided. The method may include enabling, in a radio link control (RLC) transmit entity, network coding augmented (NCA) RLC layer communication between the RLC transmit entity and one or more RLC receive entities. The method may also include encoding, by the RLC transmit entity, RLC layer SDU payload using the network coding based on a configured coding rate (e.g., by radio resource control signaling) to provide a plurality of encoded RLC PDUs for each RLC SDU of a plurality of RLC SDUs. The method may further include transmitting, by the RLC transmit entity to the one or more RLC receive entities, the plurality of encoded RLC PDUs for each respective RLC SDU of the plurality of RLC SDUs and receiving, by the RLC transmit entity from RLC entities of the one or more RLC entities, NCA RLC status feedback. The method may still further include retransmitting, by the RLC transmit entity to the one or more RLC receive entities, a portion of the RLC layer SDU payload based upon the NCA RLC status feedback.

In an additional aspect of the disclosure, an apparatus for wireless communication may be provided. The apparatus may include means for enabling, in a RLC transmit entity, NCA RLC layer communication between the RLC transmit entity and one or more RLC receive entities. The apparatus may also include means for encoding, by the RLC transmit entity, RLC layer SDU payload using the network coding based on a configured coding rate (e.g., by radio resource control signaling) to provide a plurality of encoded RLC PDUs for each RLC SDU of a plurality of RLC SDUs. The apparatus may further include means for transmitting, by the RLC transmit entity to the one or more RLC receive entities, the plurality of encoded RLC PDUs for each respective RLC SDU of the plurality of RLC SDUs, and means for receiving, by the RLC transmit entity from RLC entities of the one or more RLC entities, NCA RLC status feedback. The apparatus may still further include means for retransmitting, by the RLC transmit entity to the one or more RLC receive entities, a portion of the RLC layer SDU payload based upon the NCA RLC status feedback.

In an additional aspect of the disclosure, a non-transitory computer-readable medium having program code recorded thereon for wireless communication may be provided. The program code may include code to enable, in a RLC transmit entity, NCA RLC layer communication between the RLC transmit entity and one or more RLC receive entities. The program code may also include code to encode, by the RLC transmit entity, RLC layer SDU payload using the network coding based on a configured coding rate (e.g., by radio resource control signaling) to provide a plurality of encoded RLC PDUs for each RLC SDU of a plurality of RLC SDUs. The program code may further include code to transmit, by the RLC transmit entity to the one or more RLC receive entities, the plurality of encoded RLC PDUs for each respective RLC SDU of the plurality of RLC SDUs, and code to receive, by the RLC transmit entity from RLC entities of the one or more RLC entities, NCA RLC status feedback. The program code may still further include code to retransmit, by the RLC transmit entity to the one or more RLC receive entities, a portion of the RLC layer SDU payload based upon the NCA RLC status feedback.

In an additional aspect of the disclosure, an apparatus configured for wireless communication is provided. The apparatus includes at least one processor, and a memory coupled to the processor. The processor may be configured to enable, in a RLC transmit entity, NCA RLC layer communication between the RLC transmit entity and one or more RLC receive entities. The processor may also be configured to encode, by the RLC transmit entity, RLC layer SDU payload using the network coding based on a configured coding rate (e.g., by radio resource control signaling) to provide a plurality of encoded RLC PDUs for each RLC SDU of a plurality of RLC SDUs. The processor may further be configured to transmit, by the RLC transmit entity to the one or more RLC receive entities, the plurality of encoded RLC PDUs for each respective RLC SDU of the plurality of RLC SDUs, and to receive, by the RLC transmit entity from RLC entities of the one or more RLC entities, NCA RLC status feedback. The processor may still further be configured to retransmit, by the RLC transmit entity to the one or more RLC receive entities, a portion of the RLC layer SDU payload based upon the NCA RLC status feedback.

In one aspect of the disclosure, a method of wireless communication is provided. The method may include enabling, in a RLC receive entity of one or more RLC receive entities in communication with a RLC transmit entity, NCA RLC layer communication between the RLC receive entity and the RLC transmit entity. The method may also include receiving, by the RLC receive entity from the RLC transmit entity, a plurality of encoded RLC PDUs for a respective RLC SDU of a plurality of RLC SDUs, wherein the plurality of encoded RLC PDUs comprise RLC layer SDU payload encoded using the network coding based on a configured coding rate. The method may further include transmitting, by the RLC receive entity to the RLC transmit entity, NCA RLC status feedback, wherein the NCA RLC status feedback is configured to facilitate retransmitting a portion of the RLC layer SDU payload.

In an additional aspect of the disclosure, an apparatus for wireless communication is provided. The apparatus may include means for enabling, in a RLC receive entity of one or more RLC receive entities in communication with a RLC transmit entity, NCA RLC layer communication between the RLC receive entity and the RLC transmit entity. The apparatus may also include means for receiving, by the RLC receive entity from the RLC transmit entity, a plurality of encoded RLC PDUs for a respective RLC SDU of a plurality of RLC SDUs, wherein the plurality of encoded RLC PDUs comprise RLC layer SDU payload encoded using the network coding based on a configured coding rate. The apparatus may further include means for transmitting, by the RLC receive entity to the RLC transmit entity, NCA RLC status feedback, wherein the NCA RLC status feedback is configured to facilitate retransmitting a portion of the RLC layer SDU payload.

In an additional aspect of the disclosure, a non-transitory computer-readable medium having program code recorded thereon for wireless communication is provided. The program code may include code to enable, in a RLC receive entity of one or more RLC receive entities in communication with a RLC transmit entity, NCA RLC layer communication between the RLC receive entity and the RLC transmit entity. The program code may also include code to receive, by the RLC receive entity from the RLC transmit entity, a plurality of encoded RLC PDUs for a respective RLC SDU of a plurality of RLC SDUs, wherein the plurality of encoded RLC PDUs comprise RLC layer SDU payload encoded using the network coding based on a configured coding rate. The program code may further include code to transmit, by the RLC receive entity to the RLC transmit entity, NCA RLC status feedback, wherein the NCA RLC status feedback is configured to facilitate retransmitting a portion of the RLC layer SDU payload.

In an additional aspect of the disclosure, an apparatus configured for wireless communication is provided. The apparatus includes at least one processor, and a memory coupled to the processor. The processor may be configured to enable, in a RLC receive entity of one or more RLC receive entities in communication with a RLC transmit entity, NCA RLC layer communication between the RLC receive entity and the RLC transmit entity. The processor may also be configured to receive, by the RLC receive entity from the RLC transmit entity, a plurality of encoded RLC PDUs for a respective RLC SDU of a plurality of RLC SDUs, wherein the plurality of encoded RLC PDUs comprise RLC layer SDU payload encoded using the network coding based on a configured coding rate. The process may further be configured to transmit, by the RLC receive entity to the RLC transmit entity, NCA RLC status feedback, wherein the NCA RLC status feedback is configured to facilitate retransmitting a portion of the RLC layer SDU payload.

BRIEF DESCRIPTION OF THE DRAWINGS

FIGS. 15A-15D show block diagrams of devices that support rateless coding at an L2 layer in accordance with aspects of the present disclosure.

FIGS. 16A-16D show block diagrams of a communication manager that supports rateless coding at an L2 layer in accordance with aspects of the present disclosure.

FIGS. 19 through 42 show flowcharts illustrating methods that support rateless coding in accordance with aspects of the present disclosure.

DETAILED DESCRIPTION

Figure 1:
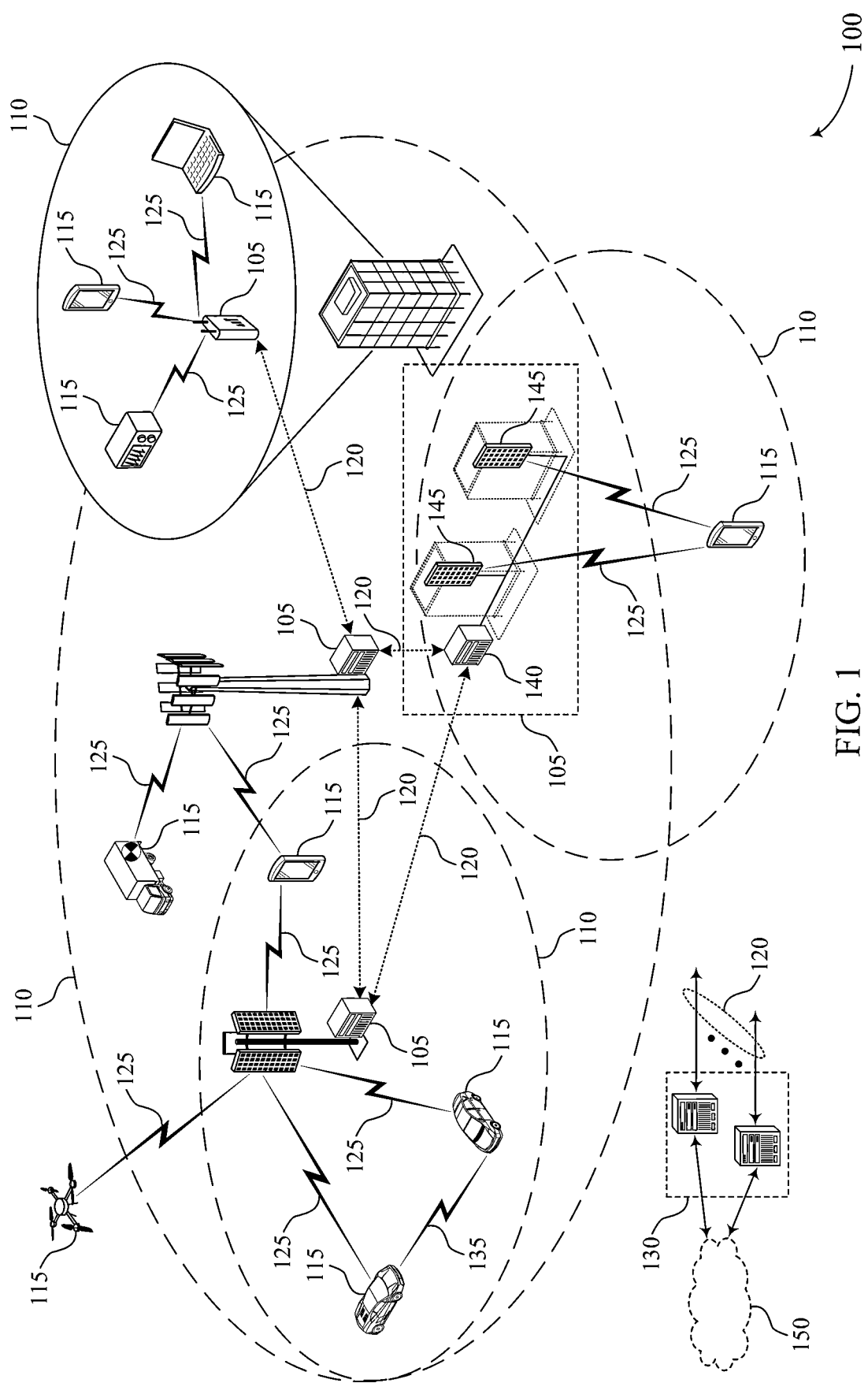
FIG. 1 illustrates an example of a system for wireless communications that supports rateless coding at a layer two (L2) protocol layer in accordance with aspects of the present disclosure.

Wireless communication systems may utilize fountain codes, which are rateless codes in the sense that the number of coded packets is potentially limitless. For example, the transmitted packets may be recovered at the receiver side so long as the number of received packets is sufficiently large (e.g., slightly larger than the number of source packets), regardless of which particular packets are received and successfully decoded. Examples of such rateless codes include Luby transform (LT) codes, Raptor codes (an enhanced code based on variations of low-density parity check (LDPC) and LT codes), and the like. Fountain codes may also be referred to as network codes because in some cases they may be applied to the network/application layer (e.g., for multimedia broadcast multi-cast service (MBMS), integrated access and backhaul (IAB), vehicle-to-everything (V2X), and the like). At the receiving side, each coded symbol would either be decoded correctly or discarded. However, application of such rateless codes at the network layer may add latency to communications as data must be passed from the network layer to other layers within the protocol stack for additional processing/packaging before transmissions, and then make its way back up the protocol stack back to the network layer for final processing/recovery of the data. This process at the transmitting and receiving side may result in intolerable traffic delays for the data being communicated within the wireless network. At the receiving side, each coded symbol would either be decoded correctly or discarded. A transmitting device (e.g., a base station) may transmit (e.g., unicast, broadcast, multicast) a set of messages (e.g., protocol data units (PDUs)) to a user equipment (UE) or group of UEs, and one or more UEs of the group of UEs may assemble a service data unit (SDU) based on the set of messages. However, the UE may fail to assemble one or more SDUs, which may result in lost packets, increased system latency, or other issues.

In some wireless communication systems, layer 2 (L2) retransmission may not be supported for at least some types of transmissions (e.g., single-point to multi-point, multicast, broadcast, etc.), which may negatively impact reliability. Extending the maximum number retransmissions in a lower layer, however, (e.g., using HARQ techniques) may be inefficient and result in a potentially long latency. And employing a window-based RLC acknowledgment mode (AM), which may include a sliding window being used to detect error packets and assemble the packets at the RLC receiver side, may introduce undesired complexities, latencies, or inefficiencies if used to correct residual errors of lower layers. For example, the use of RLC AM technique may require unicast retransmission and thus may be undesirable for use in a broadcast system where data is initially broadcast.

The use of rateless codes (e.g., fountain codes), which may also be referred to as network coding, at an L2 layer (e.g., a packet data convergence protocol (PDCP) or radio link control (RLC) layer) may support L2 retransmission, including in a broadcast context and thus provide reliability or other benefits that may be appreciated by one or ordinary skill in the art. Aspects of the disclosure are initially described in the context of wireless communications systems. At the L2 layer of a transmitting device (e.g., a lower layer within the protocol stack below the network layer and within L2, such as a PDCP layer or an RLC layer), SDUs may be encoded using a rateless code (e.g., a network code, outer code, etc.). For example, a transmitting device (e.g., a UE and/or base station performing a transmission) may receive a set of L2 SDUs at the L2 layer. The set of L2 SDUs may correspond to a payload of data (e.g., packets) for transmission to receiving device(s) (e.g., a UE(s) and/or base station(s) receiving the transmission). The transmitting device may use the rateless code to segment an L2 SDU into multiple source L2 PDUs and encode the set of L2 PDUs to generate, create, obtain, etc., a set of encoded L2 PDUs, including the source L2 PDUs and a set of parity L2 PDUs. The set of encoded L2 PDUs may then be passed down to the lower layer(s) for transmission to the receiving devices.

The receiving device may receive the transmission and provide the set of encoded L2 PDUs to the L2 layer for decoding. The receiving device may decode a set of encoded L2 PDUs to obtain an L2 SDU. For example, the receiving device may receive a threshold quantity of L2 PDUs of an L2 SDU (e.g., source L2 PDUs and parity L2 PDUs), rearrange/reassemble the L2 PDUs, and then use the rateless code to decode the set of encoded L2 PDUs to obtain the corresponding L2 SDU. The L2 SDU (e.g., obtained based on decoding using the rateless code) may be passed or otherwise provided to an upper layer of the receiving device for further processing/recovery of the L2 SDU.

In some examples, at an L2 layer of a transmitting device (e.g., a lower layer within the protocol stack below the network layer and within L2, such as a PDCP layer or an RLC layer), and in some cases before integrity protection and ciphering, L2 SDUs may be encoded using a rateless code (e.g., a network code, outer code, etc.). For example, a transmitting device (e.g., a UE) and/or base station performing a transmission) may receive a set of L2 SDUs at the L2 layer. The set of L2 SDUs may correspond to a payload of data (e.g., packets) for transmission to receiving device(s) (e.g., a UE(s) and/or base station(s) receiving the transmission). The transmitting device may use the rateless code to encode the set of L2 SDUs to generate, create, obtain, etc., a set of encoded L2 PDUs. The set of encoded L2 PDUs may then be passed down to the lower layer(s) for transmission to the receiving devices.

In some examples, the receiving device may receive the transmission and provide the set of encoded L2 PDUs to the L2 layer, e.g., after integrity verification and deciphering, for decoding. The receiving device may decode the set of encoded L2 PDUs to obtain the set of L2 SDUs. For example, the receiving device may receive a threshold quantity of L2 sub-PDUs of an L2 PDU (e.g., source sub-PDUs and parity sub-PDUs), rearrange/reassemble the L2 sub-PDUs, and then use the rateless code to decode the L2 PDU to obtain the corresponding L2 SDU. The set of L2 SDUs (e.g., obtained based on decoding using the rateless code) may be passed or otherwise provided to an upper layer of the receiving device for further processing/recovery of the L2 SDU.

Various aspects of the present disclosure provide communication techniques for a transmitting and receiving devices. For example, a transmitting device may transmit a set of L2 PDUs to a group of receiving devices, and the set of L2 PDUs may correspond to one or more L2 SDUs. A receiving device of the group of receiving devices may receive set of L2 PDUs and attempt to generate or assemble a corresponding L2 SDU, but the receiving device may not successfully generate the corresponding SDU. In some cases, the receiving device may not receive one or more L2 PDUs of the set of L2 PDUs, while in some other cases, the receiving device may not properly decode one or more L2 PDUs of the set of L2 PDUs, which may prevent the receiving device from generating and obtaining a corresponding SDU. The receiving device may generate a report (e.g., an L2 status PDU) to indicate the status of the set of L2 PDUs or one or more L2 SDUs to the transmitting device. In some cases, the transmitting device may alter a coding rate based on the report, which may improve communication reliability and decrease system latency.

Such techniques may involve a transmitting device determining that a polling condition has been met. In such cases, the transmitting device may set a polling flag within a subsequent L2 PDU based on determining that the polling condition has been met, and the transmitting device may transmit the subsequent L2 PDU to the group of UEs. The polling condition may be based on a timer, a number of transmitted L2 PDUs, a number of bytes corresponding to transmitted L2 PDUs, or any combination thereof. The transmitting device may monitor for one or more reports from the group of UEs. In some cases, the report may be generated by a receiving device based on a prohibit timer or an L2 PDU indicating a polling flag. Generating a report based on a timer or a polling flag may support automatic repeat request (ARQ) procedures at the L2 layer, which may improve communication reliability and decrease system latency.

Various aspects of the present disclosure provide communication techniques for a transmitting and receiving devices. For example, a transmitting device may encode, at an L2 layer of the transmitting device, a set of L2 SDUs according to a set of network coding parameters to obtain a first set of L2 PDUs. The transmitting device may transmit, to one or more receiving devices (e.g., via a unicast, broadcast, or multicast message), the first set of L2 PDUs. One or more receiving devices may receive the first set of L2 PDUs and attempt to generate or assemble a corresponding L2 SDU, but one or more of the receiving devices may not successfully generate the corresponding SDU. In some cases, the receiving device may not receive one or more L2 PDUs of the set of L2 PDUs, while in some other cases, the receiving device may not properly decode one or more L2 PDUs of the set of L2 PDUs, which may prevent one or more of the receiving devices from generating and obtaining a corresponding SDU. One or more of the receiving devices may generate a report (e.g., an L2 status PDU, feedback report) to indicate the status of the set of L2 PDUs or one or more L2 SDUs to the transmitting device.

The transmitting device may receive, a receiving device of the one or more receiving devices, a report indicating an L2 SDU of the set of L2 SDUs that was unsuccessfully received at the receiving device. In some cases, the report may additionally include a bitmap indicating which L2 SDUs were successfully received, and which L2 SDUs were not successfully received of the set of L2 SDUs. Additionally or alternatively to the bitmap, the report may include an indication of the number of L2 PDUs the receiving device used to assemble one L2 SDU. Based on the received report, the transmitting device may transmit, to the one or more receiving devices, a second set of L2 PDUs corresponding to at least the L2 SDU of the set of L2 SPDUs. In some cases, the transmitting device may receive a feedback report from more than one device, and may determine the second set of L2 PDUs based on the multiple feedback reports.

Aspects of the disclosure are initially described in the context of wireless communications systems. Aspects of the disclosure are further illustrated by and described with reference to apparatus diagrams, system diagrams, and flowcharts that relate to rateless coding at an L2 layer, outer coding at (e.g., in) the L2 layer, L2 configurations, L2 polling messages, L2 status messages, polling and status reporting for network coding, L2 communications, and the like.

FIG. 1 illustrates an example of a wireless communications system 100 that supports rateless coding at an L2 layer in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/$ ($\Delta f_{max} \cdot N_f$) seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for layer transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network may include an access point (AP) that may communicate with one or more wireless or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a device may communicate with an associated AP via downlink (e.g., the communication link from the AP to the device) and uplink (e.g., the communication link from the device to the AP). A wireless personal area network (PAN), which may include a Bluetooth connection, may provide for short range wireless connections between two or more paired wireless devices. For example, wireless devices such as cellular phones may utilize wireless PAN communications to exchange information such as audio signals with wireless headsets.

The wireless communications system 100 may be a packet-based network that operates according to a layered protocol stack. In the user plane, communications at the bearer or PDCP layer may be IP-based. In some cases, a Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

Communication between devices of wireless communication system 100 may implement various communication protocols, such as for providing robust data communication, facilitating high data rate communication, avoiding or mitigating interference, etc. RLC, for example, is a layer 2 radio link protocol used in UMTS, LTE, and 5G NR on the air interface. When implemented, RLC is located on top of the 3GPP MAC-layer and below the PDCP layer and RRC layer to perform various tasks, such as transfer of upper layer PDUs, error correction through ARQ, concatenation, segmentation, and reassembly of RLC SDUs, re-segmentation of RLC data PDUs, reordering of RLC data PDUs, duplicate detection, RLC SDU discard, RLC re-establishment, and/or protocol error detection and recovery, depending upon the RLC mode implemented. The RLC modes include AM, UM, and TM.

NR RLC AM provides layer 2 packet error correction through ARQ. The ARQ within RLC AM provides RLC SDU or RLC SDU segmentation retransmission based on RLC status reports. The RLC status reports may be provided in response to polling for the RLC status report. Additionally, the RLC status reports may be provided when a RLC receive entity has detected missing RLC SDU or RLC SDU segmentation.

NR RLC UM provides basic functionality, such as a sliding window in the RLC transmit and receive entities, segment/re-segment in RLC transmission, and re-assemble segmented RLC SDU in RLC reception. However, in contrast to NR RLC AM, NR RLC UM does not provide layer 2 reliability functionality. For example, NR RLC UM does not provide for any reception response (e.g., ACK or NACK) from a RLC receive entity.

NR RLC TM provides very little processing with respect to RLC data. For example, in NR RLC TM there is no RLC header, no reordering, no segmentation, and no reassembly. NR RLC TM does, however, provide buffering of transmit data.

Network coding is a technique that has been utilized to provide error correction supporting robust data communication. In communications in which network coding is implemented a fountain code (e.g., Luby transform code, Raptor code, etc.), generally referred to as a network code in 3GPP in light of being applied in the network layer, is used to protect source data against loss in transmission (e.g., resulting from poor channel conditions, signal fading, interference, blockage, etc.). When using a fountain code, encoding is applied to each source data fragment (i.e., k fragments into which a source data object is partitioned) to generate repair data, wherein the resulting repair data fragments are of equal size with the source data fragments. Fountain codes are rateless codes in sense that a coded packet is potentially limitless (e.g., may include the source fragments and an unlimited number of repair data fragments).

Source data transmitted using network coding can be recovered in receiver as long as the number of received fragments is some number of fragments larger than that of the source fragments no matter which packets are received. For example, the fountain code may provide r repair fragments for each source data object segmented into k source data fragments, whereby the total number of fragments, p, for a source data object may be expressed as p=k+r. Thus, the fountain code may be parameterized as (p; k; r) where k is the number of source data fragments of a source data object, p is the total number of encoded symbols (e.g., potentially unlimited for a rateless code), and r=p−k is the number of repair data fragments. A property of fountain codes is that all k source data fragments can be recovered from any n (e.g., k≤n≤p) of the p encoded fragments (i.e., the data of the source object may be reconstructed by receiving any combination (source data and/or repair data fragments) of n fragments).

A transmitting device (e.g., a UE 115 and/or base station 105 performing a transmission) may receive, at a PDCP layer of the transmitting device, a set of PDCP SDUs corresponding to a payload of data for transmission to one or more receiving devices. The transmitting device may encode, at the PDCP layer, the set of PDCP SDUs according to a set of network coding parameters to obtain a set of encoded PDCP PDUs, the network coding parameters comprising at least a rateless code. The transmitting device may provide the set of encoded PDCP PDUs to a lower layer of the transmitting device for transmission to the one or more receiving devices (e.g., one or more other UE(s) 115 and/or base station(s) 105 receiving the transmission).

A receiving device (e.g., a UE 115 and/or base station 105 receiving a transmission) may receive, at a PDCP layer of the receiving device, a set of encoded PDCP PDUs from a transmitting device. The receiving device may decode, at the PDCP layer, the set of encoded PDCP PDUs according to a set of network coding parameters to obtain a set of PDCP SDUs corresponding to a payload of data, the set of network coding parameters comprising at least a rateless code. The receiving device may provide the set of PDCP SDUs to an upper layer of receiving device, the upper layer being a higher layer than the PDCP layer of the receiving device.

A transmitting device (e.g., a UE 115 and/or base station 105 performing a transmission) may receive, at a PDCP layer of the transmitting device, a set of PDCP SDUs corresponding to a payload of data for transmission to one or more receiving devices. The transmitting device may encode, at the PDCP layer, the set of PDCP SDUs according to a set of network coding parameters to obtain a set of encoded PDCP PDUs. Encoding according to the network coding parameters may be or include encoding using at least a rateless code. The transmitting device may provide the set of encoded PDCP PDUs to a lower layer of the transmitting device for transmission to the one or more receiving devices (e.g., one or more other UE(s) 115 and/or base station(s) 105 receiving the transmission).

A receiving device (e.g., a UE 115 and/or base station 105 receiving a transmission) may receive, at a PDCP layer of the receiving device, a set of encoded PDCP PDUs from a transmitting device. The receiving device may decode, at the PDCP layer, the set of encoded PDCP PDUs according to a set of network coding parameters to obtain a set of PDCP SDUs corresponding to a payload of data, the set of network coding parameters comprising at least a rateless code. The receiving device may provide the set of PDCP SDUs to an upper layer of receiving device, the upper layer being a higher layer than the PDCP layer of the receiving device.

A transmitting device (e.g., a UE 115 and/or base station 105 performing a transmission) may receive, at a PDCP layer of the transmitting device, a set of PDCP SDUs corresponding to a payload of data for transmission to one or more receiving devices. The transmitting device may encode, at the PDCP layer, the set of PDCP SDUs according to a set of network coding parameters to obtain a set of encoded PDCP PDUs. Encoding according to the network coding parameters may be or include encoding using at least a rateless code. The transmitting device may provide the set of encoded PDCP PDUs to a lower layer of the transmitting device for transmission to the one or more receiving devices (e.g., one or more other UE(s) 115 and/or base station(s) 105 receiving the transmission).

A receiving device (e.g., a UE 115 and/or base station 105 receiving a transmission) may receive, at a PDCP layer of the receiving device, a set of encoded PDCP PDUs from a transmitting device. The receiving device may decode, at the PDCP layer, the set of encoded PDCP PDUs according to a set of network coding parameters to obtain a set of PDCP SDUs corresponding to a payload of data, the set of network coding parameters comprising at least a rateless code. The receiving device may provide the set of PDCP SDUs to an upper layer of receiving device, the upper layer being a higher layer than the PDCP layer of the receiving device.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

For example, a transmitting device (e.g., a base station 105) may encode, at a PDCP layer of the base station 105, a set of PDCP SDUs according to a set of network coding parameters to obtain a first set of PDCP protocol data units (PDUs). The base station 105 may transmit, to one or more receiving devices (e.g., a UE 115) via a unicast, broadcast, or multicast message, the first set of PDCP PDUs and receive, from a UE 115 of the one or more UEs 115, a report indicating a PDCP SDU of the set of PDCP SDUs that was unsuccessfully received (e.g., not successfully received) at the UE 115, where an unsuccessfully received PDCP SDU may refer to a PDCP SDU that the UE 115 could not assemble. In some cases, the report may additionally include a bitmap indicating which PDCP SDUs were successfully received, and which PDCP SDUs were not successfully received. Additionally or alternatively to the bitmap, the report may include an indication of the number of PDCP PDUs the UE 115 used to assemble one PDCP SDU. Based on the received report, the base station 105 may transmit, to the one or more UEs 115, a second set of PDCP PDUs corresponding to at least the PDCP SDU of the set of PDCP SPDUs. In some cases, the base station 105 may receive a feedback report from more than one UE 115, and may determine the second set of PDCP PDUs based on the multiple feedback reports.

Figure 2A:
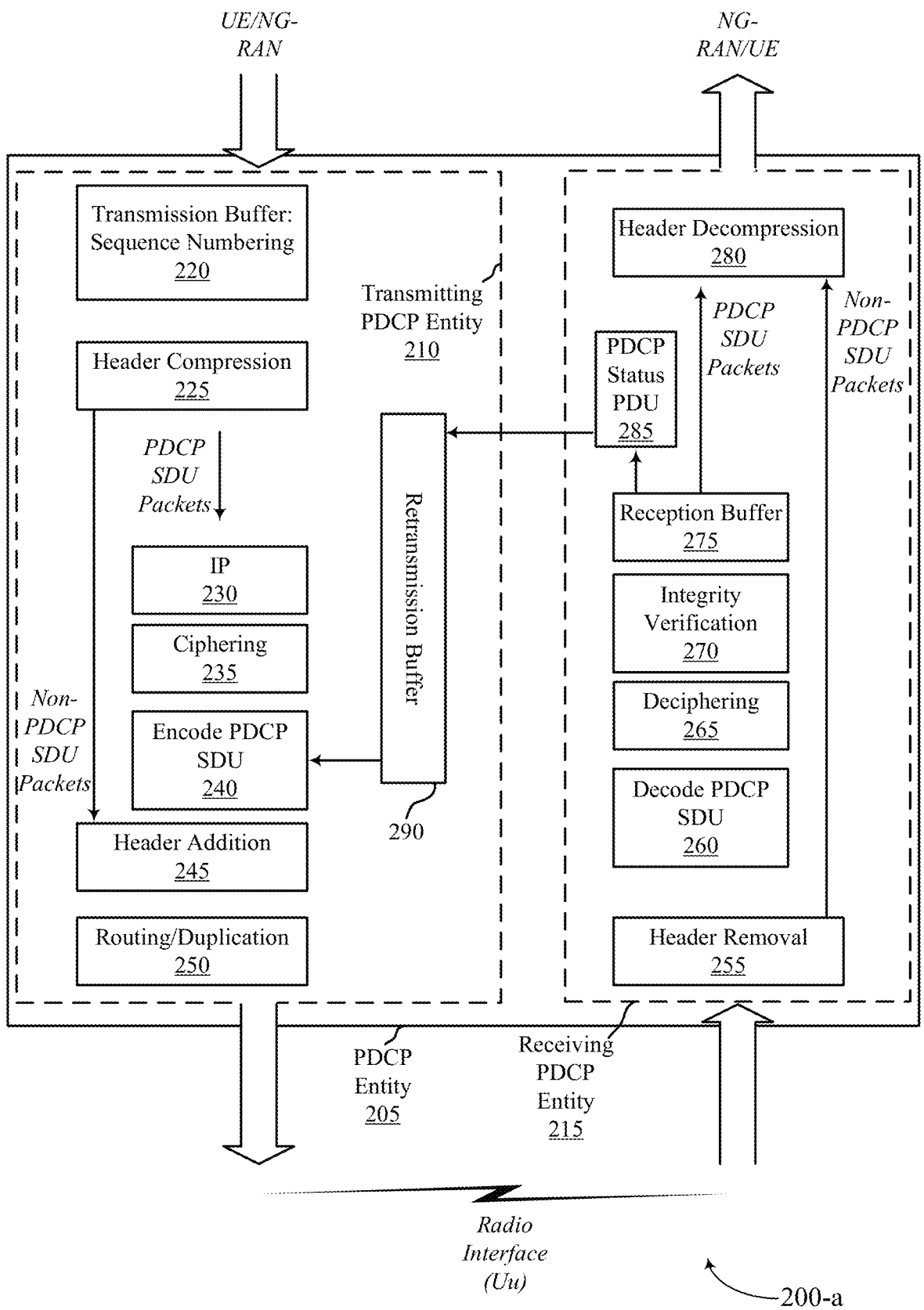
FIGS. 2A and 2B illustrate an example of a PDCP entity that supports rateless coding at an L2 layer in accordance with aspects of the present disclosure.
Figure 2B:
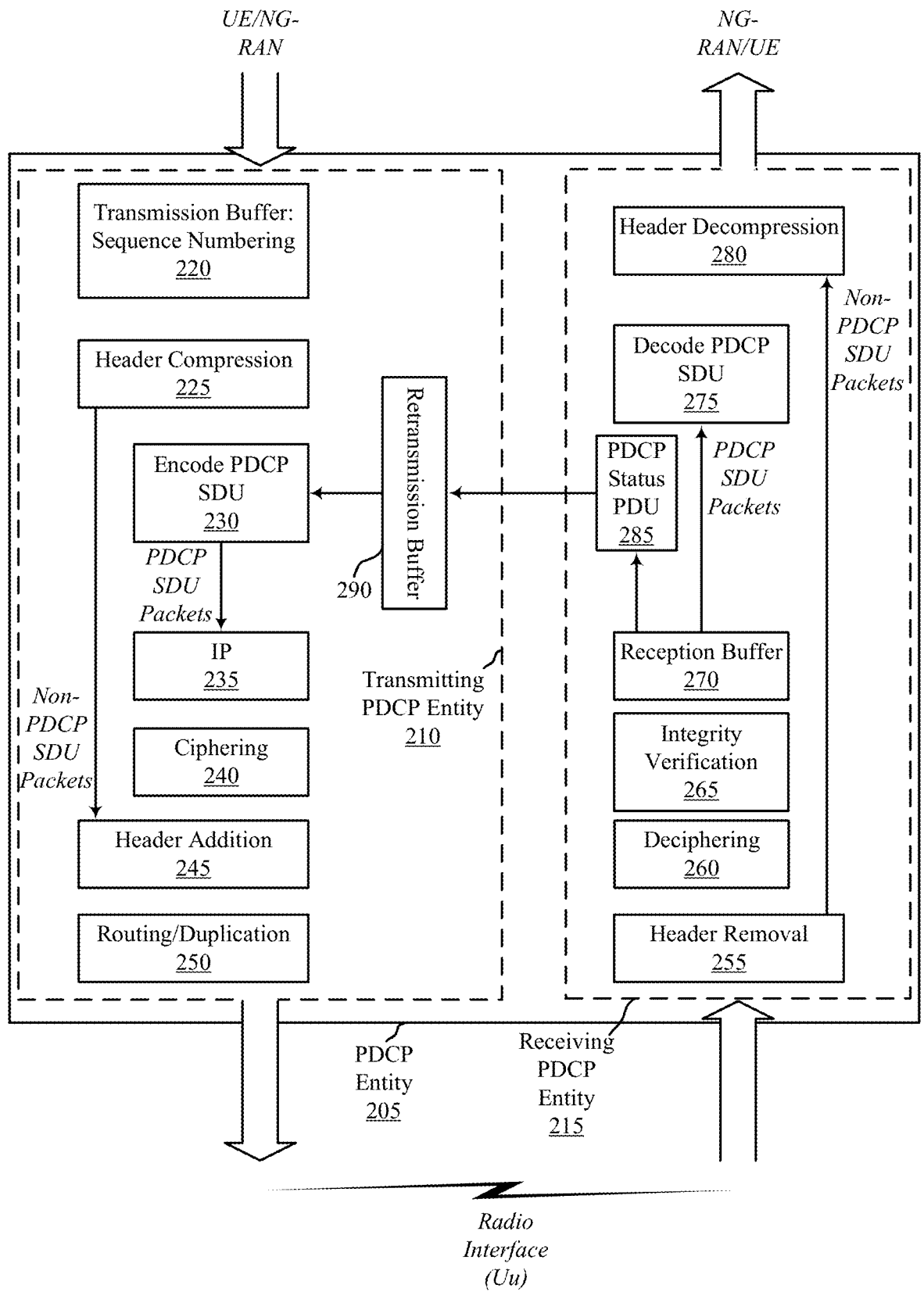

FIGS. 2A and 2B illustrate an example of a PDCP entity 200 (e.g., a PDCP configuration) that supports rateless coding at an L2 layer in accordance with aspects of the present disclosure. In some examples, the PDCP entity 200 may implement aspects of wireless communication system 100. PDCP entity 200 may include a PDCP entity 205 comprising transmitting PDCP entity 210 at a transmitting device and receiving PDCP entity 215 at a receiving device. In some aspects, the transmitting device and/or receiving device may be examples of a UE and/or base station as described herein. Broadly, PDCP entity 200-a of FIG. 2A illustrates an example where the retransmission occurs after integrity protection and ciphering and PDCP entity 200-b of FIG. 2B illustrates an example where the retransmission occurs before integrity protection and ciphering.

Turning first to PDCP entity 200-a of FIG. 2A, in some aspects a base station may be configured or otherwise act as a transmitting device performing a wireless transmission to a UE, 115 which may be configured or otherwise acting as a receiving device in this scenario. Conversely, the UE 115 may also implement various aspects of the described techniques when configured or otherwise acting as a transmitting device performing a wireless transmission to a base station 105, which would be configured or otherwise acting as the receiving device in this scenario. In some examples, such wireless transmissions may be performed by the base station 105 to another base station 105 (e.g., in an IAB network) and/or by a UE 115 to another UE 115 (e.g., in a V2X, IAB, etc., network).

Wireless devices communicating over a wireless network may form peer entities between layers within a protocol stack established at each end of the communications (e.g., at the transmitting device end and the receiving device end). For example, a transmitting device (e.g., a UE and/or a base station performing a transmission to other UE(s) and/or base station(s)) may implement a protocol stack that includes, starting at the bottom, a physical layer that maps transport channels to physical channels of the wireless medium, implements the 5G frame structure, beamforming, variable bandwidths, and the like. The physical layer may also be referred to as layer 1 (L1). Above L1 within the protocol stack lies layer two (L2), which includes a MAC layer, an RLC layer, a PDCP layer, etc. The MAC layer generally provides priority handling between logical channels, transport format selection, padding, etc. The RLC layer generally provides packet segmentation and concatenation, RLC timers, etc. Traditionally, the PDCP layer transfers user plane/control plane data, provides PDCP sequence number (SN) maintenance, ciphering/integrity protection, bearer routing, etc. Above L2 within the protocol stack lies layer three (L3), which may include an RRC layer, IP layer, and the like. L3 within the protocol stack is also referred to as the network layer, application layer, etc.

When a transmitting device communicates with the receiving device, a logical entity is established between each layer of the transmitting device and the corresponding layer of the receiving device (e.g., a next-generation radio access network (NG-RAN) entity structure). For example, PDCP entity 205 is established between a transmitting device (e.g., transmitting PDCP entity 210) and a receiving device (e.g., receiving PDCP entity 215) to support wireless communications. Such logical entities are also established between the MAC layers (e.g., a MAC entity), RLC layers (e.g., an RLC entity), etc., which are used to monitor, control, or otherwise manage the aspects of the wireless communication functions being performed at the particular layer. Traditionally, a payload of data for transmission to the receiving device(s) from an upper layer (e.g., L3) is processed at the upper layer, passed down to L2 for further packaging, processing, etc., and then passed down to L1 to be mapped to a physical resources (e.g., time, frequency, spatial, code, etc. resources) for transmission to the receiving device(s) via a radio interface, such as the Uu interface, a PC5 interface, etc. The receiving device receives the transmission over the radio interface at L1. The payload of data is then passed upwards within the protocol stack of the receiving device for processing at each of L2 and L3.

At a high level, a payload of data for transmission to a receiving device(s) may be generated at an upper layer as a set of IP packet(s). Each IP packet at the resource block level is passed down to the service data adaptation protocol (SDAP) layer, where a SDAP header is added to the packet. This creates an SDAP SDU including the SDAP header. The SDAP SDU with the SDAP header is then passed down to the PDCP layer, where a PDCP PDU header is added to the packet. This creates a PDCP SDU including the PDCP header. The PDCP SDU with the PDCP header is passed down to the RLC layer, where an RLC header is added to the packet. This creates an RLC SDU with the RLC header. The RLC SDU with the RLC header is then passed down to the MAC layer, where a MAC header is added to the packet. This creates a MAC SDU plus the MAC header. The MAC layer assembles the MAC SDUs with MAC headers into a MAC PDU transport block, which is passed down to the physical layer for transmission.

Broadly, the PDU/SDU references relates to L2 protocols. In some aspects, a SDU refers to input data received at one layer from an upper layer for processing. For example, a layer receives a PDU, which is an SDU from the perspective of the receiving layer, and then outputs a PDU after packaging/processing at the receiving layer to a the lower layer (e.g., in a transmission scenario). This PDU being provided to the lower layer is an SDU from the perspective of that lower layer. Accordingly, the output of the data from the protocol entity is the PDU and the input to that protocol entity is the SDU. For example, what arrives at the PDCP layer (e.g., in a transmission scenario) is an RRC PDU which becomes, from the perspective of the PDCP layer, a PDCP PDU. The PDCP layer performs PDCP related processing on the PDCP SDU and then outputs PDCP PDUs to a lower layer (e.g., the RLC layer). In other words, a PDU specifies the data that will be sent to the peer protocol layer (e.g., a PCDP PDU from the transmitting PDCP entity 210) to the receiving device(s) (e.g., a PDCP PDU provided to receiving PDCP entity 215).

Some wireless communication systems (e.g., unicast, multi-cast, broadcast, etc.) do not support L2 retransmissions (e.g., retransmissions of L2 SDUs or PDUs), which may negative impact reliability. Extending the maximum number retransmissions in a lower layer using HARQ techniques may be inefficient and result in a potentially long latency. Window based RLC acknowledgment mode (AM), which may include a sliding window being used to detect error packets and assemble the packets at the RLC receiver side, may involve undesirable complexities, latencies, or inefficiencies when used for correcting residual errors of lower layers. For example, such techniques may require unicast retransmission, even where initial transmissions are broadcast or multicast.

Wireless communication systems may utilize fountain codes, which are rateless codes in that the number of encoded packets to be transmitted is potentially limitless. For example, the transmitted packets may be recovered at the receiver side so long as the number of received packets is sufficiently large (e.g., slightly larger than the number of source packets), regardless of which particular packets are received and successfully decoded. Examples of such rateless codes include LT codes, raptor codes (an enhanced code based on variations of LDPC and LT codes), and the like.

Fountain codes may also be referred to as network codes because they are typically applied to the network/application layer (e.g., for MBMS, IAB, V2X, and the like). At the receiving side, each encoded symbol would either be decoded correctly or discarded (e.g., the encoded packet(s) transmitted during a symbol). This approach permits a block number (e.g., source block number (SBN)) and/or a symbol identifier (e.g., encoding symbol identifier (ESI)) associated with the packet(s) to be added as a header file to the encoded symbols. The SBN generally corresponds to an integer identifier for the source block (e.g., the column of the original generator matrix) that the encoded symbols within the packet relate to. The ESI generally corresponds to an integer identifier for the encoding symbols within the packet. Each encoded packet may include the SBN (e.g., the first 16 bits), the ESI (e.g., the last 16 bits), and the encoding symbol(s). Based on the SBN and ESI, the transmitting device and receiving device may determine which source symbols (e.g., which column of the original generator matrix) were selected to generate the encoded symbol.

Accordingly, fountain codes are rateless codes with an unlimited number of columns in the original generator matrix generated by the transmitting device. For example, the transmitting device may have K symbols for transmission to the receiving device. The original generator matrix may therefore be generated with K rows (corresponding to the K symbols) and, as the fountain code is a rateless code, a potentially infinite number of columns. The number of transmitted packets may correspond to the formula:

$$p_j = \sum_{k=1}^{K} s_k G_{kj}$$

For a conventional ARQ, the original generator matrix may begin with the unit matrix.

The recovered packets (e.g., the received packets) may correspond to the formula:

$$r_k = \sum_{n=1}^{N} P_n (G_{nk}^{\prime-1})$$

The condition or scenario for the receiving device to recover the packets may include G' according to the received packets being invertible or the rank of G' being K. A design rule for the original generator matrix is that G' is invertible with minimum N.

However, as discussed above conventional wireless communication systems do not support application (e.g., encoding) of the rateless codes at L2, such as at the PDCP layer. Accordingly, and given that the PDCP layer is the entrance to the L2 protocol stack, aspects of the described techniques provide for rateless coding to be configured in the PDCP layer, which may increase link reliability without causing significant latency issues and/or protocol change. For example, the SDAP provides quality of service (QoS) mapping and flow identifier (ID) and does not impact packet processing. The RLC layer works under transparent mode (TM) or unacknowledgement mode (UM) without providing ARQ functionality. Rateless/network coding techniques, as described herein, may support recovery of missing packets in a multi-cast/broadcast system.

For example, the PDCP layer (e.g., transmitting PDCP entity 210) may receive a set of PDCP SDUs corresponding to a payload of data for transmission to receiving device(s). The set of PDCP SDUs may generally include packets for transmission to convey the payload of data. Broadly, the PDCP layer may perform various processing operations, additions, etc., on the set of PDCP SDUs in order to generate a corresponding set of PDCP PDUs to be provided to a lower layer (e.g., the RLC layer), which will ultimately be processed and passed down to the physical layer for transmission to the receiving device(s) over the air interface. For example, the PDCP layer may encode the set of PDCP SDUs using network coding parameters (e.g., a rateless code). In some aspects, encoding of the PDCP SDUs at the PDCP layer may be performed after integrity protection, ciphering, and the like.

For example, the set of PDCP SDUs may be received in transmission buffer 220. That is, the data (e.g., the set of PDCP SDUs corresponding to packets of the payload of data) may be stored in the transmission buffer and have a sequence number added to each PDCP SDU. Broadly, the sequence number may be used to determine whether the packet is received in order, whether there are any duplications for the packet, how the packets are to be arranged to re-create the original payload of data, and the like. In some aspects, the sequence number applied to a PDCP SDU may be associated with a COUNT value that may correspond to a next transmission field (TX NEXT) for the PDCP SDU. The packets may be provided to header compression 225 for processing, e.g., to perform header compression of the PDCP SDU. For example, header compression 225 may modify the header of the PDCP SDU for efficiency. In some aspects, header compression 225 may not be applied for non-PDCP SDU packets (e.g., control plane packets, such as RRC/non-access stratum (NAS) messages). In some aspects, header compression 225 may be applied to PDCP SDU packets (e.g., user plane packets, such as the packets corresponding to the payload of data). For example, header compression 225 may be applied to user plane packets, although this may be skipped in some scenarios.

The PDCP SDU packets may leave header compression 225 and be processed by integrity protection (IP) 230 and ciphering 235 functions before being provided for header addition 245 and routing/duplication 250 for final processing before being provided to lower layers for transmission. Header addition 245 adds the PDCP header to the PDCP SDU and routing/duplication 250 routes the packet to the intended bearer, if applicable.

However, aspects of the described techniques provide for encoder 240 to be enabled, configured, implemented, or otherwise provided, at the PDCP layer of the packet before integrity protection/ciphering functions. As discussed, the encoder 240 may encode a PDCP SDU of the set of PDCP SDUs to create, define, or otherwise obtain a corresponding set of encoded PDCP PDUs. However, it is to be understood that in some examples the PDCP SDUs may be PDCP PDUs from the perspective of receiving PDCP entity 215 after routing/duplication 250 processing. Accordingly, the transmitting PDCP entity 210 (e.g., the PDCP layer in this example) may apply network coding parameters including a rateless code to the PDCP SDUs at encoder 240.

Accordingly, aspects of the described techniques permit, after integrity protection 230 and ciphering 235 functionality, the PDCP data PDU (e.g., the PDCP SDU) being encoded using network coding, rateless coding, etc. In some aspects, the encoded PDCP PDU using rateless coding may also be referred to as a coded PDCP SDU.

To encode the PDCP SDU, the encoder 240 may segment the PDCP SDU into one or more PDCP PDUs, in some cases referred to as source PDCP PDUs. The encoder 240 may encode the one or more source PDCP PDUs using a rateless code (e.g., fountain code, network code, etc.) to generate one or more parity PDCP PDUs. The source PDCP PDUs and the parity PDCP PDUs may, collectively, be referred to as an encoded set of PDCP PDUs. In some cases, the transmitting device may store the encoded set of PDCP PDUs in a retransmission buffer 290.

In some examples, the number of source PDCP PDUs that the PDCP SDU is segmented into may be configured by the network (e.g., using RRC configuration signaling in a PDCP-Config field). Accordingly, the encoded set of PDCP PDUs may be passed to header addition 245 discussed above, where a PDCP header is added to each encoded PDCP PDU and then provided to routing/duplication 250 for final processing before being provided to a lower layer for transmission to the receiving device(s).

Each PDCP PDU header may include fields to assist a receiving device in decoding and reassembling the associated PDCP SDU. For example, each PDU header may include a sequence number for one associated PDCP SDU. The receiving device may be able to determine which PDCP PDUs are for a same PDCP SDU based on the sequence numbers. In some cases, a PDCP PDU header may include an L field, which indicates whether the attached PDCP data PDU is a last PDU of one SDU. The L field may be used by the receiving device to determine if all PDCP PDUs associated with one PDCP SDU have been received. If the receiving device cannot reassemble the PDCP SDU after receiving all PDCP PDUs, the PDCP SDU may be considered missing by the receiving device. In some cases, a PDCP PDU header may include a sub-sequence number field, which indicate the index of the attached PDCP PDU associating to one PDCP SDU. The receiving device may use the sub-sequence number field to order the received PDCP PDUs and obtain the PDCP SDU. In some cases, a PDCP PDU header may include a T field, which may indicate whether the attached PDCP data PDU is a repaired PDU or not.

In some aspects, while a rateless code may itself be rateless, it may be utilized so as to achieve an actual code rate. A code may be considered rateless if the code is not associated with any fixed code rate (which may alternatively be referred to as coding rate). For example, a set of source symbols (or packets, such as SDUs or PDUs) may be encoded using a rateless code to generate any quantity of encoded symbols (or packets, such as SDUs or PDUs), and the source symbols may be recovered based on any sufficiently large group of encoded symbols—that is, it may not matter which particular encoded symbols are received by a receiving device, so long as a sufficient quantity of encoded symbols are received. Thus, a transmitting device may generate and transmit any quantity of encoded symbols for a given quantity of source symbols, so long as the quantity generated and transmitted is sufficiently large, and the actual quantity generated and transmitted may vary over time (e.g., during a first period of time, the transmitting device may generate and transmit X encoded symbols per N source symbols using the rateless code, and during a second period of time, the transmitting device may generate and transmit Y encoded symbols per N source symbols using the same rateless code, where X and Y are both sufficiently large, but perhaps Y is larger than X to further increase a likelihood that a receiving device is able to successfully decode a sufficient number of the transmitted encoded symbols or a given set of source symbols, at the cost of extra signaling or other overhead).

Thus, though any quantity of corresponding PDCP PDUs (e.g., including the source PDCP PDUs and parity PDCP PDUs) may be generated by encoding an SDU using a rateless code, the actual code rate with which a set of one or more SDUs is encoded using the rateless code may be equal to the total quantity of SDUs in the set of one or more SDUs (or alternatively the total quantity of corresponding source PDUs) divided by the total number of corresponding PDCP PDUs actually generated for the set of one or more SDUs. In some cases, the network may configure a minimum code rate for the source PDCP data PDU (e.g., using the PDCP-Config field in RRC signaling). For example, RRC configuration signaling may be received indicating the minimum code rate for the encoding using the rateless code. The actual (as utilized) code rate for the encoding using the rateless code may be adjusted based on the RRC signaling.

In some aspects, an actual code rate may be dynamically adjusted based on the feedback from the receiving device(s), such as in a PDCP status PDU (e.g., a status report indicating HARQ information, or a more simple report). For example, the status report may be received that indicates the quantity of PDCP PDUs that the receiving device decoded and used to attempt to reassemble the PDCP SDU within receiving PDCP entity 215. A field (e.g., NumPDU) in the PDCP status PDU (e.g., the report) may indicate the number of PDCP data PDUs used to decode the whole PDCP SDU. The code rate of the encoding using the rateless code may be adjusted based on the status report. For example, the encoding process for each encoding symbol (e.g., each PDCP SDU) may include the transmitting device (e.g., encoding 240) randomly choosing a degree $d_i$ from a degree distribution and randomly choosing $d_i$ distinct source symbols with uniform distribution and performing an exclusive or (XOR) function on them. Selecting different degrees $d_i$ may result in effectively providing a minimum code rate for encoding using the rateless codes.

Accordingly, a PDCP SDU may, after segmentation, be used to generate of a set of source PDCP PDUs (e.g., source PDUs) associated with one PDCP SDU as well as a set of corresponding parity PDCP PDUs (e.g., parity PDUs). Headers may be added to the encoded PDCP PDUs may carry or otherwise convey an indication of the total number of source PDCP PDUs and parity PDCP PDUs, which the receiving device(s) may use to efficiently parse the received encoded PDCP PDUs.

The encoded set of PDCP PDUs are then transmitted to the receiving device(s) over the Uu radio interface by the physical layer of the transmitting device. The payload of data is received at the physical layer of the receiving device(s), processed, and then passed up to L2 for additional processing, e.g., the PDCP layer of the receiving device, which corresponds to the receiving PDCP entity 215. Accordingly, the set of encoded PDCP PDUs may be received at the PDCP layer of the receiving device. Initially this may include each PDCP PDU being provided to header removal 255 for removal the PDCP header. As discussed above, the PDCP header may indicate an index for each PDCP PDU as well as an associated PDCP SDU. Accordingly, the receiving device may determine an order for the source PDCP PDUs and parity PDCP PDUs associated with one PDCP SDU based on the header removed at header removal 255.

The PDCP SDU may be decoded at decoder 260 according to the network coding parameters (including the rateless code) to obtain corresponding PDCP SDUs. In some aspects, this may include window based PDCP receive procedures being used (e.g., for PDCP in-order delivery, PDU duplication detection, and the like). Decoder 260 may decode the PDCP SDU and deliver this to the deciphering 265.

In some aspects, the receiving device may begin to decode and reassemble a PDCP SDU when a minimum number of PDCP data PDUs have been received that are associated with a single PDCP SDU (e.g., to reduce decoding complexity). In one example, the one or more network coding parameters can include, additionally to other parameters described elsewhere herein, the minimum number of PDCP data PDUs. In some cases, the network may configure the minimum number of PDCP data PDUs. In some examples, the receiving device may stop decoding PDCP data PDUs associated to one PDCP SDU if the PDCP SDU can be reassembled successfully. The receiving device may discard any additional PDCP PDUs once the associated PDCP SDU is reassembled, which may save packet decoding latency and processing The decoded PDCP SDU is then routed through deciphering 265, integrity verification 270, and reception buffer 275 for processing. For example, deciphering 265 may decipher the PDCP SDU, integrity verification 270 may verify the integrity of the PDCP SDU, and reception buffer 275 may store the PDCP SDU. Reception buffer 275 may provide the PDCP SDU to header compression 280, which then provides the PDCP SDU to an upper layer of the receiving device higher than the PDCP layer (e.g., an RRC layer). As discussed above, non-PDCP SDU packets (e.g., control plane packets) may skip deciphering 265, integrity verification 270, etc.

As discussed above, aspects of the described techniques may also provide HARQ (e.g., ARQ) functionality at the PDCP layer. For example, the receiving device may determine that the PDCP SDU is unable to be successfully received and decoded. Accordingly, PDCP status PDU 285 may transmit or otherwise provide a status report (e.g., or more simply report) indicating that the PDCP SDU is unable to be successfully received and decoded. In some aspects, the status report may carry or otherwise convey an indication of a sequence number to a next PDCP SDU that is yet to be received (e.g., ACK_SN, which corresponds to the SN of the next PDCP SDU that has not been received). In some aspects, the status report may carry or otherwise convey an indication of a bitmap indicating the PDCP SDUs which are missing or correctly received at the receiving device. In some aspects, the status report may carry or otherwise indicate a quantity of PDCP PDUs the receiving device decoded and used to attempt to obtain the at least one PDCP SDU (e.g., number of PDCP PDUs, including source and parity PDUs, that were decoded and used to assemble one PDCP SDU). The transmitting device may adjust the minimum code rate for encoding a repair PDCP SDU based on the report. Additionally, or alternatively, the minimum code rate may be adjusted for future (e.g., non-repair) PDCP SDU encodings.

Retransmission buffer 290 of the transmitting PDCP entity 210 may monitor for and receive the status report from PDCP status PDU 285 (e.g., the status report may be transmitted over the radio interface) and use this information to provide some degree of HARQ functionality. For example, retransmission buffer 290 implemented at the PDCP layer of the transmitting device may determine that the status report for a previously transmitted encoded PDCP PDU comprises a negative acknowledgment for the encoded PDCP PDU. Accordingly, the retransmission buffer 290 may determine that at least one PDCP SDU in the set of PDCP SDUs correspond to the previously transmitted set of encoded PDCP PDUs (e.g., a repair/retransmission PDCP PDU). Encoder 240 may encode the PDCP SDU as a repair PDCP SDU based on the negative acknowledgment.

As discussed above, the RLC layer typically sets below (e.g., is a lower layer) the PDCP layer. The RLC layer may operate in UM/TM. When operating in UM, the RLC layer may provide segmentation of the PDCP SDU for the transmitting device and/or reassembly of the PDCP PDU for the receiving device. This may include a sliding window being implemented at the RLC entity of both the transmitting device and the receiving device, segmentation/re-segmentation in the RLC layer of the transmitting device, reassembly of the segmented RLC SDU at the RLC entity of the receiving device, and the like. When operating in TM, the RLC layer may provide transparent transmissions (e.g., neither SDU segmentation nor ARQ functionality). In this situation, segmentation/re-segmentation may be implemented at the MAC layer, e.g., a MAC SDU can be segmented based on a grant of resource. In this situation, the PDCP layer may provide security, outer coding based ARQ, and in-order delivery of the PDCP PDUs.

It is to be understood that FIG. 2A illustrates just an example approach to implementing network coding at the PDCP layer, and that other approaches are possible. For example, rather than encoding PDCP SDUs after integrity protection 230 and ciphering 235 (and decoding PDCP SDUs before deciphering 265 and integrity verification 270), an alternative implementation may encode PDCP SDUs before integrity protection integrity protection 230 and ciphering 235 (and decode PDCP SDUs after deciphering 265 and integrity verification 270) but still within the PDCP layer (such as is illustrated in PDCP entity 200-*b* of FIG. 2B). As another example, an alternative implementation may segment a PDCP SDU to obtain a corresponding set of source PDCP sub-PDUs, and encode the set of source PDCP sub-PDUs to obtain a set of encoded source PDPC sub-PDUs, and prepend a PDCP PDU header to a single PDPC PDU that includes the set of encoded source PDPC sub-PDUs. Thus, rather than each segment of the PDCP SDU eventually corresponding to a PDCP PDU with a corresponding PDCP PDU header (and thus multiple PDCP PDUs and associated PDCP PDU headers being generated for a single PDCP SDU), each segment of the PDCP SDU may eventually correspond to a sub-PDU within a single encoded PDCP PDU that has a single PDCP PDU header.

Turning for PDCP entity 200-*b* of FIG. 2B, as discussed above conventional wireless communication systems do not support application (e.g. encoding) of the rateless codes at L2, such as at the PDCP layer. Accordingly and given that the PDCP layer is the entrance to the L2 protocol stack, aspects of the described techniques provide for rateless coding to be configured in the PDCP layer, which may increase link reliability without causing significant latency issues and/or protocol change. For example, the SDAP provides QoS mapping and flow ID and does not impact packet processing. The RLC layer works under TM or UM without providing ARQ functionality. Rateless/network coding techniques, as described herein, may support recovery of missing packets in a multi-cast/broadcast system.

For example, the PDCP layer (e.g., transmitting PDCP entity 210) may receive a set of PDCP SDUs corresponding to a payload of data for transmission to receiving device(s). The set of PDCP SDUs may generally include packets for transmission to convey the payload of data. Broadly, the PDCP layer may perform various processing operations, additions, etc., on the set of PDCP SDUs in order to generate a corresponding set of PDCP PDUs to be provided to a lower layer (e.g., the RLC layer), which will ultimately be processed and passed down to the physical layer for transmission to the receiving device(s) over the air interface. For example, the PDCP layer may encode the set of PDCP SDUs using network coding parameters (e.g., a rateless code). In some aspects, encoding of the PDCP SDUs at the PDCP layer may be performed before integrity protection, ciphering, and the like.

For example, the set of PDCP SDUs may be received in transmission buffer 220. That is, the data (e.g., the set of PDCP SDUs corresponding to packets of the payload of data) may be stored in the transmission buffer and have a sequence number added to each PDCP SDU. Broadly, the sequence number may be used to determine whether the packet is received in order, whether there are any duplications for the packet, how the packets are to be arranged to re-create the original payload of data, and the like. In some aspects, the sequence number applied to a PDCP SDU may be associated with a COUNT value that may correspond to a next transmission field (TX NEXT) for the PDCP SDU. The packets may be provided to header compression 225 for processing, e.g., to perform header compression of the PDCP SDU. For example, header compression 225 may modify the header of the PDCP SDU for efficiency. In some aspects, header compression 225 may not be applied for non-PDCP SDU packets (e.g., control plane packets, such as RRC/NAS messages). In some aspects, header compression 225 may be applied to PDCP SDU packets (e.g., user plane packets, such as the packets corresponding to the payload of data). For example, header compression 225 may be applied to user plane packets, although this may be skipped in some scenarios.

Traditionally, the PDCP SDU packets would leave header compression 225 and be processed by integrity protection (IP) 235 and ciphering 240 functions before being provided for header addition 245 and routing/duplication 250 for final processing before being provided to lower layers for transmission. Header addition 245 adds the PDCP header to the PDCP SDU and routing/duplication 250 routes the packet to the intended bearer, if applicable.

However, aspects of the described techniques provide for encoder 230 to be enabled, configured, implemented, or otherwise provided, at the PDCP layer of the packet before integrity protection/ciphering functions. As discussed, the encoder 230 may encode the PDCP SDUs in the set of PDCP SDUs to create, define, or otherwise obtain a corresponding set of encoded PDCP PDUs. However, it is to be understood that in some examples the PDCP SDUs may be PDCP PDUs from the perspective of receiving PDCP entity 215 after routing/duplication 250 processing. Accordingly, the transmitting PDCP entity 210 (e.g., the PDCP layer in this example) may apply network coding parameters including a rateless code to the PDCP SDUs at encoder 230.

Accordingly, aspects of the described techniques permit, before integrity protection 235 and ciphering 240 functionality, the PDCP data PDU (e.g., the PDCP PDU) being encoded using outer coding, such as network coding, rateless coding, etc. In some aspects, the encoded PDCP PDU using rateless coding may also be referred to as a coded PDCP PDU. Accordingly, the coded PDCP PDUs may be passed to integrity protection 235 and ciphering 240 for processing using the next transmission (TX NEXT) count value discussed above. For example, the PDCP SN (sequence number) of the PDCP data PDU (e.g., the coded PDCP PDU) may be set to the next transmission (TX NEXT) count value and the next transmission (TX NEXT) count may be incriminated. The coded PDCP PDU may then be provided to header addition 245 where a PDCP header is added to the coded PDCP PDU and then provided to routing/duplication 250 for final processing before being provided to a lower layer for transmission to the receiving device(s). Accordingly, the PDCP layer may associate each PDCP SDU to a count value (e.g., sequence number) corresponding to the next transmission field (TX NEXT).

In some aspects, encoding of the PDCP SDUs may include each PDCP SDU being segmented into a number of source PDCP sub-PDUs (e.g., source sub-PDUs), with each source sub-PDU having the same size (e.g., the same number of bits of information). For example, encoder 230 may segment a PDCP SDU into a set of sub-PDUs having the same size. In some examples, the number of sub-PDUs that the PDCP SDU is segmented into may be configured by the network (e.g., using RRC configuration signaling in a PDCP-Config field) for the transmitting device and a receiving device(s) in order support packet reassembling and decoding at the receiving device(s). Encoder 230 may encode the set of sub-PDUs using the rateless code to obtain a set of source sub-PDUs. Encoder 230 may encode at least a subset of the sub-PDUs using the rateless code to obtain a set of parity sub-PDUs. That is, outer coding may be performed on the source PDCP sub-PDUs to generate parity PDCP sub-PDUs.

In some aspects, while a rateless code may itself be rateless, it may be utilized so as to achieve an actual code rate. A code may be considered rateless if the code is not associated with any fixed code rate (which may alternatively be referred to as coding rate). For example, a set of source symbols (or packets, such as SDUs or PDUs) may be encoded using a rateless code to generate any quantity of encoded symbols (or packets, such as SDUs or PDUs), and the source symbols may be recovered based on any sufficiently large group of encoded symbols—that is, it may not matter which particular encoded symbols are received by a receiving device, so long as a sufficient quantity of encoded symbols are received. Thus, a transmitting device may generate and transmit any quantity of encoded symbols for a given quantity of source symbols, so long as the quantity generated and transmitted is sufficiently large, and the actual quantity generated and transmitted may vary over time (e.g., during a first period of time, the transmitting device may generate and transmit X encoded symbols per N source symbols using the rateless code, and during a second period of time, the transmitting device may generate and transmit Y encoded symbols per N source symbols using the same rateless code, where X and Y are both sufficiently large, but perhaps Y is larger than X to further increase a likelihood that a receiving device is able to successfully decode a sufficient number of the transmitted encoded symbols or a given set of source symbols, at the cost of extra signaling or other overhead).

Thus, though any quantity of corresponding PDCP sub-PDUs (e.g., including the source PDCP sub-PDUs and parity PDCP sub-PDUs) may be generated by encoding an SDU using a rateless code, the actual code rate with which a set of one or more SDUs is encoded using the rateless code may be equal to the total quantity of SDUs in the set of one or more SDUs (or alternatively the total quantity of corresponding source PDUs) divided by the total number of corresponding sub-PDUs actually generated for the set of one or more SDUs. In some cases, the network may configure a minimum code rate for the source PDCP data sub-PDU within one PDCP SDU (e.g., using the PDCP-Config field in RRC signaling). For example, RRC configuration signaling may be received indicating the minimum code rate for the encoding using the rateless code. The actual (as utilized) code rate for the encoding using the rateless code may be adjusted based on the RRC signaling.

In some aspects, the actual code rate with which encoding using the rateless code occurs may be dynamically adjusted based on the feedback from the receiving device(s), such as in a PDCP status PDU (e.g., a status report indicating HARQ information, or more simply report). For example, the status report may be received that indicates the quantity of sub-PDUs that the receiving device decoded and used to attempt to reassemble the PDCP SDU within receiving PDCP entity 215. A field (e.g., NumPDU) in the PDCP status PDU (e.g., the report) may indicate the number of PDCP data sub-PDUs used to obtain the whole PDCP SDU. The code rate of the encoding using the rateless code may be adjusted based on the status report. For example, the encoding process for each encoding symbol (e.g., each PDCP SDU) may include the transmitting device (e.g., encoding 230) randomly choosing a degree $d_i$ from a degree distribution and randomly choosing $d_i$ distinct source symbols with uniform distribution and performing an exclusive or (XOR) function on them. Selecting different degrees $d_i$ may result in effectively providing a minimum code rate for encoding using the rateless codes.

Accordingly, a PDCP data PDU (e.g., the PDCP PDU) may, after segmentation, consist of a set of source PDCP sub-PDUs (e.g., source sub-PDUs) associated with one PDCP SDU as well as a set of corresponding parity PDCP sub-PDUs (e.g., parity sub-PDUs). The header added to the segmented PDCP SDU may carry or otherwise convey an indication of the total number of source PDCP sub-PDUs and parity PDCP sub-PDUs, which the receiving device(s) may use to efficiently parse the received PDCP PDU.

The segmented and encoded set of PDCP PDUs (e.g., the payload of data) are then transmitted to the receiving device(s) over the Uu radio interface by the physical layer of the transmitting device. The payload of data is received at the physical layer of the receiving device(s), processed, and then passed up to L2 for additional processing, e.g., the PDCP layer of the receiving device, which corresponds to the receiving PDCP entity 215. Accordingly, the set of encoded PDCP PDUs may be received at the PDCP layer of the receiving device. Initially this may include each PDCP PDU being provided to header removal 255 for removal the PDCP header. As discussed above, the PDCP header may indicate the total number of source sub-PDUs and parity sub-PDUs that each PDCP SDU is segmented into. Accordingly, the receiving device may determine the quantity of source sub-PDUs and parity sub-PDUs based on the header removed at header removal 255.

In some aspects, the receiving device may begin to decode a PDCP PDU when a minimum number of PDCP data sub-PDUs have been received that are associated with a single PDCP SDU (e.g., to reduce decoding complexity). In one example, the one or more network coding parameters can include, additionally to other parameters described elsewhere herein, the minimum number of PDCP data PDUs. The received PDCP data PDU can be either a complete PDCP PDU or one or more segmented PDCP PDUs. If the received segmented PDCP PDUs are placed at the front of the PDCP SDU with the PDU header (e.g., the first part of one or more source/parity sub-PDUs with a PDCP header), a receiving device may still be able to successfully reassemble the PDCP SDU (e.g., by reordering the header/sub-PDUs). This permits the RLC receive entity to deliver an incomplete RLC SDU in some situations (e.g., the RLC receive entity may provide a portion of source sub-PDUs and parity sub-PDUs of a PDCP PDU to the PDCP layer).

The PDCP PDU is then routed through deciphering 260, integrity verification 265, and reception buffer 270 for processing. For example, deciphering 260 may decipher the PDCP PDU, integrity verification 265 may verify the integrity of the PDCP PDU, and reception buffer 270 may store the PDCP PDU. As discussed above, non-PDCP SDU packets (e.g., control plane packets) may skip deciphering 260, integrity verification 265, etc.

The set of PDCP PDUs are then decoded at decoder 275 according to the network coding parameters (including the rateless code) to obtain a set of PDCP SDUs. In some aspects, this may include window based PDCP receive procedures being used (e.g., for PDCP in-order delivery, PDU duplication detection, and the like). Decoder 275 may decode the PDCP SDU and deliver this to the upper layer for additional/final processing. For example, decoder 275 may provide the set of PDCP SDUs to header compression 280, which then provides the PDCP SDU to an upper layer of the receiving device higher than the PDCP layer (e.g., an RRC layer).

As discussed above, aspects of the described techniques may also provide ARQ functionality at the PDCP layer. For example, the receiving device may determine that one or more of the encoded PDCP PDUs are unable to be successfully received and decoded. Accordingly, PDCP status PDU 285 may transmit or otherwise provide a status report (e.g., or more simply report) indicating that the encoded PDCP PDU are unable to be successfully received and decoded. In some aspects, the status report may carry or otherwise convey an indication of a sequence number to a next encoded PDCP PDU that is yet to be received (e.g., ACK_SN, which corresponds to the SN of the next PDCP SDU that has not been received). In some aspects, the status report may carry or otherwise convey an indication of a bitmap indicating, for each encoded PDCP PDU having a SN greater than the SN encoded PDCP PDU, whether the encoded PDCP PDU was successfully received and decoded (e.g., bitmap to indicate the PDCP SDU(s) which are missing or which are correctly received and decoded by the receiving PDCP entity 215). In some aspects, the status report may carry or otherwise indicate a quantity of sub-PDUs the receiving device decoded and used to attempt to obtain the at least one encoded PDCP PDU (e.g., number of PDCP sub-PDUs, including source and parity sub-PDUs, that were decoded and used to assemble one PDCP SDU). The transmitting device may adjust the minimum code rate for encoding a repair PDCP SDU based on the report.

Retransmission buffer 290 of the transmitting PDCP entity 210 may monitor for and receive the status report from PDCP status PDU 285 (e.g., the status report may be transmitted over the radio interface) and use this information to provide some degree of ARQ functionality. For example, retransmission buffer 290 implemented at the PDCP layer of the transmitting device may determine that the status report for a previously transmitted encoded PDCP PDU comprises a negative acknowledgment for the encoded PDCP PDU.

Accordingly, the retransmission buffer 290 may determine that at least one PDCP SDU in the set of PDCP SDUs correspond to the previously transmitted encoded PDCP PDU (e.g., a repair/retransmission PDCP PDU). Encoder 230 may encode the PDCP SDU as a repair PDCP SDU based on the negative acknowledgment.

As discussed above, the RLC layer typically sets below (e.g., is a lower layer) the PDCP layer. The RLC layer may operate in UM/TM. When operating in UM, the RLC layer may provide segmentation of the PDCP SDU for the transmitting device and/or reassembly of the PDCP PDU for the receiving device. This may include a sliding window being implemented at the RLC entity of both the transmitting device and the receiving device, segmentation/re-segmentation in the RLC layer of the transmitting device, reassembly of the segmented RLC SDU at the RLC entity of the receiving device, and the like. When operating in TM, the RLC layer may provide transparent transmissions (e.g., neither SDU segmentation nor ARQ functionality). In this situation, segmentation/re-segmentation may be implemented at the MAC layer, e.g., a MAC SDU can be segmented based on a grant of resource. In this situation, the PDCP layer may provide security, outer coding based ARQ, and in-order delivery of the PDCP PDUs.

Figure 3A:
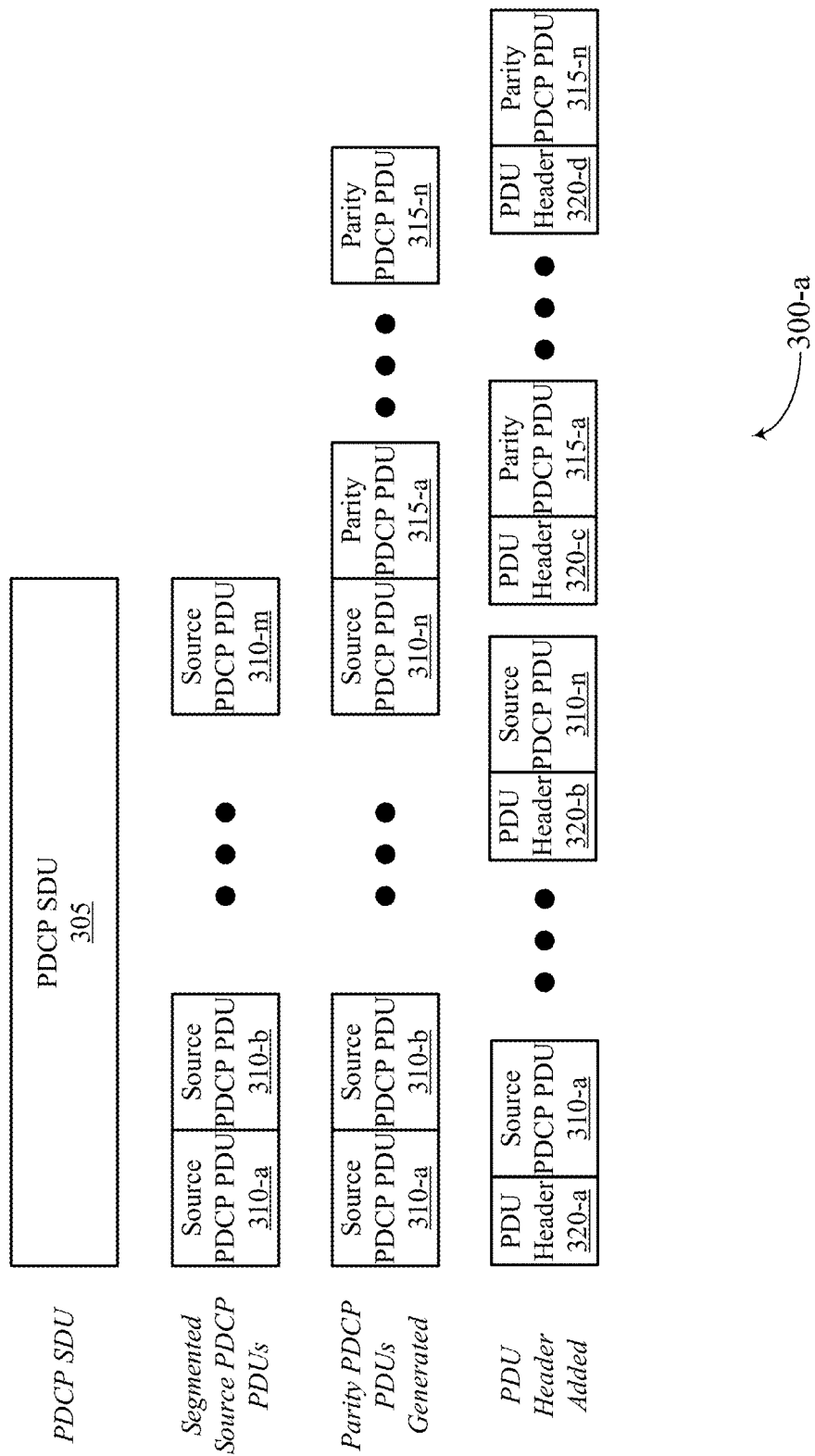
FIGS. 3A and 3B illustrate an example of a PDCP configuration that supports rateless coding at an L2 layer in accordance with aspects of the present disclosure.
Figure 3B:
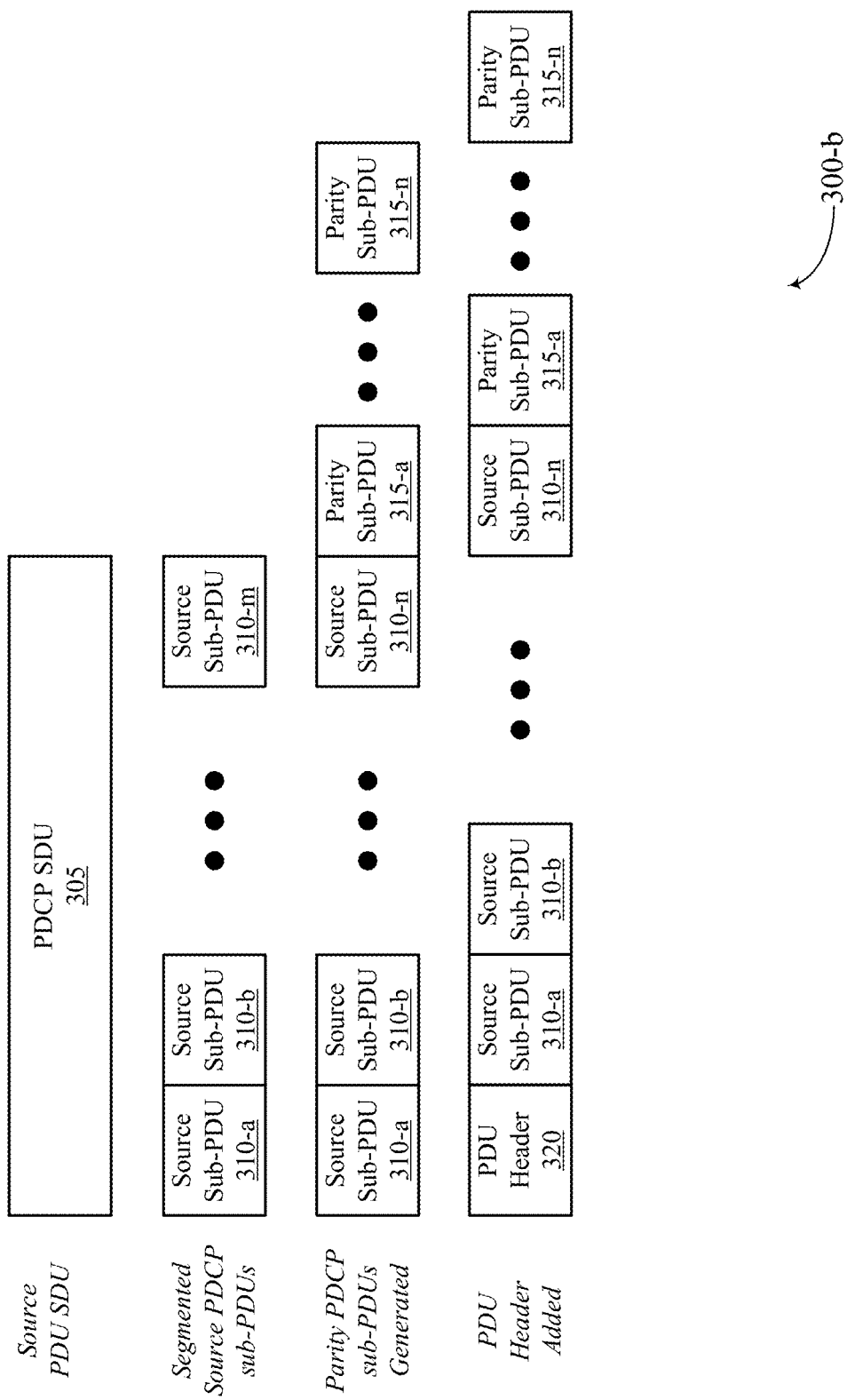

FIGS. 3A and 3B illustrate an example of a PDCP configuration 300 that supports rateless coding at an L2 layer, polling and status reporting for network coding, and the like, in accordance with aspects of the present disclosure. In some examples, the PDCP configuration 300 may implement aspects of wireless communication system 100. Aspects of PDCP configuration 300 may be implemented at a transmitting device and/or receiving device, which may be examples of the UE and/or base station as described herein.

For example, with reference to PDCP configuration 300-a, a transmitting device may identify a PDCP SDU 305 for transmission to one or more receiving devices and prepare the PDCP SDU 305 for network coding at the PDCP layer. For example, the transmitting device may perform sequence numbering, header compression, integrity protection, and ciphering as described herein. The transmitting device may then obtain a PDCP SDU 305 with integrity protection and ciphering.

To perform network coding at the PDCP layer, the transmitting device may segment the PDCP SDU 305 into a set of source PDCP PDUs 310. For example, the transmitting device may segment the PDCP SDU 305 into source PDCP PDU 310-a through 310-m. In some cases, the transmitting device may be configured with a size or number of source PDCP PDUs 310 to segment the PDCP SDU into.

The transmitting device may encode the set of source PDCP PDUs 310 according to a set of network coding parameters. In some cases, encoding the source PDCP PDUs 310 according to the set of network coding parameters may generate a set of parity PDCP PDUs 315.

The set of network coding parameters may include a code (e.g., a rateless code) as well as a code rate (e.g., an actual or as-applied code rate) for the encoding. In some cases, the code rate may be pre-configured at the transmitting device. For example, the transmitting device may generate a quantity of encoded source PDUs 310 and encoded parity PDCP PDUs 315, where the combined quantity of encoded source PDUs 310 and encoded parity PDCP PDUs 315 (e.g., the total quantity of encoded PDUs in the set of encoded PDCP PDUs) relative to the quantity of segmented source PDUs 310 is based on (e.g., equal to) the code rate. In addition to the encoded source PDUs 310, the transmitting device may generate N parity PDCP PDUs 315 to achieve the code rate, from parity PDCP PDU 315-a to parity PDCP PDU 315-n. Therefore, the transmitting device may generate a set of encoded PDCP PDUs, including the source PDCP PDUs 310 and the parity PDCP PDUs 315.

In some cases, the set of network coding parameters may include a minimum code rate for the PDCP PDUs. Additionally or alternatively, the set of network coding parameters may the minimum number of encoded parity PDCP PDUs 315, or other parameters described elsewhere herein. The transmitting device may encode the source PDCP PDUs 310 to generate encoded PDCP PDUs 310 and encoded parity PDCP PDUs 315 according to the minimum code rate, at least for a first network coded PDCP SDU transmission. An actual code rate may be dynamically adjusted based on feedback from the one or more receiving devices.

In some cases, the transmitting device may store the encoded set of PDCP PDUs in a retransmission buffer. Storing the encoded set of PDCP PDUs may decrease latency for generating a retransmission of the PDCP SDU 305. For example, the transmitting device may obtain the PDCP PDUs for a missed PDCP SDU from the retransmission buffer instead of generating a new set of encoded PDCP PDUs.

The transmitting device may generate PDU headers 320 for the set of encoded PDCP PDUs. Each PDCP PDU of the set of encoded PDCP PDUs (e.g., including source PDCP PDUs 310 and parity PDCP PDUs 315) may have a PDU header prepended. The PDU header 320 may be an example of a PDU header 405 or a PDU header 505 described with reference to FIGS. 4 and 5, respectively. The PDU header 320 may, in some cases, include fields or parameters related to the network coding.

After prepending the PDU headers 320 for the set of encoded PDCP PDUs, the transmitting device may perform routing and duplication for the set of encoded PDCP PDUs and submit the resulting set of encoded PDCP PDUs to a lower layer. The transmitting device may transmit the set of encoded PDCP PDUs via the lower layers (e.g., over a wireless interface) to the one or more receiving devices.

In some cases, a receiving device may transmit a PDCP status PDU to a transmitting device based on failing to correctly assemble a PDCP SDU 305 from a set of source PDCP PDUs 310. The PDCP status PDU may contain feedback information which may support the transmitting device in dynamically adjusting a code rate, which may reduce latency and improve system efficiency.

It is to be understood that FIG. 3A illustrates just an example approach to implementing network coding at the PDCP layer, and that other approaches are possible. For example, as discussed elsewhere herein, an alternative implementation may segment a PDCP SDU 305 to obtain a corresponding set of source PDCP sub-PDUs, and encode the set of source PDCP sub-PDUs to obtain a set of encoded source PDPC sub-PDUs, and prepend a PDCP PDU header to a single PDPC PDU that includes the set of encoded source PDPC sub-PDUs. Thus, rather than each segment of the PDCP SDU 305 eventually corresponding to a PDCP PDU 310 with a corresponding PDCP PDU header 320 (and thus multiple PDCP PDUs 310 and associated PDCP PDU headers 320 being generated for a single PDCP SDU 305), each segment of the PDCP SDU 305 may eventually correspond to a sub-PDU within a single encoded PDCP PDU that has a single PDCP PDU header.

Turing next to PDCP configuration 300-b of FIG. 3B, as discussed above, aspects of the described techniques provide for a set of PDCP SDUs received at a PDCP layer of a transmitting device to be encoded at the PDCP layer according to a set of network coding parameters, which includes a rateless code. The set of PDCP SDUs may correspond to a payload of data for transmission to receiving device(s), e.g., the set of PDCP SDUs may correspond to the payload of data which has been divided into packets received from an upper layer. The set of PDCP SDUs encoded at the PDCP layer using the rateless code may create, define, or otherwise obtain, a set of encoded PDCP PDUs that are provided to lower layers for transmission to the receiving device. The set of encoded PDCP PDUs are the "data" that the PDCP layer/entity of the transmitting device is providing to the PDCP layer/entity of the receiving device(s). The receiving device may receive the transmission and decode the set of encoded PDCP PDUs at the PDCP layer using the rateless code to create, define, or otherwise obtain (e.g., recreate) the set of PDCP SDUs. The PDCP SDUs are provided to upper layers for further processing and recovery of the payload of data.

As also discussed above, encoding the set of PDCP SDUs may include segmenting each PDCP SDU (e.g., PDCP SDU 305) into a set of sub-PDUs. PDCP SDU 305 may correspond to a source PDCP SDU in this context. For example, the transmitting device may encode the set of sub-PDUs using a rateless code to obtain a set of source sub-PDUs 310, with each source sub-PDU 310 having the same size. For example, PDCP SDU 305 may be segmented into source sub-PDU 310-a, source sub-PDU 310-b, . . . , source sub-PDU 310-m, and so forth. The transmitting device may encode the set of source sub-PDUs 310 using the rateless code to obtain of set of parity sub-PDUs 315, which may be used to recover lost sub-PDUs of the PDCP SDU 305 by the receiving device. For example, the transmitting device, at the PDCP layer, may encode the source sub-PDU 310 to obtain parity sub-PDU 315-a, . . . , parity sub-PDU 315-n, and so forth.

Header 320 for the PDU may then be added to the set of source sub-PDUs 310 and the set of parity sub-PDUs 315 to form the encoded PDCP PDU. In some aspects, header 320 may carry or otherwise convey an indication of the quantity of sub-PDUs included in the encoded PDCP PDU. Accordingly, the encoded PDCP PDU in this context may include header 320, the set of source sub-PDUs 310 and the set of parity sub-PDUs 315. The encoded PDCP PDU is then transmitted over a radio interface (e.g., a Uu radio interface) to the receiving device.

The receiving device may receive the encoded PDCP PDU, remove header 320, and attempt to decode and recover PDCP SDU 305. In one example, the receiving device may receive each sub-PDU and header 320 of the encoded PDCP PDU and therefore begin decoding by assembling PDCP SDU 305 from the received sub-PDUs. In another example, the receiving device may begin decoding after a certain number of sub-PDUs of the encoded PDCP PDU have been received. For example and for each encoded PDCP PDU received, the receiving device may determine that a threshold quantity of sub-PDUs (e.g., source sub-PDUs 310 and/or parity sub-PDUs 315) have been received. In some aspects, the threshold quantity of sub-PDUs that are to be received before the decoding is attempted may be configured using RRC signaling indicating the threshold quantity of sub-PDUs that are to be received before an attempt to decode the encoded PDCP PDU begins. As discussed above, header 320 may indicate the total quantity of sub-PDUs corresponding to the encoded PDCP PDU, which the receiving device may use to determine the total quantity of sub-PDUs associated with PDCP SDU 305 during the decoding. For example, the receiving device may compare the number of received sub-PDUs to the total quantity of sub-PDUs indicated in header 320 and begin the decoding attempt once the threshold quantity of sub-PDUs are received.

In some examples, the receiving device may receive header 320 of the encoded PDCP PDU prior to receiving one or more of the sub-PDUs. In this situation, the receiving device, at the PDCP layer and/or RLC layer, may rearrange the sub-PDUs in order to place the header 320 first followed by the source sub-PDUs 310 and parity sub-PDUs 315. Accordingly, the receiving device may reassemble or re-segment the sub-PDUs in order to recreate PDCP SDU 305 for recovery of the portion of the data payload carried therein. PDCP SDU 305, once decoded, is then passed to upper layers for additional/final processing and recovery of the payload of data in conjunction with the other PDCP SDUs corresponding to the set of encoded PDCP PDUs.

FIGS. 4A-4D illustrate an example of a PDCP PDU format 400 (e.g., a PDCP header) that supports rateless coding at an L2 layer, outer coding at the PDCP layer, and the like, in accordance with aspects of the present disclosure. In some examples, PDCP PDU format 400 may implement aspects of wireless communication system 100, PDCP entity/configuration 200, and/or PDCP entity/configuration 300. Aspects of PDCP PDU format 400 may be implemented by a transmitting device and a receiving device, which may be examples of the UE and/or base station as described herein.

Figure 4A:
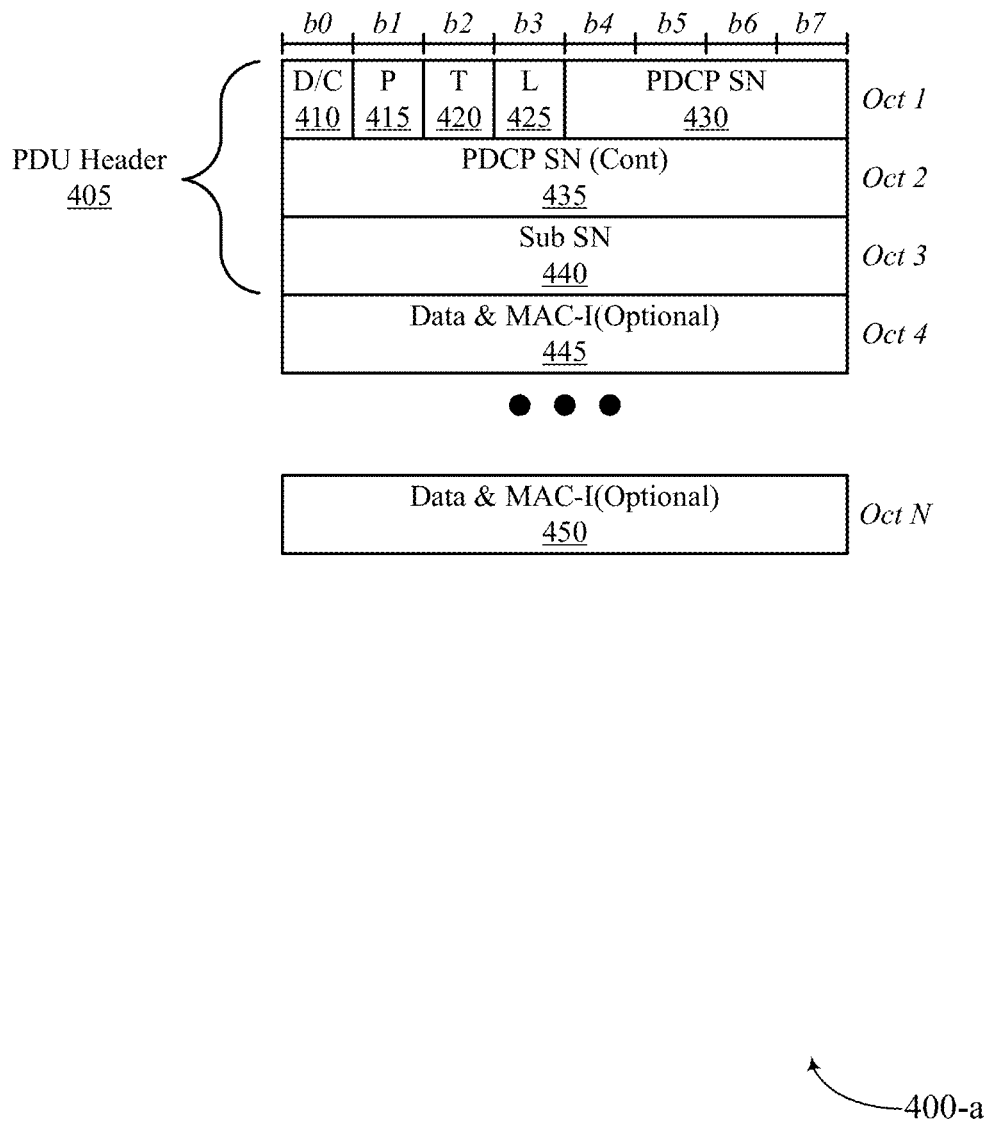
FIGS. 4A-4C illustrate an example of a PDCP protocol data unit (PDU) format that supports rateless coding at an L2 layer in accordance with aspects of the present disclosure.

PDCP PDU format 400-a of FIG. 4A may include an example of a PDU header 405 which may be added to network coded PDCP PDUs. For example, the PDU header 405 may be prepended to a source PDCP PDUs and parity PDCP PDUs corresponding to a PDCP SDU. The PDCP PDU format 400 may be an example of a PDU header 405 with a 12-bit PDCP sequence number. The PDU header 405 may include, for example, 4 octaves of 8 bits (e.g., b0 through b7).

A transmitting device may segment a PDCP SDU into source PDCP PDUs and perform network coding to the source PDCP PDUs to generate parity PDCP PDUs. The transmitting device may generate PDU headers for the set of encoded PDCP PDUs, including the source PDCP PDUs and parity PDCP PDUs. Each PDCP PDU of the set of encoded PDCP PDUs may have a PDU header 405. The PDU header 405 for a PDCP PDU may include a data or control field 410, which may indicate whether the PDCP PDU includes data or control information.

In some cases, the PDU header 405 may include one or more fields which may be based on the network coding. For example, PDU header 405 may include P field 415. The P field 415 may indicate whether the PDU requests a status report (e.g., HARQ feedback, a PDCP status PDU, etc.) from the receiver or not.

The PDU header 405 may include a T field 420, which may indicate whether the PDCP PDU is a repaired PDU (e.g., a retransmitted PDU or a PDU corresponding to an SDU for which one or more PDUs were previously transmitted) or not. For example, if the transmitting device is sending a retransmission of a PDCP SDU which was unsuccessfully received by one or more receiving devices, the transmitting device may retransmit PDCP PDUs corresponding to the PDCP SDU, and the transmitting device may indicate whether the PDCP PDUs for the retransmissions are repaired (e.g., retransmissions) or not. Indicating whether the PDCP PDU is repaired may assist receiving devices in obtaining or successfully decoding a missed PDCP SDU.

The PDU header 405 may include an L field 425, which may indicate whether the PDCP PDU is a last PDCP PDU corresponding to a PDCP SDU. By indicating a last PDCP PDU of the set of encoded PDCP PDUs, the transmitting device may indicate when all encoded PDCP PDUs corresponding to a PDCP SDU have been transmitted. If a receiving device cannot successfully decode and obtain the PDCP SDU after receiving all of the encoded PDCP PDUs corresponding to the PDCP SDU, the receiving device may determine that the PDCP SDU cannot be obtained, and the receiving device may consider the PDCP SDU as missing.

The PDU header 405 may include PDCP sequence number fields 430 and 435, where a value for the PDCP sequence number fields 430 and 435 correspond to a PDCP SDU. In some cases, the sequence number of the PDCP SDU may be associated with a count value configured at the transmitting device. For example, the transmitting device may set the PDCP sequence number field 430 in the PDU header 405 to indicate which PDCP SDU the PDCU PDU is associated with. The PDU header 405 may use 12 bits in the PDCP sequence number fields 430 and 435 to indicate the PDCP sequence number.

In some cases, the PDU header 405 may include a sub-sequence number field 440. The sub-sequence number field 440 may indicate an index of the PDCP PDU corresponding to the PDCP SDU. The sub-sequence number field 440 may be used to indicate an ordering for the encoded set of PDCP PDUs. For example, if the transmitting device generates a set of K data PDCP PDUs, the sub-sequence number of a PDU header may indicate the index of the corresponding PDCP PDU in the K data PDCP PDUs. The sub-sequence number may be used at the one or more receiving devices to organize the received PDCP data PDUs and obtain the corresponding PDCP SDU. In some cases, the sub-SN field may be an 8-bit field, indicating indexes for up to 256 encoded PDCP PDUs corresponding to a single PDCP SDUs.

In some cases, the PDU header 405 may be prepended to a PDCP payload including one or more fields including data and message authentication code-integrity (MAC-I) information. For example, the PDCP PDU payload may include one or more octaves, or bytes, for the data and MAC-I information, such as field 445 through field 450.

Figure 4B:
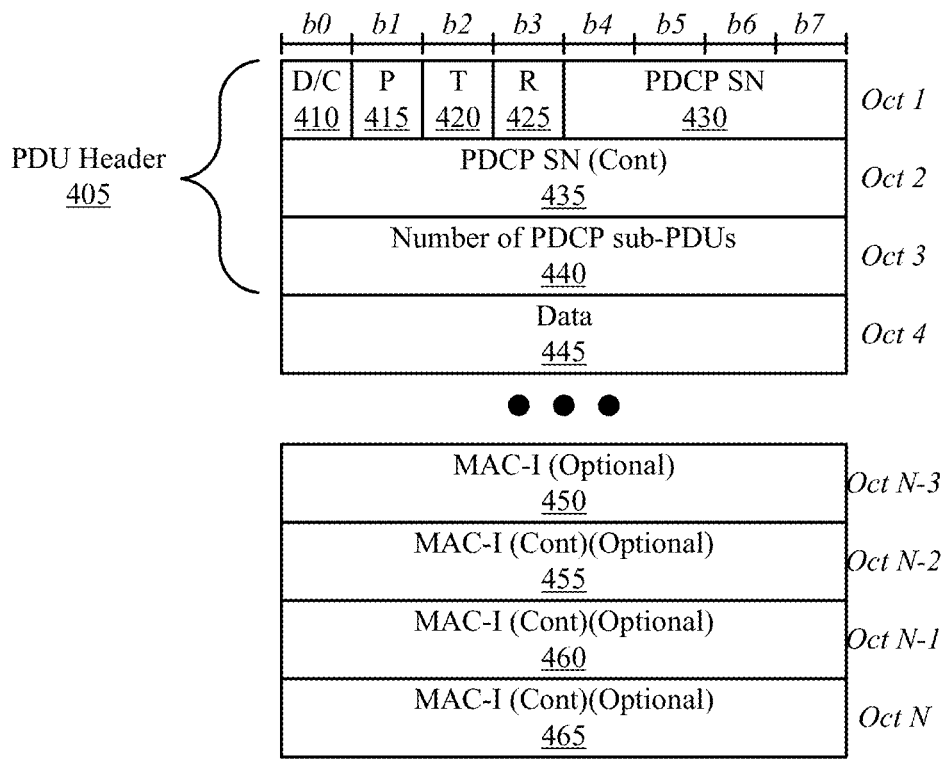

Turning to PDCP PDU format 400-b (e.g., a PDCP header) of FIG. 4B, as discussed above, aspects of the described techniques provide for a set of PDCP SDUs received at a PDCP layer of a transmitting device to be encoded at the PDCP layer according to a set of network coding parameters, which includes a rateless code. The set of PDCP SDUs may correspond to a payload of data for transmission to receiving device(s), e.g., the set of PDCP SDUs may correspond to the payload of data which has been divided into packets received from an upper layer. The set of PDCP SDUs encoded at the PDCP layer using the rateless code may create, define, or otherwise obtain, a set of encoded PDCP PDUs that are provided to lower layers for transmission to the receiving device. The set of encoded PDCP PDUs are the "data" that the PDCP layer/entity of the transmitting device is providing to the PDCP layer/entity of the receiving device(s). The receiving device may receive the transmission and decode the set of encoded PDCP PDUs at the PDCP layer using the rateless code to create, define, or otherwise obtain (e.g., recreate) the set of PDCP SDUs. The PDCP SDUs are provided to upper layers for further processing and recovery of the payload of data.

As also discussed above, encoding the set of PDCP SDUs may include adding a header for the PDU to the set of source sub-PDUs and the set of parity sub-PDUs to form the encoded PDCP PDU. PDU header 405 illustrates one non-limiting example of the header that may be added to the set of source sub-PDUs and the set of parity sub-PDUs to form the encoded PDCP PDU.

Generally, PDU header 405 may include a first octet (e.g., Oct 1) spanning eight bits (e.g., b0-b7) that includes a D/C field 410 indicating whether the PDU is data or control information, a P field 415 indicating the PDU type, a T field 420 indicating whether or not this PDCP PDU is a repair PDU (e.g., a retransmission PDU), a reserved field 425, and a PDCP SN field 430 indicating the SN of this PDCP SDU. The PDCP SN may extend to the PDCP SN field 435 in the second octet (Oct 2), e.g., depending on the number of bits used to convey the PDCP SN. The third octet (Oct 3) may be used to indicate the total number or quantity of PDCP sub-PDUs 440, which includes the source sub-PDUs and the parity sub-PDUs. The following octets (e.g., Oct 4 through Oct N−4) may be used to convey the data 445 (e.g., sub-PDUs), with optional MAC-I information 450, 455, 460, and 465 being conveyed in octets N−3, N−2, N−1, and N, respectively. The optional MAC-I information indicates or otherwise provides information used for integrity protection.

Figure 4C:
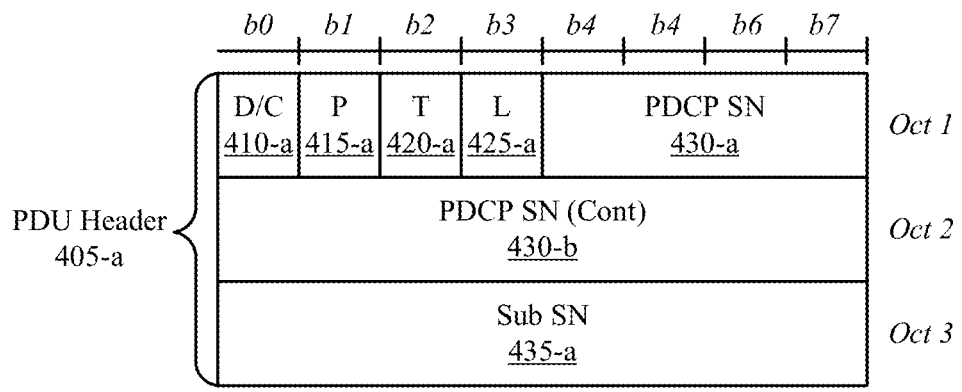

Turning to FIG. 4C, illustrated is an example of a PDCP polling message 400-c that supports polling and status reporting for network coding. The PDCP polling message 400-c may illustrate an example of a PDCP message transmitted from a transmitting device to a receiving device. In some cases, the PDCP polling message 400-c (and/or PDCP polling message 400-d of FIG. 4D) may provide a polling mechanism that supports PDCP feedback from a PDCP receiving device.

The PDCP polling message 400-c (e.g., a PDCP PDU) may include PDU header 405-a, D/C field 410-a indicating whether the message is a data message or a control message, P field 415-a indicating whether the message is a polling message (e.g., whether the message is prompting the transmission of a PDCP status PDU), T field 420-a indicating whether the message is a repair PDU (e.g., a retransmission PDU), L field 425-a indicating whether the message is the last PDU of an SDU, PDCP SN fields 430 indicating a SN of the message, and Sub SN field 435-a indicating the index (e.g., the source) PDU or parity PDU associated with an SDU. PDCP SN field 430-a may correspond to a first index and PDCP SN field 430-b may correspond to a second index different from the first index. P bit 415-a may be inserted into the PDCP polling message 400-C based on a polling condition being met. In some cases, the polling condition may correspond to a timer expiration, a number of transmitted PDCP data PDUs, a number of bytes associated with a number of transmitted PDCP data PDUs, or any combination thereof.

The polling condition may be based on an RRC configuration, and the transmitting device may include P bit 415-a based on the polling condition being met. In some cases, the duration of the timer (e.g., a polling timer) may be configured as part the RRC procedure, and the transmitting device may insert P bit 415-a into PDU header 405-a based on an expiration of the timer. In some cases, a first RRC parameter may correspond to enabling or disabling the timer, and in some additional or alternative examples, a second RRC parameter may correspond to a time duration of the timer. In some examples, a time duration value may correspond to disabling the timer. For example, an infinite time duration may correspond to disabling the timer, and the transmitting device may disable the timer based on receiving an RRC parameter corresponding to an infinite time duration. The transmitting device may start or restart the timer after inserting P bit 415-*a* into PDU header 405-*a*.

A PDCP receiving device (e.g., a UE) may be associated with a timer (e.g., a prohibit timer), and the timer may be configured as part of an RRC procedure. The RRC procedure may enable the timer, disable the timer, or configure the timer with a value (e.g., via the PDCP-Config field). In some cases, a timer value corresponding to an infinite value may correspond to disabling the timer. The timer may start or restart when a PDCP data PDU arrives at an empty buffer (e.g., a PDCP buffer) at the receiving device. The timer may additionally or alternatively start or restart when a report (e.g., a new PDCP status PDU) is transmitted by the receiving device. The receiving device may generate a report (e.g., a PDCP status PDU) when the timer expires. For example, the duration of the timer may be configured via an RRC procedure, and the receiving device may generate a PDCP status PDU and transmit the PDCP status PDU to a transmitting device based on the expiration of the timer.

Figure 4D:
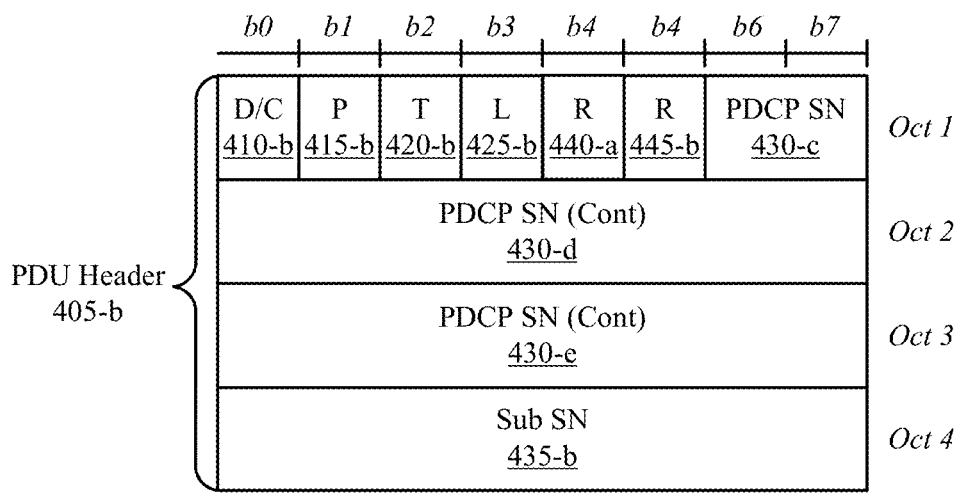

Turning to FIG. 4D, the PDCP polling message 400-*d* (e.g., a PDCP PDU) may include PDU header 405-*b*, D/C field 410-*b* indicating whether the message is a data message or a control message, P filed 415-*b* indicating whether the message is a polling message (e.g., whether the message is prompting the transmission of a PDCP status PDU), T field 420-*b* indicating whether the message is a repair PDU (e.g., a retransmission PDU), L field 425-*b* indicating whether the message is the last PDU of an SDU, R fields 440-*a* and 445-*b* corresponding to reserved bits, PDCP SN fields 430-*c*, 430-*d*, and 430-*e* indicating a SN of the message, and Sub SN field 435-*b* indicating an index (e.g., the source) PDU or parity PDU associated with an SDU. P bit 415-*a* may be inserted into the PDCP polling message 400-*d* based on a polling condition being met. In some cases, the polling condition may correspond to a timer expiration, a number of transmitted PDCP data PDUs, a number of bytes associated with a number of transmitted PDCP data PDUs, or any combination thereof.

Figure 5A:
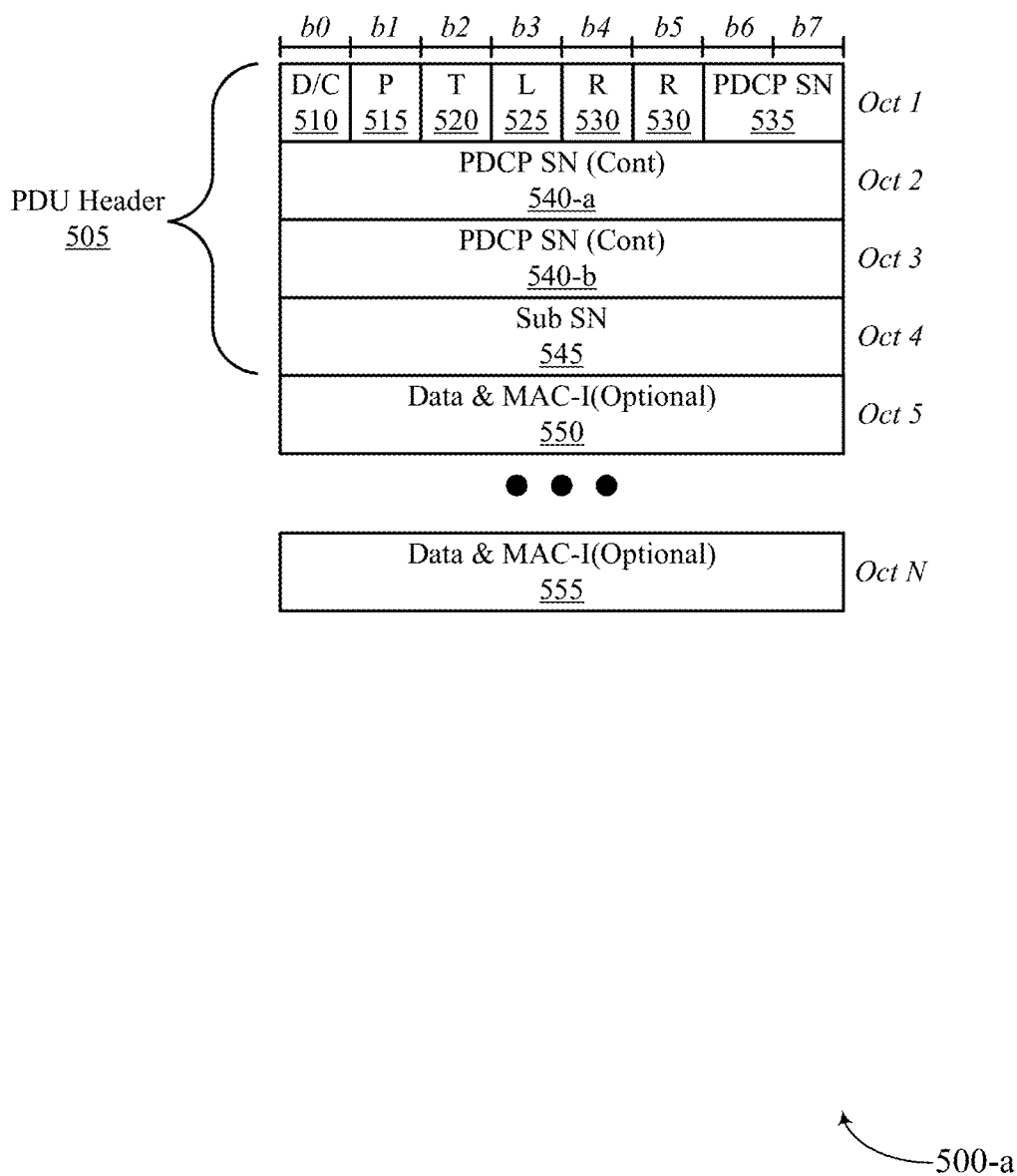
FIGS. 5A and 5B illustrate an example of a PDCP PDU format that supports rateless coding at an L2 layer in accordance with aspects of the present disclosure.
Figure 5B:
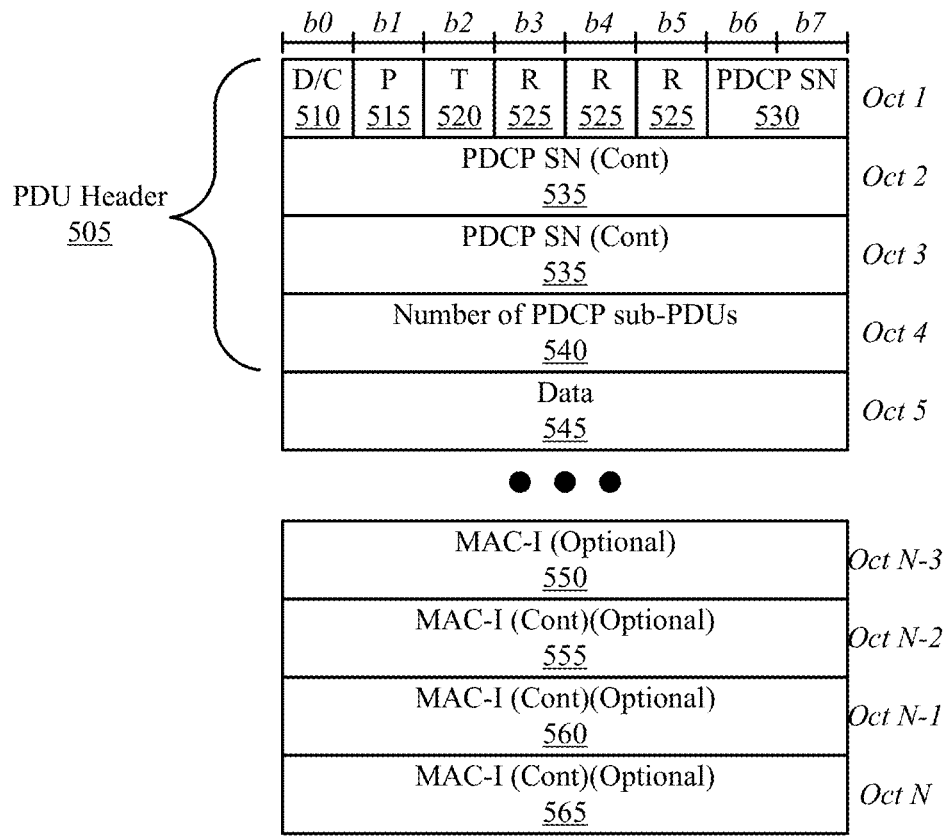

FIGS. 5A and 5B illustrate an example of a PDCP PDU format 500 (e.g., a PDCP header) that supports rateless coding at an L2 layer, outer coding at the PDCP layer, and the like, in accordance with aspects of the present disclosure. In some examples, PDCP PDU format 500 may implement aspects of wireless communication system 100, PDCP entity/configuration 200, PDCP header 300 and/or 400. Aspects of PDCP header 500 may be implemented by a transmitting device and a receiving device, which may be examples of the UE and/or base station as described herein.

Turning first to FIG. 5A, PDCP PDU format 500-*a* may include an example of a PDU header 505 which may be added to network coded PDCP PDUs. For example, the PDU header 505 may be prepended to a source PDCP PDUs and parity PDCP PDUs corresponding to a PDCP SDU. The PDCP PDU format 500 may be an example of a PDU header 505 with a 20-bit PDCP sequence number. The PDU header 505 may include, for example, 4 octaves of 8 bits (e.g., b0 through b7).

A transmitting device may segment a PDCP SDU into source PDCP PDUs and perform network coding to the source PDCP PDUs to generate parity PDCP PDUs. The transmitting device may generate PDU headers for the set of encoded PDCP PDUs, including the source PDCP PDUs and parity PDCP PDUs. Each PDCP PDU of the set of encoded PDCP PDUs may have a PDU header 505. The PDU header 505 for a PDCP PDU may include a data or control field 510, which may indicate whether the PDCP PDU includes data or control information.

In some cases, the PDU header 505 may include one or more fields which may be based on the network coding. For example, PDU header 505 may include P field 515. The P field 515 may indicate whether the PDU requests a status report (e.g., HARQ feedback, a PDCP status PDU, etc.) from the receiver or not.

The PDU header 505 may include a T field 520, which may indicate whether the PDCP PDU is a repaired PDU (e.g., a retransmitted PDU or a PDU corresponding to an SDU for which one or more PDUs were previously transmitted) or not. For example, if the transmitting device is sending a retransmission of a PDCP SDU which was unsuccessfully received by one or more receiving devices, the transmitting device may retransmit PDCP PDUs corresponding to the PDCP SDU, and the transmitting device may indicate whether the PDCP PDUs for the retransmissions are repaired (e.g., retransmissions) or not. Indicating whether the PDCP PDU is repaired may assist receiving devices in obtaining or successfully decoding a missed PDCP SDU.

The PDU header 505 may include an L field 525, which may indicate whether the PDCP PDU is a last PDCP PDU corresponding to a PDCP SDU. By indicating a last PDCP PDU of the set of encoded PDCP PDUs, the transmitting device may indicate when all encoded PDCP PDUs corresponding to a PDCP SDU have been transmitted. If a receiving device cannot successfully decode and obtain the PDCP SDU after receiving all of the encoded PDCP PDUs corresponding to the PDCP SDU, the receiving device may determine that the PDCP SDU cannot be obtained, and the receiving device may consider the PDCP SDU as missing. In some cases, the PDU header 505 may include one or more R fields 530. The R fields 530 may be reserved fields for some additional or alternative function of the PDCP PDU.

The PDU header 505 may include PDCP sequence number fields 535, 540-*a*, and 540-*b*, where a value for the PDCP sequence number fields 535 and 540 may correspond to a PDCP SDU. In some cases, the sequence number of the PDCP SDU may be associated with a count value configured at the transmitting device. For example, the transmitting device may set the PDCP sequence number field 535 and 540 in the PDU header 505 to indicate which PDCP SDU the PDCU PDU is associated with. The PDU header 505 may use 20 bits across the PDCP sequence number fields 535 and 540 to indicate the PDCP sequence number.

In some cases, the PDU header 505 may include a sub-sequence number field 545. The sub-sequence number field 545 may indicate an index of the PDCP PDU corresponding to the PDCP SDU. The sub-sequence number field 545 may be used to indicate an ordering for the encoded set of PDCP PDUs. For example, if the transmitting device generates a set of K data PDCP PDUs, the sub-sequence number of a PDU header may indicate the index of the corresponding PDCP PDU in the K data PDCP PDUs. The sub-sequence number may be used at the one or more receiving devices to organize the received PDCP data PDUs and obtain the corresponding PDCP SDU. In some cases, the sub-SN field may be an 8-bit field, indicating indexes for up to 256 encoded PDCP PDUs corresponding to a single PDCP SDUs.

In some cases, the PDU header 505 may be prepended to a PDCP PDU payload including one or more fields for data and MAC-I information. For example, the PDCP PDU payload may include one or more octaves, or bytes, for the data and MAC-I information, such as field 550 through field 555.

Turning to PDCP PDU format **500-*b* of FIG. 5B**, as discussed above aspects of the described techniques provide for a set of PDCP SDUs received at a PDCP layer of a transmitting device to be encoded at the PDCP layer according to a set of network coding parameters, which includes a rateless code. The set of PDCP SDUs may correspond to a payload of data for transmission to receiving device(s), e.g., the set of PDCP SDUs may correspond to the payload of data which has been divided into packets received from an upper layer. The set of PDCP SDUs encoded at the PDCP layer using the rateless code may create, define, or otherwise obtain, a set of encoded PDCP PDUs that are provided to lower layers for transmission to the receiving device. The set of encoded PDCP PDUs are the "data" that the PDCP layer/entity of the transmitting device is providing to the PDCP layer/entity of the receiving device(s). The receiving device may receive the transmission and decode the set of encoded PDCP PDUs at the PDCP layer using the rateless code to create, define, or otherwise obtain (e.g., recreate) the set of PDCP SDUs. The PDCP SDUs are provided to upper layers for further processing and recovery of the payload of data.

As also discussed above, encoding the set of PDCP SDUs may include adding a header for the PDU to the set of source sub-PDUs and the set of parity sub-PDUs to form the encoded PDCP PDU. PDU header 505 illustrates one non-limiting example of the header that may be added to the set of source sub-PDUs and the set of parity sub-PDUs to form the encoded PDCP PDU.

Generally, PDU header 505 may include a first octet (e.g., Oct 1) spanning eight bits (e.g., b0-b7) that includes a D/C field 510 indicating whether the PDU is data or control information, a P field 515 indicating the PDU type, a T field 520 indicating whether or not this PDCP PDU is a repair PDU (e.g., a retransmission PDU), two reserved fields 535, and a PDCP SN field 530 indicating the SN of this PDCP SDU. The PDCP SN may extend to the PDCP SN field 535 in the second octet (Oct 2) and PDCP SN field 540 in the third octet (e.g., Oct 3), e.g., depending on the number of bits used to convey the PDCP SN. The fourth octet (Oct 4) may be used to indicate the total number or quantity of PDCP sub-PDUs 540, which includes the source sub-PDUs and the parity sub-PDUs. The following octets (e.g., Oct 5 through Oct N–4) may be used to convey the data 545 (e.g., sub-PDUs), with optional MAC-I information 550, 555, 560, and 565 being conveyed in octets N–3, N–2, N–1, and N, respectively. The optional MAC-I information indicates or otherwise provides information used for integrity protection.

Figure 6A:
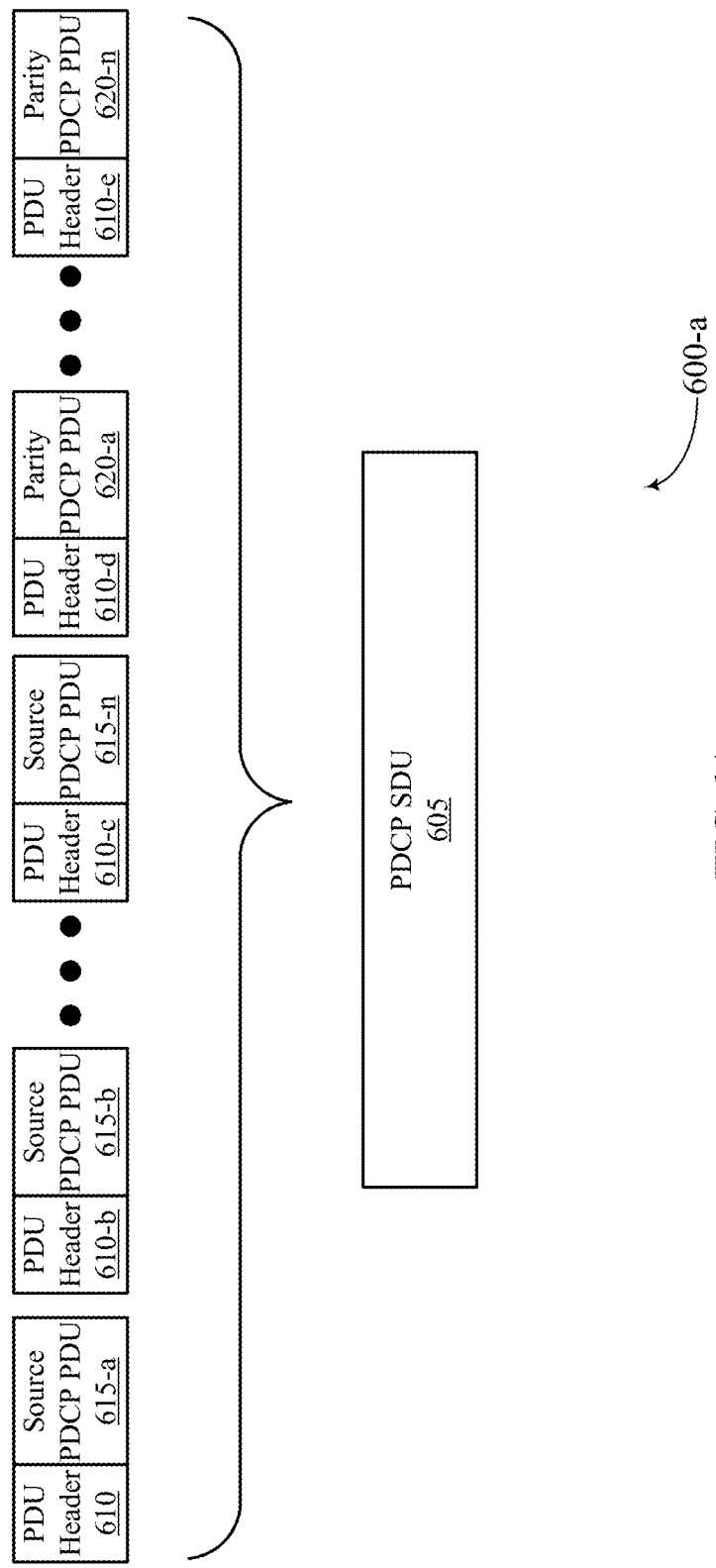
FIGS. 6A and 6B illustrate an example of a PDCP configuration that supports rateless coding at an L2 layer in accordance with aspects of the present disclosure.
Figure 6B:
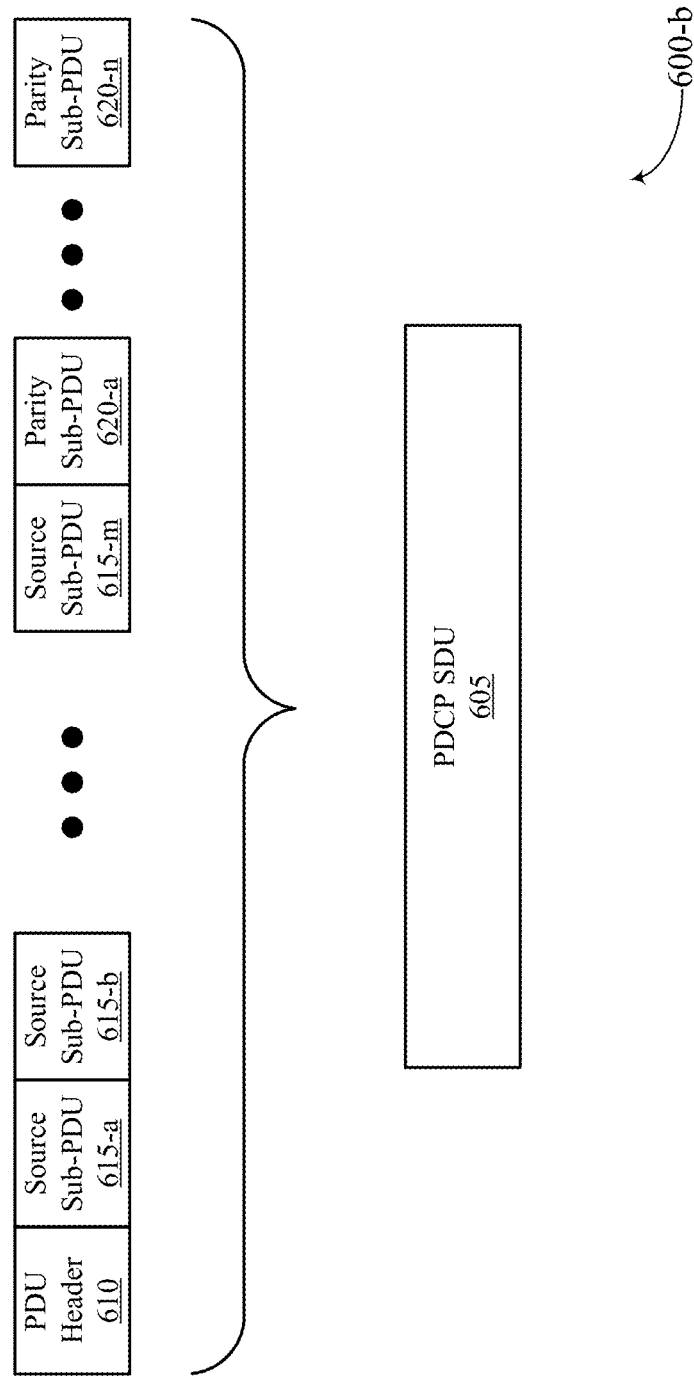

FIGS. 6A and 6B illustrate an example of a PDCP configuration 600 that supports rateless coding at an L2 layer, outer coding at the PDCP layer, and the like, in accordance with aspects of the present disclosure. In some examples, PDCP configuration 600 may implement aspects of wireless communication system 100, PDCP entity/configurations 200, PDCP entity/configuration 300, and/or PDCP headers 400 and/or 500. Aspects of PDCP configuration 600 may be implemented by a transmitting device and a receiving device, which may be examples of the UE and/or base station as described herein.

Turning first to PDCP configuration **600-*a* of FIG. 6A, a receiving device may receive at least a subset of the set of encoded PDCP data PDUs and attempt to obtain a PDCP SDU 605 from the encoded PDCP data PDUs. The set of encoded PDCP data PDUs may include source PDCP PDUs 615 and parity PDCP PDUs 620. For example, the receiving device may receive PDCP PDUs 615-*a* and 615-*b* through 615-*n* and parity PDCP PDUs 620-*a* through 620-*n*. Each PDCP PDU may have a PDU header 610, which may be an example of a PDU header 405 or 505 as described with reference to FIGS. 4 and 5**, respectively.

The receiving device may attempt to assemble (e.g., obtain, decode) the PDCP SDU 605 from the received PDCP PDUs. In some cases, the receiving device may begin assembling the PDCP SDU 605 after receiving a minimum number of corresponding PDCP PDUs. For example, the receiving device may be unable to retrieve the PDCP SDU 605 prior to receiving a certain number of corresponding PDCP PDUs (e.g., based on the network coding procedure), so the receiving device may wait to receive at least the minimum number of PDCP PDUs before attempting to reassemble the PDCP SDU 605.

In some cases, the receiving device may reassemble a PDCP SDU 605 based on information in the PDU headers 610. For example, the receiving device may organize received PDCP PDUs according to associated PDCP SDUs 605. For example, the PDU headers 610 for each of the source PDCP PDUs 615 and parity PDCP PDUs 620 may include a field associating the PDCP PDUs with the PDCP SDU 605. In some cases, the receiving device may organize received PDCP data PDUs associated with a PDCP SDU based on the sub-sequence number indexes of the received PDCP data PDUs. For example, the PDU header 610 may indicate an ordering for the PDCP PDUs, and the receiving device may organize, for example, source PDCP PDU **615-*a* before source PDCP PDU 615-*b*** based on the indexes.

In some examples, the receiving device may be able to reassemble the PDCP SDU 605 from received PDCP PDUs. The receiving device may store the PDCP SDU 605 in a reception buffer for in-order delivery of PDCP SDUs. In some cases, once a PDCP SDU is obtained, the receiving device may stop decoding or discard any additional received PDCP data PDUs associated with the obtained PDCP SDU 605. For example, the receiving device may not use all of the parity PDCP PDUs 620 to obtain the PDCP SDU 605. The receiving device may discard any additional PDCP PDUs 615 and/or parity PDCP PDUs 620 after obtaining the PDCP SDU 605. This may reduce packet decoding latency and processing time at the receiving device.

In some cases, the receiving device may record a number of PDCP PDUs used to successfully decode a PDCP SDU, or an average number of PDCP PDUs used to successfully decode each PDCP SDU of a set of PDCP SDUs. For example, if the receiving device successfully decodes the PDCP SDU without using all of the transmitted set of encoded PDCP PDUs, the receiving device may report how many PDCP PDUs were used to obtain the PDCP SDU to the transmitting device, and a code rate may be adjusted at the transmitting device.

If the receiving device cannot assemble a PDCP SDU 605 after receiving all of the PDCP data PDUs associated with the PDCP SDU 605, the receiving device may consider the PDCP SDU missing. For example, if the receiving device cannot assemble the PDCP SDU 605 after receiving all source PDCP data PDUs associated with the PDCP SDU and all parity PDCP data PDUs associated with the PDCP SDU, the receiving device may identify the PDCP SDU as missing. In some cases, the receiving device may determine that all of the encoded set of PDCP data PDUs have been received based on receiving a PDCP data PDU with a flag in the PDU header 610 set indicating the PDCP data PDU is a last PDCP data PDU. For example, PDU header 610-e may include a field which is set to indicate that parity PDCP PDU 620-n is the last PDP PDU of a set of encoded PDCP PDUs associated with the PDCP SDU 605.

The receiving device may generate a PDCP status PDU for the PDCP SDU 605 and transmit the PDCP status PDU to the transmitting device. In some cases, a PDCP status PDU may provide feedback for one or more PDCP SDUs including the PDCP SDU 605. The PDCP status PDU may include a field indicating the sequence number of a next not received PDCP SDU. For example, if the receiving device cannot obtain the PDCP SDU 605 from the set of encoded PDCP PDUs, the receiving device may indicate the sequence number of the PDCP SDU 605. In some cases, this may initiate a retransmission procedure, and the receiving device may receive a retransmission of PDCP PDUs corresponding to the PDCP SDU 605 or repaired PDCP DPUs for the PDCP SDU 605. If the receiving device can obtain the PDCP SDU 605, the receiving device may indicate a sequence number of a following PDCP SDU.

In some cases, the PDCP status PDU may include an indicator of a number of PDCP PDUs used to assemble the PDCP SDU 605, or an average number of PDCP PDUs used to assemble a set of PDCP SDUs that includes the PDCP SDU 605. For example, the receiving device may not have used all of the parity PDCP PDUs 620 to obtain the PDCP SDU 605, and the receiving device may indicate how many PDCP PDUs were used to obtain the PDCP SDU 605. Based on indicating the number of PDCP PDUs used to successfully receive a PDCP SDU, the transmitting device may adjust a code rate for communications with the one or more receiving devices. In some cases, the transmitting device may receive multiple PDCP status PDUs from multiple receiving devices, and the transmitting device may adjust the code rate based on a largest number of PDCP PDUs used to obtain the PDCP SDU. This may ensure reliable communications with each of the multiple receiving devices.

In some examples, the PDCP status PDU may include a bitmap to indicate missing PDCP SDUs or correctly received PDCP SDUs. For example, the bitmap may indicate which SDUs are missing and which SDUs are correctly received by the receiving device. Each bit of the bitmap may correspond to a different PDCP SDU. In an example, if a bit of the bitmap is toggled (e.g., "1"), then an associated PDCP SDU may have been successfully received at the receiving device, and if the bit is not toggled (e.g., "0"), then the associated PDCP SDU may be missing at the receiving device.

Turning next to PDCP configuration 600-b of FIG. 6B, as discussed above, aspects of the described techniques provide for a set of PDCP SDUs received at a PDCP layer of a transmitting device to be encoded at the PDCP layer according to a set of network coding parameters, which includes a rateless code. The set of PDCP SDUs may correspond to a payload of data for transmission to receiving device(s), e.g., the set of PDCP SDUs may correspond to the payload of data which has been divided into packets received from an upper layer. The set of PDCP SDUs encoded at the PDCP layer using the rateless code may create, define, or otherwise obtain, a set of encoded PDCP PDUs that are provided to lower layers for transmission to the receiving device. The set of encoded PDCP PDUs are the "data" that the PDCP layer/entity of the transmitting device is providing to the PDCP layer/entity of the receiving device(s). The receiving device may receive the transmission and decode the set of encoded PDCP PDUs at the PDCP layer using the rateless code to create, define, or otherwise obtain (e.g., recreate) the set of PDCP SDUs. The PDCP SDUs are provided to upper layers for further processing and recovery of the payload of data.

As also discussed above, the receiving device decoding each encoded PDCP PDU may include the receiving device reassembling, segmenting, reordering, and the like, one or more sub-PDUs associated with an encoded PDCP PDU in order to recover the payload of data. For example, the receiving device may receive PDU header 610, a set of source sub-PDUs 615 (e.g., source sub-PDU 615-a, source sub-PDU 615-b, . . . , source sub-PDU 615-m, etc.) and a set of parity sub-PDUs 620 (e.g., parity sub-PDU 620-a, . . . , parity sub-PDU 620-n, etc.). In some examples, the receiving device may receive PDU header 610 out of order (e.g., after) receiving one or more of the source sub-PDUs 615 and/or parity sub-PDUs 620. In this instance, the receiving device may rearrange the sub-PDUs such that the PDU header 610 is first and the sub-PDUs follow.

In some aspects, the receiving device may attempt to decode and recover the payload of data from an encoded PDCP PDU after a threshold quantity of sub-PDUs have been received. For example, the receiving device may determine that the threshold quantity of sub-PDUs corresponding to the source sub-PDUs 615 and/or parity sub-PDUs 620 are received before attempting to decode the encoded PDCP PDU to recover PDCP SDU 605. In some examples, the receiving device may wait until the PDU header 610, each source sub-PDU 615, and each parity sub-PDU 620 are received before attempting to decode and recover PDCP SDU 605.

Accordingly, the receiving device may receive the encoded PDCP PDU (e.g., PDU header 610, the set of source sub-PDU 615, and the set of parity sub-PDUs 620), decode the encoded PDCP PDU using the rateless code to recover PDCP SDU 605, and pass the PDCP SDU 605 up to a higher layer for further processing/data payload recovery.

Figure 7:
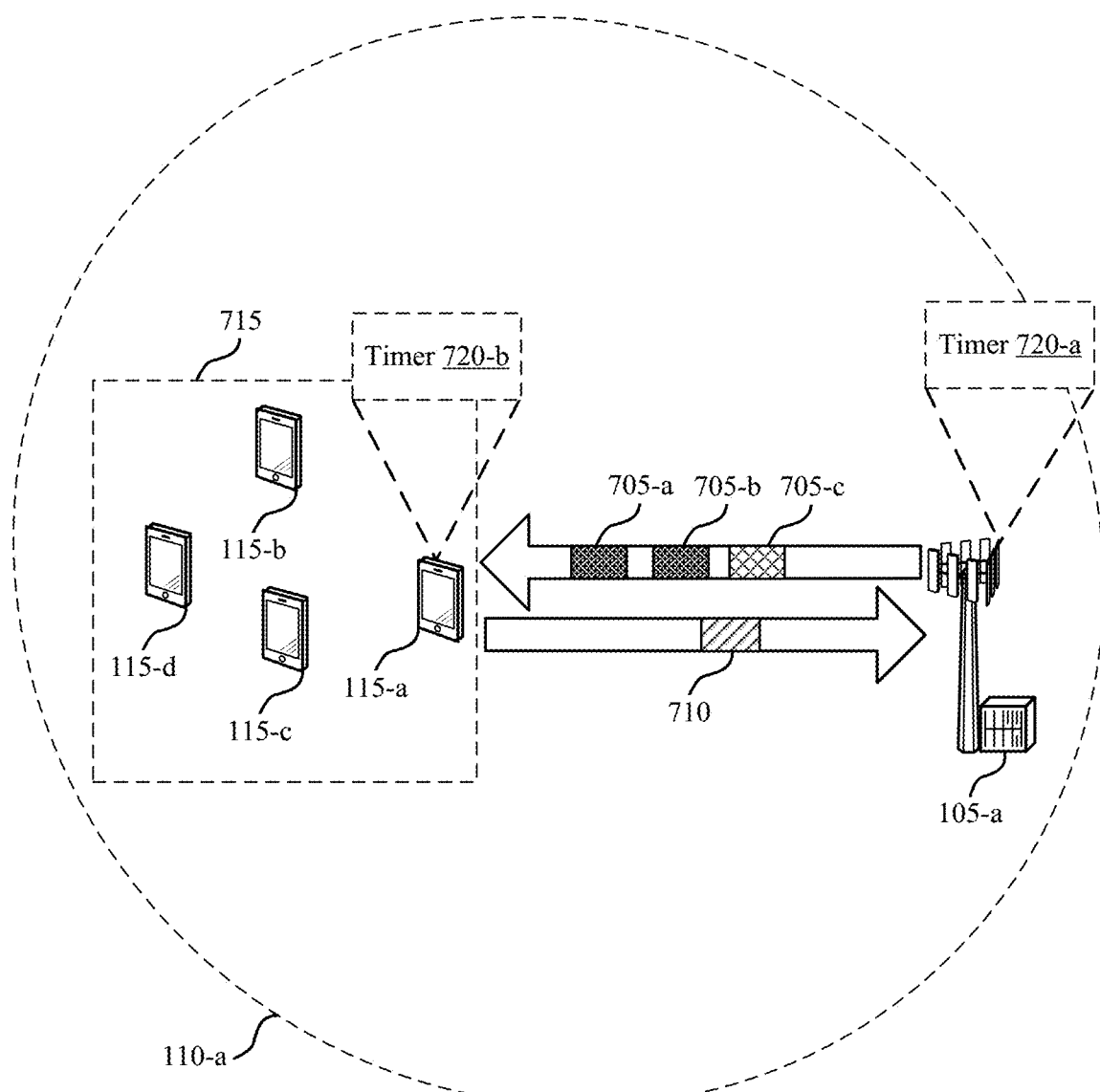
FIG. 7 illustrates an example of a PDCP configuration that supports outer coding at an L2 layer in accordance with aspects of the present disclosure.

FIG. 7 illustrates an example of a wireless communications system 700 that supports polling and status reporting for network coding in accordance with aspects of the present disclosure. In some examples, wireless communications system 700 may implement aspects of wireless communications system 100. Wireless communications system 700 may include base station 105-a, which may be an example of a base station 105 as described herein. Base station 105-a may be associated with coverage area 110-a. Wireless communications system 700 may include a group of UEs 715, which may include a number of UEs 115.

Base station 105-a may transmit or broadcast a number of PDCP PDUs 705 to the group of UEs 715. For example, base station 105-a may transmit a set of PDCP PDUs that includes PDCP PDU 705-a and PDCP PDU 705-b, and the set of PDCP PDUs may correspond to one or more PDCP SDUs. The set of PDCP PDUs may additionally include subsequent PDCP PDU 705-c. Base station 105-a may determine that a polling condition has been met and set a polling flag in subsequent PDCP PDU 705-c. The polling flag may correspond to a polling field in the header of subsequent PDCP PDU 705-c that is set to a bit value (e.g., 0 or 1) to indicate the polling flag. In some cases, base station 105-a may determine that the polling condition has been met based on a timer 720-a.

In some cases, timer 720-a may be a period polling timer that is configured by an RRC procedure. For example, a first RRC parameter may indicate an enabled timer mode or a disabled timer mode, and base station 105-a may enable or disable timer 720-a based on the first RRC parameter. In some additional or alternative examples, a second RRC parameter may indicate an association of timer 720-*a* to a value corresponding to PDCP-Config. The value may indicate an infinite value, which may indicate a disabled mode of timer 720-*a*. Base station 105-*a* may insert a polling bit into subsequent PDCP PDU 705-*c* based on the expiration of timer 720-*a*.

In some cases, base station 105-*a* may determine that the polling condition has been met based on transmitted PDCP PDUs 705. For example, base station 105-*a* may be configured with a first PDCP PDU threshold corresponding to a number of transmitted PDCP PDUs 705. Subsequent PDCP PDU 705-*c* may include a polling bit in the header when the number of transmitted PDCP PDUs satisfies (e.g., meets or exceeds) the threshold. As a non-limiting example, base station 105-*a* may be configured with a first threshold of "2", transmit PDCP PDU 705-*a* and PDCP PDU 705-*c*, and insert a polling bit into PDCP PDU 705-*c* based on the number of transmitted PDCP PDUs 705 satisfying the first threshold. In some additional or alternative examples, base station 105-*a* may be configured with a second PDCP PDU threshold corresponding to a number of bytes associated with transmitted PDCP PDUs 705, and base station 105-*a* may insert a polling bit into subsequent PDCP PDU 705-*c* based on the number of bytes associated with transmitted PDCP PDUs 705 satisfying the threshold.

Base station 105-*a* may monitor the group of UEs 715 for a report 710 (e.g., a PDCP status PDU) based on transmitting the subsequent PDCP PDU 705-*c*. The report 710 may indicate a status of the transmitted set of PDCP PDUs 705 or the corresponding one or more PDCP SDUs. UE 115-*a* may generate the report 710 based on a polling condition for met. In some cases, UE 115-*a* may generate and transmit the report 710 based on the expiration of timer 720-*b* (e.g., a prohibit timer). Timer 720-*b* may be configured as part of an RRC procedure. In some examples, as part of the RRC procedure, the timer 720-*b* may be configured with a duration, enabled, or disabled. Timer 720-*b* may be started or restarted based on receiving a PDCP PDU 705 at an empty PDCP buffer or transmitting a report 710 (e.g., a PDCP status PDU). In some additional or alternative cases, UE 115-*a* may generate and transmit the report 710 based on identifying a polling flag in PDCP PDU 705-*c*.

UE 115-*a* may receive the set of PDCP PDUs 705 from base station 105-*a*, and the set of PDCP PDUs may correspond to one or more SDUs. In some cases, multiple UEs 115 may receive the set of PDCP PDUs 705. One or more UEs 115 of UE group 715 may receive the set of PDCP PDUs 705 and assemble one or more corresponding PDCP SDUs. In some cases, UE 115-*a* may receive the set of PDCP PDUs 705 and attempt to assemble a corresponding PDCP SDU, but the PDCP SDU may not be correctly assembled based on missing PDCP PDUs or incorrectly decoded PDCP PDUs. UE 115-*a* may transmit the report 710 to base station 105-*a*, which may include an indication of a SN of the corresponding PDCP SDU (e.g., ACK_SN), an indication of the number of PDCP PDUs (includes source or parity PDCP PDUs) decoded and used to assemble the corresponding PDCP SDU (e.g., NumPDU), an indication of the number of PDCP subPDUs decided and used to assemble the corresponding PDCP SDU (e.g., NumPDU), or an indication of missing or correctly assembled PDCP SDUs, which may provide feedback information that supports base station 105-*a* adjusting the code rate for PDCP PDUs, which may improve system efficiency. The report 710 may additionally include an indication of the type of report 710 (e.g., a "C" field of the report 710 may indicate a PDCP status PDU type). Different ARQ schemes may be performed in the wireless communications system 700 based on the report 710, which may reduce system latency.

Figure 8:
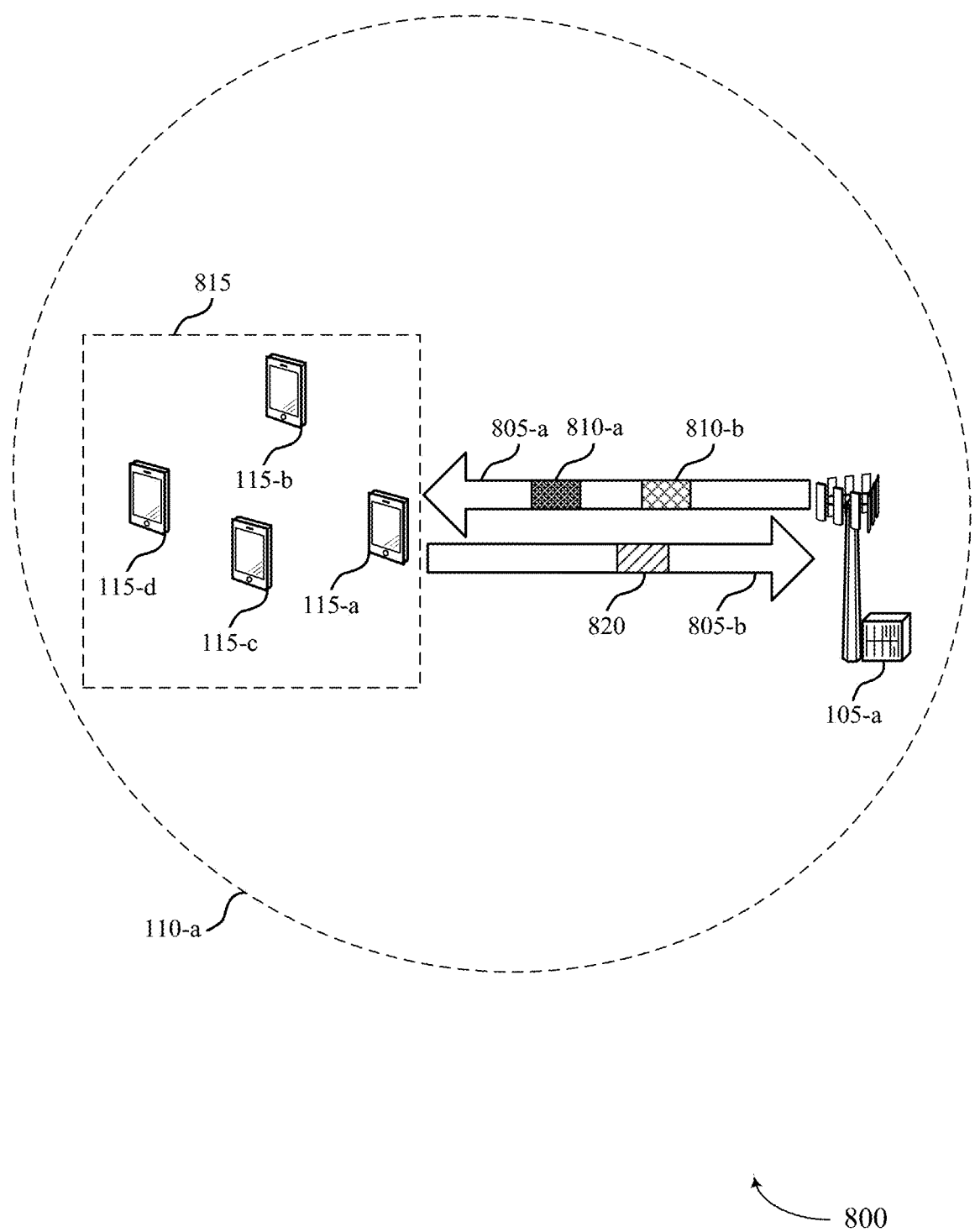
FIG. 8 illustrates an example of a system for wireless communications that supports retransmission procedures at an L2 layer in accordance with aspects of the present disclosure.

FIG. 8 illustrates an example of a wireless communications system 800 that supports retransmission procedures at an L2 layer in accordance with aspects of the present disclosure. In some examples, wireless communications system 800 may implement aspects of wireless communications system 100. Wireless communications system 800 may include base station 105-*a* (e.g., a transmitting device), which may be an example of a base station 105 as described herein. Base station 105-*a* may be associated with coverage area 110-*a*. Wireless communications system 800 may include a group of UEs 815 (e.g., UEs 115-*a*, 115-*b*, 115-*c*, 115-*d*), which may include any number of UEs 115.

In some wireless communications systems, such as wireless communications system 800, a base station 105 may communicate with one or more UEs 115 via communication links 805. For example, base station 105-*a* may transmit messages (e.g., control, or data messages) to a single UE 115 (e.g., a unicast signal) via communications link 805-*a* (e.g., a downlink communications link), or base station 105-*a* may transmit messages to multiple UEs 115 (e.g., a broadcast, or multicast signal) via communications link 805-*a*. Each UE 115 may transmit messages to base station 105-*a* via a communications link 805 (e.g., an uplink communications link). Communications link 805-*b* may illustrate a collective of multiple communications links. For example, communications link 805-*b* may include a communications link for each UE 115 in the group of UEs 815. A communications system that supports a device transmitting to multiple other devices may be referred to as a single-point to multi-point communications system and may support multicast transmissions, broadcast transmissions, V2X transmissions, etc. As described herein, a base station (e.g., base station 105-*a*) may transmit or broadcast a number of PDCP PDUs to a group of UEs 815. For example, base station 105-*a* may transmit a first set of PDCP PDUs 810-*a* that include any number of PDCP PDUs, and the first set of PDCP PDUs 810-*a* may correspond to one or more PDCP SDUs.

Base station 105-*a* may monitor the group of UEs 815 for a report 820 (e.g., a PDCP status PDU, feedback report) based on transmitting the first set of PDCP PDUs 810-*a*. The report 820 may indicate a status of the transmitted first set of PDCP PDUs 810-*a* or the corresponding one or more PDCP SDUs. For example, UE 115-*a* may receive the first set of PDCP PDUs 810-*a* from base station 105-*a*, and UE 115-*a* may attempt to decode the first set of PDCP PDUs 810-*a* to obtain one or more PDCP SDUs. In some cases, UE 115-*a* may receive the first set of PDCP PDUs 810-*a* and attempt to assemble one or more corresponding PDCP SDUs, but one or more of the PDCP SDUs may not be correctly assembled based on missing PDCP PDUs or incorrectly decoded PDCP PDUs. UE 115-*a* may transmit the report 820 to base station 805-*a*, which may include an indication of a SN of the corresponding PDCP SDU (e.g., ACK_SN), where the sequence number may indicate the first PDCP SDU of a set of PDCP SDUs the UE 115 was unable to successfully decode. The report may further include an indication of the number of PDCP PDUs (includes source or parity PDCP PDUs) decoded and used to assemble a corresponding PDCP SDU (e.g., NumPDU), an indication of the number of PDCP subPDUs decided and used to assemble a corresponding PDCP SDU (e.g., NumPDU), or an indication of missing or correctly assembled PDCP SDUs (via a bitmap), or a combination thereof. In some cases, multiple UEs 115 may receive the first set of PDCP PDUs 810-*a*. One or more UEs 115 of UE group 815 may receive the first set of PDCP PDUs 810-*a* and assemble one or more corresponding PDCP SDUs. Each UE 115, for example, in the group of UEs 815 may be configured to transmit a report 820 to base station 105-*a* to indicate the status of the transmitted first set of PDCP PDUs 810-*a* or the corresponding one or more PDCP SDUs.

The information included in each report may be preconfigured (e.g., via RRC signaling), where each UE 115 may include the same information in a report 820 to base station 105-*a*, or the UEs 115 may include different information in reports 820 to base station 105-*a*. For example, each UE 115 may be configured to transmit a type 1, type 2, or type 3 report 820 to base station 105-*a*. A type 1 report 820 may include an indication of the ACK_SN, a type 2 report 820 may include an indication of the ACK-SN, and one or more NumPDUs, and a type 3 report 820 may include an indication of the ACK-SN, one or more NumPDUs, and a bitmap. In some cases, the report 820 may additionally include an indication of the type of report 820 (e.g., a field, such as a "C" field, of the report 820 may indicate a PDCP status PDU type, such a type 1, type 2, or type 3).

Different ARQ schemes may be performed in the wireless communications system 800 based on the report 820, which may reduce system latency. In some cases, base station 105-*a* may use one or more of the received reports 820 to configure future downlink transmissions to the group of UEs 815, or a single UE 115. For example, one or more of the reports 820 may provide feedback information that base station 105-*a* may use to adjust the code rate for downlink transmissions, such as a set of PDCP PDUs 810, to one or more of the UEs 115 in the group of UEs 815, which may improve system efficiency. In some cases, base station 105-*a* may adjust the code rate of one or more downlink transmissions based on the indicated NumPDU. For example, base station 105-*a* may original encode a PDCP SDU to obtain ten PDCP PDUs. A UE 115 may use eight PDCP SDUs to obtain the PDCP SDU, where the UE 115 may indicate eight as the NumPDU in a type 2 report. In some cases, the base station 105 may adjust the code rate of the PDCP PDUs to decrease the number of PDCP PDUs the base station 105 transmits for one PDCP SDU because the UE 115 did not utilize the full ten PDCP PDUs to assemble the PDCP SDU. Additionally or alternatively, base station 105-*a* may utilize one or more of the received reports 820 to configure a second set of PDCP PDUs 810-*b*. For example, base station 105-*a* may identify one or more PDCP SDUs that were not successfully received or decoded by one or more of the UEs 115 in the group of UEs 815. The base station 105-*a* may configure the second set of PDCP PDUs 810-*b* that includes PDCP PDUs that correspond to one or more of the identified PDCP SDUs. In some cases, base station 105-*a* may re-encode the identified PDCP SDUs to obtain the second set of PDCP PDUs 810-*b*. Base station 105-*a* may transmit the second set of PDCP PDUs 810-*b* to the group of UEs 815 to mitigate the latency and increase the reliability in wireless communications system 800. Though in the example of FIG. 8 the transmitting device is base station 105-*a*, it is to be understood that a transmitting device as described herein may alternatively be a UE 115, and similarly a receiving device as described herein may be a base station 105 despite being described as a UE 115 in examples herein.

Figure 9A:
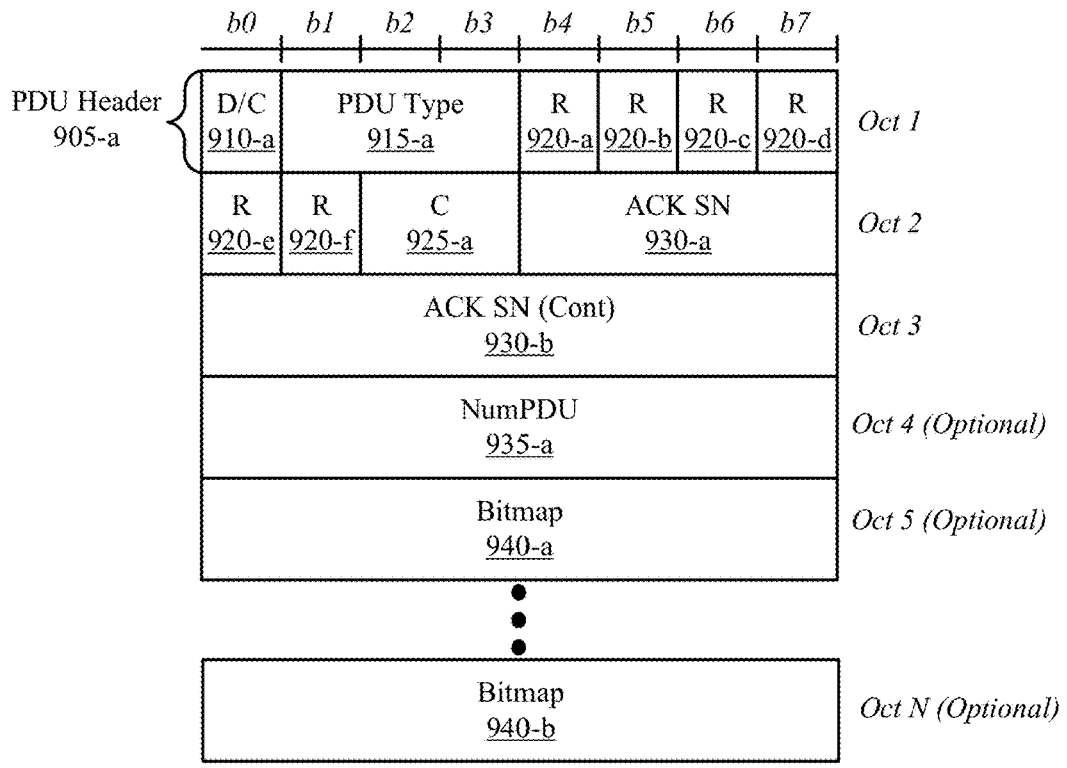
FIGS. 9A and 9B illustrate examples of PDCP status messages that supports polling and status reporting for network coding in accordance with aspects of the present disclosure.
Figure 9B:
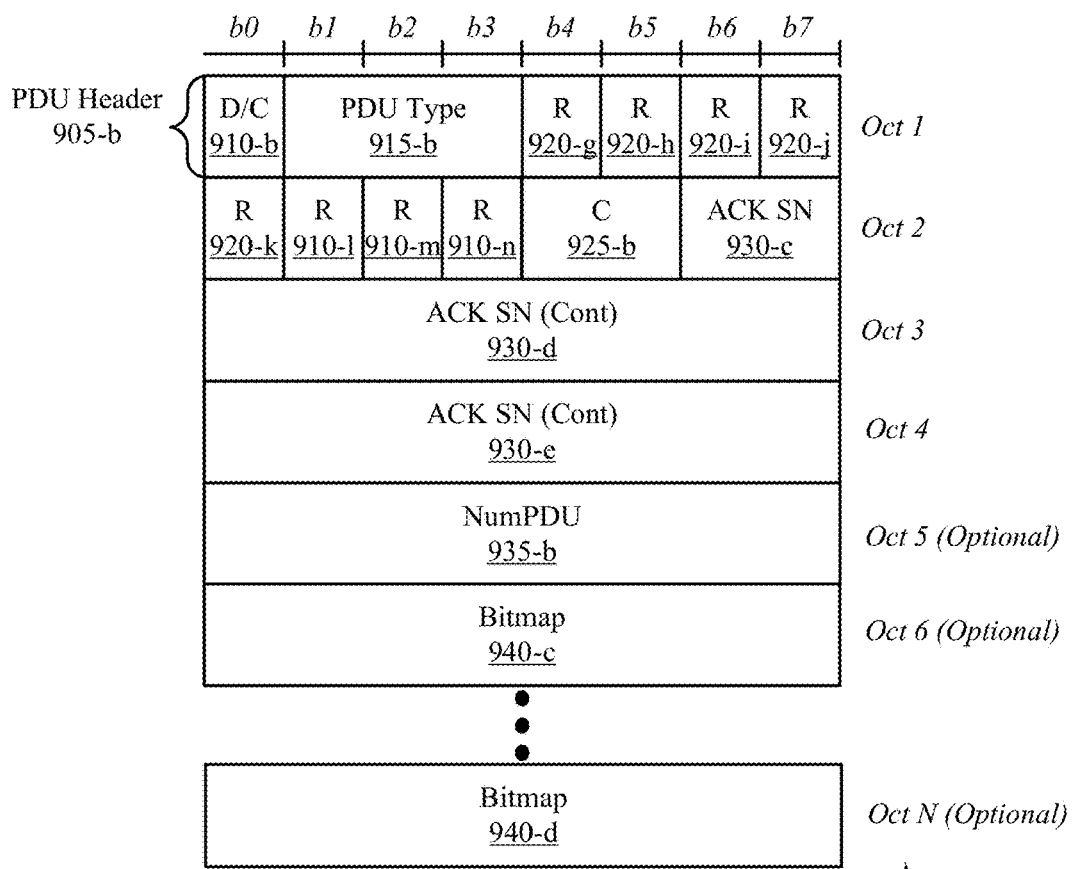

FIGS. 9A and 9B illustrate examples of PDCP status messages 901 and 902 that support polling and status reporting for network coding in accordance with aspects of the present disclosure. In some examples, PDCP status messages 901 and 902 may implement aspects of wireless communication systems described herein. In some cases, the PDCP status message 901 or 902 may provide a feedback mechanism that supports PDCP status PDU feedback from a PDCP receiving device. The message 901 or 902 may be transmitted by a receiving device (e.g., a UE) in accordance with a unicast transmission, and the feedback may indicate the status of a set of PDCP PDUs or one or more PDCP SDUs.

The PDCP status message 901 (e.g., a PDCP status PDU) may include PDU header 905-*a*, D/C field 910-*a* indicating whether the message is a data message or a control message, PDU Type field 915-*a* indicating a type of report, a number of R fields 920 (e.g., R fields 920-*a*, 920-*b*, 920-*c*, 920-*d*, 920-*e*, and 920-*f*) corresponding to a number of reserved bits. Either as part of or outside the header, the PDCP status message 901 may further include C field 925-*a* indicating the type of PDCP status PDU (e.g., type 1 comprising an ACK_SN field, type 2 comprising an ACK_SN field and a NumPDU field, type 3 comprising an ACK_SN field, a NumPDU field, and a Bitmap field, etc.). The ACK SN fields 930 may indicate the SN of a PDCP SDU that was not received at the receiving device. In some cases, ACK SN 930-*a* and ACK SN 930-*b* may correspond to the same SN (e.g., a conjunction or concatenation of ACK SN 930-*a* and ACK SN 930-*b* may indicate a single SN) and therefore the same PDCP SDU. For example, the combination of ACK SN 930-*a* and ACK SN 930-*b*, which may include 12 bits, may be used to indicate the SN of a PDCP SDU that was not received at the receiving device.

In some examples, a NumPDU field 935 may indicate a number of PDCP PDUs decoded and used to assemble a PDCP SDU, and in some additional or alternative examples, a NumPDU field 935 may indicate the number of PDCP sub-PDUs decoded and used to assemble a PDCP SDU. For example, NumPDU 935-*a* field may correspond to a quantity (e.g., a one-shot number) indicating the number of PDCP PDUs (e.g., including source PDCP PDUs or parity PDCP PDUs) decoded and used to assemble a PDCP SDU. The quantity may be based on PDCP PDUs or PDCP sub-PDUs received with a polling flag. As an additional or alternative example, NumPDU field 935-*a* may correspond to a statistical measure (e.g., an average recorded quantity, a median quantity, a mode quantity, etc.) of the number of PDCP PDUs or PDCP sub-PDUs decoded and used to assemble a PDCP SDU. The statistical measure may be based on PDCP PDUs or PDCP sub-PDUs received since a most recent polling flag was received or since a most recent PDCP status PDU was transmitted.

A Bitmap field 940 may indicate PDCP SDUs that are missing from the receiver or correctly received or assembled at the receiver. In some cases, a bitmap field 940 may include a bitmap that indicates the PDCP SDUs in relation to the ACK SN 930 field. For example, bitmap 940-*a* may indicate PDCP SDUs that have been correctly received by the receiver, and bitmap 940-*b* may indicate PDCP SDUs that are missing (e.g., not received, unsuccessfully decoded, etc.) from the receiver. Bitmap field 940-*a* may correspond to a first bitmap field and bitmap field 940-*b* may correspond to a second bitmap field different from the first bitmap field.

The PDCP status message 902 (e.g., a PDCP status PDU) may include PDU header 905-*b*, D/C field 910-*b* indicating whether the message is a data message or a control message, PDU type field 915-*b* indicating the type of report, a number of R fields 920 (e.g., R fields 920-*g*, 920-*h*, 920-*i*, 920-*j*, 920-*k*, 920-*l*, 920-*m* and 920-*n*) corresponding to a number of reserved bits. Either as part of or outside the header, the PDCP status message 902 may further include C field 925-*b* indicating the type of PDCP status PDU (e.g., type 1 comprising an ACK_SN field, type 2 comprising an ACK_SN field and a NumPDU field, type 3 comprising an ACK_SN field, a NumPDU field, and a Bitmap field, etc.) The ACK SN fields 930 may indicate the SN of a PDCP SDU that was not received at the receiving device. In some cases, ACK SN field 930-*c*, ACK SN field 930-*d*, and ACK SN field 930-*e* may correspond to the same SN (and therefore the same PDCP SDU). For example, the combination of ACK SN 930-*c*, ACK SN 930-*d*, and ACK SN 930-*e*, which may include 18 bits, may be used to indicate the SN of a PDCP SDU that was not received at the receiving device.

In some examples, a NumPDU field 935 may indicate a number of PDCP PDUs decoded and used to assemble a PDCP SDU, and in some additional or alternative examples, a NumPDU field 935 may indicate the number of PDCP sub-PDUs decoded and used to assemble a PDCP SDU. For example, NumPDU 935-*b* field may correspond to a quantity (e.g., a one-shot number) indicating the number of PDCP PDUs (e.g., including source PDCP PDUs or parity PDCP PDUs) decoded and used to assemble a PDCP SDU. The quantity may be based on PDCP PDUs or PDCP sub-PDUs received with a polling flag. As an additional or alternative example, NumPDU field 935-*b* may correspond to a statistical measure (e.g., an average recorded quantity, a median quantity, a mode quantity, etc.) of the number of PDCP PDUs or PDCP sub-PDUs decoded and used to assemble a PDCP SDU. The statistical measure may be based on PDCP PDUs or PDCP sub-PDUs received since a most recent polling flag was received or since a most recent PDCP status PDU was transmitted.

One or more bitmap fields 940 may indicate PDCP SDUs that are missing from the receiver or correctly received or assembled at the receiver. In some cases, a bitmap field 940 may include a bitmap that indicates the PDCP SDUs in relation to the ACK SN 930 field. For example, bitmap 940-*c* may indicate PDCP SDUs that have been correctly received by the receiver, and bitmap 940-*d* may indicate PDCP SDUs that are missing (e.g., not received, unsuccessfully decoded, etc.) from the receiver. Bitmap field 940-*c* may correspond to a first bitmap field and bitmap field 940-*d* may correspond to a second bitmap field.

In some cases, the transmitting device may dynamically adjust a coding rate for PDCP messages based on the PDCP status message 902. For example, the transmitting device may adjust the coding rate based on receiving a PDCP status message 902 that includes an acknowledgement SN (e.g., an ACK SN field 930, the SN of the next non-received PDCP SDU) and any combination of an indication of a quantity of PDUs (e.g., a NumPDU field 935, a one-shot number of PDCP PDUs or PDCP sub-PDUs), an indication of an average quantity of PDUs (e.g., a NumPDU field 935, an average recorded number of PDCP PDUs or PDCP sub-PDUs), or a bitmap (e.g., a bitmap field 935, an indication of the missing or correctly received PDCP SDUs). In some cases, different ARQ schemes may be performed based on feedback information indicated as part of PDCP status message 901 or 902, which may reduce system latency.

Figure 10:
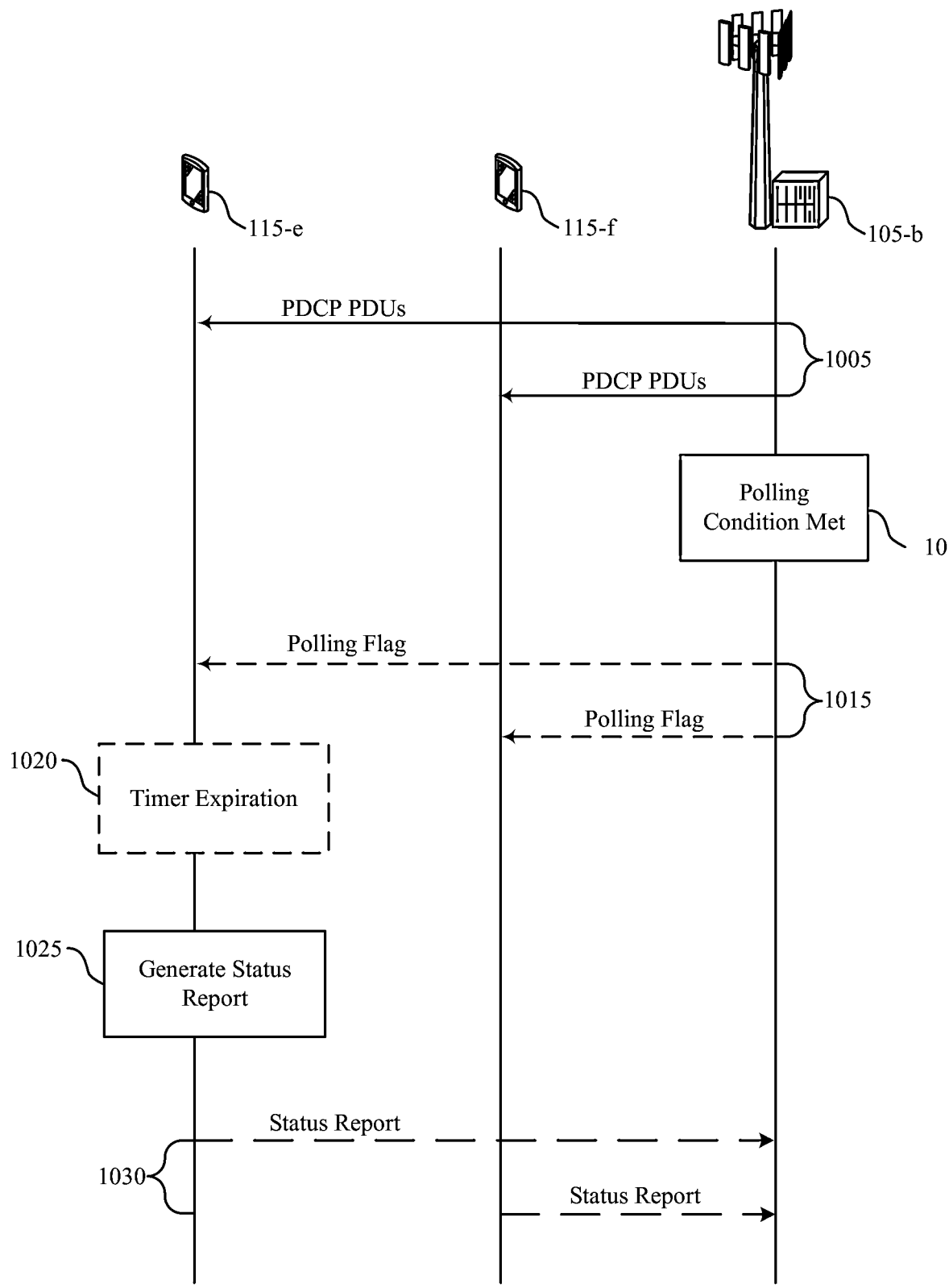
FIG. 10 illustrates an example of a process flow that supports polling and status reporting for network coding in accordance with aspects of the present disclosure.

FIG. 10 illustrates an example of a process flow 1000 that supports polling and status reporting for network coding in accordance with aspects of the present disclosure. In some examples, process flow 1000 may implement aspects of wireless communication systems described herein. The process flow 1000 may include UE 115-*e*, UE 115-*f*, and base station 105-*b*, which may be examples of the corresponding devices described herein. Alternative examples of the following may be implemented, where some steps are performed in a different order than described or are not performed at all. In some cases, steps may include additional features not mentioned below, or further steps may be added.

At 1005, a transmitting device (e.g., base station 105-*b*) may transmit a set of PDCP PDUs corresponding to one or more PDCP SDUs to one or more receiving devices (e.g., one or more UEs 115). The transmitting device may transmit the set of PDCP PDUs to UE 115-*e*, and in some cases, the transmitting device may also transmit the set of PDCP PDUs to UE 115-*f*. For example, base station 105-*b* may broadcast the set of PDCP PDUs a group of UEs 115.

At 1010, the transmitting device may determine that a polling condition has been met. The polling condition may correspond to an expiration of a timer (e.g., a periodic timer), a number of transmitted PDCP data PDUs, or a number of bytes associated with a number of transmitted PDCP data PDUs.

At 1015, the transmitting device may set a polling flag within a subsequent PDCP PDU based on determining that the polling condition has been met. The transmitting device may transmit the subsequent PDCP PDU to one or more receiving devices (e.g., UE 115-*e* or UE 115-*f*). The transmitting device may monitor for a report from the receiving device of the one or more receiving devices based on transmitting the subsequent PDCP PDU.

At 1025, the receiving device may generate a report indicating a status of the set of PDCP PDUs or the one or more PDCP SDUs at the PDCP layer. In some cases, the receiving device may generate the report based on receiving the polling flag at 1015 or the timer (e.g., a prohibit timer) expiration at 1020. The report may indicate a status of the transmitted set of PDCP PDUs or the one or more PDCP SDUs.

At 1030, the receiving device may transmit the report to the transmitting device. The report may include a SN of a PDCP SDU, an indication of a quantity of PDCP PDUs or PDCP sub-PDUs used by the receiving device to obtain a PDCP SDU, an average quantity of PDCP PDUs or PDCP sub-PDUs used by the receiving device to obtain one or more PDCP SDUs, a bitmap indicating, for each PDCP SDU, whether the receiving device was successful or unsuccessful in receiving a respective SDU, or any combination thereof. In some cases, UE 115-*e* or UE 115-*f* may transmit a report to the transmitting device. The transmitting device may modify a coding rate based on receiving the report, which may reduce system latency.

Figure 11:
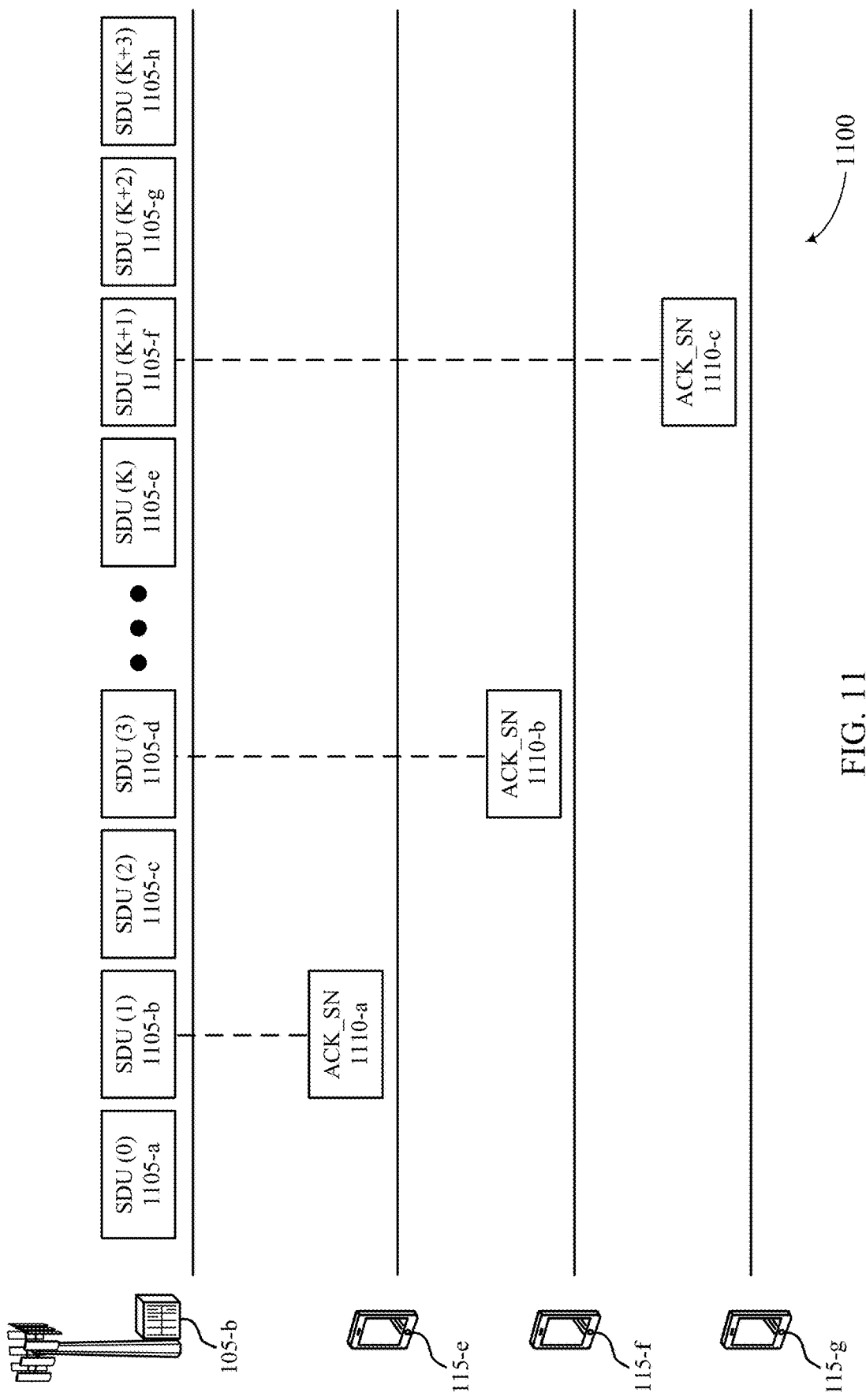
FIGS. 11 and 12 illustrate examples of PDCP reports that support retransmission procedures at an L2 layer in accordance with aspects of the present disclosure.

FIG. 11 illustrates an example of a report configuration 1100 that supports retransmission procedures at an L2 layer in accordance with aspects of the present disclosure. The report configuration 1100 may be implemented by base station 105-*b*, UEs 115-*e*, 115-*f*, and 115-*g*, or a combination thereof, which may be examples of a base station 105 and UEs 115 as described herein. In some cases, base station 105-*b* may implement a PDCP encoding scheme and a feedback procedure to transmit a first set or a repaired set of PDCP PDUs to one or more UEs 115. For example, base station 105-*b* may encode one or more PDCP SDUs 1105 to obtain a set of PDCP PDUs to transmit to the one or more UEs 115. Additionally or alternatively, other wireless devices, such as UEs 115-*e*, 115-*f*, 115-*g*, or some combination of these UEs 115, may implement an encoding scheme, or a feedback procedure, or a combination thereof.

As described above, a base station 105 (e.g., base station 105-*b*) may determine a set of PDCP SDUs 1105 to transmit to a set of UEs 115 that includes any number of UEs 115. Prior to transmission, base station 105-*b* may encode the set of PDCP SDUs 1105 (e.g., via a rateless code) to obtain a first set of PDCP PDUs. Base station 105-*a* may transmit the first set of PDCP PDUs to the set of UEs 115. In some cases, the set of UEs 115 may include UEs 115-e, 115-f, and 115-g. Each of UEs 115-e, 115-f, and 115-g may attempt to receive and decode each of the PDCP PDUs in the first set of PDCP PDUs to obtain the respective PDCP SDUs 1105. In some implementations, however, one or more UEs 115 may be unable to obtain or successfully decode one or more of the PDCP SDUs 1105 or one or more PDCP PDUs corresponding to one or more PDCP SDUs 1105.

To facilitate increased reliability in the combinations network, and as described above, each UE 115 may be configured to transmit a report (e.g., PDCP status PDU, feedback report) to indicate one or more parameters associated with the first set of PDCP PDUs, or the respective PDCP SDUs 1105, or a combination thereof. Each UE 115 may be configured to transmit a type 1, type 2, or a type 3 report, where each of the three reports includes an indication of the first PDCP SDU 1105 a UE 115 was unable to receive in a set of PDCP SDUs 1105. The indication of the first PDCP SDU 1105 a UE 115 was unable to receive may include a sequence number (e.g., an ACK_SN), where the sequence number is associated with the respective PDCP SDU 1105.

For example, base station 105-b may determine to encode SDUs 1105-a through 1105-h to obtain a first set of PDCP PDUs to transmit (e.g., via a unicast, multicast, or broadcast transmission) to UEs 115-e, 115-f, and 115-g, where the first set of PDCP PDUs are associated with SDUs 1105-a through 1105-h. Each UE 115 may attempt to receive and decode each of the PDCP PDUs in the first set of PDCP PDUs to obtain SDUs 1105-a through 1105-h. In some cases, UE 115-e may determine that PDCP SDU 1105-b is the first (e.g., earliest) PDCP SDU 1105 of the set of PDCP SDUs 1105 that has not been successfully received at the UE 115-e. UE 115-f may determine that PDCP SDU 1105-d is the first (e.g., earliest) PDCP SDU 1105 of the set of PDCP SDUs 1105 that has not been successfully received at the UE 115-f and UE 115-g may determine that PDCP SDU 1105-f is the first (e.g., earliest) PDCP SDU 1105 of the set of PDCP SDUs 1105 that has not been successfully received at the UE 115-g. In some cases, each UE 115 may determine that it could not obtain one or more additional PDCP PDUs following the first PDCP SDU 1105 (e.g., SDU 1105-b, SDU 1105-d, and SDU 1105-f).

According to a type 1, type 2, or a type 3 report, each UE 115 may transmit, to base station 105-b, the first PDCP SDU 1105 the UE 115 could not obtain, such as with an ACK_SN. For example, UE 115-e may transit ACK_SN 1110-a associated with SDU 1105-b, UE 115-f may transmit ACK_SN 1110-b associated with SDU 1105-d, and UE 115-g may transmit ACK_SN 1110-c associated with SDU 1105-f. Upon receiving a report from each of UEs 115-e, 115-f, and 115-g, base station 105-b may determine at least the earliest ACK_SN 1110 indicated among all received reports and determine the first unsuccessfully decoded SDU 1105 by any of the UEs 115. For example, base station 105-b may determine the earliest ACK_SN 1110 is ACK_SN 1110-a associated with SDU 1105-b. In some cases, base station 105-b may consider each SDU 1105 prior to SDU 1105-b to be successfully decoded by each UE 115.

As such, base station 105-b may generate the encoded PDCP repaired PDUs to improve reliability in the network (e.g., improve L2 reliability). For example, base station 105-a may re-encode and/or retransmit the PDCP PDUs associated with SDUs 1105-b through 1105-f, such that base station 105-b transmits a second set of PDCP PDUs associated with the first not decoded PDCP SDU 1105 to the last PDCP SDU 1105 of the original set of PDCP SDUs. In another example, base station 105-a may re-encode and/or retransmit the PDCP PDUs associated with SDUs 1105-b through 1105-f, such that base station 105-b transmits a second set of PDCP PDUs associated with the first not decoded PDCP SDU 1105 to the PDCP SDU 1105 associated with the latest ACK_SN 1110 (e.g., ACK_SN 1110-c). In some cases, the PDU may include a field (e.g., a "T" field) that indicates whether the PDU is a repaired PDU (e.g., a retransmitted PDU or PDU corresponding to a PDU that was unsuccessfully received at one or more receiving devices).

Figure 12:
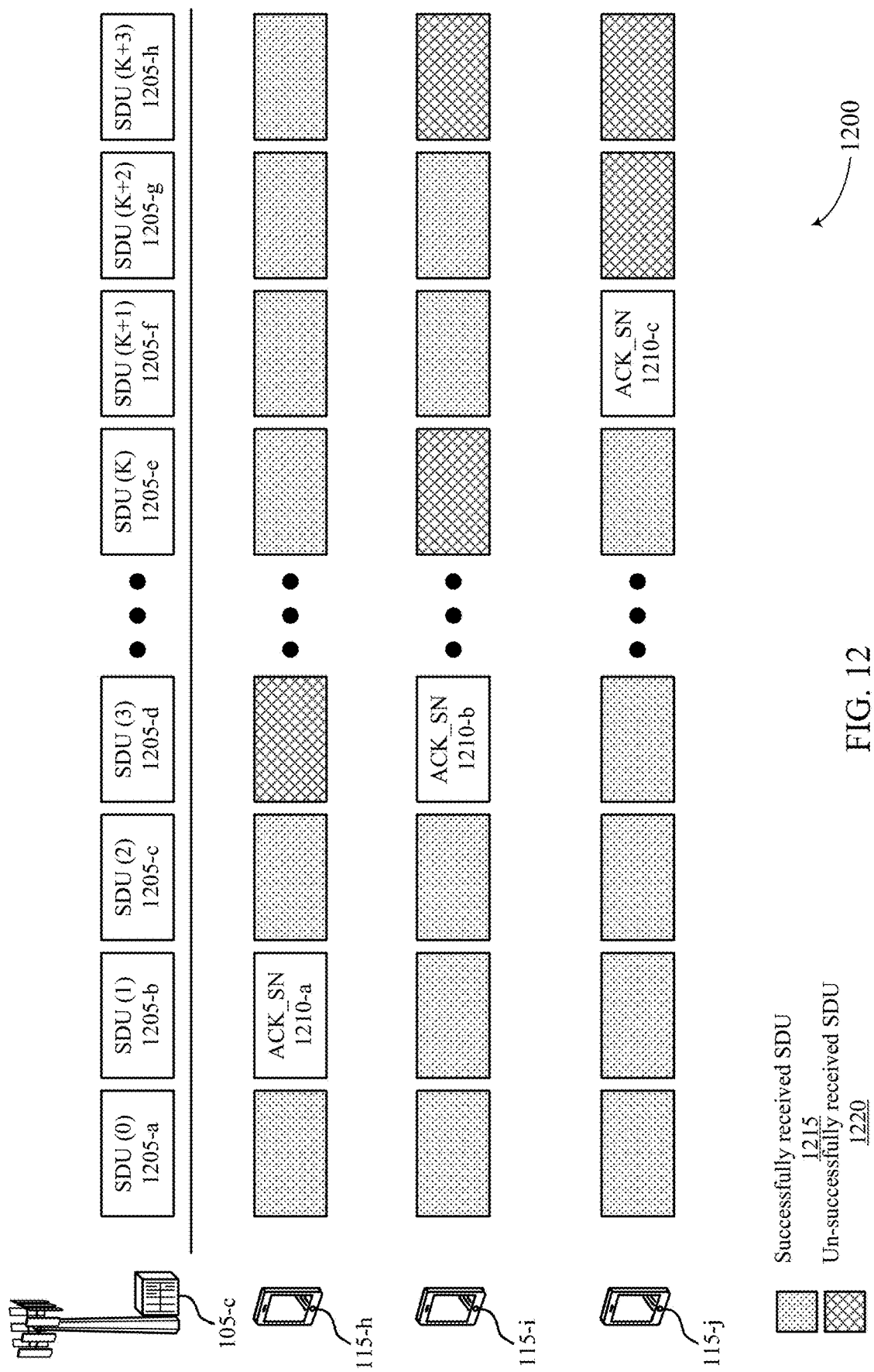

FIG. 12 illustrates an example of a report configuration 1200 that supports retransmission procedures at an L2 layer in accordance with aspects of the present disclosure. The report configuration 1200 may be implemented by base station 105-c, or by UEs 115-h, 115-i, and 115-j, or a combination thereof, which may be examples of a base station 105 and UEs 115 as described herein. In some cases, base station 105-c may implement a PDCP encoding scheme and a feedback procedure to transmit a first set or a repaired set of PDCP PDUs to one or more UEs 115. For example, base station 105-c may encode one or more PDCP SDUs to obtain a set of PDCP PDUs to transmit to the one or more UEs 115. Additionally or alternatively, other wireless devices, such as UEs 115-h, 115-i, 115-j, or some combination of these UEs 115, may implement an encoding scheme, or a feedback procedure, or a combination thereof.

As described above, a base station 105 (e.g., base station 105-c) may determine a set of PDCP SDUs 1205 to transmit to a set of UEs 115 that includes any number of UEs 115. Prior to transmission, base station 105-b may encode the set of PDCP SDUs 505 (e.g., via a rateless code) to obtain a first set of PDCP PDUs. Base station 105-a may transmit the first set of PDCP PDUs to the set of UEs 115. In some cases, the set of UEs 115 may include UEs 115-h, 115-i, and 115-j. Each of UEs 115-h, 115-i, and 115-j may attempt to receive and decode each of the PDCP PDUs in the first set of PDCP PDUS to obtain the respective PDCP SDU. In some implementations, a UE 115 may not be able to obtain one or more of the PDCP SDUs 1205.

To facilitate increased reliability in the combinations network, and as described above, each UE 115 may be configured to transmit a report (e.g., PDCP status PDU, feedback report) to indicate one or more parameters associated with the first set of PDCP PDUs, or the respective PDCP SDUs, or a combination thereof. Each UE 115 may be configured to transmit a type 1, type 2, or a type 3 report, where a type 3 report may include a bitmap to indicate which PDCP SDUs 1205 a UE 115 successfully decoded (e.g., depicted as successfully received SDUs) and which the UE 115 was not able to successfully decode (e.g., depicted as un-successfully received SDUs). In some cases, the bitmap may indicate the successfully and/or unsuccessfully received PDCP SDUs 1205 after the indicated ACK_SN 1210 but not before.

For example, base station 105-c may determine to encode SDUs 1205-a through 1205-h to obtain a first set of PDCP PDUs to transmit (e.g., via a unicast, multicast, or broadcast transmission) to UEs 115-h, 115-i, and 115-j, where the first set of PDCP PDUs are associated with SDUs 1205-a through 1205-h. Each UE 115 may attempt to receive and decode each PDCP PDU in the first set of PDCP PDUs to obtain SDUs 1205-a through 1205-h. UE 115-h may determine that the first PDCP SDU 1205 that UE 115-h could not obtain is SDU 1205-b. UE 115-i may determine that the first PDCP SDU 1205 that UE 115-i could not obtain is SDU 1205-d and UE 115-j may determine that the first PDCP SDU 1205 that UE 115-*j* could not obtain is SDU 1205-*f*. In some cases, each UE 115 may determine that it could not obtain one or more additional PDCP PDUs following the first PDCP SDU 1205 (e.g., SDU 1205-*b*, SDU 1205-*d*, and SDU 1205-*f*). For example, UE 115-*h* may determine that it did not successfully decode SDUs 1205-*b*, and 1205-*d*. UE 115-*i* may determine that it did not successfully decode SDUs 1205-*d*, 1205-*e*, and 1205-*h*. UE 115-*j* may determine that it did not successfully decode SDUs 1205-*f*, 1205-*g*, and 1205-*h*.

Each of UEs 115-*h*, 115-*i*, and 115-*j* may be configured to transmit, to base station 105-*c*, a type 3 report, such that each UE 115 includes an indication of ACK_SN 1210, a NumPDU, and a bitmap. For example, UE 115-*h* may include ACK-SN 1210-*a* associated with 1205-*b*, a NumPDU, and a bitmap indicating that UE 115-*h* successfully received, SDUs 1205-*c*, and 1205-*e* through 1205-*h*, and unsuccessfully received SDU 1205-*d*. In some cases, the ACK_SN 1210 may be included in the bitmap, or separate from the bitmap.

Upon receiving a report from each of UEs 115-*h*, 115-*i*, and 115-*j*, base station 105-*c* may determine at least the earliest ACK_SN 1210 indicated among all received reports and determine the first unsuccessfully decoded SDU 1205 by any of the UEs 115. For example, base station 105-*c* may determine the earliest ACK_SN 1210 is ACK_SN 1210-*a* associated with SDU 1205-*b*. In some cases, base station 105-*b* may consider each SDU 1205 prior to SDU 505-*b* to be successfully decoded by each UE 115. In some cases, base station 105-*c* may re-encode and/or retransmit the PDCP PDUs associated with SDUs 1205-*b* through 1205-*h*, such that base station 105-*c* transmits a second set of PDCP PDUs associated with the first not decoded PDCP SDU 1205 to the last PDCP SDU 1205 of the original set of PDCP SDUs.

In some implementations, base station 105-*c* may additionally determine the last not successfully decoded SDU 1205. For example, base station 105-*c* may determine that SDU 1205-*h* was not successfully decoded by either UEs 115-*i* or UE 115-*j*. In some cases, base station 105-*c* may re-encode and/or retransmit the PDCP PDUs associated with SDUs 1205-*b* through 1205-*h*, such that base station 105-*c* transmits a second set of PDCP PDUs associated with the first not decoded PDCP SDU 1205 to the last not decoded PDCP SDU 1205 of the original set of PDCP SDUs.

In some implementations, base station 105-*c* may additionally determine each SDU 1205 that was not successfully decoded each UE 115. For example, base station 105-*c* may determine that SDUs 1205-*b*, 1205-*d*, 1205-*e*, 1205-*f*, 1205-*g*, and 1205-*h* were not successfully decoded by the UEs 115. In some cases, base station 105-*c* may re-encode and/or retransmit the PDCP PDUs associated with SDUs 1205-*b*, 1205-*d*, 1205-*e*, 1205-*f*, 1205-*g*, and 1205-*h*, such that base station 105-*c* transmits a second set of PDCP PDUs associated with the unsuccessfully decoded SDUs 1205.

Figure 13:
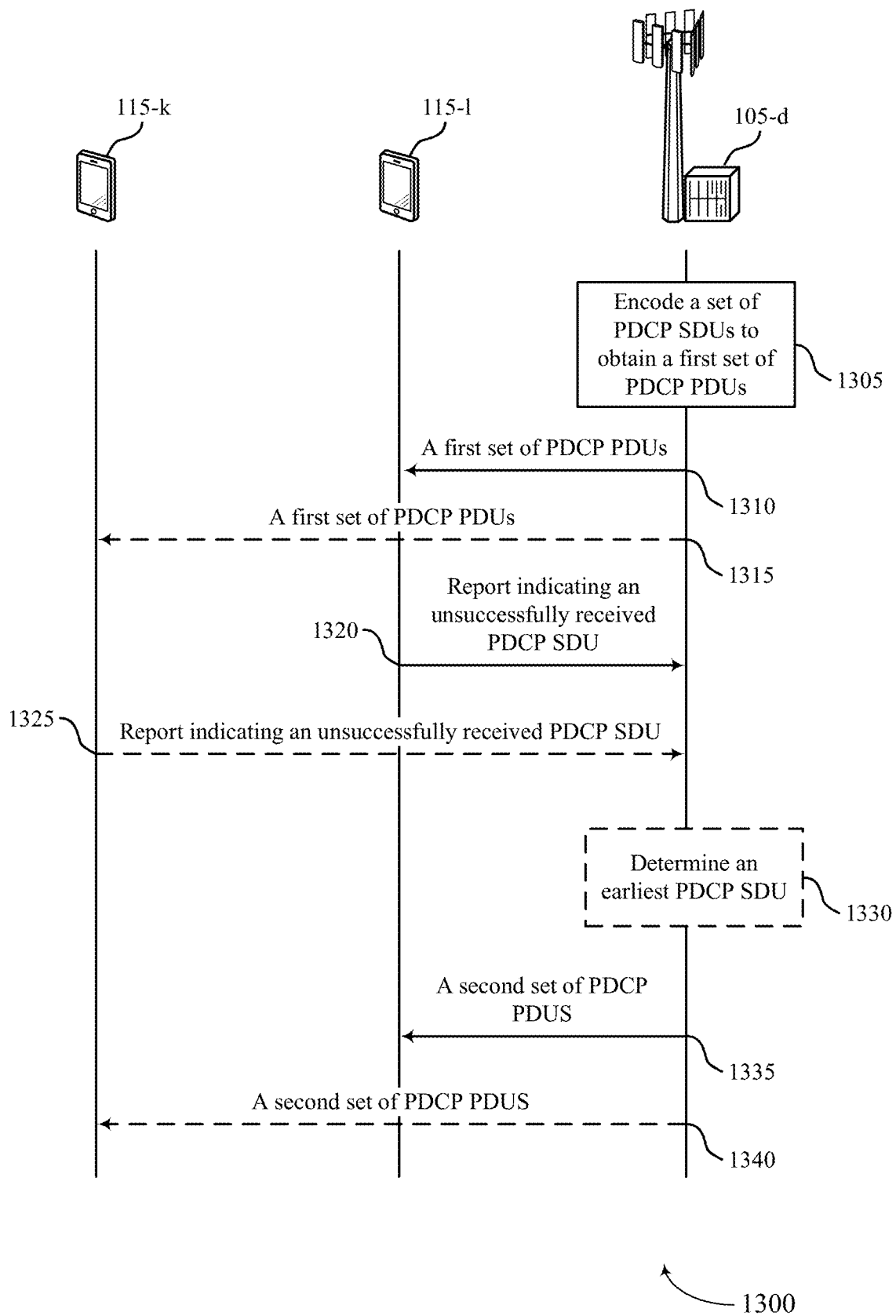
FIG. 13 illustrates an example of a process flow that supports retransmission procedures at an L2 layer in accordance with aspects of the present disclosure.

FIG. 13 illustrates an example of a process flow 1300 that supports retransmission procedures at an L2 layer in accordance with aspects of the present disclosure. The process flow 1300 may illustrate an example PDCP encoding and feedback scheme. For example, base station 105-*d* may perform an encoding and feedback scheme with UEs 115-*k*, and 115-*l*. Base station 105-*d* and UEs 115-*k*, and 115-*l* may be examples of the corresponding wireless devices described herein. In some cases, instead of base station 105-*d* implementing the PDCP encoding and feedback scheme, a different type of wireless device (e.g., a UE 115) may perform the scheme. Alternative examples of the following may be implemented, where some steps are performed in a different order than described or are not performed at all. In some cases, steps may include additional features not mentioned below, or further steps may be added.

At 1305, base station 105-*d* (e.g., a transmitting device) may encode, at a PDCP layer of base station 105-*d*, a set of PDCP SDUs according to a set of network coding parameters to obtain a first set of PDCP PDUs. In some cases, the set of PDCP SDUs may be encoded using a rateless code (e.g., Luby Transform code, Raptor code).

At 1310, base station 105-*d* may transmit, to UE 115-*l* (e.g., a receiving device), the first set of PDCP PDUs. For example, base station 105-*d* may transmit a unicast message to UE 115-*l*. In some cases, base station 105-*d* may transmit a multicast, or broadcast message that includes the first set of PDCP PDUs. In such a case, at 1315, base station 105-*d* may transmit the first set of PDCP PDUs to UE 115-*k* (e.g., a receiving device).

At 1320, base station 105-*d* may receive, from UE 115-*l*, a report indicating a PDCP SDU of the set of PDCP SDUs that was unsuccessfully received at UE 115-*l*. The report may include a sequence number (e.g., ACK_SN) associated with the PDCP SDU.

In some cases, at 1325, base station 105-*d* may receive, from UE 115-*k*, a second report indicating a second PDCP SDU of the set of PDCP SDUs that was unsuccessfully received at UE 115-*k*. The report may include a sequence number (e.g., ACK_SN) associated with the second PDCP SDU.

In some implementations, the report and the second report each includes an indication of a quantity of PDCP PDUs or PDCP sub-PDUs used by the respective UE 115 to obtain a PDCP SDU of the set of PDCP SDUs. Base station 105-*d* may adjust a code rate for downlink transmissions based on the indication of the quantity of PDCP PDUs. In some implementations, the report and the second report each includes an indication of an average quantity of PDCP PDUs or PDCP sub-PDUs used by the respective UE 115 to obtain one or more PDCP SDUs of the set of PDCP SDUs. The base station 105-*d* may adjust a code rate for downlink transmissions based on the indication of the average quantity of PDCP PDUs.

In some cases, the report and the second report each includes a bitmap indicating, for each PDCP SDUs of the set of PDCP SDUs having a sequence number greater than the respective indicated sequence number, whether the respective UE 115 was successful or unsuccessful in obtaining a respective PDCP SDU.

At 1330, if base station 105-*d* received multiple reports, base station 105-*d* may determine an earliest PDCP SDU between the PDCP SDU and the second PDCP SDU based on respective sequence numbers (e.g., ACK_SN) associated with the PDCP SDU and the second PDCP SDU, where at least some of the second set of PDCP PDUs correspond to the earliest PDCP SDU based on the determining. In some cases, base station 105-*d* may determine the second set of PDCP PDUs based on respective bitmaps of the report and second report, where the second set of PDCP PDUs corresponds to the earliest PDCP SDU, a latest PDCP SDU that was unsuccessfully received by at least one of UE 115-*l* and UE 115-*k*, and each PDCP SDU between the earliest PDCP SDU and the latest PDCP SDU. In some cases, base station 105-*a* may determine the second set of PDCP PDUs based on respective bitmaps of the report and second report, the second set of PDCP PDUs corresponding to the earliest PDCP SDU and one or more PDCP SDUs unsuccessfully received by at least one of UE 115-*l* and UE 115-*k*. In some implementations, base station 105-*d* may re-encode at least a subset of the set of PDCP SDUs to obtain the second set of PDCP PDUs based on the report, or the second report, or both. Each PDCP PDU in the second set of PDCP PDUs may include a field (e.g., a "T" field) indicating whether the PDCP PDU is a retransmitted PDCP PDU.

At 1335, base station 105-*d* may transmit, to UE 115-*l* (e.g., via a unicast, broadcast, or multicast message), based at least on the received report at 1320, a second set of PDCP PDUs corresponding to at least the PDCP SDU of the set of PDCP SDUs. Additionally or alternatively, the second set of PDCP PDUs may be based on the report received at 1325.

In some cases, at 1340, base station 105-*d* may transmit, to UE 115-*k* (e.g., via a unicast, broadcast, or multicast message), based at least on the received report at 1320, a second set of PDCP PDUs corresponding to at least the PDCP SDU of the set of PDCP SPDUs. Additionally or alternatively, the second set of PDCP PDUs may be based on the report received at 1325. In some implementations, the second set of PDCP PDUs further corresponds to each PDCP SDU between the earliest PDCP SDU and each PDCP SDU of the set of PDCP SDUs having a sequence number greater than the earliest PDCP SDU.

Figure 14:
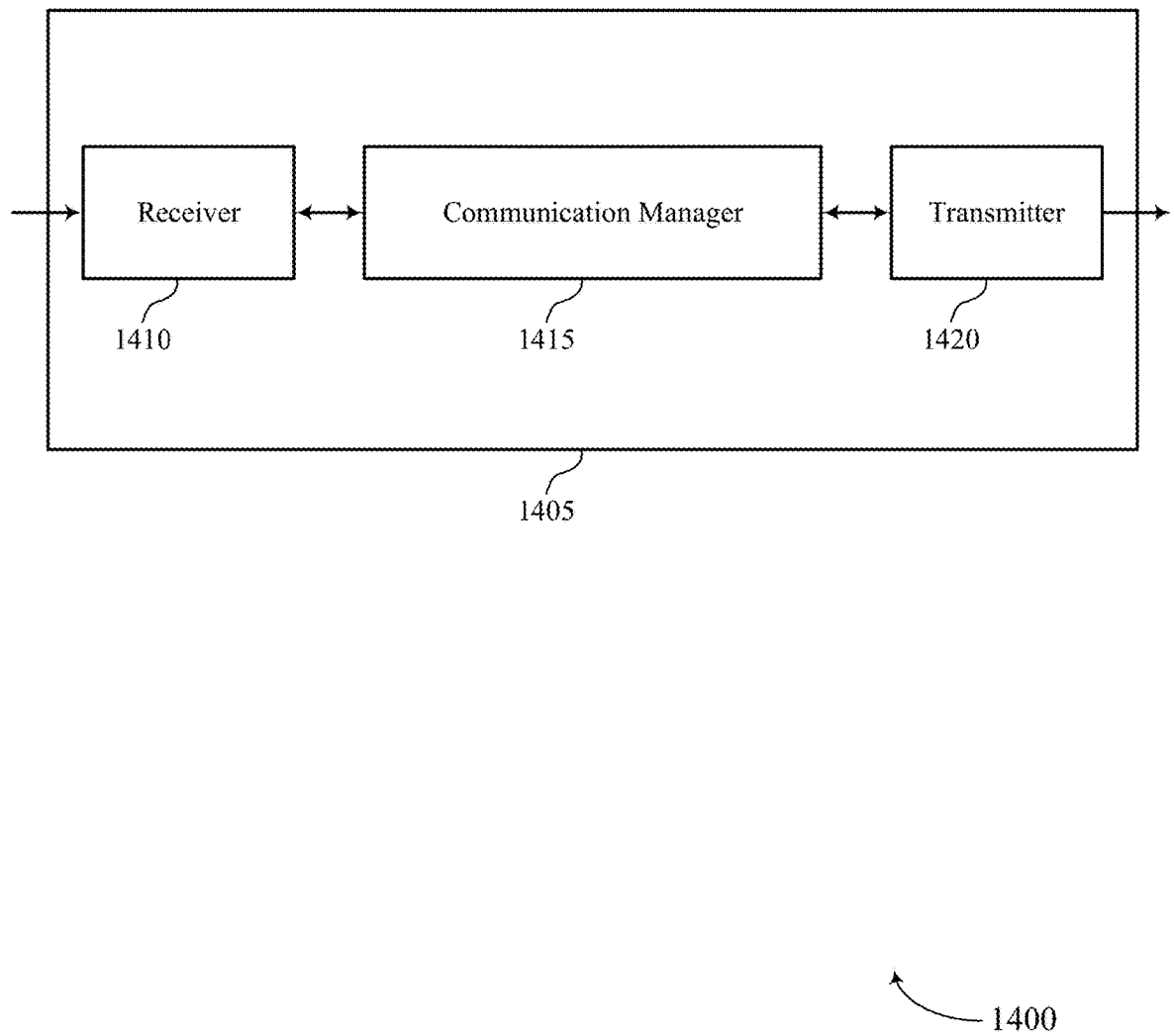
FIG. 14 shows a block diagram of devices that support rateless coding at an L2 layer in accordance with aspects of the present disclosure.

FIG. 14 shows a block diagram 1400 of a device 1405 that supports rateless coding at an L2 layer, outer coding at the PDCP layer, and the like, in accordance with aspects of the present disclosure. The device 1405 may be an example of aspects of a UE 115 or base station 105 as described herein. The device 1405 may include a receiver 1410, a communication manager 1415, and a transmitter 1420. The device 1405 may also include a processor. Each of these components may be in communication with one another (e.g., via one or more buses).

The receiver 1410 may receive information such as packets, user data, or control information associated with various information channels (e.g., control channels, data channels, and information related to rateless coding at an L2 layer, etc.). Information may be passed on to other components of the device 1405. The receiver 1410 may be an example of aspects of the transceiver as described herein. The receiver 1410 may utilize a single antenna or a set of antennas.

The communication manager 1415 may segment a PDCP SDU into a set of PDCP PDUs at a PDCP layer of the transmitting device, encode, at the PDCP layer, the set of PDCP PDUs according to one or more network coding parameters to obtain a set of encoded PDCP PDUs, the one or more network coding parameters including a rateless code, generate, for the set of encoded PDCP PDUs, a corresponding set of PDU headers, and output the set of encoded PDCP PDUs and the corresponding set of PDU headers from the PDCP layer to a lower layer of the transmitting device for transmission to one or more receiving devices.

The communication manager 1415 may also receive, at a PDCP layer of the receiving device, a set of PDCP PDUs and a corresponding set of PDCP PDU headers from a transmitting device, the set of PDCP PDUs and the corresponding set of PDCP PDU headers corresponding to a PDCP SDU, decode, at the PDCP layer, at least a subset of the set of PDCP PDUs based on one or more network coding parameters and the corresponding set of PDCP PDU headers, the one or more network coding parameters including a rateless code, generate a report based on the decoding, where the report indicates whether the PDCP SDU was obtained from the set of PDCP PDUs, and transmit the report to the transmitting device.

The communications manager 1415 may, e.g., when device 1405 is configured as a transmitting device, receive, at a PDCP layer of the transmitting device, a set of PDCP SDUs corresponding to a payload of data for transmission to one or more receiving devices, encode, at the PDCP layer, the set of PDCP SDUs according to a set of network coding parameters to obtain a set of encoded PDCP PDUs, the network coding parameters including at least a rateless code, and provide the set of encoded PDCP PDUs to a lower layer of the transmitting device for transmission to the one or more receiving devices.

The communications manager 1415 may, e.g., when device 1405 is configured as a receiving device, also receive, at a PDCP layer of the receiving device, a set of encoded PDCP PDUs from a transmitting device, decode, at the PDCP layer, the set of encoded PDCP PDUs according to a set of network coding parameters to obtain a set of PDCP SDUs corresponding to a payload of data, the set of network coding parameters including at least a rateless code, and provide the set of PDCP SDUs to an upper layer of receiving device, the upper layer being a higher layer than the PDCP layer of the receiving device.

The communications manager 1415 may transmit, to one or more receiving devices, a set of PDCP PDUs corresponding to one or more PDCP SDUs, transmit the subsequent PDCP PDU to the one or more receiving devices, determine that a polling condition at the transmitting device has been met, set, based on determining that the polling condition has been met, a polling flag within a subsequent PDCP PDU, and monitor for a report from a receiving device of the one or more receiving devices based on transmitting the subsequent PDCP PDU, the report indicating a status of the transmitted set of PDCP PDUs or the one or more PDCP SDUs.

The communications manager 1415 may also receive, at a PDCP layer of the receiving device, a set of PDCP PDUs from a transmitting device, the set of PDPC PDUs corresponding to one or more PDCP SDUs, generate, at the PDCP layer, a report indicating a status of the set of PDCP PDUs or the one or more PDCP SDUs at the receiving device, and transmit the report to the transmitting device.

In some examples, the communications manager 1415 may be implemented as an integrated circuit or chipset for a mobile device modem, and the receiver 1410 and transmitter 1420 may be implemented as analog components (e.g., amplifiers, filters, antennas) coupled with the mobile device modem to enable wireless transmission and reception over one or more bands.

The communications manage 1415 as described herein may be implemented to realize one or more potential advantages. One implementation may allow device 1405 to support ARQ procedures at the PDCP layer. Based on the techniques described herein, the communications manage 1415 may support PDCP status polling and the generating of PDCP status reports. As such, the device 1405 may decrease system latency and increase likelihood of successful receptions of packets (e.g., one or more PDCP PDUs or SDUs). In some examples, based on the decreased system latency, the device 1405 may improve user experience and increase battery life at the device 1405.

The communications manager 1415 may encode, at a PDCP layer of the transmitting device, a set of PDCP SDUs according to a set of network coding parameters to obtain a first set of PDCP PDUs, transmit, to one or more receiving devices, the first set of PDCP PDUs, receive, from a receiving device of the one or more receiving devices, a report indicating a PDCP SDU of the set of PDCP SDUs that was unsuccessfully received at the receiving device, and transmit, to the one or more receiving devices, based on the received report, a second set of PDCP PDUs corresponding to at least the PDCP SDU of the set of PDCP SDUs.

The communications manager 1415 as described herein may be implemented to realize one or more potential advantages. One implementation may allow the device 1405 to repair downlink transmissions at a PDCP layer based on feedback received from one or more devices (e.g., UEs). For example, a device 1405 may receive reports from one or more other devices that indicate successfully or unsuccessfully received PDCP SDUs and/or PDCP PDUs, and based on the reports, the device 1405 may configure a new set of PDCP PDUs to transmit to the one or more other devices to ensure successful reception of the PDCP SDUs by the one or more other devices.

Based on implementing the report and downlink transmission reparation techniques as described herein, a processor of a base station (e.g., controlling the receiver 1410, the transmitter 1420, or the transceiver as described herein) may support more reliable communications between device 1405 and one or more other devices, and decrease latency in the communications system.

The communication manager 1415 may be an example of aspects of the communication manager as described herein.

The communication manager 1415, or its sub-components, may be implemented in hardware, code (e.g., software or firmware) executed by a processor, or any combination thereof. If implemented in code executed by a processor, the functions of the communication manager 1415, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communication manager 1415, or its sub-components, may be physically located at various positions, including being distributed such that portions of functions are implemented at different physical locations by one or more physical components. In some examples, the communication manager 1415, or its sub-components, may be a separate and distinct component in accordance with various aspects of the present disclosure. In some examples, the communication manager 1415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the communication manager 1415 as described herein may be implemented to realize one or more potential advantages. One implementation may allow a transmitting or receiving device to support Layer 2 retransmission schemes without significant latency by supporting network coding at the PDCP layer. Additionally, network coding at the PDCP layer may increase reliability for communication of PDCP SDUs.

The transmitter 1420 may transmit signals generated by other components of the device 1405. In some examples, the transmitter 1420 may be collocated with a receiver 1410 in a transceiver module. For example, the transmitter 1420 may be an example of aspects of the transceiver as described herein. The transmitter 1420 may utilize a single antenna or a set of antennas.

FIGS. 15A-15D shows examples of a block diagram 1500 of a device 1505 that supports rateless coding at an L2 layer, outer coding at the PDCP layer, and the like, in accordance with aspects of the present disclosure. The device 1505 may be an example of aspects of a UE 115 and/or or a base station 105 as described herein. The device 1505 may include a receiver 1510, a communication manager 1515, and a transmitter 1555. The device 1505 may also include a processor. Each of these components may be in communication with one another (e.g., via one or more buses).

The receiver 1510 may receive information such as packets, user data, or control information associated with various information channels (e.g., control channels, data channels, and information related to rateless coding at an L2 layer, etc.). Information may be passed on to other components of the device 1505. The receiver 1510 may be an example of aspects of the transceiver as described herein. The receiver 1510 may utilize a single antenna or a set of antennas.

Turning first to block diagram 1500-*a* of FIG. 15A, the communication manager 1515 may be an example of aspects of the communication manager as described herein. The communication manager 1515 may include a PDCP SDU manager 1520*a*, a PDCP encoding manager 1525*a*, a PDCP PDU manager 1530*a*, a PDCP PDU outputting manager 1535*a*, a PDCP decoding manager 1540*a*, a PDCP SDU report manager 1545*a*, and a report transmitting manager 1550*a*.

The PDCP SDU manager 1520*a* may segment a PDCP SDU into a set of PDCP PDUs at a PDCP layer of the transmitting device. The PDCP encoding manager 1525*a* may encode, at the PDCP layer, the set of PDCP PDUs according to one or more network coding parameters to obtain a set of encoded PDCP PDUs, the one or more network coding parameters including a rateless code. The PDCP PDU manager 1530*a* may generate, for the set of encoded PDCP PDUs, a corresponding set of PDU headers. The PDCP PDU outputting manager 1535*a* may output the set of encoded PDCP PDUs and the corresponding set of PDU headers from the PDCP layer to a lower layer of the transmitting device for transmission to one or more receiving devices.

The PDCP PDU manager 1530*a* may receive, at a PDCP layer of the receiving device, a set of PDCP PDUs and a corresponding set of PDCP PDU headers from a transmitting device, the set of PDCP PDUs and the corresponding set of PDCP PDU headers corresponding to a PDCP SDU. The PDCP decoding manager 1540*a* may decode, at the PDCP layer, at least a subset of the set of PDCP PDUs based on one or more network coding parameters and the corresponding set of PDCP PDU headers, the one or more network coding parameters including a rateless code. The PDCP SDU report manager 1545*a* may generate a report based on the decoding, where the report indicates whether the PDCP SDU was obtained from the set of PDCP PDUs. The report transmitting manager 1550*a* may transmit the report to the transmitting device.

Figure 15B:
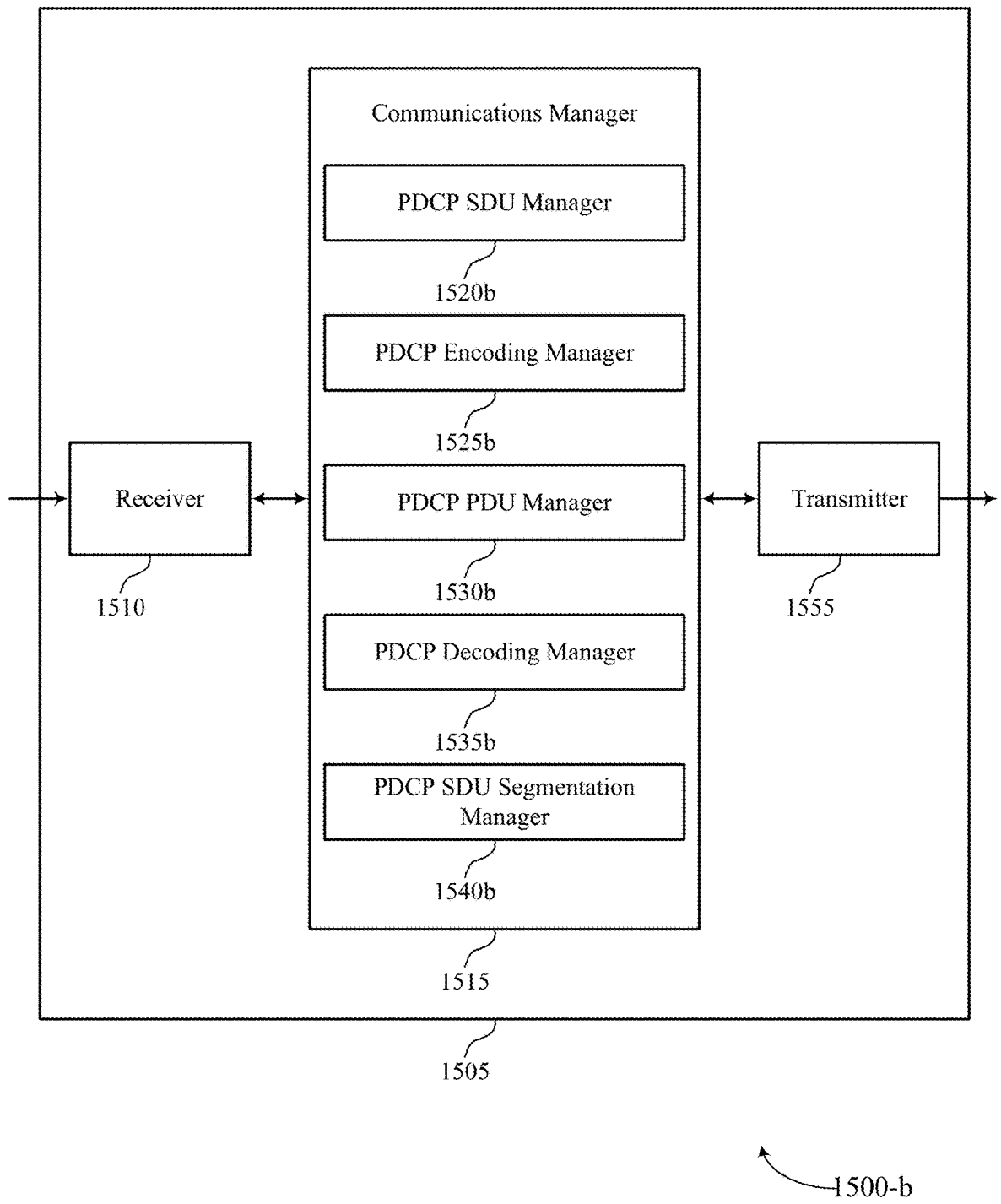

Turning next to block diagram 1500-*b* of FIG. 15B, the communications manager 1515 may be an example of aspects of the communications manager as described herein. The communications manager 1515 may include a PDCP SDU manager 1520*b*, a PDCP encoding manager 1525*b*, a PDCP PDU manager 1530*b*, a PDCP decoding manager 1535*b*, and a PDCP SDU segmentation manager 1540*b*.

The PDCP SDU manager 1520*b* may receive, at a PDCP layer of the transmitting device, a set of PDCP SDUs corresponding to a payload of data for transmission to one or more receiving devices.

The PDCP encoding manager 1525b may encode, at the PDCP layer, the set of PDCP SDUs according to a set of network coding parameters to obtain a set of encoded PDCP PDUs, the network coding parameters including at least a rateless code.

The PDCP PDU manager 1530b may provide the set of encoded PDCP PDUs to a lower layer of the transmitting device for transmission to the one or more receiving devices.

The PDCP PDU manager 1530b may receive, at a PDCP layer of the receiving device, a set of encoded PDCP PDUs from a transmitting device.

The PDCP decoding manager 1535b may decode, at the PDCP layer, the set of encoded PDCP PDUs according to a set of network coding parameters to obtain a set of PDCP SDUs corresponding to a payload of data, the set of network coding parameters including at least a rateless code.

The PDCP SDU segmentation manager 1540b may provide the set of PDCP SDUs to an upper layer of receiving device, the upper layer being a higher layer than the PDCP layer of the receiving device.

Turning next to block diagram 1500-c of FIG. 15C, the communications manager 1515 may be an example of aspects of the communications manager as described herein. The communications manager 1515 may include a PDU transmitter 1520c, a polling condition manager 1525c, a polling flag component 1530c, a report monitor 1535c, a PDU receiver 1540c, a report generator 1545c, and a report transmitter 1550c.

The PDU transmitter 1520c may transmit, to one or more receiving devices, a set of PDCP PDUs corresponding to one or more PDCP SDUs and transmit the subsequent PDCP PDU to the one or more receiving devices.

The polling condition manager 1525c may determine that a polling condition at the transmitting device has been met.

The polling flag component 1530c may set, based on determining that the polling condition has been met, a polling flag within a subsequent PDCP PDU.

The report monitor 1535c may monitor for a report from a receiving device of the one or more receiving devices based on transmitting the subsequent PDCP PDU, the report indicating a status of the transmitted set of PDCP PDUs or the one or more PDCP SDUs.

The PDU receiver 1540c may receive, at a PDCP layer of the receiving device, a set of PDCP PDUs from a transmitting device, the set of PDPC PDUs corresponding to one or more PDCP SDUs.

The report generator 1545c may generate, at the PDCP layer, a report indicating a status of the set of PDCP PDUs or the one or more PDCP SDUs at the receiving device.

The report transmitter 1550c may transmit the report to the transmitting device.

Turning next to block diagram 1500-d of FIG. 15D, he communications manager 1515 may be an example of aspects of the communications manager as described herein. The communications manager 1515 may include a SDU encoder 1520d, a PDU transmitter 1525d, a report receiver 1530d, and a retransmission component 1535d.

The SDU encoder 1520d may encode, at a PDCP layer of the transmitting device, a set of PDCP SDUs according to a set of network coding parameters to obtain a first set of PDCP PDUs. The PDU transmitter 1525d may transmit, to one or more receiving devices, the first set of PDCP PDUs. The report receiver 1530d may receive, from a receiving device of the one or more receiving devices, a report indicating a PDCP SDU of the set of PDCP SDUs that was unsuccessfully received at the receiving device. The retransmission component 1535d may transmit, to the one or more receiving devices, based on the received report, a second set of PDCP PDUs corresponding to at least the PDCP SDU of the set of PDCP SDUs.

The transmitter 1555 may transmit signals generated by other components of the device 1505. In some examples, the transmitter 1555 may be collocated with a receiver 1510 in a transceiver module. For example, the transmitter 1555 may be an example of aspects of the transceiver as described herein. The transmitter 1555 may utilize a single antenna or a set of antennas.

FIGS. 16A-16D show examples of a block diagram 1600 of a communication manager 1605 that supports rateless coding at an L2 layer, outer coding at the PDCP layer, and the like, in accordance with aspects of the present disclosure. The communication manager 1605 may be an example of aspects of other communication managers described herein.

Figure 16A:
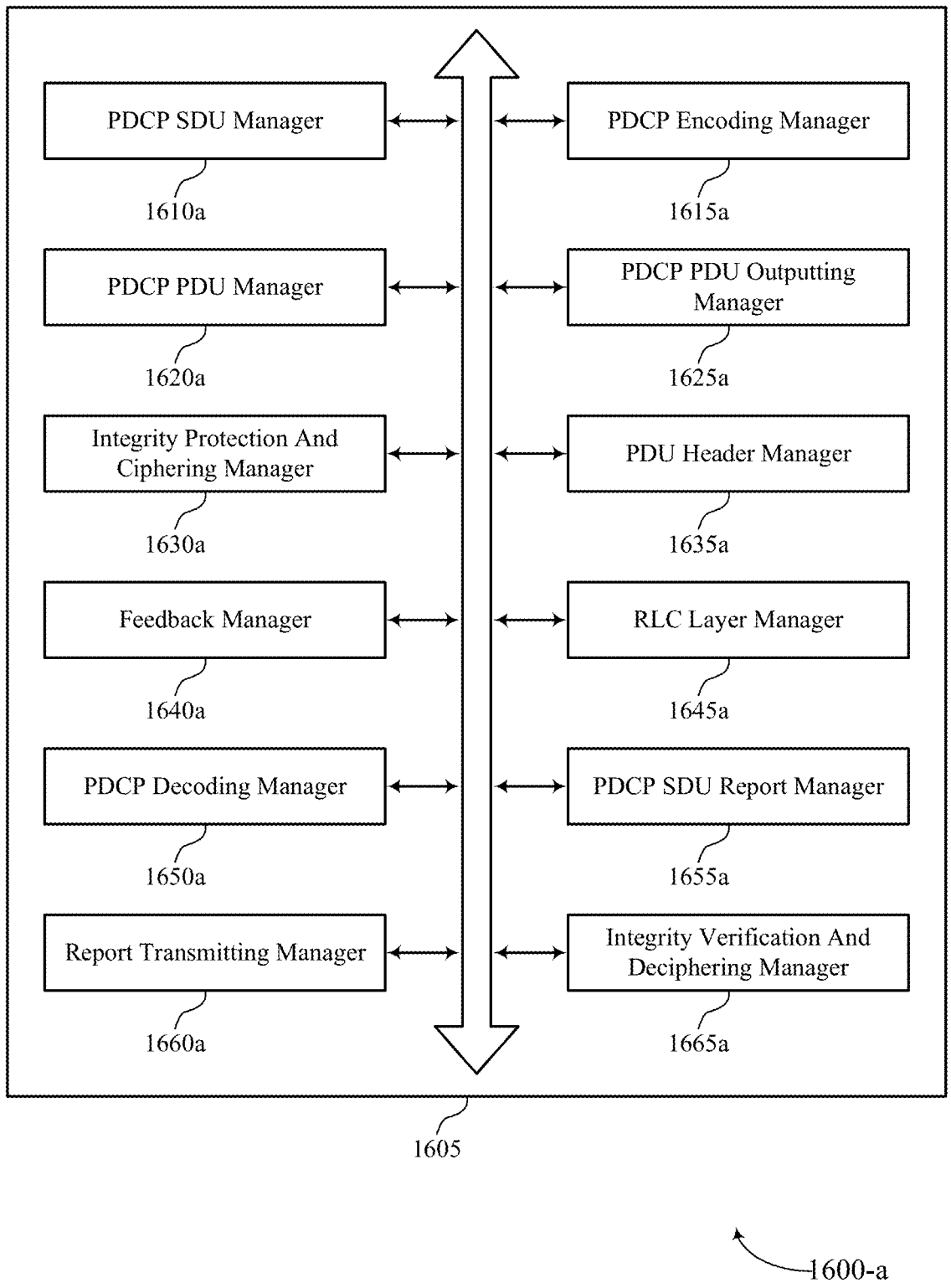

Turning first to block diagram 1600-a of FIG. 16A, the communication manager 1605 may include a PDCP SDU manager 1610a, a PDCP encoding manager 1615a, a PDCP PDU manager 1620a, a PDCP PDU outputting manager 1625a, an integrity protection and ciphering manager 1630a, a PDU header manager 1635a, a feedback manager 1640a, a RLC layer manager 1645a, a PDCP decoding manager 1650a, a PDCP SDU report manager 1655a, a report transmitting manager 1660a, and an integrity verification and deciphering manager 1665a. Each of these modules may communicate, directly or indirectly, with one another (e.g., via one or more buses).

The PDCP SDU manager 1610a may segment a PDCP SDU into a set of PDCP PDUs at a PDCP layer of the transmitting device. The PDCP encoding manager 1615a may encode, at the PDCP layer, the set of PDCP PDUs according to one or more network coding parameters to obtain a set of encoded PDCP PDUs, the one or more network coding parameters including a rateless code. In some examples, encode the set of PDCP PDUs includes encoding the set of source PDCP PDUs to obtain a set of encoded source PDCP PDUs and a set of encoded parity PDCP PDUs. In some examples, the PDCP encoding manager 1615a may receive an indication of the minimum code rate for the set of encoded PDCP PDUs via radio resource control signaling. In some cases, the set of PDCP PDUs includes a set of source PDCP PDUs.

The PDCP PDU manager 1620a may generate, for the set of encoded PDCP PDUs, a corresponding set of PDU headers. In some examples, the PDCP PDU manager 1620a may receive, at a PDCP layer of the receiving device, a set of PDCP PDUs and a corresponding set of PDCP PDU headers from a transmitting device, the set of PDCP PDUs and the corresponding set of PDCP PDU headers corresponding to a PDCP SDU. In some examples, the PDCP PDU manager 1620a may store the PDCP SDU or the set of encoded PDCP PDUs in a retransmission buffer implemented at the PDCP layer. The PDCP PDU outputting manager 1625a may output the set of encoded PDCP PDUs and the corresponding set of PDU headers from the PDCP layer to a lower layer of the transmitting device for transmission to one or more receiving devices.

The PDCP decoding manager 1650a may decode, at the PDCP layer, at least a subset of the set of PDCP PDUs based on one or more network coding parameters and the corresponding set of PDCP PDU headers, the one or more network coding parameters including a rateless code. In some examples, the PDCP decoding manager 1650a may determine that at least a minimum quantity of PDCP PDUs of the set of PDCP PDUs has been received, where the decoding is based on determining that at least the minimum quantity of PDCP PDUs has been received. In some examples, the PDCP decoding manager 1650a may receive an indication of the minimum quantity of PDCP PDUs in the set of PDCP PDUs via radio resource control signaling.

In some examples, the PDCP decoding manager 1650a may obtain the PDCP SDU from the subset of the set of PDCP PDUs. In some examples, the PDCP decoding manager 1650a may refrain from decoding a remaining subset of the set of PDCP PDUs based on obtaining the PDCP SDU. In some examples, the PDCP decoding manager 1650a may receive a set of source PDCP PDUs and a set of parity PDCP PDUs.

The PDCP SDU report manager 1655a may generate a report based on the decoding, where the report indicates whether the PDCP SDU was obtained from the set of PDCP PDUs. In some examples, the PDCP SDU report manager 1655a may indicate, to the transmitting device, a quantity of PDCP PDUs used by the receiving device to obtain the PDCP SDU. In some examples, the PDCP SDU report manager 1655a may determine that the PDCP SDU cannot be obtained from the set of PDCP PDUs, where the report indicates that the receiving device was unable to obtain the PDCP SDU. In some examples, the PDCP SDU report manager 1655a may monitor for a retransmission of the set of PDCP PDUs based on transmitting the report.

In some examples, the PDCP SDU report manager 1655a may identify, within each PDU header of the set of PDU headers, a field indicating an index for an associated PDCP PDU corresponding to the PDCP SDU, where the set of PDCP PDUs are decoded based on an ordering corresponding to the index. In some cases, the PDCP SDU is included in a set of PDCP SDUs. In some cases, the receiving device is unable to obtain one or more PDCP SDUs in the set of PDCP SDUs.

In some cases, the report includes a sequence number of the PDCP SDU based on the PDCP SDU having a lowest sequence number among the one or more PDCP SDUs that the receiving device is unable to obtain. In some cases, the report further includes a bitmap indicating, for each PDCP SDU in a set of PDCP SDUs having a sequence number greater than the sequence number of the PDCP SDU, whether the receiving device was able to successfully obtain or was not able to obtain a respective PDCP SDU. The report transmitting manager 1660a may transmit the report to the transmitting device.

The integrity protection and ciphering manager 1630a may perform, at the PDCP layer and before the encoding, an integrity protection and ciphering function on the PDCP SDU. The PDU header manager 1635a may set, within each PDU header of the set of PDU headers, a field indicating an index for an associated encoded PDCP PDU corresponding to the PDCP SDU, where the index corresponds to an ordering for the set of encoded PDUs.

In some examples, the PDU header manager 1635a may set, within a PDU header of the set of PDU headers, a flag indicating that an associated encoded PDCP PDU is a last encoded PDCP PDU of the set of encoded PDUs corresponding to the PDCP SDU. In some examples, the PDU header manager 1635a may set, within each PDU header of the set of PDU headers, a repair field indicating whether an associated encoded PDCP PDU is a repaired PDCP PDU.

In some examples, the PDU header manager 1635a may identify, within a PDU header of the set of PDU headers, a flag indicating that an associated PDCP PDU is a last PDCP PDU of the set of PDCP PDUs corresponding to the PDCP SDU. In some examples, the PDU header manager 1635a may identify, within each PDU header of the set of PDU headers, a repair field indicating whether an associated PDCP PDU is a repaired PDCP PDU.

The feedback manager 1640a may receive, from a receiving device of the one or more receiving devices, feedback for the set of encoded PDCP PDUs indicating that the receiving device was unable to obtain the PDCP SDU. In some examples, the feedback manager 1640a may retrieve, based on the feedback, the set of encoded PDCP PDUs from a retransmission buffer implemented at the PDCP layer. In some examples, the feedback manager 1640a may retransmit the set of encoded PDCP PDUs to the one or more receiving devices based on the retrieving. In some examples, the feedback manager 1640a may retrieve, based on the feedback, the PDCP SDU from a retransmission buffer implemented at the PDCP layer.

In some examples, the feedback manager 1640a may encode the set of PDCP PDUs according to the one or more network coding parameters to obtain a set of re-encoded PDCP PDUs based on the retrieving. In some examples, the feedback manager 1640a may transmit the set of re-encoded PDCP PDUs to the one or more receiving devices. In some examples, the feedback manager 1640a may receive, from a receiving device of the one or more receiving devices, feedback for the set of encoded PDCP PDUs indicating that the receiving device was able to obtain the PDCP SDU. In some examples, the feedback manager 1640a may receive, from the receiving device, an indication of a quantity of encoded PDCP PDUs used by the receiving device to obtain the PDCP SDU. In some examples, the feedback manager 1640a may adjust a code rate of the one or more network coding parameters based on the indicated quantity of encoded PDCP PDUs.

The RLC layer manager 1645a may configure a radio link control layer at the transmitting device to operate a transparent mode or an unacknowledged mode, where the encoding at the PDCP layer is based on the configuring. In some examples, the RLC layer manager 1645a may configure a radio link control layer at the receiving device for a transparent mode or an unacknowledged mode, where the decoding at the PDCP layer is based on the configuring. The integrity verification and deciphering manager 1665a may perform, at the PDCP layer after decoding at least the subset of the set of PDCP PDUs and obtaining the PDCP SDU, an integrity verification and deciphering function on the PDCP SDU.

Turning next to block diagram 1600-b of FIG. 16B, the communications manager 1605 may include a PDCP SDU manager 1610b, a PDCP encoding manager 1615b, a PDCP PDU manager 1620b, an integrity protection and ciphering manager 1625b, a PDCP ARQ manager 1630b, a count manager 1635b, a PDCP SDU segmentation manager 1640b, a PDCP decoding manager 1645b, a PDCP reassembly manager 1650b, and a PDCP sub-PDU count manager 1655b. Each of these modules may communicate, directly or indirectly, with one another (e.g., via one or more buses).

The PDCP SDU manager 1610b may receive, at a PDCP layer of the transmitting device, a set of PDCP SDUs corresponding to a payload of data for transmission to one or more receiving devices.

The PDCP encoding manager 1615b may encode, at the PDCP layer, the set of PDCP SDUs according to a set of network coding parameters to obtain a set of encoded PDCP PDUs, the network coding parameters including at least a rateless code.

The PDCP PDU manager 1620b may provide the set of encoded PDCP PDUs to a lower layer of the transmitting device for transmission to the one or more receiving devices.

In some examples, the PDCP PDU manager 1620b may receive, at a PDCP layer of the receiving device, a set of encoded PDCP PDUs from a transmitting device.

The PDCP SDU segmentation manager 1640b may provide the set of PDCP SDUs to an upper layer of receiving device, the upper layer being a higher layer than the PDCP layer of the receiving device. In some examples, the PDCP SDU segmentation manager 1640b may segment a PDCP SDU into a set of sub-PDUs, each sub-PDU including a same size. In some examples, the PDCP SDU segmentation manager 1640b may encode the set of sub-PDUs using the rateless code to obtain a set of source sub-PDUs. In some examples, the PDCP SDU segmentation manager 1640b may encode at least a subset of the sub-PDUs using the rateless code to obtain a set of parity sub-PDUs, the set of source sub-PDUs and the set of parity sub-PDUs collectively including a PDCP PDU for transmission to the one or more receiving devices. In some examples, the PDCP SDU segmentation manager 1640b may receive a report indicating a quantity of sub-PDUs the receiving device decoded and used to attempt to reassemble the PDCP SDU.

In some examples, the PDCP SDU segmentation manager 1640b may adjust a code rate of the encoding using the rateless code based on the report. In some examples, the PDCP SDU segmentation manager 1640b may receive a RRC configuration signal indicating a minimum code rate for the encoding using the rateless code. In some examples, the PDCP SDU segmentation manager 1640b may adjust the code rate for the encoding using the rateless code based on the RRC configuration signal. In some examples, the PDCP SDU segmentation manager 1640b may add a header for the PDCP PDU. In some cases, the header indicates a quantity of sub-PDUs included in the PDCP PDU, the PDCP PDU including the set of source sub-PDUs and the set of parity sub-PDUs.

The PDCP decoding manager 1645b may decode, at the PDCP layer, the set of encoded PDCP PDUs according to a set of network coding parameters to obtain a set of PDCP SDUs corresponding to a payload of data, the set of network coding parameters including at least a rateless code.

The integrity protection and ciphering manager 1625b may perform, at the PDCP layer and after the encoding, an integrity protection and ciphering function on the set of encoded PDCP PDUs. In some examples, the integrity protection and ciphering manager 1625b may perform, at the PDCP layer and before the decoding, an integrity verification and deciphering function on the set of encoded PDCP PDUs.

The PDCP ARQ manager 1630b may determine, based on a retransmission buffer implemented at the PDCP layer, that a report for a previously transmitted encoded PDCP PDU includes a negative acknowledgement for the encoded PDCP PDU. In some examples, the PDCP ARQ manager 1630b may determine that at least one PDCP SDU in the set of PDCP SDUs correspond to the previously transmitted encoded PDCP PDU. In some examples, the PDCP ARQ manager 1630b may encode, based on the negative acknowledgment, the PDCP SDU as a repaired PDCP SDU. In some examples, the PDCP ARQ manager 1630b may determine that at least one of the encoded PDCP PDUs was unable to be successfully received and decoded. In some examples, the PDCP ARQ manager 1630b may transmit a report indicating that the at least one encoded PDCP PDU was unable to be successfully received and decoded. In some cases, the report indicates a sequence number of a next encoded PDCP PDU in the set of encoded PDCP PDUs that has yet to be received. In some cases, the report includes a bitmap indicating, for each encoded PDCP PDU in the set of encoded PDCP PDUs having a sequence number greater than the sequence number of the next encoded PDCP PDU, whether the encoded PDCP PDU was successfully received and decoded. In some cases, the report indicates a quantity of sub-PDUs the receiving device decoded and used to attempt to obtain the at least one encoded PDCP PDU.

The count manager 1635b may associate, for each PDCP SDU in the set of PDCP SDUs, at the PDCP layer and before the encoding, a count value corresponding to a next transmission field to a PDCP SDU. In some examples, the count manager 1635b may perform, at the PDCP layer and after the encoding, an integrity protection and ciphering function on the encoded PDCP PDU. In some examples, the count manager 1635b may provide the encoded PDCP PDU to the lower layer for transmission to the one or more receiving devices. The PDCP reassembly manager 1650b may determine, for each encoded PDCP PDU of the set of encoded PDCP PDUs, that a threshold quantity of sub-PDUs of the encoded PDCP PDU has been received, where attempting to decode the encoded PDCP PDU is in response to determining that the threshold quantity of sub-PDUs has been received. In some examples, the PDCP reassembly manager 1650b may receive a set of sub-PDUs of the encoded PDCP PDU prior to receiving a header of the encoded PDCP PDU.

In some examples, the PDCP reassembly manager 1650b may rearrange the sub-PDUs in the set of sub-PDUs according to a decoding order including the header first followed by the sub-PDUs of the set of sub-PDUs. In some examples, the PDCP reassembly manager 1650b may receive a RRC signal indicating the threshold quantity of sub-PDUs of the encoded PDCP PDU that are to be received before the receiving device attempts to decode the encoded PDCP PDU. In some examples, the PDCP reassembly manager 1650b may identify, based on the header, a total quantity of sub-PDUs corresponding to the encoded PDCP PDU.

The PDCP sub-PDU count manager 1655b may determine, for each encoded PDCP PDU of the set of encoded PDCP PDUs, that each sub-PDU of the encoded PDCP PDU has been received.

Turning next to block diagram 1600-c of FIG. 16C, the communications manager 1605 may include a PDU transmitter 1610c, a polling condition manager 1615c, a polling flag component 1620c, a report monitor 1625c, an indication receiver 1630c, a timer component 1635c, a code rate manager 1640c, a report decoder 1645c, a PDU receiver 1650c, a report generator 1655c, a report transmitter 1660c, a timer manager 1665c, and a report type manager 1670c. Each of these modules may communicate, directly or indirectly, with one another (e.g., via one or more buses).

The PDU transmitter 1610c may transmit, to one or more receiving devices, a set of PDCP PDUs corresponding to one or more PDCP SDUs. In some examples, the PDU transmitter 1610c may transmit the subsequent PDCP PDU to the one or more receiving devices. In some cases, a header of the subsequent PDCP PDU includes the polling flag.

The polling condition manager 1615c may determine that a polling condition at the transmitting device has been met. In some examples, the polling condition manager 1615c may determine that a quantity of PDCP PDUs included in the set of PDCP PDUs satisfies a threshold. In some examples, the polling condition manager 1615c may determine that a quantity of data included in the set of PDCP PDUs satisfies a threshold.

The polling flag component 1620c may set, based on determining that the polling condition has been met, a polling flag within a subsequent PDCP PDU.

The report monitor 1625c may monitor for a report from a receiving device of the one or more receiving devices based on transmitting the subsequent PDCP PDU, the report indicating a status of the transmitted set of PDCP PDUs or the one or more PDCP SDUs. In some examples, receiving the report based on the monitoring, where the report includes an indication of a quantity of PDCP PDUs or PDCP sub-PDUs used by the receiving device to obtain a PDCP SDU. In some examples, receiving the report based on the monitoring, where the report includes an indication of an average quantity of PDCP PDUs or PDCP sub-PDUs used by the receiving device to obtain each PDCP SDU of a set of PDCP SDUs. In some examples, receiving the report based on the monitoring, where the report includes an indication of a SN for a PDCP SDU of the one or more PDCP SDUs, the indication of the SN indicating that the receiving device was able to obtain each of the one or more PDCP SDUs having a SN lower than the indicated SN. In some examples, receiving the report based on the monitoring, where the report includes an indication of a report type for the report, the indicated report type one of a set of report types. In some cases, the report further includes a bitmap indicating, for each PDCP SDU of the one or more PDCP SDUs having a SN greater than the indicated SN, whether the receiving device was successful or unsuccessful in obtaining a respective PDCP SDU.

The PDU receiver 1650c may receive, at a PDCP layer of the receiving device, a set of PDCP PDUs from a transmitting device, the set of PDPC PDUs corresponding to one or more PDCP SDUs. In some examples, the PDU receiver 1650c may receive, from the transmitting device after receiving the set of PDCP PDUs, a subsequent PDCP PDU that includes a polling flag, where generating the report is based on the polling flag. In some examples, the PDU receiver 1650c may receive a PDCP PDU of the set of PDCP PDUs at an empty buffer of the receiving device, where initiating the timer is based on receiving the PDU at the empty buffer. In some cases, the receiving device is unable to obtain a PDCP SDU of the one or more PDCP SDUs.

The report generator 1655c may generate, at the PDCP layer, a report indicating a status of the set of PDCP PDUs or the one or more PDCP SDUs at the receiving device. In some cases, the report includes a SN of the PDCP SDU based on the PDCP SDU having a lowest SN among a subset of one or more PDCP SDU that the receiving device is unable to obtain among the one or more PDCP SDUs. In some cases, the report further includes a bitmap indicating, for each PDCP SDU among the one or more PDCP SDUs having a SN greater than the SN of the PDCP SDU, whether the receiving device was successful or unsuccessful in obtaining a respective PDCP SDU. In some cases, the report includes an indication of a quantity of PDCP PDUs or PDCP sub-PDUs used by the receiving device to obtain a PDCP SDU. In some cases, the report includes an indication of an average quantity of PDCP PDUs or PDCP sub-PDUs used by the receiving device to obtain each PDCP SDU of a set of PDCP SDUs.

The report transmitter 1660c may transmit the report to the transmitting device. In some examples, the report transmitter 1660c may transmit, to the transmitting device before transmitting the report, a prior report indicating a status of a prior set of PDCP PDUs, where initiating the timer is based on transmitting the prior report.

The indication receiver 1630c may receive an indication of the threshold via radio resource control signaling. In some examples, the indication receiver 1630c may receive an indication to enable or disable the timer via radio resource control signaling. In some examples, the indication receiver 1630c may receive an indication of a duration for the timer via radio resource control signaling. In some cases, the indication is an indication to disable the timer, and where the indication to disable the timer includes an indication of an infinite duration for the timer. The timer component 1635c may initiate a timer based on transmitting a prior PDCP PDU that includes a prior polling flag, where determining that the polling condition has been met includes identifying an expiration of the timer. In some examples, the timer component 1635c may enable or disabling the timer based on the indication. In some examples, the timer component 1635c may configure the duration for the timer based on the indication.

The code rate manager 1640c may adjust a code rate for encoding PDCP SDUs at the PDCP layer based on the indicated quantity of PDCP PDUs or PDCP sub-PDUs. In some examples, the code rate manager 1640c may adjust a code rate for encoding PDCP SDUs at the PDCP layer based on the indicated average quantity of PDCP PDUs or PDCP sub-PDUs.

The report decoder 1645c may decode the report based on least in part on the indication of the report type for the report. In some cases, the report type is a first report type of the set of report types, the report including an indication of a SN for a PDCP SDU of the one or more PDCP SDUs, the indication of the SN indicating that the receiving device was able to obtain each of the one or more PDCP SDUs having a SN lower than the indicated SN. In some cases, the report type is a second report type of the set of report types, the report including the indication of the SN for the PDCP SDU of the one or more PDCP SDUs, and the report further including at least one of an indication of a quantity of PDCP PDUs or PDCP sub-PDUs used by the receiving device to obtain a PDCP SDU or an indication of an average quantity of PDCP PDUs or PDCP sub-PDUs used by the receiving device to obtain each PDCP SDU of a set of PDCP SDUs.

In some cases, the report type is a third report type of the set of report types, the report including the indication of the SN for the PDCP SDU of the one or more PDCP SDUs, the report further including at least one of the indication of a quantity of PDCP PDUs or PDCP sub-PDUs used by the receiving device to obtain a PDCP SDU or the indication of the average quantity of PDCP PDUs or PDCP sub-PDUs used by the receiving device to obtain each PDCP SDU of the set of PDCP SDUs, and the report further including a bitmap indicating, for each PDCP SDU of the one or more PDCP SDUs having a SN greater than the indicated SN, whether the receiving device was successful or unsuccessful in obtaining a respective PDCP SDU.

The timer manager 1665c may initiate a timer at the receiving device, where generating the report is based on an expiration of the timer. In some examples, the timer manager 1665 may receive an indication to enable or disable the timer via radio resource control signaling. In some examples, the timer manager 1665c may enable or disabling the timer based on the indication. In some examples, the timer manager 1665c may receive an indication of a duration for the timer via radio resource control signaling. In some examples, the timer manager 1665c may configure the duration for the timer based on the indication. In some cases, the indication is an indication to disable the timer, and where the indication to disable the timer includes an indication of an infinite duration for the timer.

The report type manager 1670c may receive, via radio resource control signaling, an indication of a report type for the receiving device to use to indicate a status of PDCP PDUs at the receiving device, the indicated report type one of a set of report types, where the report is of the indicated report type. In some cases, the report indicates the report type to the transmitting device. In some cases, the report type is a first report type of the set of report types, the report including a SN of the PDCP SDU based on the PDCP SDU having a lowest SN among a subset of one or more PDCP SDU that the receiving device is unable to obtain among the one or more PDCP SDUs.

In some cases, the report type is a second report type of the set of report types, the report including the SN of the PDCP SDU, and the report further including at least one of an indication of a quantity of PDCP PDUs or PDCP sub-PDUs used by the receiving device to obtain a PDCP SDU or an indication of an average quantity of PDCP PDUs or PDCP sub-PDUs used by the receiving device to obtain each PDCP SDU of a set of PDCP SDUs. In some cases, the report type is a third report type of the set of report types, the report including the indication of the SN for the PDCP SDU of the one or more PDCP SDUs, the report further including at least one of the indication of the quantity of PDCP PDUs or PDCP sub-PDUs used by the receiving device to obtain the PDCP SDU or the indication of the average quantity of PDCP PDUs or PDCP sub-PDUs used by the receiving device to obtain each PDCP SDU of the set of PDCP SDUs, and the report further including a bitmap indicating, for each PDCP SDU among the one or more PDCP SDUs having a SN greater than the SN of the PDCP SDU, whether the receiving device was successful or unsuccessful in receiving a respective PDCP SDU.

Figure 16D:
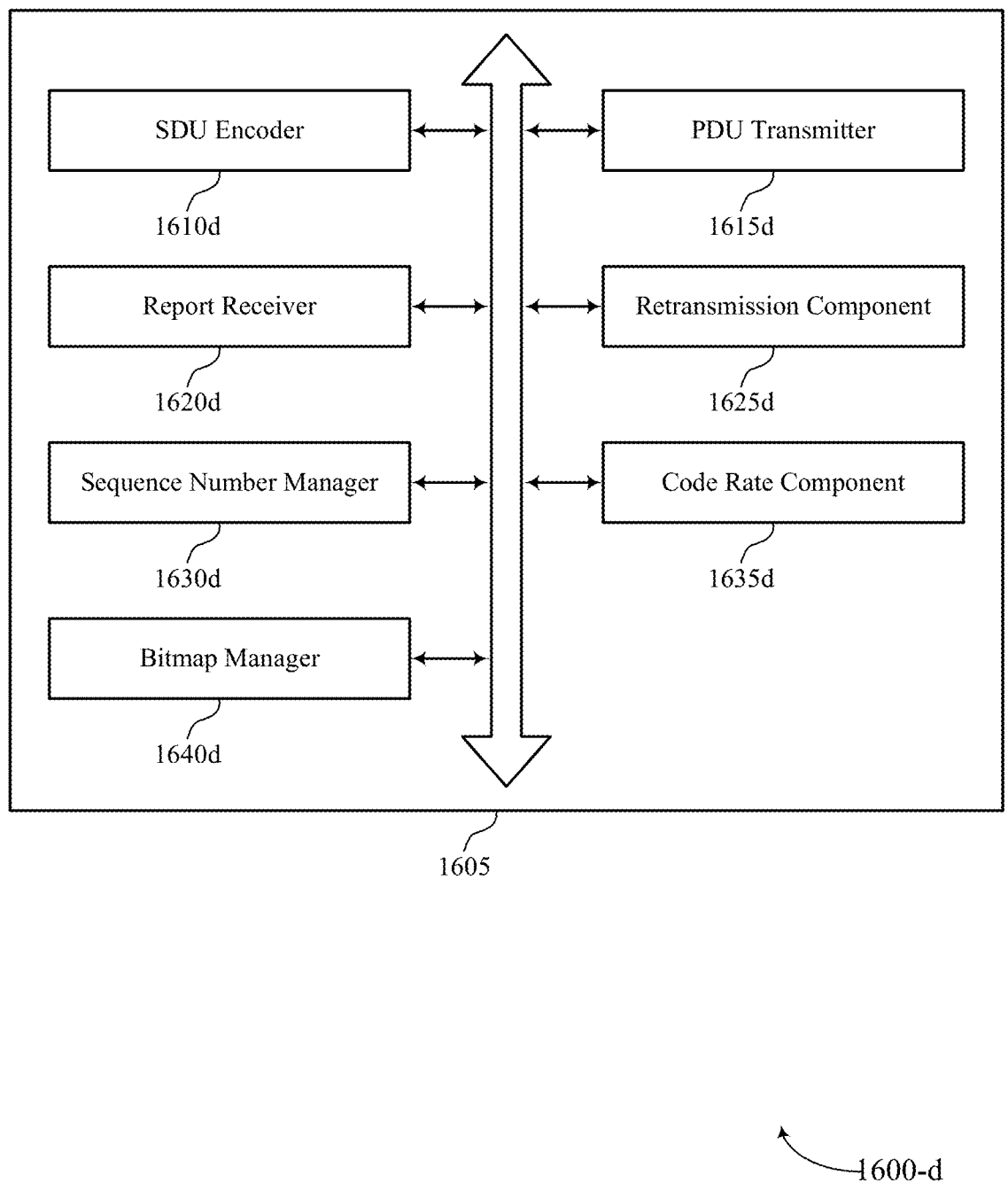

Turning next to block diagram 1600-d of FIG. 16D, the communications manager 1605 may include a SDU encoder 1610d, a PDU transmitter 1615d, a report receiver 1620d, a retransmission component 1625d, a sequence number manager 1630d, a code rate component 1635d, and a bitmap manager 1640d. Each of these modules may communicate, directly or indirectly, with one another (e.g., via one or more buses).

The SDU encoder 1610d may encode, at a PDCP layer of the transmitting device, a set of PDCP SDUs according to a set of network coding parameters to obtain a first set of PDCP PDUs. The PDU transmitter 1615d may transmit, to one or more receiving devices, the first set of PDCP PDUs. In some examples, the report receiver 1620d may receive, from a second receiving device of the one or more receiving devices, a second report indicating a second PDCP SDU of the set of PDCP SDUs that was unsuccessfully received at the second receiving device. The retransmission component 1625d may transmit, to the one or more receiving devices, based on the received report, a second set of PDCP PDUs corresponding to at least the PDCP SDU of the set of PDCP SDUs.

The report receiver 1620d may receive, from a receiving device of the one or more receiving devices, a report indicating a PDCP SDU of the set of PDCP SDUs that was unsuccessfully received at the receiving device. The sequence number manager 1630d may determine an earliest PDCP SDU between the PDCP SDU and the second PDCP SDU based on respective sequence numbers associated with the PDCP SDU and the second PDCP SDU, where at least some of the second set of PDCP PDUs correspond to the earliest PDCP SDU based on the determining.

In some cases, the second set of PDCP PDUs further corresponds to each PDCP SDU between the earliest PDCP SDU and each PDCP SDU of the set of PDCP SDUs having a sequence number greater than the earliest PDCP SDU. In some cases, the report includes a sequence number associated with the PDCP SDU and the second report includes a sequence number associated with the second PDCP SDU.

In some cases, the report and the second report each include an indication of a quantity of PDCP PDUs or PDCP sub-PDUs used by the respective receiving device to obtain a PDCP SDU of the set of PDCP SDUs and the code rate component 1635d may adjust a code rate for encoding PDCP SDUs at the PDCP layer based on the indication of the quantity of PDCP PDUs.

In some cases, the report and the second report each includes an indication of an average quantity of PDCP PDUs or PDCP sub-PDUs used by the respective receiving device to obtain one or more PDCP SDUs of the set of PDCP SDUs and the code rate component 1635 may adjust a code rate for encoding PDCP SDUs at the PDCP layer based on the indication of the average quantity of PDCP PDUs.

In some cases, the report and the second report each includes a bitmap indicating, for each PDCP SDUs of the set of PDCP SDUs having a sequence number greater than the respective indicated sequence number, whether the respective receiving device was successful or unsuccessful in obtaining a respective PDCP SDU. The bitmap manager 1640d may determine the second set of PDCP PDUs based on respective bitmaps of the report and the second report, the second set of PDCP PDUs corresponding to the earliest PDCP SDU and one or more PDCP SDUs unsuccessfully received by at least one of the receiving device and the second receiving device.

In some examples, the SDU encoder 1610d may re-encode at least a subset of the set of PDCP SDUs to obtain the second set of PDCP PDUs based on the report, or the second report, or both. In some examples, the SDU encoder 1610d may encode the set of PDCP SDUs using a rateless code. In some cases, the report includes a sequence number associated with the PDCP SDU. In some cases, each PDCP PDU in the second set of PDCP PDUs includes a field indicating whether the PDCP PDU is a retransmitted PDCP PDU.

Figure 17:
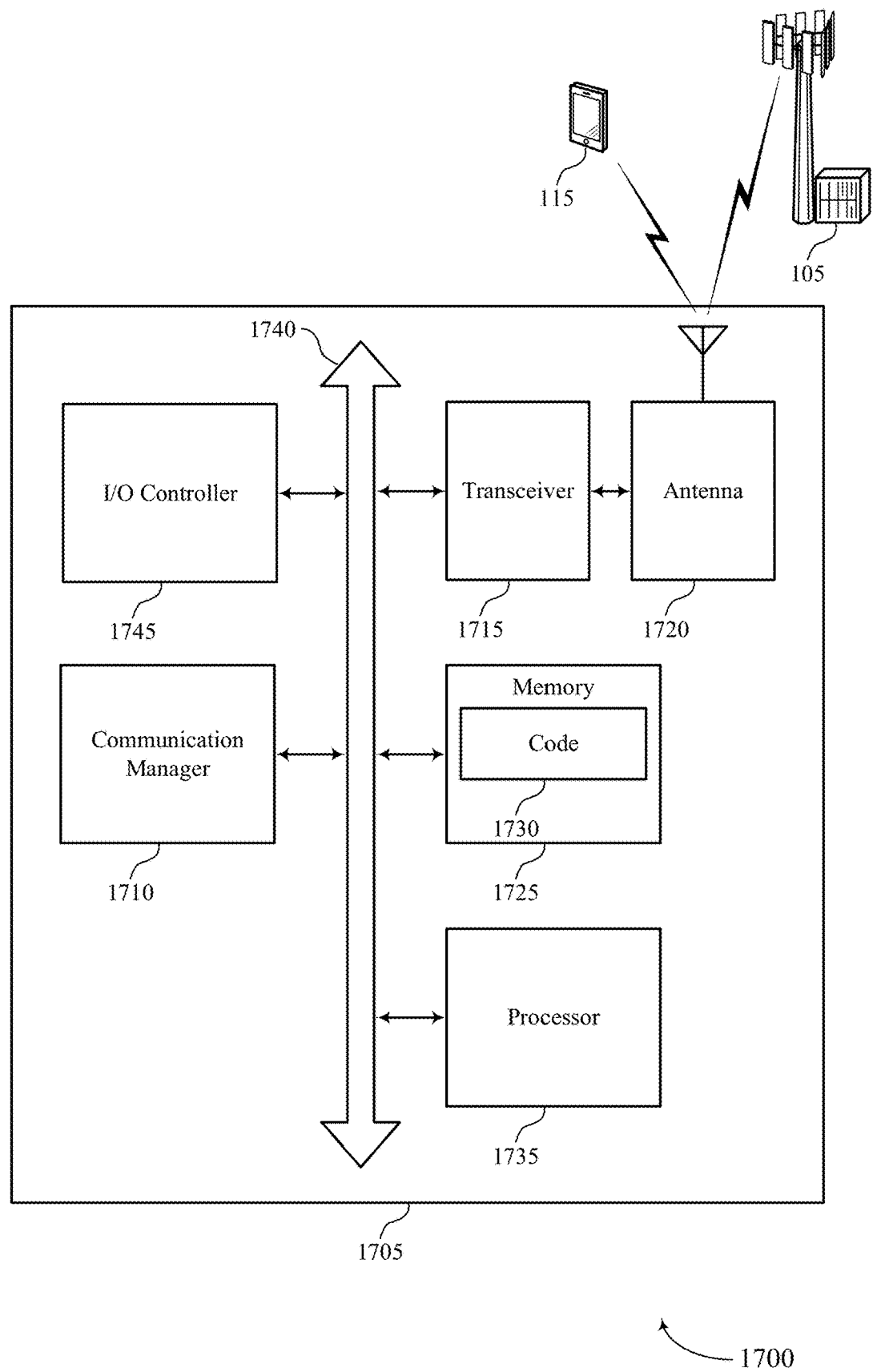
FIG. 17 shows a diagram of a system including a user equipment (UE) that supports rateless coding at an L2 layer in accordance with aspects of the present disclosure.

FIG. 17 shows a diagram of a system 1700 including a device 1705 that supports rateless coding at an L2 layer, outer coding at the PDCP layer, and the like, in accordance with aspects of the present disclosure. The device 1705 may be an example of or include the components of other devices described herein. The device 1705 may include components for bi-directional voice and data communications including components for transmitting and receiving communications, including a communication manager 1710, a transceiver 1715, an antenna 1720, memory 1725, a processor 1735, and an I/O controller 1745. These components may be in electronic communication via one or more buses (e.g., bus 1740).

The communication manager 1710 may segment a PDCP SDU into a set of PDCP PDUs at a PDCP layer of the transmitting device, encode, at the PDCP layer, the set of PDCP PDUs according to one or more network coding parameters to obtain a set of encoded PDCP PDUs, the one or more network coding parameters including a rateless code, generate, for the set of encoded PDCP PDUs, a corresponding set of PDU headers, and output the set of encoded PDCP PDUs and the corresponding set of PDU headers from the PDCP layer to a lower layer of the transmitting device for transmission to one or more receiving devices. The communication manager 1710 may also receive, at a PDCP layer of the receiving device, a set of PDCP PDUs and a corresponding set of PDCP PDU headers from a transmitting device, the set of PDCP PDUs and the corresponding set of PDCP PDU headers corresponding to a PDCP SDU, decode, at the PDCP layer, at least a subset of the set of PDCP PDUs based on one or more network coding parameters and the corresponding set of PDCP PDU headers, the one or more network coding parameters including a rateless code, generate a report based on the decoding, where the report indicates whether the PDCP SDU was obtained from the set of PDCP PDUs, and transmit the report to the transmitting device.

The communications manager 1710 may, e.g., when device 1705 is configured as a transmitting device, receive, at a PDCP layer of the transmitting device, a set of PDCP SDUs corresponding to a payload of data for transmission to one or more receiving devices, encode, at the PDCP layer, the set of PDCP SDUs according to a set of network coding parameters to obtain a set of encoded PDCP PDUs, the network coding parameters including at least a rateless code, and provide the set of encoded PDCP PDUs to a lower layer of the transmitting device for transmission to the one or more receiving devices.

The communications manager 1710 may, e.g., when device 1705 is configured as a receiving device, also receive, at a PDCP layer of the receiving device, a set of encoded PDCP PDUs from a transmitting device, decode, at the PDCP layer, the set of encoded PDCP PDUs according to a set of network coding parameters to obtain a set of PDCP SDUs corresponding to a payload of data, the set of network coding parameters including at least a rateless code, and provide the set of PDCP SDUs to an upper layer of receiving device, the upper layer being a higher layer than the PDCP layer of the receiving device.

The communications manager 1710 may transmit, to one or more receiving devices, a set of PDCP PDUs corresponding to one or more PDCP SDUs, transmit the subsequent PDCP PDU to the one or more receiving devices, determine that a polling condition at the transmitting device has been met, set, based on determining that the polling condition has been met, a polling flag within a subsequent PDCP PDU, and monitor for a report from a receiving device of the one or more receiving devices based on transmitting the subsequent PDCP PDU, the report indicating a status of the transmitted set of PDCP PDUs or the one or more PDCP SDUs. The communications manager 1710 may also receive, at a PDCP layer of the receiving device, a set of PDCP PDUs from a transmitting device, the set of PDPC PDUs corresponding to one or more PDCP SDUs, generate, at the PDCP layer, a report indicating a status of the set of PDCP PDUs or the one or more PDCP SDUs at the receiving device, and transmit the report to the transmitting device.

The communications manager 1710 may encode, at a PDCP layer of the transmitting device, a set of PDCP SDUs according to a set of network coding parameters to obtain a first set of PDCP PDUs, transmit, to one or more receiving devices, the first set of PDCP PDUs, receive, from a receiving device of the one or more receiving devices, a report indicating a PDCP SDU of the set of PDCP SDUs that was unsuccessfully received at the receiving device, and transmit, to the one or more receiving devices, based on the received report, a second set of PDCP PDUs corresponding to at least the PDCP SDU of the set of PDCP SDUs.

The transceiver 1715 may communicate bi-directionally, via one or more antennas, wired, or wireless links as described above. For example, the transceiver 1715 may represent a wireless transceiver and may communicate bi-directionally with another wireless transceiver. The transceiver 1715 may also include a modem to modulate the packets and provide the modulated packets to the antennas for transmission, and to demodulate packets received from the antennas.

In some cases, the wireless device may include a single antenna 1720. However, in some cases the device may have more than one antenna 1720, which may be capable of concurrently transmitting or receiving multiple wireless transmissions.

The memory 1725 may include RAM and ROM. The memory 1725 may store computer-readable, computer-executable code 1730 including instructions that, when executed, cause the processor to perform various functions described herein. In some cases, the memory 1725 may contain, among other things, a BIOS which may control basic hardware or software operation such as the interaction with peripheral components or devices.

The I/O controller 1745 may manage input and output signals for the device 1705. The I/O controller 1745 may also manage peripherals not integrated into the device 1705. In some cases, the I/O controller 1745 may represent a physical connection or port to an external peripheral. In some cases, the I/O controller 1745 may utilize an operating system such as iOS®, ANDROID®, MS-DOS®, MS-WINDOWS®, OS/2®, UNIX®, LINUX®, or another known operating system. In other cases, the I/O controller 1745 may represent or interact with a modem, a keyboard, a mouse, a touchscreen, or a similar device. In some cases, the I/O controller 1745 may be implemented as part of a processor. In some cases, a user may interact with the device 1705 via the I/O controller 1745 or via hardware components controlled by the I/O controller 1745.

The code 1730 may include instructions to implement aspects of the present disclosure, including instructions to support wireless communications. The code 1730 may be stored in a non-transitory computer-readable medium such as system memory or other type of memory. In some cases, the code 1730 may not be directly executable by the processor 1735 but may cause a computer (e.g., when compiled and executed) to perform functions described herein.

The processor 1735 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1735 may be configured to operate a memory array using a memory controller. In other cases, a memory controller may be integrated into the processor 1735. The processor 1735 may be configured to execute computer-readable instructions stored in a memory (e.g., the memory 1725) to cause the device 1705 to perform various functions (e.g., functions or tasks supporting rateless coding at an L2 layer).

Figure 18:
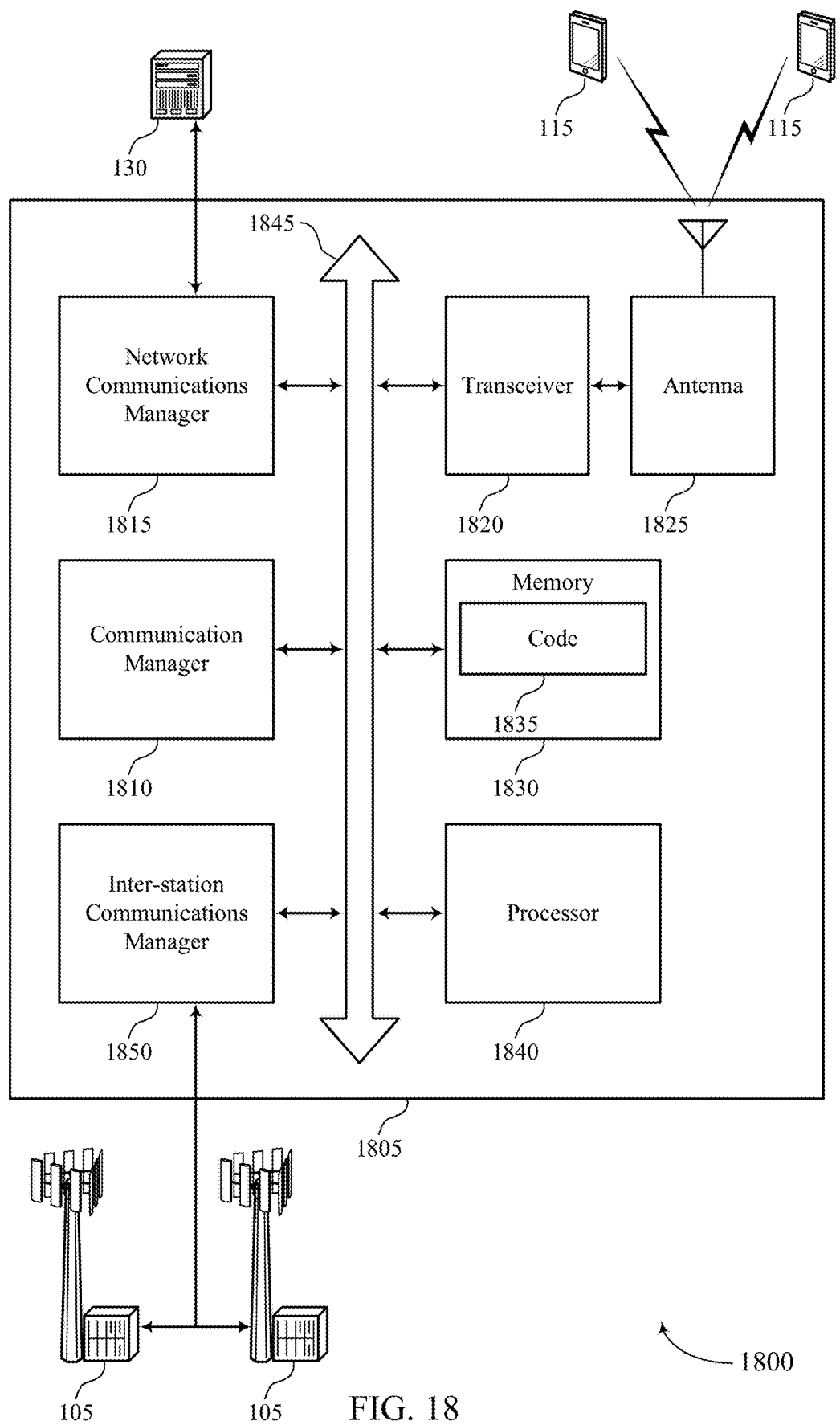
FIG. 18 shows a diagram of a system including a base station that supports rateless coding at an L2 layer in accordance with aspects of the present disclosure.

FIG. 18 shows a diagram of a system 1800 including a device 1805 that supports rateless coding at an L2 layer, outer coding at the PDCP layer, and the like, in accordance with aspects of the present disclosure. The device 1805 may be an example of or include the components of other devices or a base station 105 as described herein. The device 1805 may include components for bi-directional voice and data communications including components for transmitting and receiving communications, including a communication manager 1810, a network communications manager 1815, a transceiver 1820, an antenna 1825, memory 1830, a processor 1840, and an inter-station communications manager 1850. These components may be in electronic communication via one or more buses (e.g., bus 1845).

The communication manager 1810 may segment a PDCP SDU into a set of PDCP PDUs at a PDCP layer of the transmitting device, encode, at the PDCP layer, the set of PDCP PDUs according to one or more network coding parameters to obtain a set of encoded PDCP PDUs, the one or more network coding parameters including a rateless code, generate, for the set of encoded PDCP PDUs, a corresponding set of PDU headers, and output the set of encoded PDCP PDUs and the corresponding set of PDU headers from the PDCP layer to a lower layer of the transmitting device for transmission to one or more receiving devices.

The communication manager 1810 may also receive, at a PDCP layer of the receiving device, a set of PDCP PDUs and a corresponding set of PDCP PDU headers from a transmitting device, the set of PDCP PDUs and the corresponding set of PDCP PDU headers corresponding to a PDCP SDU, decode, at the PDCP layer, at least a subset of the set of PDCP PDUs based on one or more network coding parameters and the corresponding set of PDCP PDU headers, the one or more network coding parameters including a rateless code, generate a report based on the decoding, where the report indicates whether the PDCP SDU was obtained from the set of PDCP PDUs, and transmit the report to the transmitting device.

The communications manager 1810 may, e.g., when device 1805 is configured as a transmitting device, receive, at a PDCP layer of the transmitting device, a set of PDCP SDUs corresponding to a payload of data for transmission to one or more receiving devices, encode, at the PDCP layer, the set of PDCP SDUs according to a set of network coding parameters to obtain a set of encoded PDCP PDUs, the network coding parameters including at least a rateless code, and provide the set of encoded PDCP PDUs to a lower layer of the transmitting device for transmission to the one or more receiving devices.

The communications manager 1810 may, e.g., when device 1805 is configured as a receiving device, also receive, at a PDCP layer of the receiving device, a set of encoded PDCP PDUs from a transmitting device, decode, at the PDCP layer, the set of encoded PDCP PDUs according to a set of network coding parameters to obtain a set of PDCP SDUs corresponding to a payload of data, the set of network coding parameters including at least a rateless code, and provide the set of PDCP SDUs to an upper layer of receiving device, the upper layer being a higher layer than the PDCP layer of the receiving device.

The communications manager 1810 may transmit, to one or more receiving devices, a set of PDCP PDUs corresponding to one or more PDCP SDUs, transmit the subsequent PDCP PDU to the one or more receiving devices, determine that a polling condition at the transmitting device has been met, set, based on determining that the polling condition has been met, a polling flag within a subsequent PDCP PDU, and monitor for a report from a receiving device of the one or more receiving devices based on transmitting the subsequent PDCP PDU, the report indicating a status of the transmitted set of PDCP PDUs or the one or more PDCP SDUs. The communications manager 1810 may also receive, at a PDCP layer of the receiving device, a set of PDCP PDUs from a transmitting device, the set of PDPC PDUs corresponding to one or more PDCP SDUs, generate, at the PDCP layer, a report indicating a status of the set of PDCP PDUs or the one or more PDCP SDUs at the receiving device, and transmit the report to the transmitting device.

The communications manager 1810 may encode, at a PDCP layer of the transmitting device, a set of PDCP SDUs according to a set of network coding parameters to obtain a first set of PDCP protocol data units (PDUs), transmit, to one or more receiving devices, the first set of PDCP PDUs, receive, from a receiving device of the one or more receiving devices, a report indicating a PDCP SDU of the set of PDCP SDUs that was unsuccessfully received at the receiving device, and transmit, to the one or more receiving devices, based on the received report, a second set of PDCP PDUs corresponding to at least the PDCP SDU of the set of PDCP SDUs.

The transceiver 1820 may communicate bi-directionally, via one or more antennas, wired, or wireless links as described above. For example, the transceiver 1820 may represent a wireless transceiver and may communicate bi-directionally with another wireless transceiver. The transceiver 1820 may also include a modem to modulate the packets and provide the modulated packets to the antennas for transmission, and to demodulate packets received from the antennas.

In some cases, the wireless device may include a single antenna 1825. However, in some cases the device may have more than one antenna 1825, which may be capable of concurrently transmitting or receiving multiple wireless transmissions.

The memory 1830 may include RAM and ROM. The memory 1830 may store computer-readable, computer-executable code 1835 including instructions that, when executed, cause the processor to perform various functions described herein. In some cases, the memory 1830 may contain, among other things, a BIOS which may control basic hardware or software operation such as the interaction with peripheral components or devices.

Inter-station communications manager 1850 may manage communications with other base station 105, and may include a controller or scheduler for controlling communications with UEs 115 in cooperation with other base stations 105. For example, the inter-station communications manager 1850 may coordinate scheduling for transmissions to UEs 115 for various interference mitigation techniques such as beamforming or joint transmission. In some examples, inter-station communications manager 1850 may provide an X2 interface within an LTE/LTE-A wireless communication network technology to provide communication between base stations 105.

The code 1835 may include instructions to implement aspects of the present disclosure, including instructions to support wireless communications. The code 1835 may be stored in a non-transitory computer-readable medium such as system memory or other type of memory. In some cases, the code 1830 may not be directly executable by the processor 1840 but may cause a computer (e.g., when compiled and executed) to perform functions described herein.

The processor 1840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1840 may be configured to operate a memory array using a memory controller. In other cases, a memory controller may be integrated into the processor 1840. The processor 1840 may be configured to execute computer-readable instructions stored in a memory (e.g., the memory 1830) to cause the device 1805 to perform various functions (e.g., functions or tasks supporting rateless coding at an L2 layer).

Figure 19:
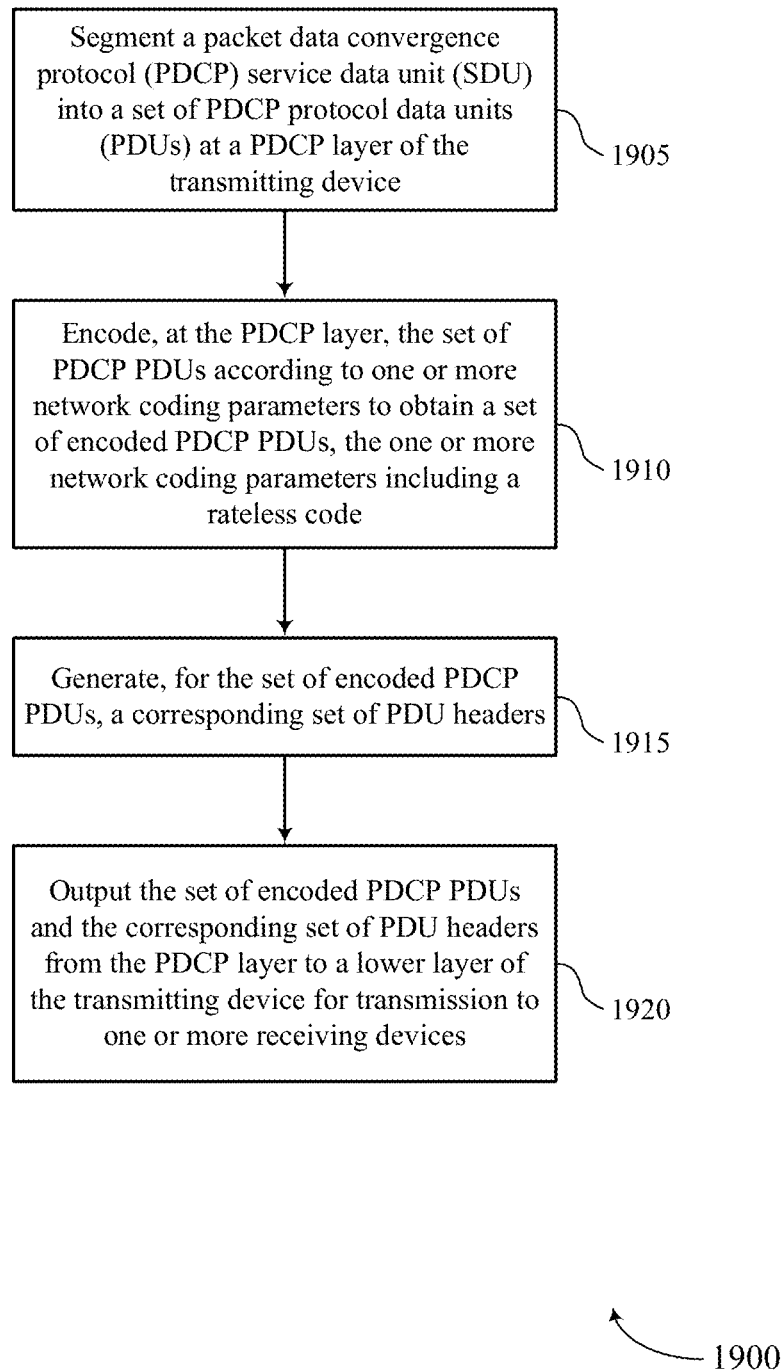

FIG. 19 shows a flowchart illustrating a method 1900 that supports rateless coding at an L2 layer in accordance with aspects of the present disclosure. The operations of method 1900 may be implemented by a UE 115 or base station 105 or its components as described herein. For example, the operations of method 1900 may be performed by a communication manager as described with reference to FIGS. 14 through 18. In some examples, a UE or base station may execute a set of instructions to control the functional elements of the UE or base station to perform the described functions. Additionally, or alternatively, a UE or base station may perform aspects of the described functions using special-purpose hardware.

At 1905, the UE or base station may segment a PDCP SDU into a set of PDCP PDUs at a PDCP layer of the transmitting device. The operations of 1905 may be performed according to the methods described herein. In some examples, aspects of the operations of 1905 may be performed by a PDCP SDU manager as described with reference to FIGS. 14 through 18.

At 1910, the UE or base station may encode, at the PDCP layer, the set of PDCP PDUs according to one or more network coding parameters to obtain a set of encoded PDCP PDUs, the one or more network coding parameters including a rateless code. Additionally or alternatively, the network coding parameters may further include other parameters as described elsewhere herein. The operations of 1910 may be performed according to the methods described herein. In some examples, aspects of the operations of 1910 may be performed by a PDCP encoding manager as described with reference to FIGS. 14 through 18.

At 1915, the UE or base station may generate, for the set of encoded PDCP PDUs, a corresponding set of PDU headers. The operations of 1915 may be performed according to the methods described herein. In some examples, aspects of the operations of 1915 may be performed by a PDCP PDU manager as described with reference to FIGS. 14 through 18.

At 1920, the UE or base station may output the set of encoded PDCP PDUs and the corresponding set of PDU headers from the PDCP layer to a lower layer of the transmitting device for transmission to one or more receiving devices. The operations of 1920 may be performed according to the methods described herein. In some examples, aspects of the operations of 1920 may be performed by a PDCP PDU outputting manager as described with reference to FIGS. 14 through 18.

Figure 20:
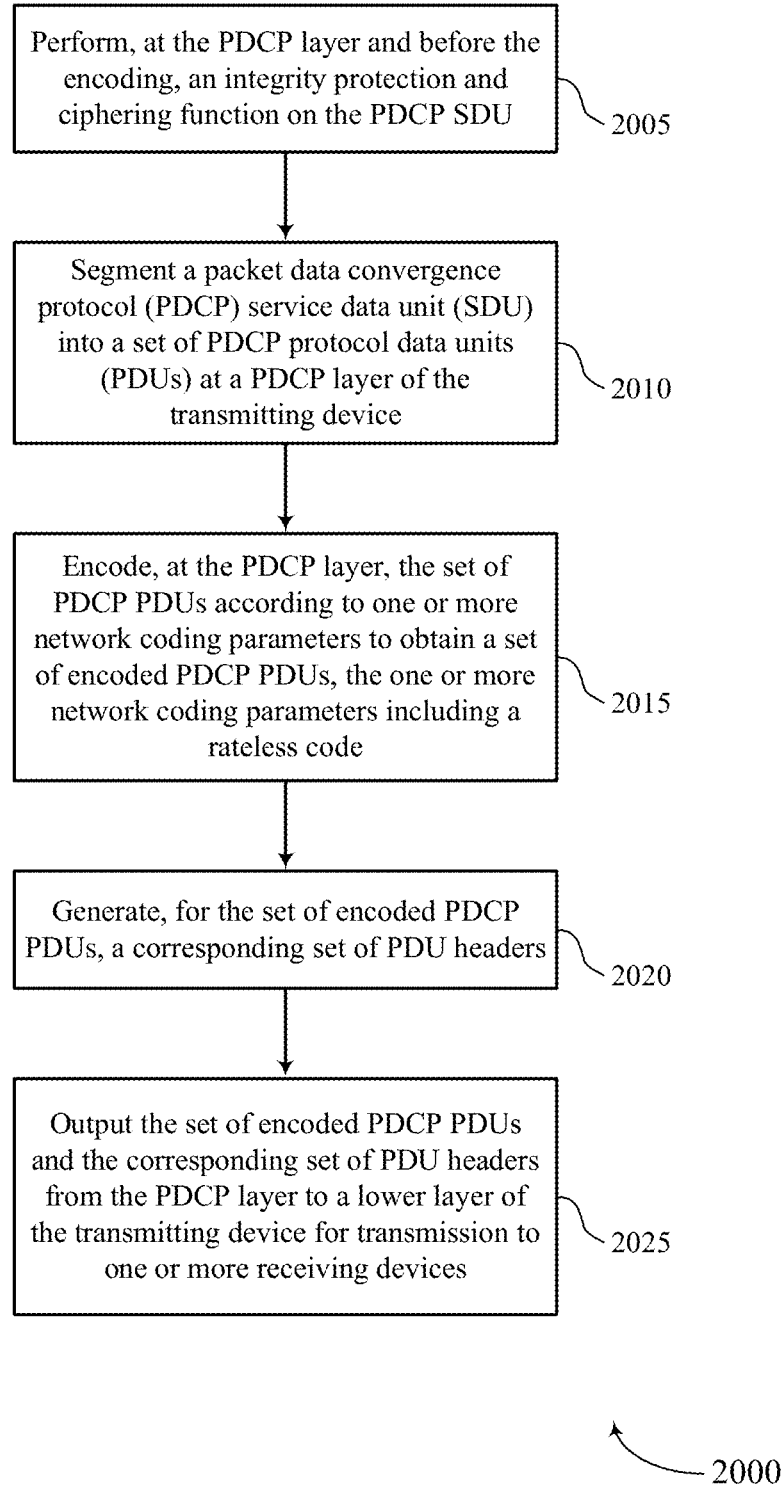

FIG. 20 shows a flowchart illustrating a method 2000 that supports rateless coding at an L2 layer in accordance with aspects of the present disclosure. The operations of method 2000 may be implemented by a UE 115 or base station 105 or its components as described herein. For example, the operations of method 2000 may be performed by a communication manager as described with reference to FIGS. 14 through 18. In some examples, a UE or base station may execute a set of instructions to control the functional elements of the UE or base station to perform the described functions. Additionally, or alternatively, a UE or base station may perform aspects of the described functions using special-purpose hardware.

At 2005, the UE or base station may perform, at the PDCP layer and before the encoding, an integrity protection and ciphering function on the PDCP SDU. The operations of 2005 may be performed according to the methods described herein. In some examples, aspects of the operations of 2005 may be performed by an integrity protection and ciphering manager as described with reference to FIGS. 14 through 18.

At 2010, the UE or base station may segment a PDCP SDU into a set of PDCP PDUs at a PDCP layer of the transmitting device. The operations of 2010 may be performed according to the methods described herein. In some examples, aspects of the operations of 2010 may be performed by a PDCP SDU manager as described with reference to FIGS. 14 through 18.

At 2015, the UE or base station may encode, at the PDCP layer, the set of PDCP PDUs according to one or more network coding parameters to obtain a set of encoded PDCP PDUs, the one or more network coding parameters including a rateless code. Additionally or alternatively, the set of network coding parameters can include additional parameters as described elsewhere herein. The operations of 2015 may be performed according to the methods described herein. In some examples, aspects of the operations of 2015 may be performed by a PDCP encoding manager as described with reference to FIGS. 14 through 18.

At 2020, the UE or base station may generate, for the set of encoded PDCP PDUs, a corresponding set of PDU headers. The operations of 2020 may be performed according to the methods described herein. In some examples, aspects of the operations of 2020 may be performed by a PDCP PDU manager as described with reference to FIGS. 14 through 18.

At 2025, the UE or base station may output the set of encoded PDCP PDUs and the corresponding set of PDU headers from the PDCP layer to a lower layer of the transmitting device for transmission to one or more receiving devices. The operations of 2025 may be performed according to the methods described herein. In some examples, aspects of the operations of 2025 may be performed by a PDCP PDU outputting manager as described with reference to FIGS. 14 through 18.

Figure 21:
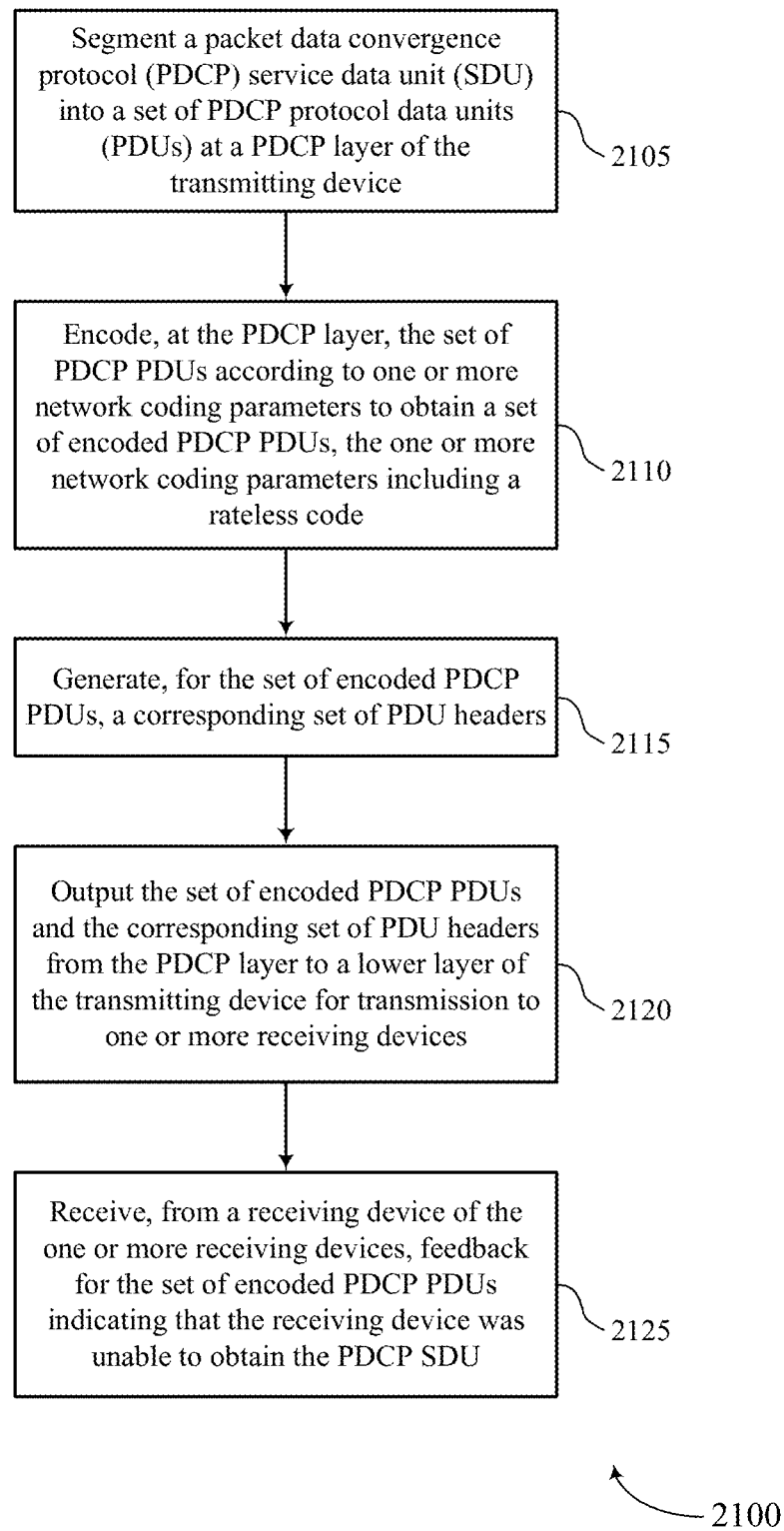

FIG. 21 shows a flowchart illustrating a method 2100 that supports rateless coding at an L2 layer in accordance with aspects of the present disclosure. The operations of method 2100 may be implemented by a UE 115 or base station 105 or its components as described herein. For example, the operations of method 2100 may be performed by a communication manager as described with reference to FIGS. 14 through 18. In some examples, a UE or base station may execute a set of instructions to control the functional elements of the UE or base station to perform the described functions. Additionally, or alternatively, a UE or base station may perform aspects of the described functions using special-purpose hardware.

At 2105, the UE or base station may segment a PDCP SDU into a set of PDCP PDUs at a PDCP layer of the transmitting device. The operations of 2105 may be performed according to the methods described herein. In some examples, aspects of the operations of 2105 may be performed by a PDCP SDU manager as described with reference to FIGS. 14 through 18.

At 2110, the UE or base station may encode, at the PDCP layer, the set of PDCP PDUs according to one or more network coding parameters to obtain a set of encoded PDCP PDUs, the one or more network coding parameters including a rateless code. Additionally or alternatively, the set of network coding parameters can include additional parameters as described elsewhere herein. The operations of 2110 may be performed according to the methods described herein. In some examples, aspects of the operations of 2110 may be performed by a PDCP encoding manager as described with reference to FIGS. 14 through 18.

At 2115, the UE or base station may generate, for the set of encoded PDCP PDUs, a corresponding set of PDU headers. The operations of 2115 may be performed according to the methods described herein. In some examples, aspects of the operations of 2115 may be performed by a PDCP PDU manager as described with reference to FIGS. 14 through 18.

At 2120, the UE or base station may output the set of encoded PDCP PDUs and the corresponding set of PDU headers from the PDCP layer to a lower layer of the transmitting device for transmission to one or more receiving devices. The operations of 2120 may be performed according to the methods described herein. In some examples, aspects of the operations of 2120 may be performed by a PDCP PDU outputting manager as described with reference to FIGS. 14 through 18.

At 2125, the UE or base station may receive, from a receiving device of the one or more receiving devices, feedback for the set of encoded PDCP PDUs indicating that the receiving device was unable to obtain the PDCP SDU. The operations of 2125 may be performed according to the methods described herein. In some examples, aspects of the operations of 2125 may be performed by a feedback manager as described with reference to FIGS. 14 through 18.

Figure 22:
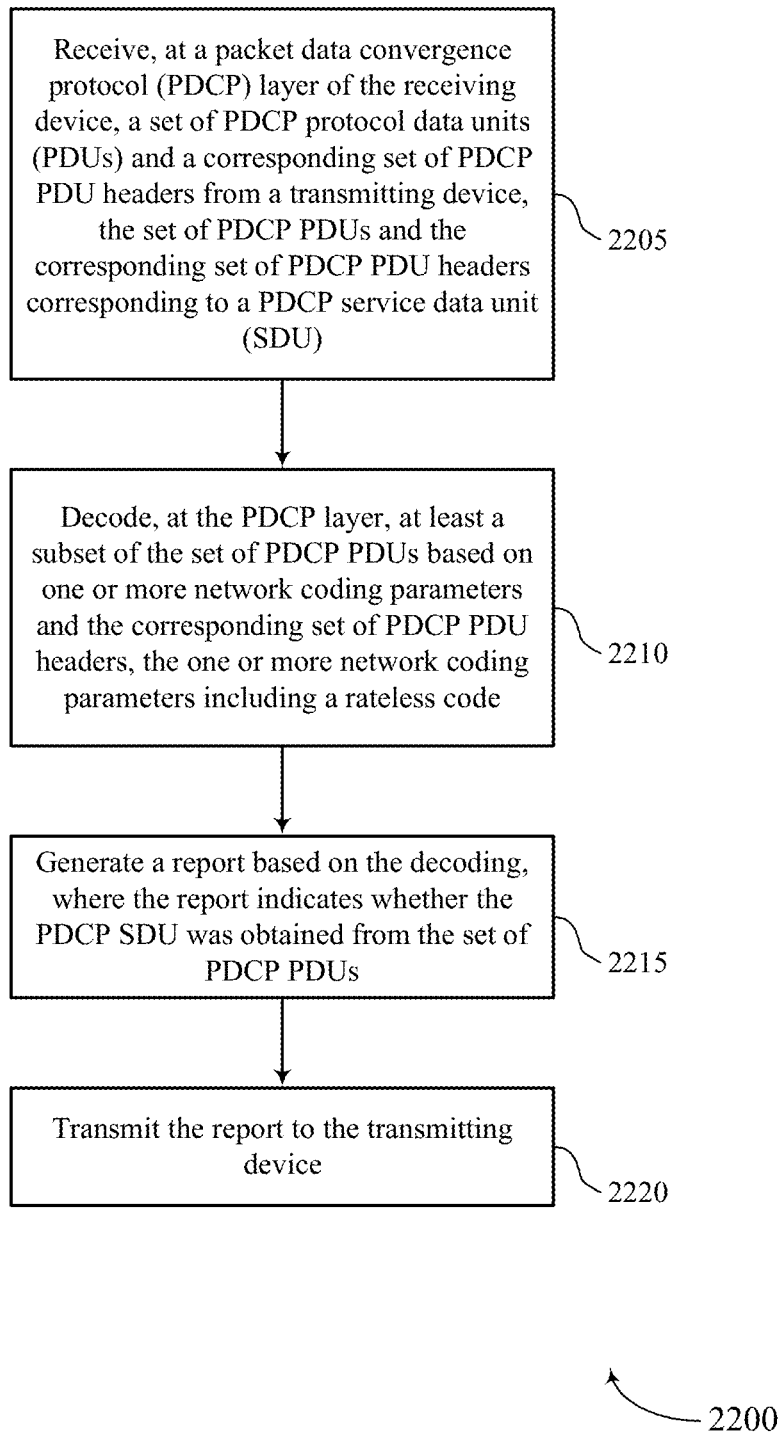

FIG. 22 shows a flowchart illustrating a method 2200 that supports rateless coding at an L2 layer in accordance with aspects of the present disclosure. The operations of method 2200 may be implemented by a UE 115 or base station 105 or its components as described herein. For example, the operations of method 2200 may be performed by a communication manager as described with reference to FIGS. 14 through 18. In some examples, a UE or base station may execute a set of instructions to control the functional elements of the UE or base station to perform the described functions. Additionally, or alternatively, a UE or base station may perform aspects of the described functions using special-purpose hardware.

At 2205, the UE or base station may receive, at a PDCP layer of the receiving device, a set of PDCP PDUs and a corresponding set of PDCP PDU headers from a transmitting device, the set of PDCP PDUs and the corresponding set of PDCP PDU headers corresponding to a PDCP SDU. The operations of 2205 may be performed according to the methods described herein. In some examples, aspects of the operations of 2205 may be performed by a PDCP PDU manager as described with reference to FIGS. 14 through 18.

At 2210, the UE or base station may decode, at the PDCP layer, at least a subset of the set of PDCP PDUs based on one or more network coding parameters and the corresponding set of PDCP PDU headers, the one or more network coding parameters including a rateless code. Additionally or alternatively, the set of network coding parameters can include additional parameters as described elsewhere herein. The operations of 2210 may be performed according to the methods described herein. In some examples, aspects of the operations of 2210 may be performed by a PDCP decoding manager as described with reference to FIGS. 14 through 18.

At 2215, the UE or base station may generate a report based on the decoding, where the report indicates whether the PDCP SDU was obtained from the set of PDCP PDUs. The operations of 2215 may be performed according to the methods described herein. In some examples, aspects of the operations of 2215 may be performed by a PDCP SDU report manager as described with reference to FIGS. 14 through 18.

At 2220, the UE or base station may transmit the report to the transmitting device. The operations of 2220 may be performed according to the methods described herein. In some examples, aspects of the operations of 2220 may be performed by a report transmitting manager as described with reference to FIGS. 14 through 18.

Figure 23:
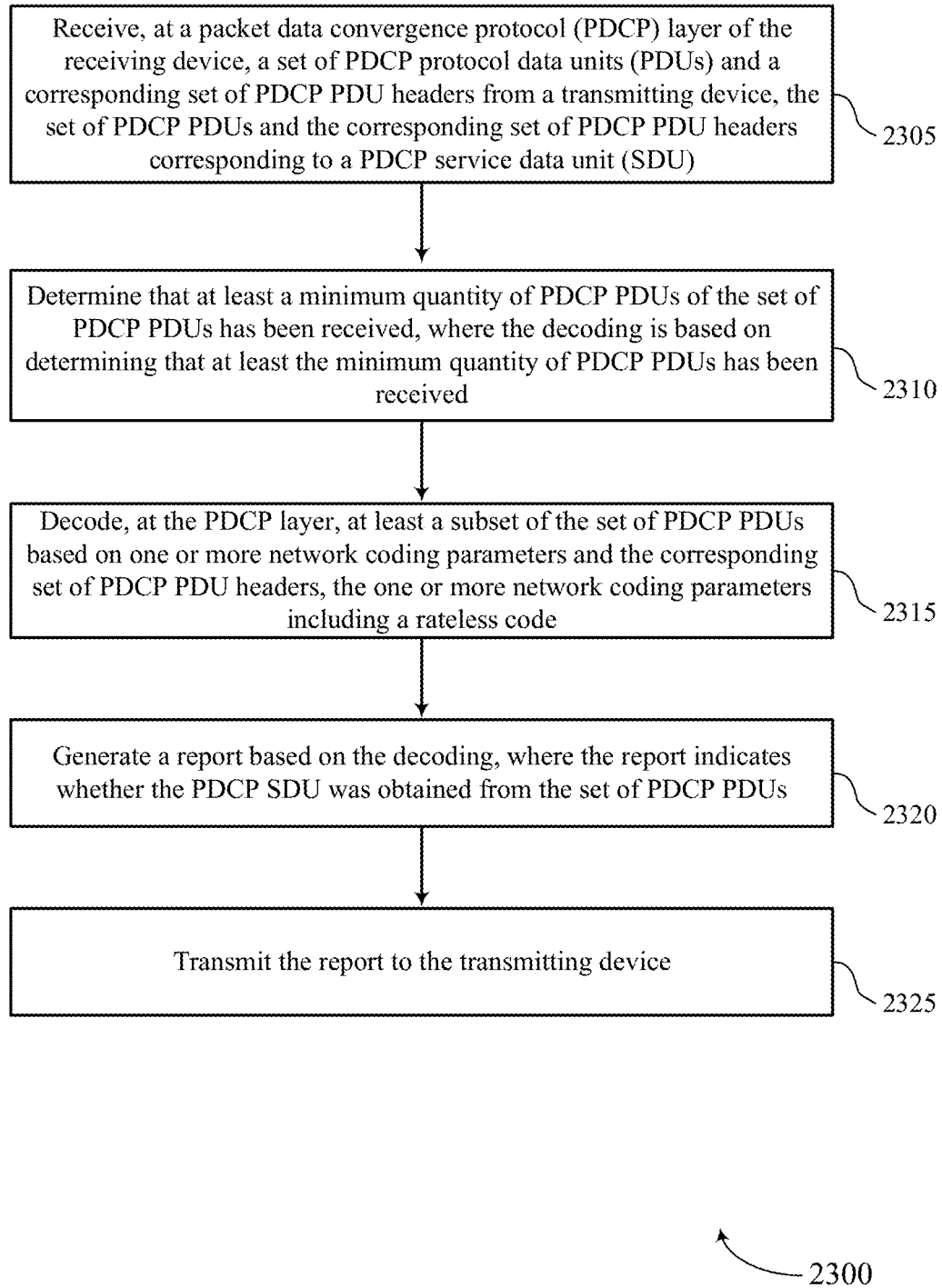

FIG. 23 shows a flowchart illustrating a method 2300 that supports rateless coding at an L2 layer in accordance with aspects of the present disclosure. The operations of method 2300 may be implemented by a UE 115 or base station 105 or its components as described herein. For example, the operations of method 2300 may be performed by a communication manager as described with reference to FIGS. 14 through 18. In some examples, a UE or base station may execute a set of instructions to control the functional elements of the UE or base station to perform the described functions. Additionally, or alternatively, a UE or base station may perform aspects of the described functions using special-purpose hardware.

At 2305, the UE or base station may receive, at a PDCP layer of the receiving device, a set of PDCP PDUs and a corresponding set of PDCP PDU headers from a transmitting device, the set of PDCP PDUs and the corresponding set of PDCP PDU headers corresponding to a PDCP SDU. The operations of 2305 may be performed according to the methods described herein. In some examples, aspects of the operations of 2305 may be performed by a PDCP PDU manager as described with reference to FIGS. 14 through 18.

At 2310, the UE or base station may determine that at least a minimum quantity of PDCP PDUs of the set of PDCP PDUs has been received, where the decoding is based on determining that at least the minimum quantity of PDCP PDUs has been received. The operations of 2310 may be performed according to the methods described herein. In some examples, aspects of the operations of 2310 may be performed by a PDCP decoding manager as described with reference to FIGS. 14 through 18.

At 2315, the UE or base station may decode, at the PDCP layer, at least a subset of the set of PDCP PDUs based on one or more network coding parameters and the corresponding set of PDCP PDU headers, the one or more network coding parameters including a rateless code. Additionally or alternatively, the one or more network coding parameters may include a minimum code rate, the minimum quantity of PDCP PDUs with reference to 2310, a generation or generator matrix, or the like. The operations of 2315 may be performed according to the methods described herein. In some examples, aspects of the operations of 2315 may be performed by a PDCP decoding manager as described with reference to FIGS. 14 through 18.

At 2320, the UE or base station may generate a report based on the decoding, where the report indicates whether the PDCP SDU was obtained from the set of PDCP PDUs. The operations of 2320 may be performed according to the methods described herein. In some examples, aspects of the operations of 2320 may be performed by a PDCP SDU report manager as described with reference to FIGS. 14 through 18.

At 2325, the UE or base station may transmit the report to the transmitting device. The operations of 2325 may be performed according to the methods described herein. In some examples, aspects of the operations of 2325 may be performed by a report transmitting manager as described with reference to FIGS. 14 through 18.

Figure 24:
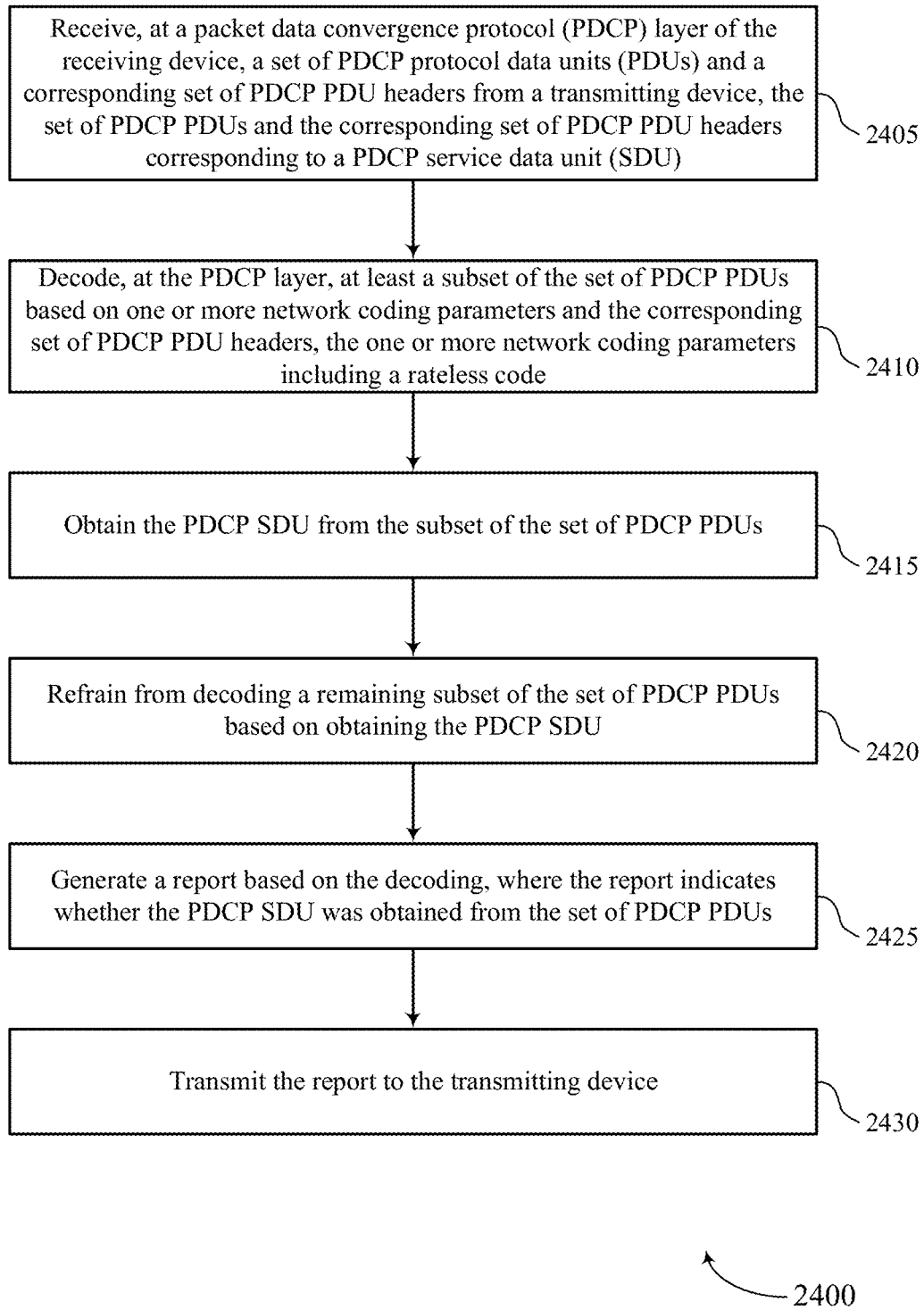

FIG. 24 shows a flowchart illustrating a method 2400 that supports rateless coding at an L2 layer in accordance with aspects of the present disclosure. The operations of method 2400 may be implemented by a UE 115 or base station 105 or its components as described herein. For example, the operations of method 2400 may be performed by a communication manager as described with reference to FIGS. 14 through 18. In some examples, a UE or base station may execute a set of instructions to control the functional elements of the UE or base station to perform the described functions. Additionally, or alternatively, a UE or base station may perform aspects of the described functions using special-purpose hardware.

At 2405, the UE or base station may receive, at a PDCP layer of the receiving device, a set of PDCP PDUs and a corresponding set of PDCP PDU headers from a transmitting device, the set of PDCP PDUs and the corresponding set of PDCP PDU headers corresponding to a PDCP SDU. The operations of 2405 may be performed according to the methods described herein. In some examples, aspects of the operations of 2405 may be performed by a PDCP PDU manager as described with reference to FIGS. 14 through 18.

At 2410, the UE or base station may decode, at the PDCP layer, at least a subset of the set of PDCP PDUs based on one or more network coding parameters and the corresponding set of PDCP PDU headers, the one or more network coding parameters including a rateless code. Additionally or alternatively, the set of network coding parameters can include additional parameters as described elsewhere herein. The operations of 2410 may be performed according to the methods described herein. In some examples, aspects of the operations of 2410 may be performed by a PDCP decoding manager as described with reference to FIGS. 14 through 18.

At 2415, the UE or base station may obtain the PDCP SDU from the subset of the set of PDCP PDUs. The operations of 2415 may be performed according to the methods described herein. In some examples, aspects of the operations of 2415 may be performed by a PDCP decoding manager as described with reference to FIGS. 14 through 18.

At 2420, the UE or base station may refrain from decoding a remaining subset of the set of PDCP PDUs based on obtaining the PDCP SDU. The operations of 2420 may be performed according to the methods described herein. In some examples, aspects of the operations of 2420 may be performed by a PDCP decoding manager as described with reference to FIGS. 14 through 18.

At 2425, the UE or base station may generate a report based on the decoding, where the report indicates whether the PDCP SDU was obtained from the set of PDCP PDUs. The operations of 2425 may be performed according to the methods described herein. In some examples, aspects of the operations of 2425 may be performed by a PDCP SDU report manager as described with reference to FIGS. 14 through 18.

At 2430, the UE or base station may transmit the report to the transmitting device. The operations of 2430 may be performed according to the methods described herein. In some examples, aspects of the operations of 2430 may be performed by a report transmitting manager as described with reference to FIGS. 14 through 18.

Figure 25:
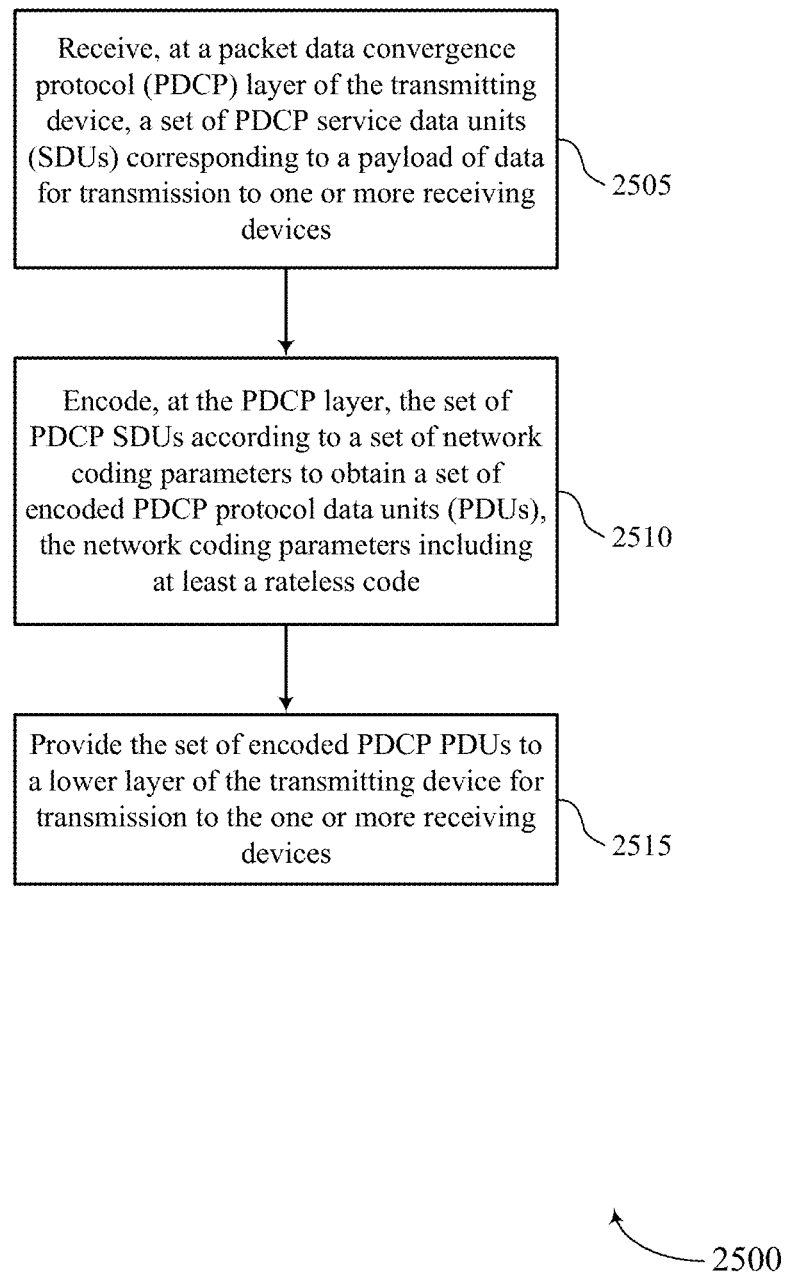

FIG. 25 shows a flowchart illustrating a method 2500 that supports outer coding at an L2 layer in accordance with aspects of the present disclosure. The operations of method 2500 may be implemented by a UE 115 or base station 105 or its components as described herein. For example, the operations of method 2500 may be performed by a communications manager as described with reference to FIGS. 14 through 18. In some examples, a UE or base station may execute a set of instructions to control the functional elements of the UE or base station to perform the functions described below. Additionally or alternatively, a UE or base station may perform aspects of the functions described below using special-purpose hardware.

At 2505, the UE or base station may receive, at a PDCP layer of the transmitting device, a set of PDCP SDUs corresponding to a payload of data for transmission to one or more receiving devices. The operations of 2505 may be performed according to the methods described herein. In some examples, aspects of the operations of 2505 may be performed by a PDCP SDU manager as described with reference to FIGS. 14 through 18.

At 2510, the UE or base station may encode, at the PDCP layer, the set of PDCP SDUs according to a set of network coding parameters to obtain a set of encoded PDCP PDUs, the network coding parameters including at least a rateless code. Additionally or alternatively, the network coding parameters may further include other parameters as described elsewhere herein. The operations of 2510 may be performed according to the methods described herein. In some examples, aspects of the operations of 2510 may be performed by a PDCP encoding manager as described with reference to FIGS. 14 through 18.

At 2515, the UE or base station may provide the set of encoded PDCP PDUs to a lower layer of the transmitting device for transmission to the one or more receiving devices. The operations of 2515 may be performed according to the methods described herein. In some examples, aspects of the operations of 2515 may be performed by a PDCP PDU manager as described with reference to FIGS. 14 through 18.

Figure 26:
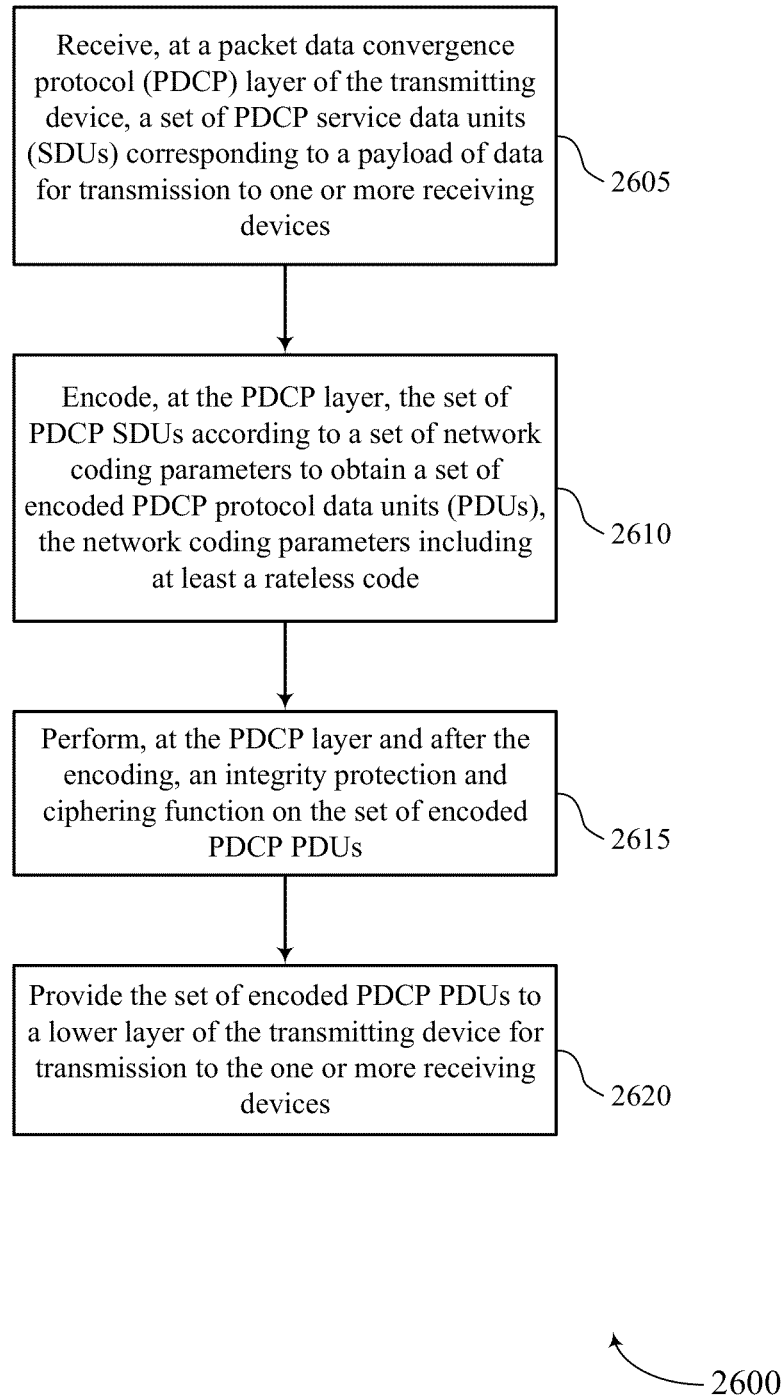

FIG. 26 shows a flowchart illustrating a method 2600 that supports outer coding at an L2 layer in accordance with aspects of the present disclosure. The operations of method 2600 may be implemented by a UE 115 or base station 105 or its components as described herein. For example, the operations of method 2600 may be performed by a communications manager as described with reference to FIGS. 14 through 18. In some examples, a UE or base station may execute a set of instructions to control the functional elements of the UE or base station to perform the functions described below. Additionally or alternatively, a UE or base station may perform aspects of the functions described below using special-purpose hardware.

At 2605, the UE or base station may receive, at a PDCP layer of the transmitting device, a set of PDCP SDUs corresponding to a payload of data for transmission to one or more receiving devices. The operations of 2605 may be performed according to the methods described herein. In some examples, aspects of the operations of 2605 may be performed by a PDCP SDU manager as described with reference to FIGS. 14 through 18.

At 2610, the UE or base station may encode, at the PDCP layer, the set of PDCP SDUs according to a set of network coding parameters to obtain a set of encoded PDCP PDUs, the network coding parameters including at least a rateless code. Additionally or alternatively, the network coding parameters may further include other parameters as described elsewhere herein. The operations of 2610 may be performed according to the methods described herein. In some examples, aspects of the operations of 2610 may be performed by a PDCP encoding manager as described with reference to FIGS. 14 through 18.

At 2615, the UE or base station may perform, at the PDCP layer and after the encoding, an integrity protection and ciphering function on the set of encoded PDCP PDUs. The operations of 2615 may be performed according to the methods described herein. In some examples, aspects of the operations of 2615 may be performed by an integrity protection and ciphering manager as described with reference to FIGS. 14 through 18.

At 2620, the UE or base station may provide the set of encoded PDCP PDUs to a lower layer of the transmitting device for transmission to the one or more receiving devices. The operations of 2620 may be performed according to the methods described herein. In some examples, aspects of the operations of 2620 may be performed by a PDCP PDU manager as described with reference to FIGS. 14 through 18.

Figure 27:
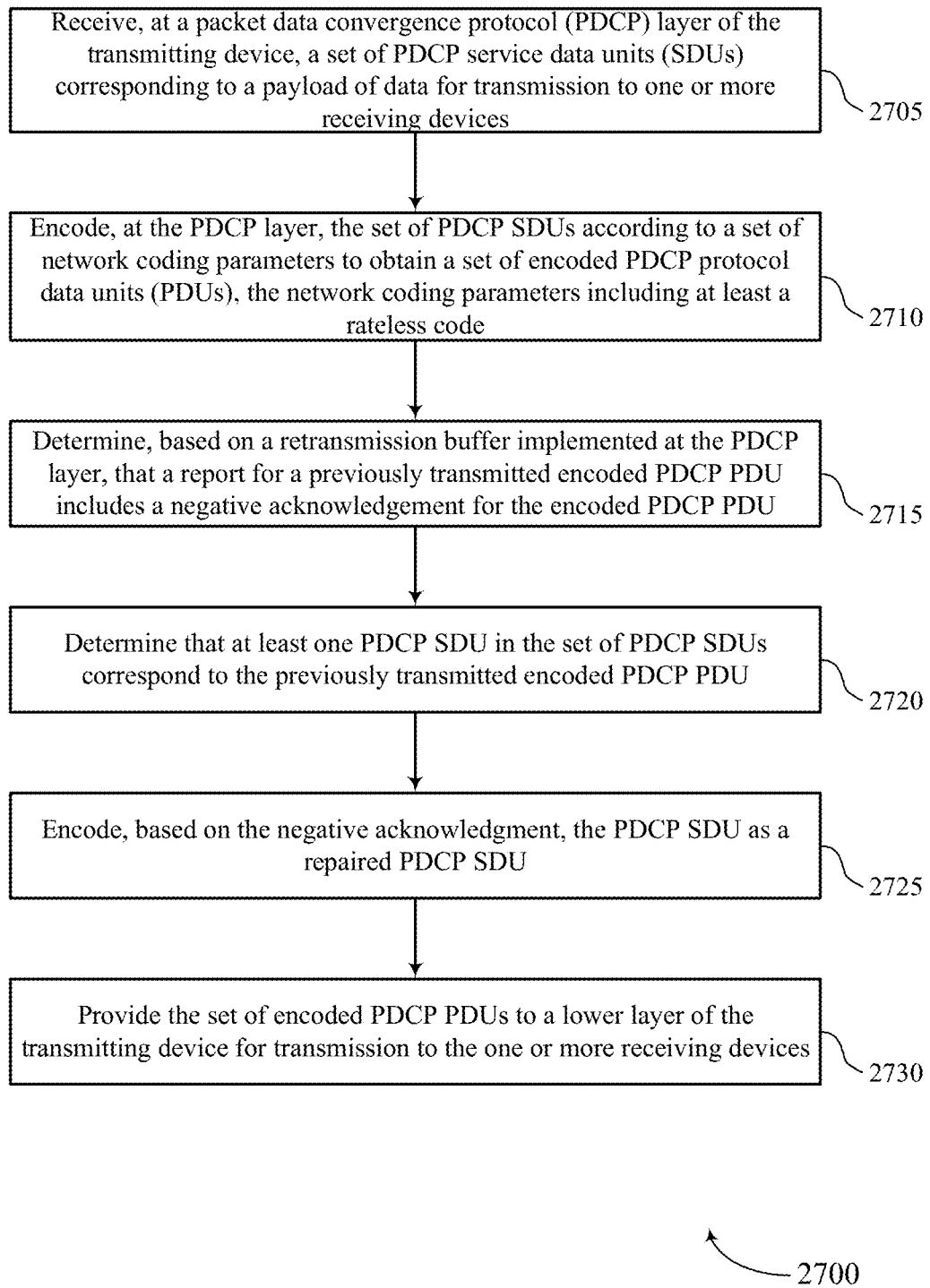

FIG. 27 shows a flowchart illustrating a method 2700 that supports outer coding at an L2 layer in accordance with aspects of the present disclosure. The operations of method 2700 may be implemented by a UE 115 or base station 105 or its components as described herein. For example, the operations of method 2700 may be performed by a communications manager as described with reference to FIGS. 14 through 18. In some examples, a UE or base station may execute a set of instructions to control the functional elements of the UE or base station to perform the functions described below. Additionally or alternatively, a UE or base station may perform aspects of the functions described below using special-purpose hardware.

At 2705, the UE or base station may receive, at a PDCP layer of the transmitting device, a set of PDCP SDUs corresponding to a payload of data for transmission to one or more receiving devices. The operations of 2705 may be performed according to the methods described herein. In some examples, aspects of the operations of 2705 may be performed by a PDCP SDU manager as described with reference to FIGS. 14 through 18.

At 2710, the UE or base station may encode, at the PDCP layer, the set of PDCP SDUs according to a set of network coding parameters to obtain a set of encoded PDCP PDUs, the network coding parameters including at least a rateless code. Additionally or alternatively, the network coding parameters may further include other parameters as described elsewhere herein. The operations of 2710 may be performed according to the methods described herein. In some examples, aspects of the operations of 2710 may be performed by a PDCP encoding manager as described with reference to FIGS. 14 through 18.

At 2715, the UE or base station may determine, based on a retransmission buffer implemented at the PDCP layer, that a report for a previously transmitted encoded PDCP PDU includes a negative acknowledgement for the encoded PDCP PDU. The operations of 2715 may be performed according to the methods described herein. In some examples, aspects of the operations of 2715 may be performed by a PDCP ARQ manager as described with reference to FIGS. 14 through 18.

At 2720, the UE or base station may determine that at least one PDCP SDU in the set of PDCP SDUs correspond to the previously transmitted encoded PDCP PDU. The operations of 2720 may be performed according to the methods described herein. In some examples, aspects of the operations of 2720 may be performed by a PDCP ARQ manager as described with reference to FIGS. 14 through 18.

At 2725, the UE or base station may encode, based on the negative acknowledgment, the PDCP SDU as a repaired PDCP SDU. The operations of 2725 may be performed according to the methods described herein. In some examples, aspects of the operations of 2725 may be performed by a PDCP ARQ manager as described with reference to FIGS. 14 through 18.

At 2730, the UE or base station may provide the set of encoded PDCP PDUs to a lower layer of the transmitting device for transmission to the one or more receiving devices. The operations of 2730 may be performed according to the methods described herein. In some examples, aspects of the operations of 2730 may be performed by a PDCP PDU manager as described with reference to FIGS. 14 through 18.

Figure 28:
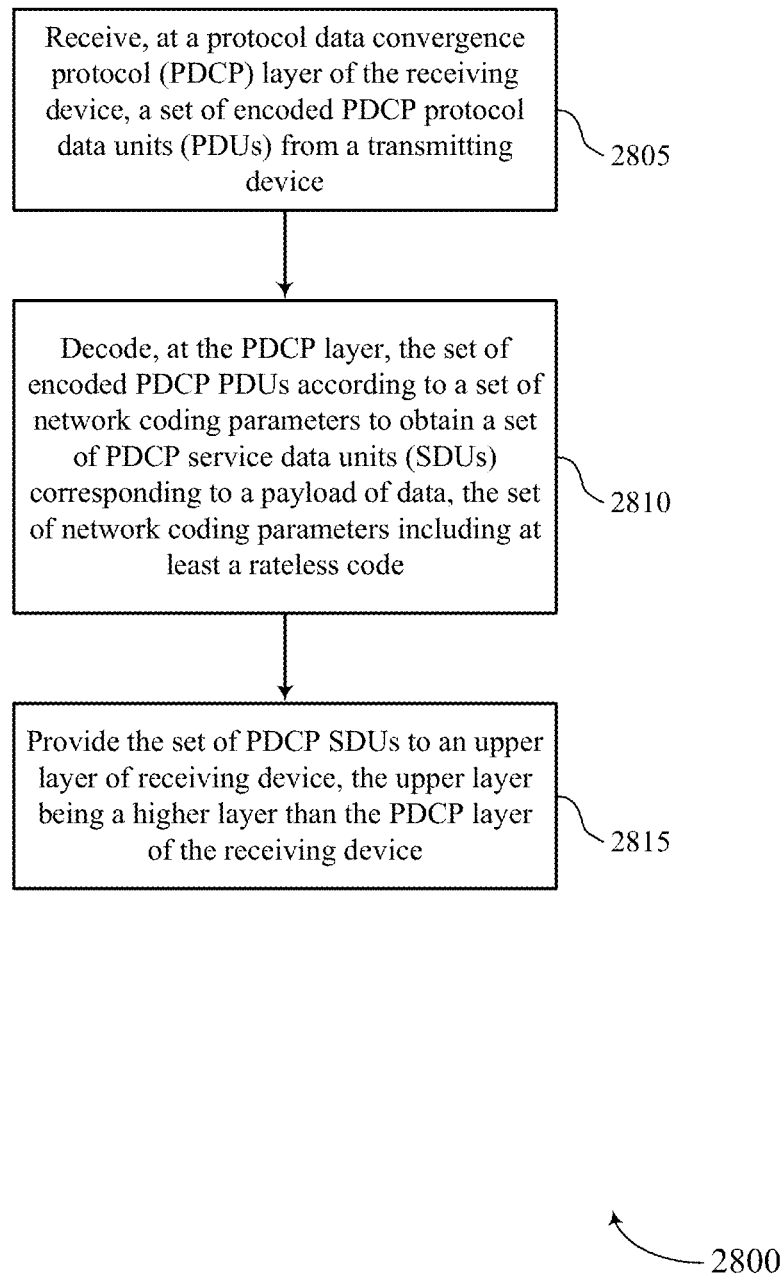

FIG. 28 shows a flowchart illustrating a method 2800 that supports outer coding at an L2 layer in accordance with aspects of the present disclosure. The operations of method 2800 may be implemented by a UE 115 or base station 105 or its components as described herein. For example, the operations of method 2800 may be performed by a communications manager as described with reference to FIGS. 14 through 18. In some examples, a UE or base station may execute a set of instructions to control the functional elements of the UE or base station to perform the functions described below. Additionally or alternatively, a UE or base station may perform aspects of the functions described below using special-purpose hardware.

At 2805, the UE or base station may receive, at a PDCP layer of the receiving device, a set of encoded PDCP PDUs from a transmitting device. The operations of 2805 may be performed according to the methods described herein. In some examples, aspects of the operations of 2805 may be performed by a PDCP PDU manager as described with reference to FIGS. 14 through 18.

At 2810, the UE or base station may decode, at the PDCP layer, the set of encoded PDCP PDUs according to a set of network coding parameters to obtain a set of PDCP SDUs corresponding to a payload of data, the set of network coding parameters including at least a rateless code. Additionally or alternatively, the network coding parameters may further include other parameters as described elsewhere herein. The operations of 2810 may be performed according to the methods described herein. In some examples, aspects of the operations of 2810 may be performed by a PDCP decoding manager as described with reference to FIGS. 14 through 18.

At 2815, the UE or base station may provide the set of PDCP SDUs to an upper layer of receiving device, the upper layer being a higher layer than the PDCP layer of the receiving device. The operations of 2815 may be performed according to the methods described herein. In some examples, aspects of the operations of 2815 may be performed by a PDCP SDU segmentation manager as described with reference to FIGS. 14 through 18.

Figure 29:
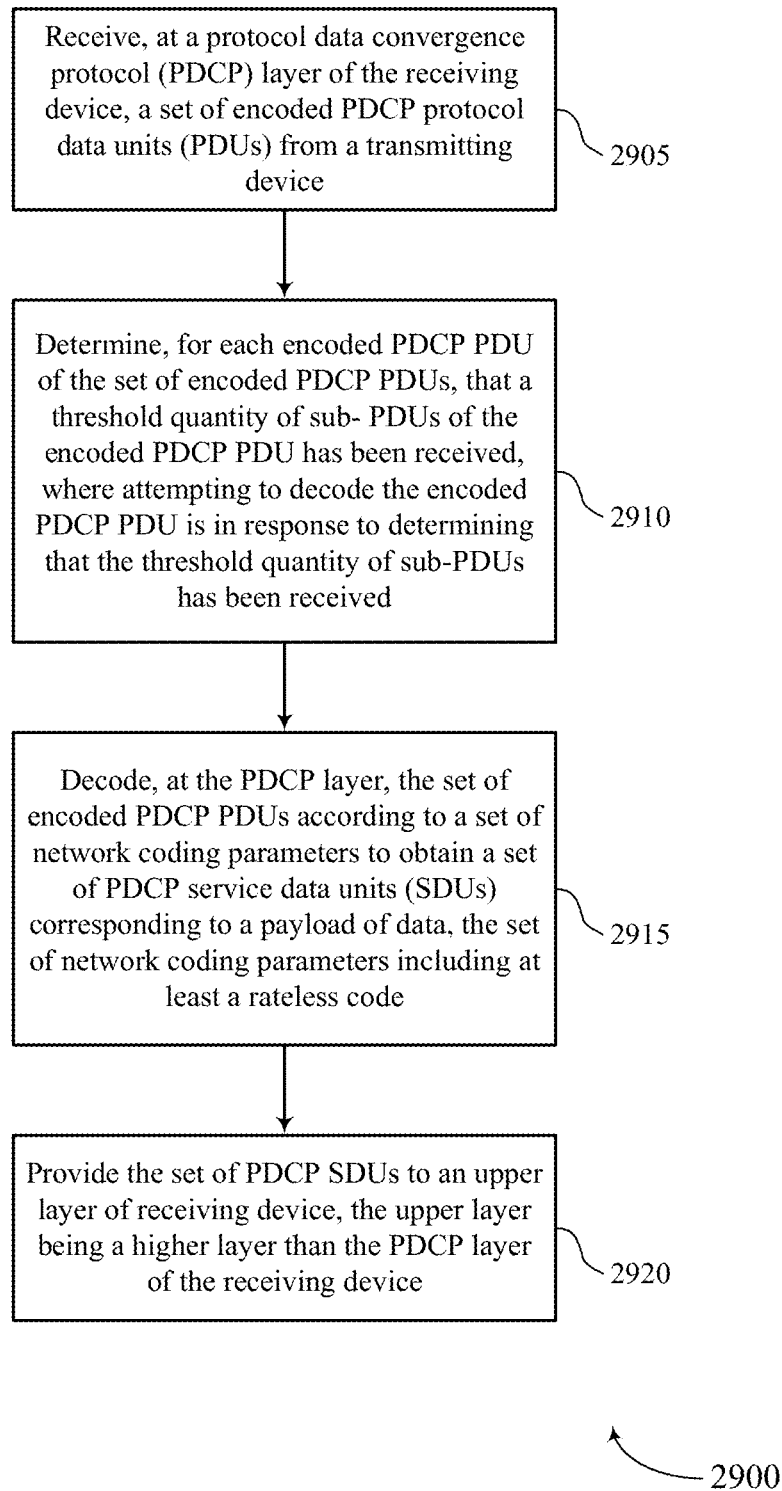

FIG. 29 shows a flowchart illustrating a method 2900 that supports outer coding at an L2 layer in accordance with aspects of the present disclosure. The operations of method 2900 may be implemented by a UE 115 or base station 105 or its components as described herein. For example, the operations of method 2900 may be performed by a communications manager as described with reference to FIGS. 14 through 18. In some examples, a UE or base station may execute a set of instructions to control the functional elements of the UE or base station to perform the functions described below. Additionally or alternatively, a UE or base station may perform aspects of the functions described below using special-purpose hardware.

At 2905, the UE or base station may receive, at a PDCP layer of the receiving device, a set of encoded PDCP PDUs from a transmitting device. The operations of 2905 may be performed according to the methods described herein. In some examples, aspects of the operations of 2905 may be performed by a PDCP PDU manager as described with reference to FIGS. 14 through 18.

At 2910, the UE or base station may determine, for each encoded PDCP PDU of the set of encoded PDCP PDUs, that a threshold quantity of sub-PDUs of the encoded PDCP PDU has been received, where attempting to decode the encoded PDCP PDU is in response to determining that the threshold quantity of sub-PDUs has been received. The operations of 2910 may be performed according to the methods described herein. In some examples, aspects of the operations of 2910 may be performed by a PDCP reassembly manager as described with reference to FIGS. 14 through 18.

At 2915, the UE or base station may decode, at the PDCP layer, the set of encoded PDCP PDUs according to a set of network coding parameters to obtain a set of PDCP SDUs corresponding to a payload of data, the set of network coding parameters including at least a rateless code. Additionally or alternatively, the one or more network coding parameters may include a minimum code rate, the threshold quantity of PDCP sub-PDUs with reference to 2910, a generation or generator matrix, or the like. The operations of 2915 may be performed according to the methods described herein. In some examples, aspects of the operations of 2915 may be performed by a PDCP decoding manager as described with reference to FIGS. 14 through 18.

At 2920, the UE or base station may provide the set of PDCP SDUs to an upper layer of receiving device, the upper layer being a higher layer than the PDCP layer of the receiving device. The operations of 2920 may be performed according to the methods described herein. In some examples, aspects of the operations of 2920 may be performed by a PDCP SDU segmentation manager as described with reference to FIGS. 14 through 18.

Figure 30:
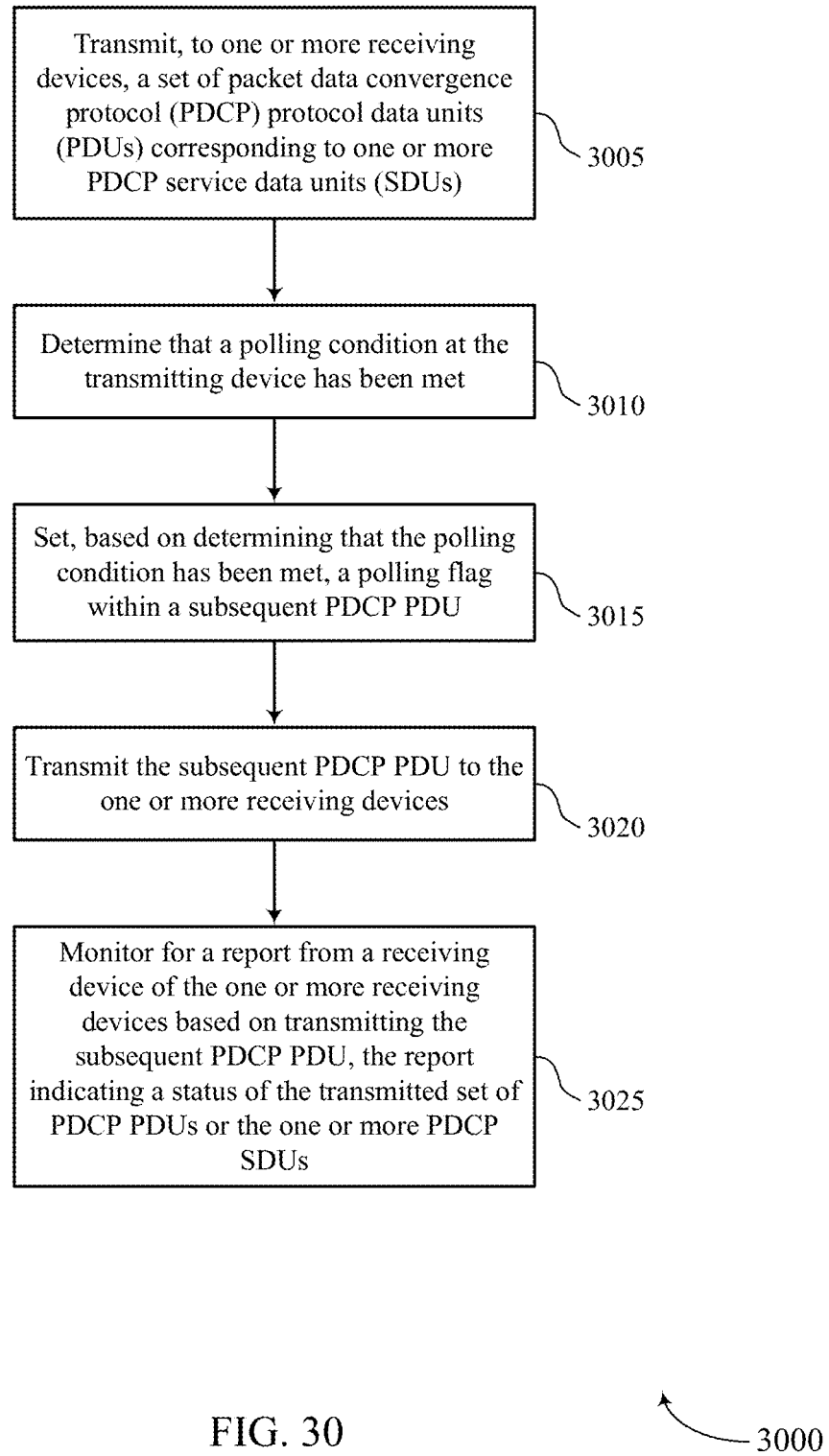

FIG. 30 shows a flowchart illustrating a method 3000 that supports polling and status reporting for network coding in accordance with aspects of the present disclosure. The operations of method 3000 may be implemented by a UE 115 or base station 105 or its components as described herein. For example, the operations of method 3000 may be performed by a communications manager as described with reference to FIGS. 14 through 18. In some examples, a UE or base station may execute a set of instructions to control the functional elements of the UE or base station to perform the functions described herein. Additionally or alternatively, a UE or base station may perform aspects of the functions described herein using special-purpose hardware.

At 3005, the UE or base station may transmit, to one or more receiving devices, a set of PDCP PDUs corresponding to one or more PDCP SDUs. The operations of 3005 may be performed according to the methods described herein. In some examples, aspects of the operations of 3005 may be performed by a PDU transmitter as described with reference to FIGS. 14 through 18.

At 3010, the UE or base station may determine that a polling condition at the transmitting device has been met. The operations of 3010 may be performed according to the methods described herein. In some examples, aspects of the operations of 3010 may be performed by a polling condition manager as described with reference to FIGS. 14 through 18.

At 3015, the UE or base station may set, based on determining that the polling condition has been met, a polling flag within a subsequent PDCP PDU. The operations of 3015 may be performed according to the methods described herein. In some examples, aspects of the operations of 3015 may be performed by a polling flag component as described with reference to FIGS. 14 through 18.

At 3020, the UE or base station may transmit the subsequent PDCP PDU to the one or more receiving devices. The operations of 3020 may be performed according to the methods described herein. In some examples, aspects of the operations of 3020 may be performed by a PDU transmitter as described with reference to FIGS. 14 through 18.

At 3025, the UE or base station may monitor for a report from a receiving device of the one or more receiving devices based on transmitting the subsequent PDCP PDU, the report indicating a status of the transmitted set of PDCP PDUs or the one or more PDCP SDUs. The operations of 3025 may be performed according to the methods described herein. In some examples, aspects of the operations of 3025 may be performed by a report monitor as described with reference to FIGS. 14 through 18.

Figure 31:
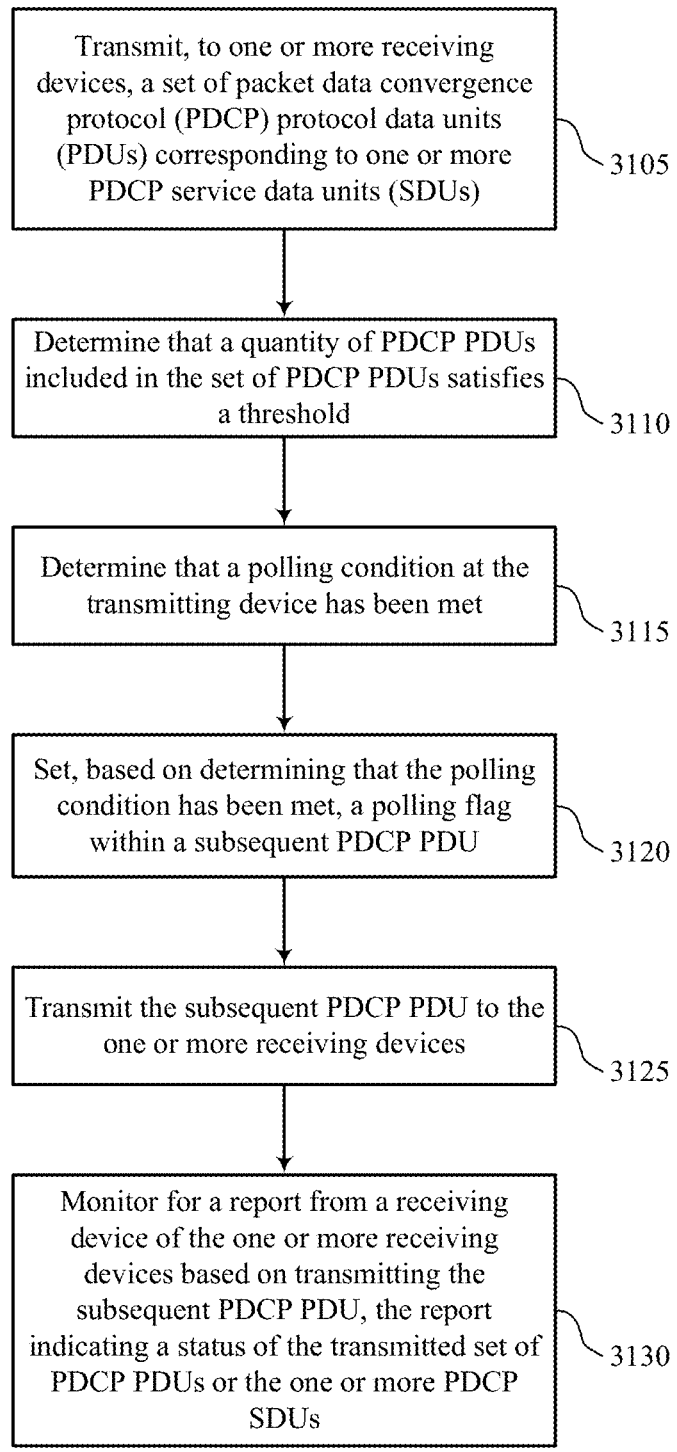

FIG. 31 shows a flowchart illustrating a method 3100 that supports polling and status reporting for network coding in accordance with aspects of the present disclosure. The operations of method 3100 may be implemented by a UE 115 or base station 105 or its components as described herein. For example, the operations of method 3100 may be performed by a communications manager as described with reference to FIGS. 14 through 18. In some examples, a UE or base station may execute a set of instructions to control the functional elements of the UE or base station to perform the functions described herein. Additionally or alternatively, a UE or base station may perform aspects of the functions described herein using special-purpose hardware.

At 3105, the UE or base station may transmit, to one or more receiving devices, a set of PDCP PDUs corresponding to one or more PDCP SDUs. The operations of 3105 may be performed according to the methods described herein. In some examples, aspects of the operations of 3105 may be performed by a PDU transmitter as described with reference to FIGS. 14 through 18.

At 3110, the UE or base station may determine that a quantity of PDCP PDUs included in the set of PDCP PDUs satisfies a threshold. The operations of 3110 may be performed according to the methods described herein. In some examples, aspects of the operations of 3110 may be performed by a polling condition manager as described with reference to FIGS. 14 through 18.

At 3115, the UE or base station may determine that a polling condition at the transmitting device has been met. The operations of 3115 may be performed according to the methods described herein. In some examples, aspects of the operations of 3115 may be performed by a polling condition manager as described with reference to FIGS. 14 through 18.

At 3120, the UE or base station may set, based on determining that the polling condition has been met, a polling flag within a subsequent PDCP PDU. The operations of 3120 may be performed according to the methods described herein. In some examples, aspects of the operations of 3120 may be performed by a polling flag component as described with reference to FIGS. 14 through 18.

At 3125, the UE or base station may transmit the subsequent PDCP PDU to the one or more receiving devices. The operations of 3125 may be performed according to the methods described herein. In some examples, aspects of the operations of 3125 may be performed by a PDU transmitter as described with reference to FIGS. 14 through 18.

At 3130, the UE or base station may monitor for a report from a receiving device of the one or more receiving devices based on transmitting the subsequent PDCP PDU, the report indicating a status of the transmitted set of PDCP PDUs or the one or more PDCP SDUs. The operations of 3130 may be performed according to the methods described herein. In some examples, aspects of the operations of 3130 may be performed by a report monitor as described with reference to FIGS. 14 through 18.

Figure 32:
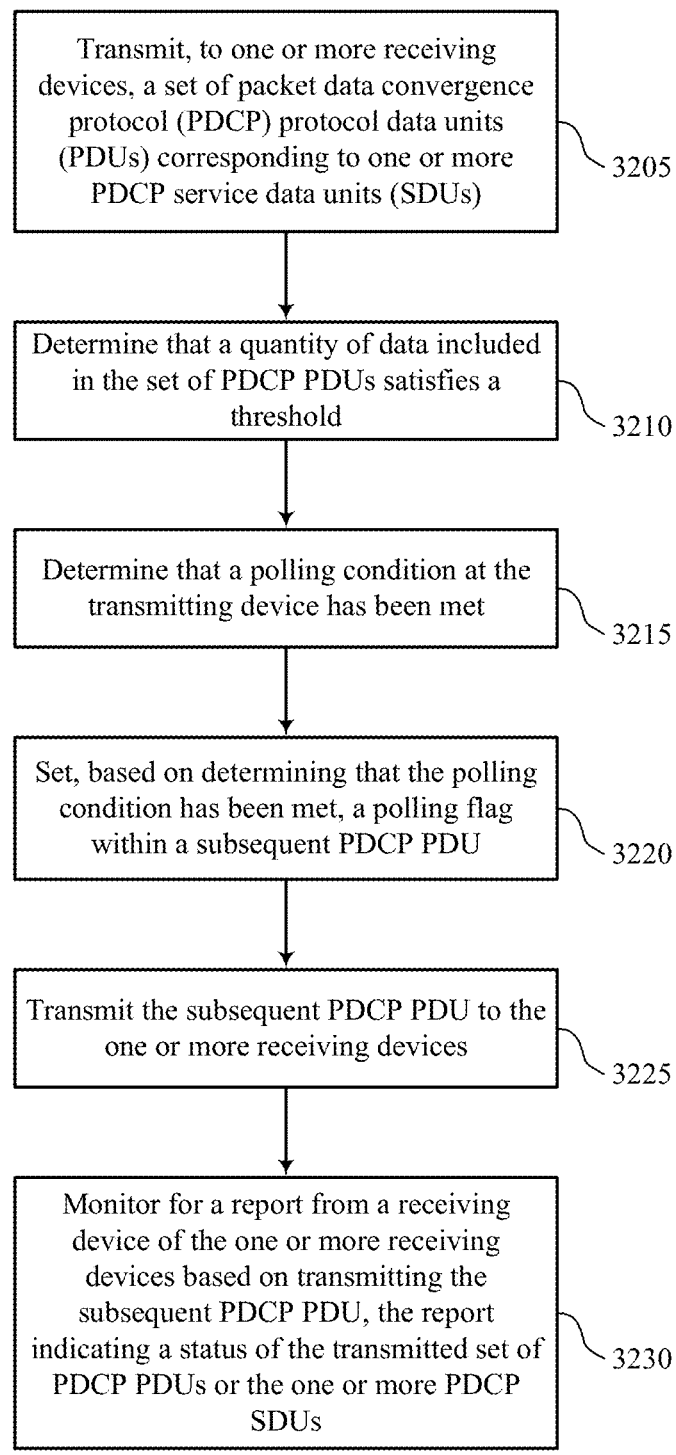

FIG. 32 shows a flowchart illustrating a method 3200 that supports polling and status reporting for network coding in accordance with aspects of the present disclosure. The operations of method 3200 may be implemented by a UE 115 or base station 105 or its components as described herein. For example, the operations of method 3200 may be performed by a communications manager as described with reference to FIGS. 14 through 18. In some examples, a UE or base station may execute a set of instructions to control the functional elements of the UE or base station to perform the functions described herein. Additionally or alternatively, a UE or base station may perform aspects of the functions described herein using special-purpose hardware.

At 3205, the UE or base station may transmit, to one or more receiving devices, a set of PDCP PDUs corresponding to one or more PDCP SDUs. The operations of 3205 may be performed according to the methods described herein. In some examples, aspects of the operations of 3205 may be performed by a PDU transmitter as described with reference to FIGS. 14 through 18.

At 3210, the UE or base station may determine that a quantity of data included in the set of PDCP PDUs satisfies a threshold. The operations of 3210 may be performed according to the methods described herein. In some examples, aspects of the operations of 3210 may be performed by a polling condition manager as described with reference to FIGS. 14 through 18.

At 3215, the UE or base station may determine that a polling condition at the transmitting device has been met. The operations of 3215 may be performed according to the methods described herein. In some examples, aspects of the operations of 3215 may be performed by a polling condition manager as described with reference to FIGS. 14 through 18.

At 3220, the UE or base station may set, based on determining that the polling condition has been met, a polling flag within a subsequent PDCP PDU. The operations of 3220 may be performed according to the methods described herein. In some examples, aspects of the operations of 3220 may be performed by a polling flag component as described with reference to FIGS. 14 through 18.

At 3225, the UE or base station may transmit the subsequent PDCP PDU to the one or more receiving devices. The operations of 3225 may be performed according to the methods described herein. In some examples, aspects of the operations of 3225 may be performed by a PDU transmitter as described with reference to FIGS. 14 through 18.

At 3230, the UE or base station may monitor for a report from a receiving device of the one or more receiving devices based on transmitting the subsequent PDCP PDU, the report indicating a status of the transmitted set of PDCP PDUs or the one or more PDCP SDUs. The operations of 3230 may be performed according to the methods described herein. In some examples, aspects of the operations of 3230 may be performed by a report monitor as described with reference to FIGS. 14 through 18.

Figure 33:
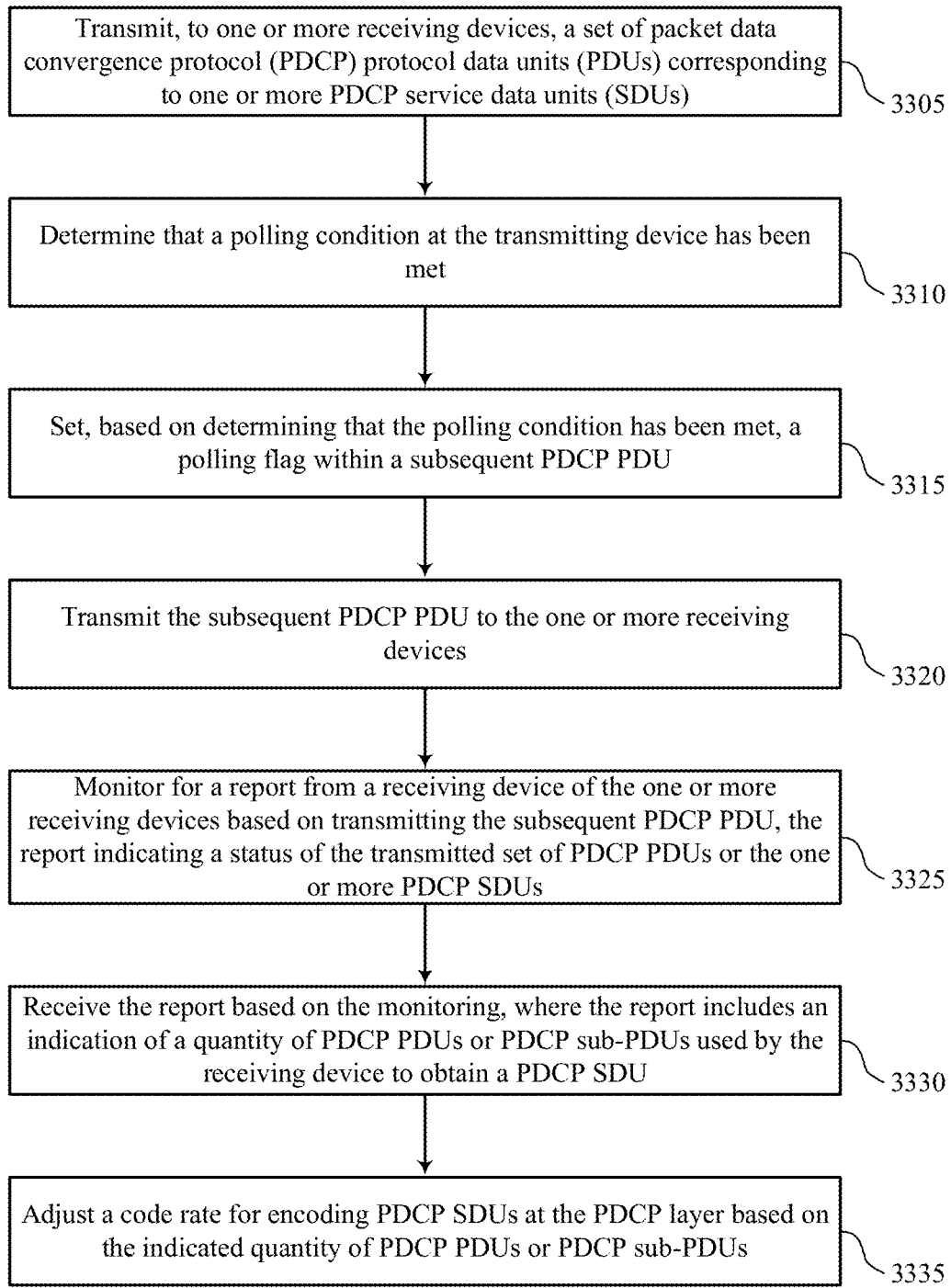

FIG. 33 shows a flowchart illustrating a method 3300 that supports polling and status reporting for network coding in accordance with aspects of the present disclosure. The operations of method 3300 may be implemented by a UE 115 or base station 105 or its components as described herein. For example, the operations of method 3300 may be performed by a communications manager as described with reference to FIGS. 14 through 18. In some examples, a UE or base station may execute a set of instructions to control the functional elements of the UE or base station to perform the functions described herein. Additionally or alternatively, a UE or base station may perform aspects of the functions described herein using special-purpose hardware.

At 3305, the UE or base station may transmit, to one or more receiving devices, a set of PDCP PDUs corresponding to one or more PDCP SDUs. The operations of 3305 may be performed according to the methods described herein. In some examples, aspects of the operations of 3305 may be performed by a PDU transmitter as described with reference to FIGS. 14 through 18.

At 3310, the UE or base station may determine that a polling condition at the transmitting device has been met. The operations of 3310 may be performed according to the methods described herein. In some examples, aspects of the operations of 3310 may be performed by a polling condition manager as described with reference to FIGS. 14 through 18.

At 3315, the UE or base station may set, based on determining that the polling condition has been met, a polling flag within a subsequent PDCP PDU. The operations of 3315 may be performed according to the methods described herein. In some examples, aspects of the operations of 3315 may be performed by a polling flag component as described with reference to FIGS. 14 through 18.

At 3320, the UE or base station may transmit the subsequent PDCP PDU to the one or more receiving devices. The operations of 3320 may be performed according to the methods described herein. In some examples, aspects of the operations of 3320 may be performed by a PDU transmitter as described with reference to FIGS. 14 through 18.

At 3325, the UE or base station may monitor for a report from a receiving device of the one or more receiving devices based on transmitting the subsequent PDCP PDU, the report indicating a status of the transmitted set of PDCP PDUs or the one or more PDCP SDUs. The operations of 3325 may be performed according to the methods described herein. In some examples, aspects of the operations of 3325 may be performed by a report monitor as described with reference to FIGS. 14 through 18.

At 3330, the UE or base station may receive the report based on the monitoring, where the report includes an indication of a quantity of PDCP PDUs or PDCP sub-PDUs used by the receiving device to obtain a PDCP SDU. The operations of 3330 may be performed according to the methods described herein. In some examples, aspects of the operations of 3330 may be performed by a report monitor as described with reference to FIGS. 14 through 18.

At 3335, the UE or base station may adjust a code rate for encoding PDCP SDUs at the PDCP layer based on the indicated quantity of PDCP PDUs or PDCP sub-PDUs. The operations of 3335 may be performed according to the methods described herein. In some examples, aspects of the operations of 3335 may be performed by a code rate manager as described with reference to FIGS. 14 through 18.

Figure 34:
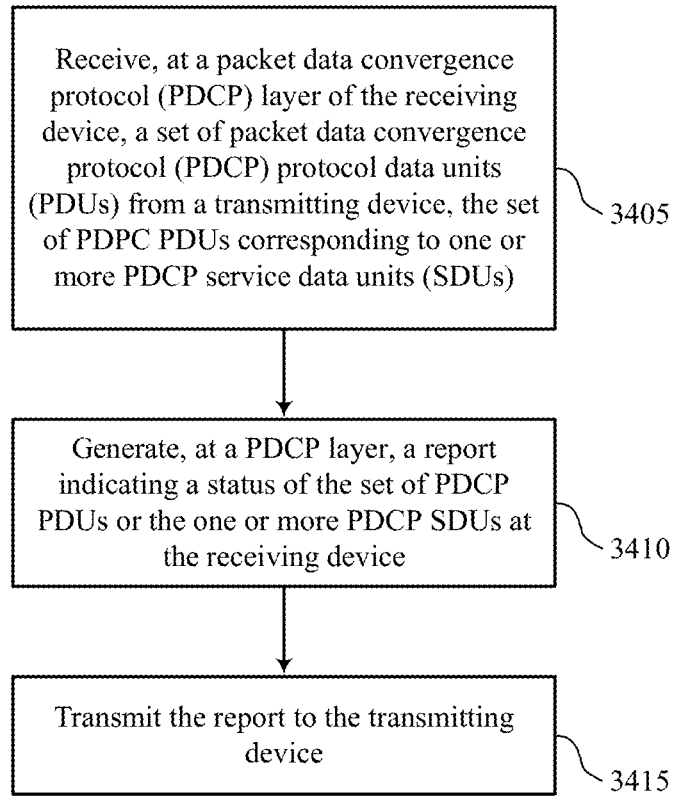

FIG. 34 shows a flowchart illustrating a method 3400 that supports polling and status reporting for network coding in accordance with aspects of the present disclosure. The operations of method 3400 may be implemented by a UE 115 or base station 105 or its components as described herein. For example, the operations of method 3400 may be performed by a communications manager as described with reference to FIGS. 14 through 18. In some examples, a UE or base station may execute a set of instructions to control the functional elements of the UE or base station to perform the functions described herein. Additionally or alternatively, a UE or base station may perform aspects of the functions described herein using special-purpose hardware.

At 3405, the UE or base station may receive, at a PDCP layer of the receiving device, a set of PDCP PDUs from a transmitting device, the set of PDPC PDUs corresponding to one or more PDCP SDUs. The operations of 3405 may be performed according to the methods described herein. In some examples, aspects of the operations of 3405 may be performed by a PDU receiver as described with reference to FIGS. 14 through 18.

At 3410, the UE or base station may generate, at the PDCP layer, a report indicating a status of the set of PDCP PDUs or the one or more PDCP SDUs at the receiving device. The operations of 3410 may be performed according to the methods described herein. In some examples, aspects of the operations of 3410 may be performed by a report generator as described with reference to FIGS. 14 through 18.

At 3415, the UE or base station may transmit the report to the transmitting device. The operations of 3415 may be performed according to the methods described herein. In some examples, aspects of the operations of 3415 may be performed by a report transmitter as described with reference to FIGS. 14 through 18.

Figure 35:
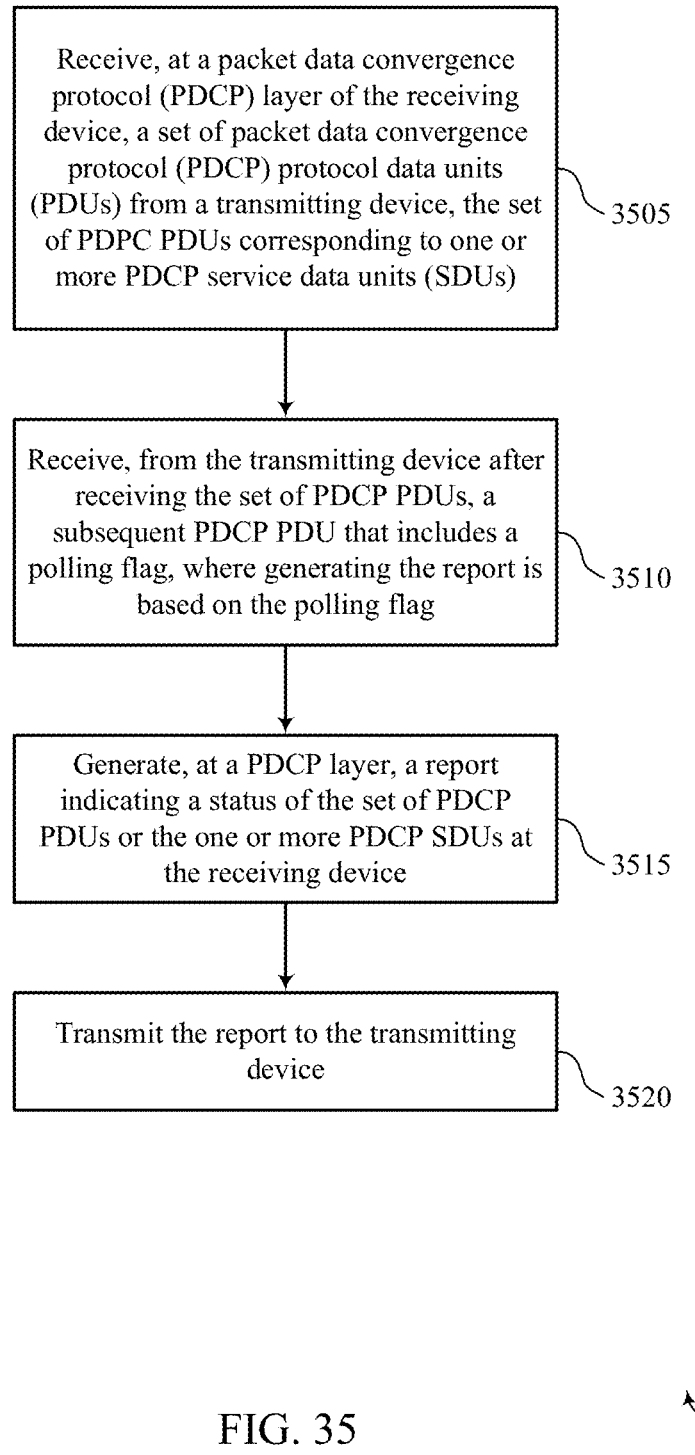

FIG. 35 shows a flowchart illustrating a method 3500 that supports polling and status reporting for network coding in accordance with aspects of the present disclosure. The operations of method 3500 may be implemented by a UE 115 or base station 105 or its components as described herein. For example, the operations of method 3500 may be performed by a communications manager as described with reference to FIGS. 14 through 18. In some examples, a UE or base station may execute a set of instructions to control the functional elements of the UE or base station to perform the functions described herein. Additionally or alternatively, a UE or base station may perform aspects of the functions described herein using special-purpose hardware.

At 3505, the UE or base station may receive, at a PDCP layer of the receiving device, a set of PDCP PDUs from a transmitting device, the set of PDPC PDUs corresponding to one or more PDCP SDUs. The operations of 3505 may be performed according to the methods described herein. In some examples, aspects of the operations of 3505 may be performed by a PDU receiver as described with reference to FIGS. 14 through 18.

At 3510, the UE or base station may receive, from the transmitting device after receiving the set of PDCP PDUs, a subsequent PDCP PDU that includes a polling flag, where generating the report is based on the polling flag. The operations of 3510 may be performed according to the methods described herein. In some examples, aspects of the operations of 3510 may be performed by a PDU receiver as described with reference to FIGS. 14 through 18.

At 3515, the UE or base station may generate, at the PDCP layer, a report indicating a status of the set of PDCP PDUs or the one or more PDCP SDUs at the receiving device. The operations of 3515 may be performed according to the methods described herein. In some examples, aspects of the operations of 3515 may be performed by a report generator as described with reference to FIGS. 14 through 18.

At 3520, the UE or base station may transmit the report to the transmitting device. The operations of 3520 may be performed according to the methods described herein. In some examples, aspects of the operations of 3520 may be performed by a report transmitter as described with reference to FIGS. 14 through 18.

Figure 36:
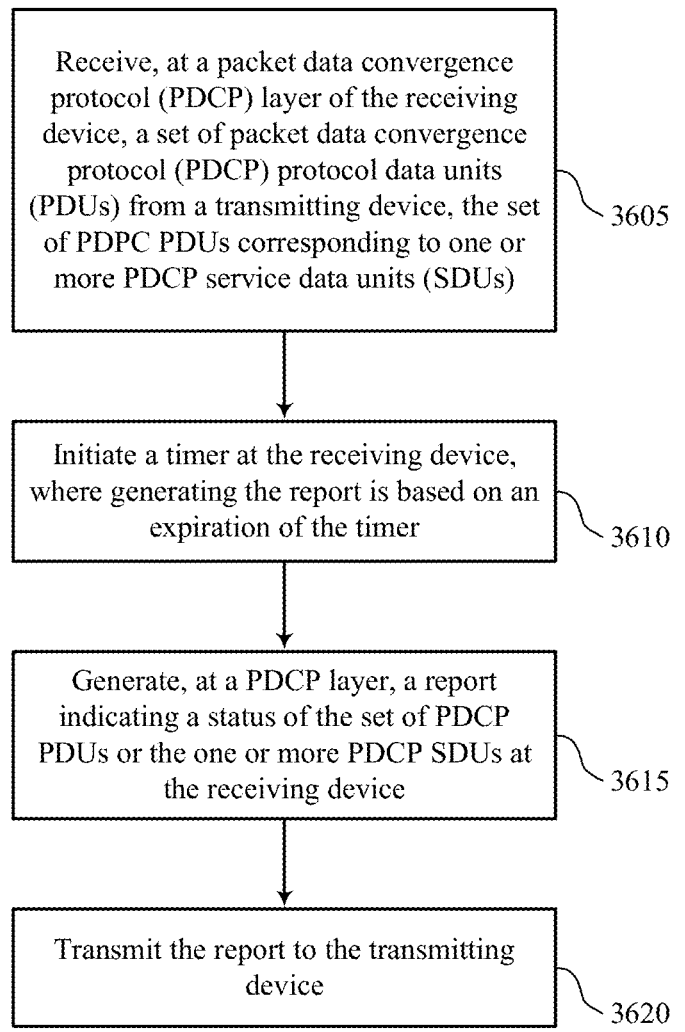

FIG. 36 shows a flowchart illustrating a method 3600 that supports polling and status reporting for network coding in accordance with aspects of the present disclosure. The operations of method 3600 may be implemented by a UE 115 or base station 105 or its components as described herein. For example, the operations of method 3600 may be performed by a communications manager as described with reference to FIGS. 14 through 18. In some examples, a UE or base station may execute a set of instructions to control the functional elements of the UE or base station to perform the functions described herein. Additionally or alternatively, a UE or base station may perform aspects of the functions described herein using special-purpose hardware.

At 3605, the UE or base station may receive, at a PDCP layer of the receiving device, a set of PDCP PDUs from a transmitting device, the set of PDPC PDUs corresponding to one or more PDCP SDUs. The operations of 3605 may be performed according to the methods described herein. In some examples, aspects of the operations of 3605 may be performed by a PDU receiver as described with reference to FIGS. 14 through 18.

At 3610, the UE or base station may initiate a timer at the receiving device, where generating the report is based on an expiration of the timer. The operations of 3610 may be performed according to the methods described herein. In some examples, aspects of the operations of 3610 may be performed by a timer manager as described with reference to FIGS. 14 through 18.

At 3615, the UE or base station may generate, at the PDCP layer, a report indicating a status of the set of PDCP PDUs or the one or more PDCP SDUs at the receiving device. The operations of 3615 may be performed according to the methods described herein. In some examples, aspects of the operations of 3615 may be performed by a report generator as described with reference to FIGS. 14 through 18.

At 3620, the UE or base station may transmit the report to the transmitting device. The operations of 3620 may be performed according to the methods described herein. In some examples, aspects of the operations of 3620 may be performed by a report transmitter as described with reference to FIGS. 14 through 18.

Figure 37:
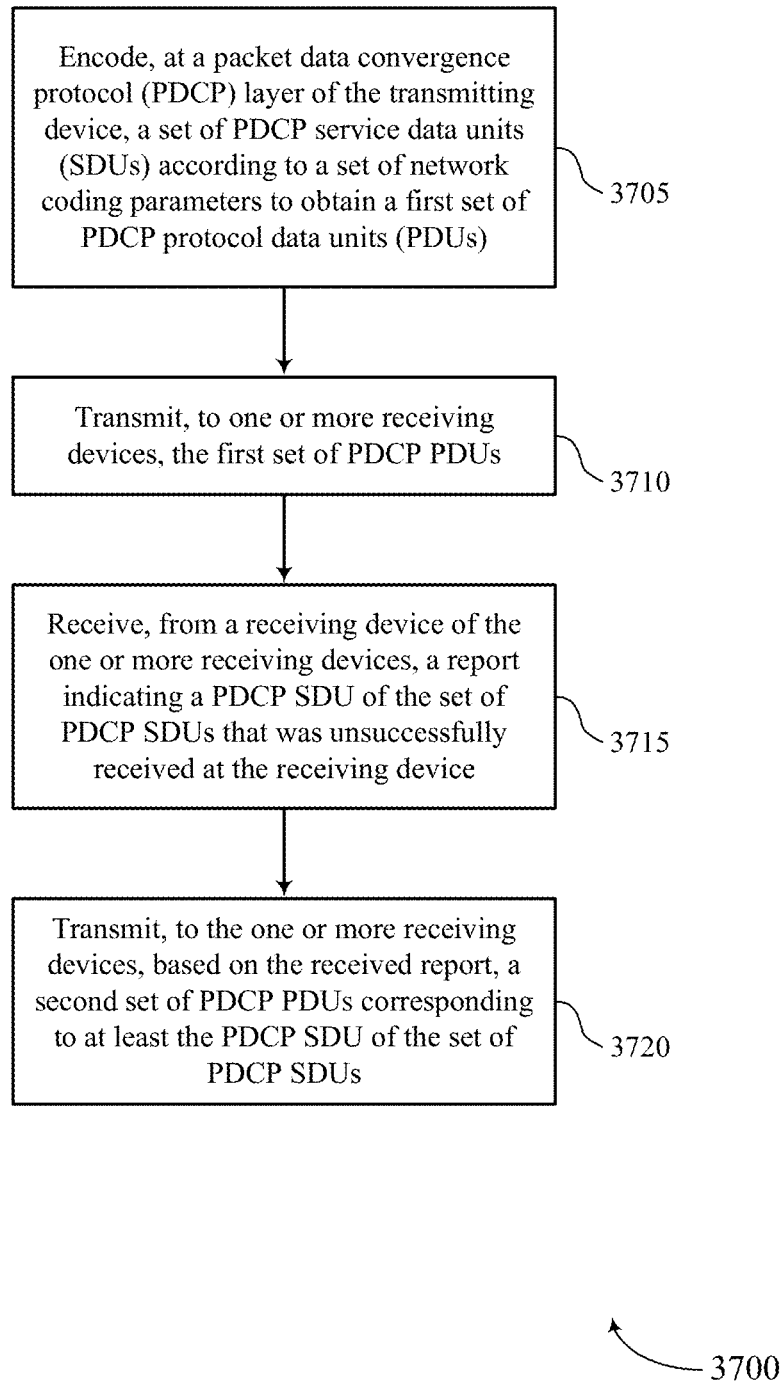

FIG. 37 shows a flowchart illustrating a method 3700 that supports retransmission procedures at an L2 layer in accordance with aspects of the present disclosure. The operations of method 3700 may be implemented by a UE 115 or base station 105 or its components as described herein. For example, the operations of method 3700 may be performed by a communications manager as described with reference to FIGS. 14 through 18. In some examples, a UE or base station may execute a set of instructions to control the functional elements of the UE or base station to perform the functions described below. Additionally or alternatively, a UE or base station may perform aspects of the functions described below using special-purpose hardware.

At 3705, the UE or base station may encode, at a PDCP layer of the transmitting device, a set of PDCP SDUs according to a set of network coding parameters to obtain a first set of PDCP PDUs. The operations of 3705 may be performed according to the methods described herein. In some examples, aspects of the operations of 3705 may be performed by a SDU encoder as described with reference to FIGS. 14 through 18.

At 3710, the UE or base station may transmit, to one or more receiving devices, the first set of PDCP PDUs. The operations of 3710 may be performed according to the methods described herein. In some examples, aspects of the operations of 3710 may be performed by a PDU transmitter as described with reference to FIGS. 14 through 18.

At 3715, the UE or base station may receive, from a receiving device of the one or more receiving devices, a report indicating a PDCP SDU of the set of PDCP SDUs that was unsuccessfully received at the receiving device. The operations of 3715 may be performed according to the methods described herein. In some examples, aspects of the operations of 3715 may be performed by a report receiver as described with reference to FIGS. 14 through 18.

At 3720, the UE or base station may transmit, to the one or more receiving devices, based on the received report, a second set of PDCP PDUs corresponding to at least the PDCP SDU of the set of PDCP SDUs. The operations of 3720 may be performed according to the methods described herein. In some examples, aspects of the operations of 3720 may be performed by a retransmission component as described with reference to FIGS. 14 through 18.

Figure 38:
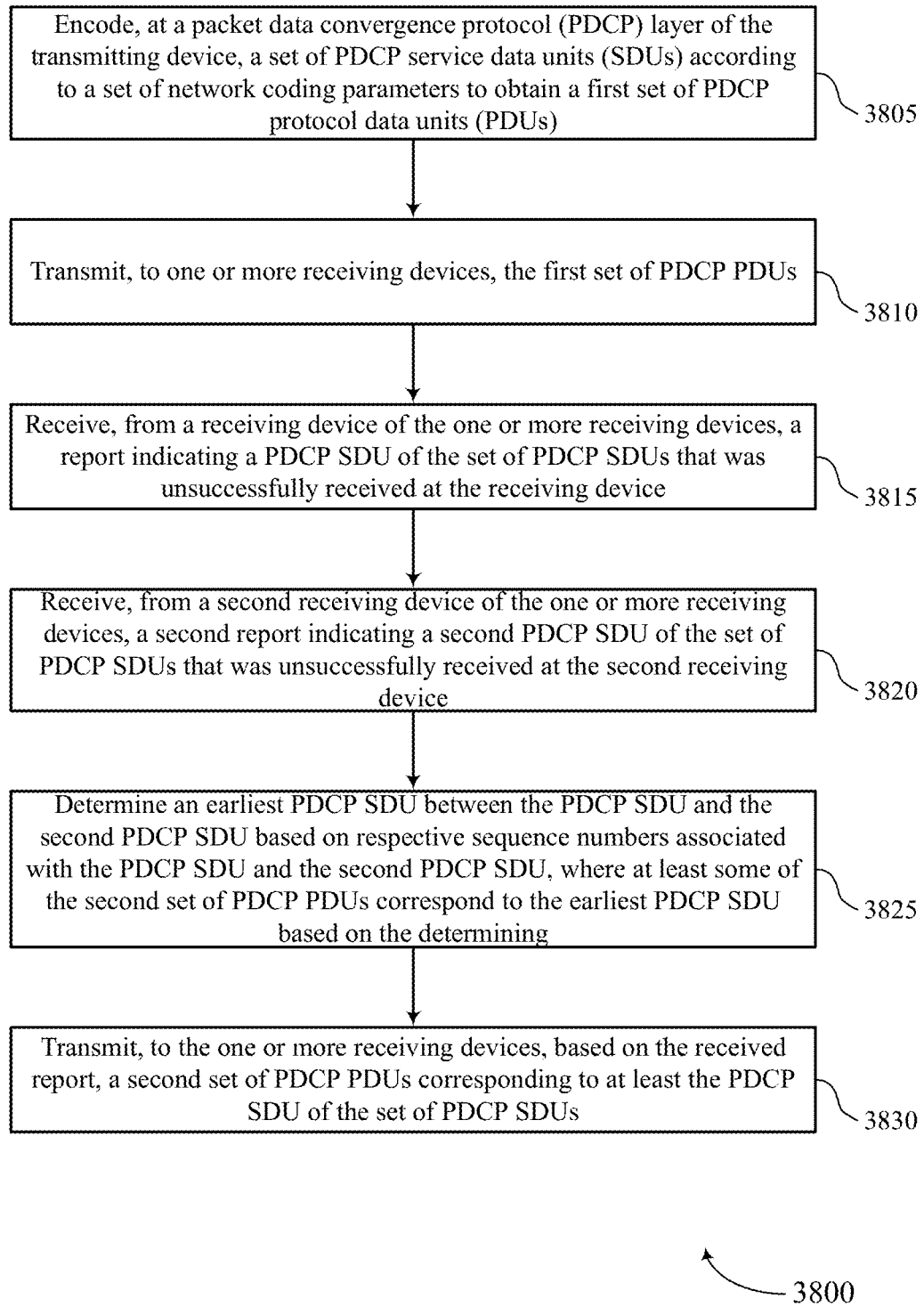

FIG. 38 shows a flowchart illustrating a method 3800 that supports retransmission procedures at an L2 layer in accordance with aspects of the present disclosure. The operations of method 3800 may be implemented by a UE 115 or base station 105 or its components as described herein. For example, the operations of method 3800 may be performed by a communications manager as described with reference to FIGS. 14 through 18. In some examples, a UE or base station may execute a set of instructions to control the functional elements of the UE or base station to perform the functions described below. Additionally or alternatively, a UE or base station may perform aspects of the functions described below using special-purpose hardware.

At 3805, the UE or base station may encode, at a PDCP layer of the transmitting device, a set of PDCP SDUs according to a set of network coding parameters to obtain a first set of PDCP PDUs. The operations of 3805 may be performed according to the methods described herein. In some examples, aspects of the operations of 3805 may be performed by a SDU encoder as described with reference to FIGS. 14 through 18.

At 3810, the UE or base station may transmit, to one or more receiving devices, the first set of PDCP PDUs. The operations of 3810 may be performed according to the methods described herein. In some examples, aspects of the operations of 3810 may be performed by a PDU transmitter as described with reference to FIGS. 14 through 18.

At 3815, the UE or base station may receive, from a receiving device of the one or more receiving devices, a report indicating a PDCP SDU of the set of PDCP SDUs that was unsuccessfully received at the receiving device. The operations of 3815 may be performed according to the methods described herein. In some examples, aspects of the operations of 3815 may be performed by a report receiver as described with reference to FIGS. 14 through 18.

At 3820, the UE or base station may receive, from a second receiving device of the one or more receiving devices, a second report indicating a second PDCP SDU of the set of PDCP SDUs that was unsuccessfully received at the second receiving device. The operations of 3820 may be performed according to the methods described herein. In some examples, aspects of the operations of 3820 may be performed by a report receiver as described with reference to FIGS. 14 through 18.

At 3825, the UE or base station may determine an earliest PDCP SDU between the PDCP SDU and the second PDCP SDU based on respective sequence numbers associated with the PDCP SDU and the second PDCP SDU, where at least some of the second set of PDCP PDUs correspond to the earliest PDCP SDU based on the determining. The operations of 3825 may be performed according to the methods described herein. In some examples, aspects of the operations of 3825 may be performed by a sequence number manager as described with reference to FIGS. 14 through 18.

At 3830, the UE or base station may transmit, to the one or more receiving devices, based on the received report, a second set of PDCP PDUs corresponding to at least the PDCP SDU of the set of PDCP SDUs. The operations of 3830 may be performed according to the methods described herein. In some examples, aspects of the operations of 3830 may be performed by a retransmission component as described with reference to FIGS. 14 through 18.

Figure 39:
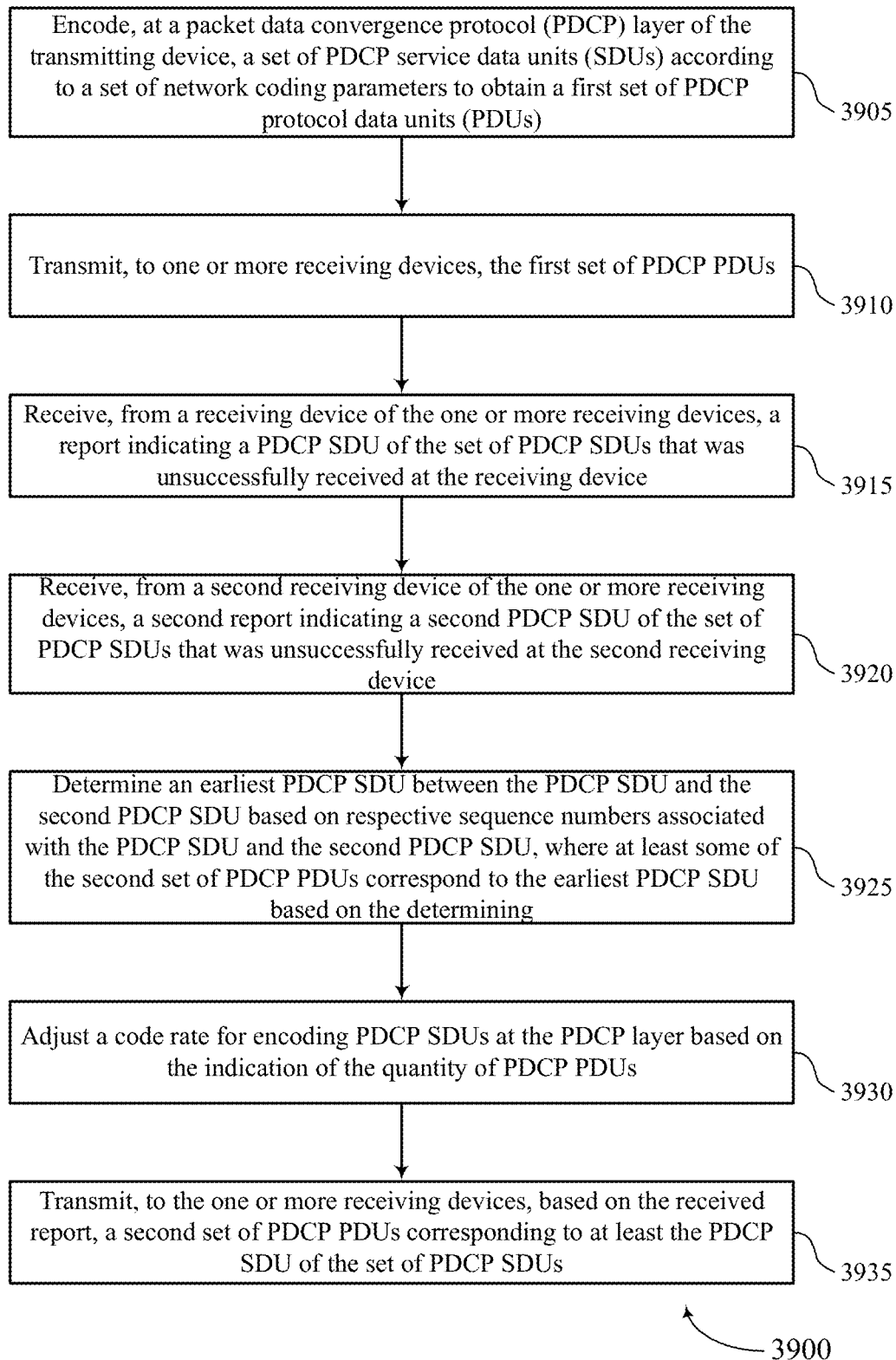

FIG. 39 shows a flowchart illustrating a method 3900 that supports retransmission procedures at an L2 layer in accordance with aspects of the present disclosure. The operations of method 3900 may be implemented by a UE 115 or base station 105 or its components as described herein. For example, the operations of method 3900 may be performed by a communications manager as described with reference to FIGS. 14 through 18. In some examples, a UE or base station may execute a set of instructions to control the functional elements of the UE or base station to perform the functions described below. Additionally or alternatively, a UE or base station may perform aspects of the functions described below using special-purpose hardware.

At 3905, the UE or base station may encode, at a PDCP layer of the transmitting device, a set of PDCP SDUs according to a set of network coding parameters to obtain a first set of PDCP PDUs. The operations of 3905 may be performed according to the methods described herein. In some examples, aspects of the operations of 3905 may be performed by a SDU encoder as described with reference to FIGS. 14 through 18.

At 3910, the UE or base station may transmit, to one or more receiving devices, the first set of PDCP PDUs. The operations of 3910 may be performed according to the methods described herein. In some examples, aspects of the operations of 3910 may be performed by a PDU transmitter as described with reference to FIGS. 14 through 18.

At 3915, the UE or base station may receive, from a receiving device of the one or more receiving devices, a report indicating a PDCP SDU of the set of PDCP SDUs that was unsuccessfully received at the receiving device. The operations of 3915 may be performed according to the methods described herein. In some examples, aspects of the operations of 3915 may be performed by a report receiver as described with reference to FIGS. 14 through 18.

At 3920, the UE or base station may receive, from a second receiving device of the one or more receiving devices, a second report indicating a second PDCP SDU of the set of PDCP SDUs that was unsuccessfully received at the second receiving device. The operations of 3920 may be performed according to the methods described herein. In some examples, aspects of the operations of 3920 may be performed by a report receiver as described with reference to FIGS. 14 through 18.

At 3925, the UE or base station may determine an earliest PDCP SDU between the PDCP SDU and the second PDCP SDU based on respective sequence numbers associated with the PDCP SDU and the second PDCP SDU, where at least some of the second set of PDCP PDUs correspond to the earliest PDCP SDU based on the determining. The operations of 3925 may be performed according to the methods described herein. In some examples, aspects of the operations of 3925 may be performed by a sequence number manager as described with reference to FIGS. 14 through 18.

At 3930, the UE or base station may adjust a code rate for encoding PDCP SDUs at the PDCP layer based on the indication of the quantity of PDCP PDUs. The operations of 3930 may be performed according to the methods described herein. In some examples, aspects of the operations of 3930 may be performed by a code rate component as described with reference to FIGS. 14 through 18.

At 3935, the UE or base station may transmit, to the one or more receiving devices, based on the received report, a second set of PDCP PDUs corresponding to at least the PDCP SDU of the set of PDCP SDUs. The operations of 3935 may be performed according to the methods described herein. In some examples, aspects of the operations of 3935 may be performed by a retransmission component as described with reference to FIGS. 14 through 18.

Figure 40:
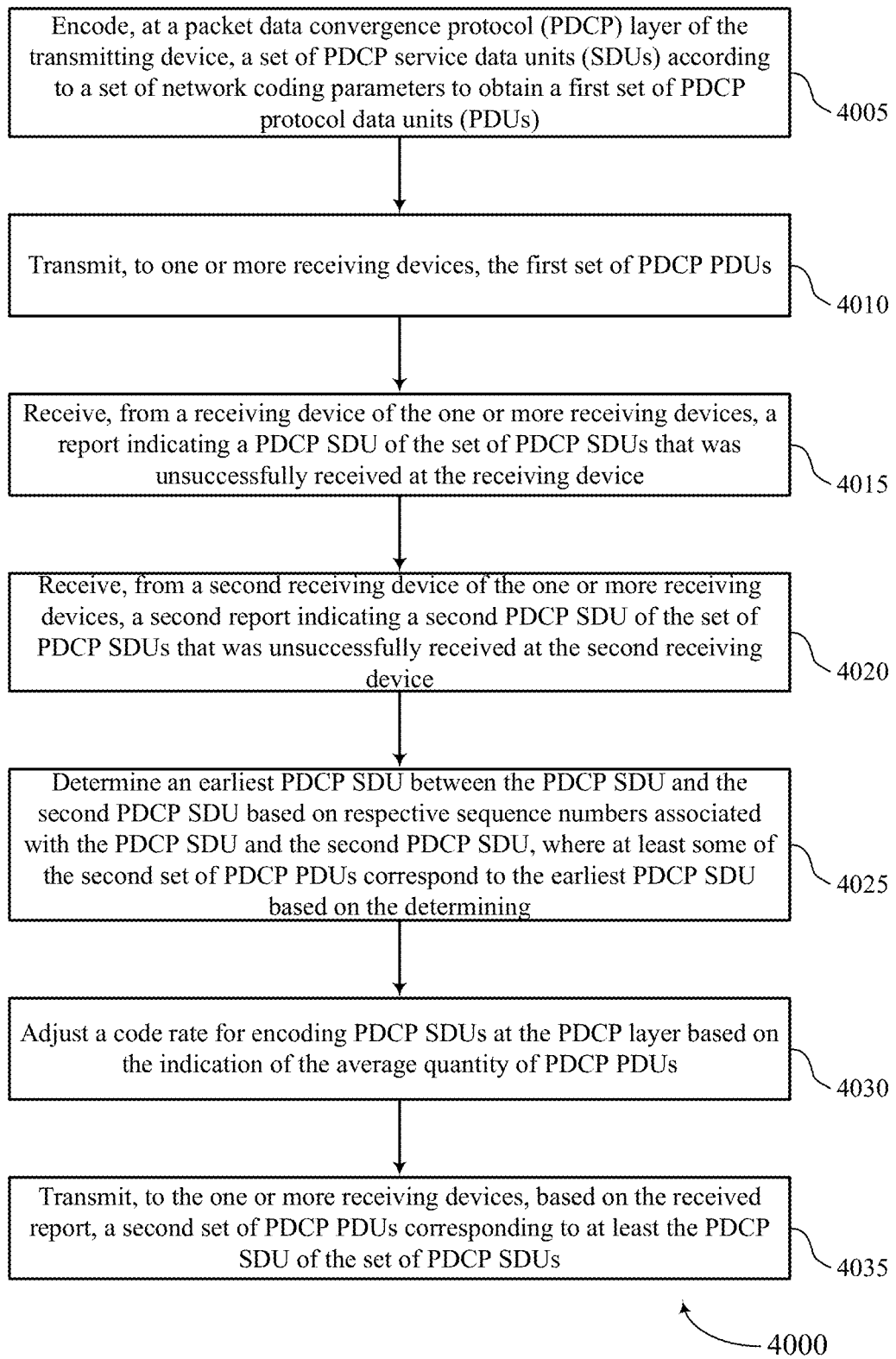

FIG. 40 shows a flowchart illustrating a method 4000 that supports retransmission procedures at an L2 layer in accordance with aspects of the present disclosure. The operations of method 4000 may be implemented by a UE 115 or base station 105 or its components as described herein. For example, the operations of method 4000 may be performed by a communications manager as described with reference to FIGS. 14 through 18. In some examples, a UE or base station may execute a set of instructions to control the functional elements of the UE or base station to perform the functions described below. Additionally or alternatively, a UE or base station may perform aspects of the functions described below using special-purpose hardware.

At 4005, the UE or base station may encode, at a PDCP layer of the transmitting device, a set of PDCP SDUs according to a set of network coding parameters to obtain a first set of PDCP PDUs. The operations of 4005 may be performed according to the methods described herein. In some examples, aspects of the operations of 4005 may be performed by a SDU encoder as described with reference to FIGS. 14 through 18.

At 4010, the UE or base station may transmit, to one or more receiving devices, the first set of PDCP PDUs. The operations of 4010 may be performed according to the methods described herein. In some examples, aspects of the operations of 4010 may be performed by a PDU transmitter as described with reference to FIGS. 14 through 18.

At 4015, the UE or base station may receive, from a receiving device of the one or more receiving devices, a report indicating a PDCP SDU of the set of PDCP SDUs that was unsuccessfully received at the receiving device. The operations of 4015 may be performed according to the methods described herein. In some examples, aspects of the operations of 4015 may be performed by a report receiver as described with reference to FIGS. 14 through 18.

At 4020, the UE or base station may receive, from a second receiving device of the one or more receiving devices, a second report indicating a second PDCP SDU of the set of PDCP SDUs that was unsuccessfully received at the second receiving device. The operations of 4020 may be performed according to the methods described herein. In some examples, aspects of the operations of 4020 may be performed by a report receiver as described with reference to FIGS. 14 through 18.

At 4025, the UE or base station may determine an earliest PDCP SDU between the PDCP SDU and the second PDCP SDU based on respective sequence numbers associated with the PDCP SDU and the second PDCP SDU, where at least some of the second set of PDCP PDUs correspond to the earliest PDCP SDU based on the determining. The operations of 4025 may be performed according to the methods described herein. In some examples, aspects of the operations of 4025 may be performed by a sequence number manager as described with reference to FIGS. 14 through 18.

At 4030, the UE or base station may adjust a code rate for encoding PDCP SDUs at the PDCP layer based on the indication of the average quantity of PDCP PDUs. The operations of 4030 may be performed according to the methods described herein. In some examples, aspects of the operations of 4030 may be performed by a code rate component as described with reference to FIGS. 14 through 18.

At 4035, the UE or base station may transmit, to the one or more receiving devices, based on the received report, a second set of PDCP PDUs corresponding to at least the PDCP SDU of the set of PDCP SDUs. The operations of 4035 may be performed according to the methods described herein. In some examples, aspects of the operations of 4035 may be performed by a retransmission component as described with reference to FIGS. 14 through 18.

FIG. 41 shows flow 4100 providing example operation by a RLC transmit entity configured for network coding augmented communication of RLC layer payload. The functions of flow 4100 may, for example, be implemented by radio link protocol logic executed by one or more processors of a device of wireless network. For example, the functions of the illustrated example may be implemented by radio link protocol logic of a base station 105 in RLC layer communication with one or more other devices (e.g., base stations 105, UEs 115, etc.) of wireless network 100. As another example, the functions of the illustrated example may be implemented by radio link protocol logic of a UE 115 in RLC layer communication with one or more other devices (e.g., base stations 105, UEs 115, etc.) of wireless network 100.

In operation according to the illustrated example of flow 4100, NCA RLC layer communication between a RLC transmit entity and one or more RLC receive entities may be enabled at block 4101. For example, a NCA RLC layer communication protocol may be selected, provisioned, and/or initiated, an available or supported form of network coding selected or designated for use, network coding parameters configured, NCA RLC status feedback parameters configured, etc. Various erasure codes (e.g., a selected erasure code, such as a fountain code, tornado code, LDPC code, Reed-Solomon coding, MDS code, etc.) may be selected for use in network coding with respect to RLC layer communications of a NCA RLC layer communication protocol. In operation according to some aspects of the disclosure, a fountain code or a Raptor code may be selected for use with respect to communication of RLC layer payload for generating repair data with respect to source data for RLC data transfer. Various network coding parameters, such as a minimum code rate for encoding source data RLC PDUs, etc., may be selected and/or configured at the RLC transmit entity, such as using RRC signaling. Further various NCA RLC status feedback parameters, such as feedback path or type (e.g., RLC status reporting, reverse link reporting, etc.), NCA feedback configuration (e.g., a number of encoded RLC PDUs used to reassemble a RLC SDU field, RLC SDU/RLC PDU feedback level, sequence number (SN) and segment offset (SO) information fields, etc.), may be selected and/or configured at the RLC transmit entity.

Enabling NCA RLC layer communication according to block 4101 may include providing signaling by the RLC transmit entity or otherwise causing signaling to be provided to one or more RLC receive entities for configuring NCA RLC layer communication operation in RLC layer communications between the RLC transmit entity and the one or more RLC receive entities. For example, the RLC transmit entity may provide information to the one or more RLC receive entities regarding the NCA RLC layer communication protocol selected, provisioned, and/or initiated at the RLC transmit entity, one or more of the various network coding parameters selected and/or configured at the RLC transmit entity, one or more of the various NCA RLC status feedback parameters selected and/or configured at the RLC transmit entity, etc. The RLC transmit entity may additionally or alternatively provide information for NCA RLC layer communication operation to the one or more RLC receive entities in addition to or in the alternative to the foregoing information used by the RLC transmit entity. For example, configuration parameters used by a RLC receive entity, such as a minimum number of encoded RLC PDUs for decoding a RLC SDU (e.g., a minimum number of encoded RLC PDUs to be received before initiating decoding a respective RLC SDU), may be provided to the one or more RLC receive entities.

At block 4102 of flow 1400 shown in FIG. 41, RLC layer SDU payload may be encoded by the RLC transmit entity using the network coding based on a configured coding rate to provide a plurality of encoded RLC PDUs for each RLC SDU of a plurality of RLC SDUs. The configured coding rate may, for example, comprise the configured minimum code rate for the source data RLC PDUs, such as may be dynamically adjusted from time to time (e.g., based on NCA RLC status feedback, such as information indicating the number of encoded RLC PDUs used to reassemble a RLC SDU). The configured coding rate of some examples may parameterize one or more aspects of the network code, such as to designate a number of repair fragments, r, to be provided for each source data object (e.g., the network code may be parameterized as (p; k; r) where k is the number of source data fragments of a source data object, p is the total number of encoded symbols, and r=p−k is the number of repair data fragments).

Figure 44:
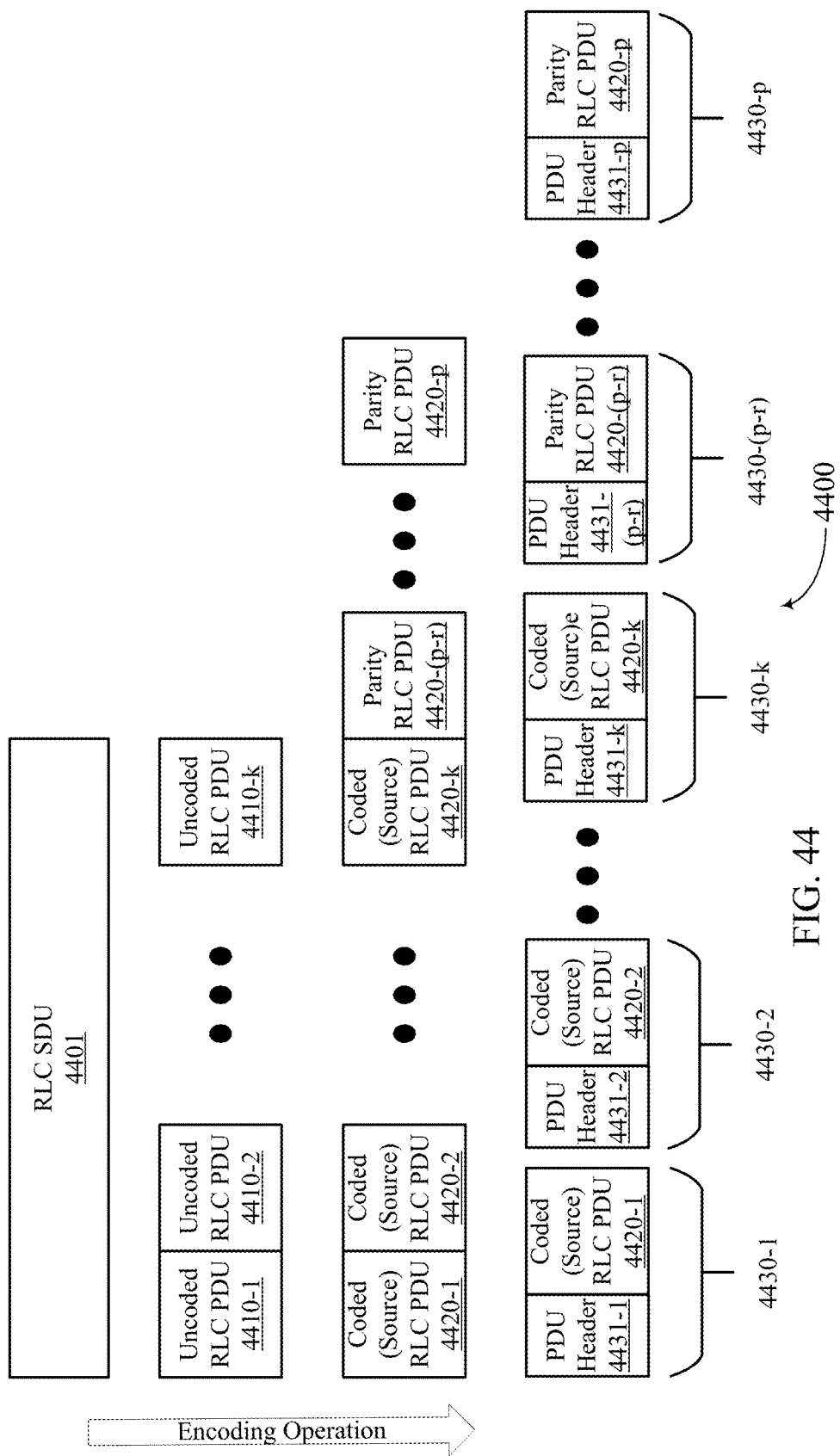
FIG. 44 is a graphical representation of RLC layer service data unit (SDU) encoding providing encoded RLC protocol data units (PDUs) according to some embodiments of the present disclosure.

Encoding payload of each RLC layer SDU of the plurality of RLC SDUs in accordance with some aspects of the disclosure may include segmenting the payload of a respective RLC SDU into a plurality of RLC PDUs. For example, source data objects may be provided as RLC SDUs from a layer (e.g., PDCP, RRC, etc.) above the RLC layer. Turning briefly to the encoding example of FIG. 44, radio link protocol logic of the RLC transmit entity may segment the RLC SDU payload (RLC SDU 4401) into a plurality of source data RLC PDUs (un-coded RLC PDUs 4410-*l* through 4410-*k*). For example, each RLC SDU may be segmented into k source data fragments of equal size. Network coding (e.g., a selected erasure code, such as a fountain code, tornado code, LDPC code, Reed-Solomon coding, MDS code, etc.) may be applied to the plurality of RLC PDUs to generate source data RLC PDUs and repair data RLC PDUs of the plurality of encoded RLC PDUs for the respective RLC SDU. For example, as shown in FIG. 44, network coding of un-coded RLC PDUs 4410-*l* through 4410-*k* may provide coded source RLC PDUs 4420-*l* through 4420-*k* and repair RLC PDUs 4420-(*p-r*) through 4420-*p*. The repair RLC PDUs comprise repair data (e.g., parity data in the case of examples of a fountain code) generated from the source data and which is configured for use in recovering the source data according to aspects of the disclosure.

Encoding operation implemented to provide encoded RLC PDUs may include one or more functions in addition to the aforementioned segmentation and network coding. For example, in accordance with some aspects of the disclosure a RLC header (e.g., headers 4431-*l* through 4431-*p* shown in FIG. 44) may be added or appended to each source data RLC PDU (e.g., coded source RLC PDUs 4420-*l* through 4420-*k*) and repair data RLC PDU (repair RLC PDUs 4420-(*p-r*) through 4420-*p*) of the plurality of encoded RLC PDUs (e.g., encoded RLC PDUs 4430-*l* through 4430-*p*) for the respective RLC SDU (e.g., RLC SDU 401).

RLC headers of some examples may include information useful in the reconstruction of the source data. In accordance with some aspects of the disclosure, each RLC SDU provided to the RLC layer may have a SN, such as for identifying the particular RLC SDU payload to a layer above the RLC layer. A sub-SN may be provided (e.g., generated by the radio link protocol logic, such as based upon the RLC SDU SN) for each of the source data RLC PDUs and repair data RLC PDUs of a respective RLC SDU. Sub-SNs may, for example, indicate an index for each encoded RLC PDU of the plurality of RLC PDUs associated with the respective RLC SDU SN, such as may be utilized by a RLC receive entity in reconstructing the respective RLC SDU. The RLC header of some examples may include the SN of the respective RLC SDU and the sub-SN of the encoded RLC PDU. Additionally or alternatively, the RLC header of some examples may include a flag to indicate whether the encoded RLC PDU is a last RLC PDU of the plurality of encoded RLC PDUs for the respective RLC SDU.

The plurality of encoded RLC PDUs for each respective RLC SDU of the plurality of RLC SDUs may be transmitted by the RLC transmit entity to the one or more RLC receive entities at block 4103 of the illustrated example of flow 4100. NCA RLC layer communication according to aspects of the disclosure may be implemented with respect to broadcast systems, multicast systems, PTM systems, SC-PTM systems, unicast systems, etc. Accordingly, the RLC transmit entity may transmit encoded RLC PDUs for each of a plurality of RLC SDUs to a plurality of RLC receive entities of broadcast, multicast, PTM, and SC-PTM scenarios. Alternatively, the RLC transmit entity may transmit RLC PDUs for each of a plurality of RLC SDUs to a single RLC receiver entity of a unicast scenario.

NCA RLC layer communication may be implemented with respect to RLC AM and/or RLC UM in accordance with some aspects of the disclosure. For example, RLC AM may be used for the transmission of the plurality of encoded RLC PDUs with respect to NCA RLC layer communication of some examples. Additionally or alternatively, RLC UM may be used for the transmission of the plurality of encoded RLC PDUs with respect to NCA RLC layer communication of some examples.

Returning to FIG. 41, at block 4104 of flow 4100 shown in FIG. 41, NCA RLC status feedback may be received by the RLC transmit entity from RLC entities of the one or more RLC entities. NCA RLC status feedback may, for example, be provided to the RLC transmit entity in response to status report polling (e.g., polling of a RLC receive entity by the RLC transmit entity), in response to one or more status report trigger (e.g., detection of reception failure by a RLC receive entity, expiration of a reporting timer, and/or other events), etc.

NCA RLC layer communication may utilize RLC status reporting (e.g., RLC STATUS PDU based RLC ARQ mechanism of RLC AM) configured for NCA RLC status feedback (e.g., configuring the RLC STATUS PDU reports to include one or more fields of information for NCA RLC layer communication operation in RLC AM scenarios).

Additionally or alternatively, NCA RLC layer communication may utilize reverse link reporting (e.g., a new NCA RLC feedback channel established for NCA RLC status feedback including one or more fields of information for NCA RLC layer communication operation in RLC AM and/or RLC UM scenarios).

The NRC RLC status feedback provided according to some aspects of the disclosure may include information configured for facilitating efficient coding/re-encoding of RLC SDUs, information configured for facilitating re-encoding and retransmitting payload of a corresponding RLC SDU determined to be missing by a RLC receive entity, etc. For example, the NCA RLC status feedback may include a field (e.g., a new field, such as NumPDU, added to RLC STATUS PDU reports of RLC AM operation or included in a reverse link initiated for NCA RLC status reporting) indicating a number of encoded RLC PDUs used to reassemble a RLC SDU of the plurality of RLC SDUs by a RLC receive entity providing the NCA RLC status feedback. Information regarding the number of encoded RLC PDUs used to reassemble RLC SDUs (e.g., averaged over time, averaged with respect to a plurality of RLC receive entities reporting the information, etc.) may be utilized in facilitating efficient coding/re-encoding of RLC SDUs (e.g., the configured coding rate may be dynamically adjusted based on information in the field indicating the number of encoded RLC PDUs used to reassemble the RLC SDU). In accordance with some examples, a network device configures a minimum coding rate parameter for the source data (e.g., in RLC-Config), and the coding rate used in encoding RLC PDUs may be dynamically adjusted based on the NCA RLC status feedback. Additionally or alternatively, the NCA RLC status feedback may include RLC SDU level information or RLC PDU level information configured for facilitating re-encoding and retransmitting payload of a corresponding RLC SDU determined to be missing by a RLC receive entity.

Having described operation by a RLC transmit entity configured for network coding augmented communication of RLC layer payload according to the example of FIG. 41, reference is now made to FIG. 42 for example operation by a RLC receive entity configured for network coding augmented communication of RLC layer payload. FIG. 42 shows flow 4200 providing example operation by a RLC receive entity configured for network coding augmented communication of RLC layer payload. The functions of flow 4200 may, for example, be implemented by radio link protocol logic executed by one or more processors of a device of wireless network. For example, the functions of the illustrated example may be implemented by radio link protocol logic of a UE 115 in communication with one or more devices (e.g., base stations 105, UEs 115, etc.) of a wireless network. As another example, the functions of the illustrated example may be implemented by radio link protocol logic of a base station 105 in RLC layer communication with one or more other devices (e.g., base stations 105, UEs 115, etc.) of wireless network 100.

In operation according to the illustrated example of flow 4200, NCA RLC layer communication between a RLC receive entity of one or more RLC receive entities in communication with a RLC transmit entity may be enabled at block 4201. For example, a NCA RLC layer communication protocol may be selected, provisioned, and/or initiated, an available or supported form of network coding selected or designated for use, network coding parameters configured, NCA RLC status feedback parameters configured, etc. Enabling NCA RLC layer communication according to block 4201 may include receiving signaling by the RLC receive entity (e.g., from the RLC transmit entity or other device of wireless network) for configuring NCA RLC layer communication operation in RLC layer communications between the RLC transmit entity and the one or more RLC receive entities. For example, the RLC receive entity may receive information regarding the NCA RLC layer communication protocol selected, provisioned, and/or initiated at the RLC transmit entity, one or more of network coding parameters, one or more NCA RLC status feedback parameters, one or more RLC receive entity configuration parameters, etc., such as using RRC signaling. For example, the RLC receive entity may receive information regarding a particular form of network coding of various erasure codes (e.g., a selected erasure code, such as a fountain code, tornado code, LDPC code, Reed-Solomon coding, MDS code, etc.) for use with respect to RLC layer communications of a NCA RLC layer communication protocol. In accordance with some aspects of the disclosure, the RLC receive entity may receive information regarding NCA RLC status feedback to be provided, such as a feedback channel to be used (e.g., NCA RLC status feedback channel, reverse link reporting channel, etc.), information to be included in the NCA RLC status feedback (e.g., SN, sub-SN, number of encoded RLC PDUs used to reassemble a respective RLC SDU, RLC SDU level/RLC PDU level feedback, etc.), NCA RLC status feedback trigger information (e.g., polling, trigger events, etc.), and/or the like. Additionally or alternatively, the RLC receive entity may receive information regarding one or more configuration parameters used by a RLC receive entity, such as a minimum number of encoded RLC PDUs for decoding a RLC SDU (e.g., a minimum number of encoded RLC PDUs to be received before initiating decoding a respective RLC SDU).

At block 4202 of example flow 4200, a plurality of encoded RLC PDUs for a respective RLC SDU of a plurality of RLC SDUs may be received by the RLC receive entity from the RLC transmit entity. The plurality of encoded RLC PDUs may, for example, comprise RLC layer SDU payload encoded using the network coding based on a configured coding rate. The plurality of encoded RLC PDUs may be configured to facilitate reassembly of a corresponding RLC SDU by the RLC receive entity. For example, the plurality of encoded RLC PDUs may include source data RLC PDUs and repair data RLC PDUs generated by applying the network coding to payload of the respective RLC SDU segmented into a plurality of RLC PDUs. The source data RLC PDUs and repair data RLC PDUs of the plurality of encoded RLC PDUs may each include a header. For example, each encoded RLC PDU of the plurality of encoded RLC PDUs may include a RLC header carrying the SN of the respective RLC SDU and a sub-SN of the encoded RLC PDU, wherein the sub-SNs indicate an index for each encoded RLC PDU of the plurality of RLC PDUs associated with the respective RLC SDU SN. Additionally or alternatively, the RLC header of one or more encoded RLC PDU of the plurality of encoded RLC PDUs may include a flag to indicate whether the one or more encoded RLC PDU is a last RLC PDU of the plurality of encoded RLC PDUs for the respective RLC SDU.

In accordance with some aspects of the disclosure, the RLC receive entity may start to reassemble a RLC SDU after a minimum number of encoded RLC PDUs for decoding a RLC SDU (e.g., the minimum number of encoded RLC PDUs to be received before initiating decoding a respective RLC SDU received by the RLC receive entity) corresponding to one RLC SDU are received. For example, the RLC receive entity may initiate reassembly of a respective RLC SDU by decoding received encoded RLC PDUs upon receiving a predefined minimum number of encoded RLC PDUs for the respective RLC SDU. In operation according to some aspects of the disclosure any combination of source data RLC PDUs and repair data RLC PDUs totaling to a number equal to or greater than the minimum number of encoded RLC PDUs for decoding may be used for recovering the source data of the corresponding RLC SDU. In some examples, a fountain code or a Raptor code may be selected for use with respect to communication of RLC layer payload, whereby the parity data or LDPC and Luby transform data of the repair data RLC PDUs is invertible with a minimum number (e.g., n) of received encoded RLC PDUs to reconstruct the RLC SDU. The total number (e.g., p) of encoded RLC PDUs transmitted with respect to a corresponding RLC SDU may be larger than the minimum number (e.g., n) of received encoded RLC PDUs to reconstruct the RLC SDU (e.g., p=k+r, where k≤n≤p). The RLC receive entity may thus reassemble a RLC SDU without having received all encoded RLC PDUs for that RLC SDU (e.g., avoiding waiting to receive each encoded RLC PDU for a RLC SDU before reassembling the RLC SDU). In accordance with some aspects of the disclosure, a RLC receive entity may cease decoding received encoded RLC PDUs upon successful reassembly of the respective RLC SDU, and may discard received encoded RLC PDUs of the plurality of encoded RLC PDUs unused in the successful reassembly of the respective RLC SDU.

Although implementing NCA RLC layer communication, a RLC PDU receive procedure implemented by a RLC receive entity may nevertheless implement functions of existing NR RLC receive operation. For example, a RLC PDU receive entity may implement a receive sliding window, reassembly timer, prohibit timer, and/or RLC STATUS PDU based RLC ARQ mechanism in association with NCA RLC layer communication.

NCA RLC status feedback may be transmitting by the RLC receive entity to the RLC transmit entity at block 4203 of flow 4200 shown in FIG. 42. The NCA RLC status feedback may, for example, be configured to facilitate retransmitting a portion of the RLC layer SDU payload. NCA RLC status feedback information of some aspects of the disclosure may include information in addition to or in the alternative to information of a RLC ARQ mechanism fed back to assist a RLC transmit entity to retransmit/re-encode RLC SDUs and/or RLC PDUs determined to be missing by the RLC receive entity. In accordance with some aspects of the disclosure, a RLC SDU may be determined to be missing by a RLC receive entity if the RLC receive entity is unable to reconstruct the RLC SDU after the last one of the plurality of encoded RLC PDUs has been received, the RLC receive entity is unable to reconstruct the RLC SDU after at least a threshold number of encoded RLC PDUs (e.g., a minimum number of encoded RLC PDUs for decoding, possibly plus some additional number of encoded RLC PDUs) has been received, the RLC receive entity is unable to reconstruct the RLC SDU after receiving all the encoded RLC PDUs (e.g., including the source data RLC PDUs and the repair data PDUS) associate with a RLC SDU, etc. NCA RLC status feedback information provided by a RLC receive entity configured for facilitating re-encoding and retransmitting payload of the respective RLC SDU may include RLC SDU level information, such as SN and SO information for the respective RLC SDU. Alternatively, NCA RLC status feedback information provided by a RLC receive entity configured for facilitating re-encoding an retransmitting payload of the respective RLC SDU may include RLC PDU level information, such as SN, sub-SN, and SO information for an encoded RLC PDU for the respective RLC SDU determined to be missing. NCA RLC status feedback provided by a RLC receive entity may additionally or alternatively include information regarding a number of encoded RLC PDUs used to reassemble the respective RLC SDU. For example, radio link protocol logic of the RLC receive entity may determine the number (e.g., NumPDU) of encoded RLC PDUs used to successfully reassemble the respective RLC SDU and provide that information in a field of the NCA RLC status feedback.

The RLC receive entity may receive re-encoded RLC SDU payload in response to the NCA RLC status feedback. For example, a RLC receive entity providing RLC SDU level NCA RLC status feedback may receive a plurality of encoded RLC PDUs retransmitting the RLC layer SDU payload of a RLC SDU determined by the RLC receive entity to be missing in response to the NCA RLC status feedback. A RLC receive entity providing RLC PDU level NCA RLC status feedback may receive one or more encoded RLC PDUs retransmitted for a RLC SDU determined by the RLC receive entity to be missing in response to the NCA RLC status feedback.

Figure 43:
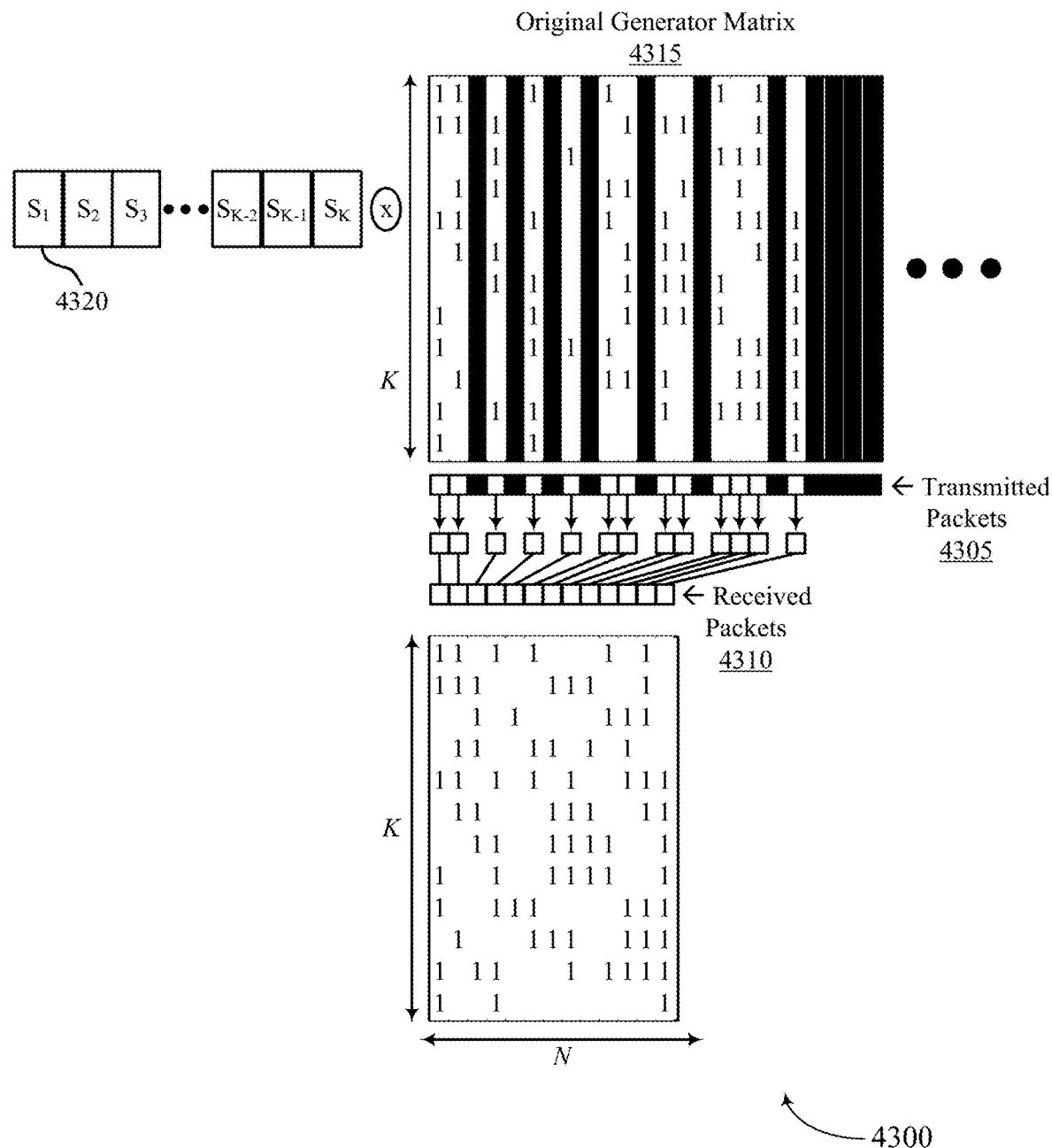
FIG. 43 is a graphical representation of the generation of repair fragments from segmented source data and the recovery of the source data from received source data and repair data fragments according to some embodiments of the present disclosure.

The foregoing property of fountain codes is illustrated in FIG. 43. As shown in FIG. 43, data of a source object may be segmented into k fragments, shown as S1 through Sk 4320, and a generator matrix 4315 applied to provide the transmitted packets 4305. In the illustrated example of a rateless fountain code, the generator matrix (Gnk) has unlimited columns. The transmitted packets may be provided as $P_j = \Sigma_{k=1}^{K} S_{kj} G_{kj}$.

Correspondingly, the recovered packets provided as $d_k \Sigma_{n=1}^{N} P_n G_{nk}^{-1}$.

In the foregoing, a condition of recovering the packets is Gnk according to the received packets 4310 is invertible, or the rank of Gnk is k, and the generator matrix 4315 is invertible with a minimum n fragments.

Network coding is currently not implemented in the RLC layer, whether with respect to RLC AM, RLC UM, or RLC TM. For example, the conventional ARQ of RLC AM (i.e., the only RLC mode currently supporting layer 2 error correction) used to correct residual error from lower layers (e.g., HARQ) does not implement network coding. Typical RLC AM may be thought of as using a unit matrix rather than a network coding generator matrix described above.

In accordance with aspects of the present disclosure, network coding is incorporated into the RLC layer to provide network coding augmented (NCA) RLC layer communication. Network coding of NCA RLC layer communication according to aspects of the disclosure may implement various forms of erasure codes, such as fountain codes, tornado codes, LDPC codes, Reed-Solomon coding, maximum distance separable (MDS) codes, etc. NCA RLC layer communication of some examples may implement a fountain code (e.g., a rateless fountain code) for generating repair data (e.g., parity data) with respect to source data for RLC data transfer. In another example, NCA RLC layer communication may implement a Raptor code for generating repair data (e.g., a combination of LDPC and Luby transform data) with respect to source data for RLC data transfer.

NCA RLC layer communication may, for example, be implemented with respect to broadcast systems, multicast systems, point-to-multipoint (PTM) systems (e.g., V2X, IAB (Integrated Access and Backhaul)), single cell point to multi-point (SC-PTM) systems, etc. to improve the layer 2 reliability. For example, NCA RLC layer communication may facilitate enhanced error correction functionality for broadcast, multicast, PTM, and SC-PTM scenarios. Further, NCA RLC layer communication may be implemented with respect to unicast systems, such as for providing enhanced layer 2 error correction, to reduce ARQ feedback overhead, etc. Network coding providing NCA RLC layer communication in accordance with some aspects of the disclosure may be implemented with respect to RLC AM and/or RLC UM. For example, network coding according to some aspects may be implemented to enhance the ARQ-based error correction of RLC AM. Additionally or alternatively, network coding according to some aspects may be implemented to enable error correction in RLC UM. NCA RLC layer communication may utilize NCA RLC status feedback from a RLC receiver entity to a RLC transmitter entity, such as using a form of RLC status reporting configured for NCA RLC status feedback (e.g., in a RLC AM scenario), using reverse link reporting configured for NCA RLC status feedback (e.g., in RLC AM and/or RLC UM scenarios), etc.

NCA RLC layer communication operation provides for various functionality at the RLC layer. The functionality supported may, for example, include transfer of upper layer PDUs, segmentation and reassembly of RLC SDUs for UM and AM data transfer, re-segmentation of RLC SDU segments for AM data transfer, encoding of RLC SDUs with network coding, decoding the encoded RLC PDUs to reassemble the RLC SDUs, error correction through ARQ in RLC AM, NCA RLC status feedback based on the encoded RLC PDUs, ARQ procedure using NCA RLC status feedback, duplicate detection for AM data transfer, RLC SDU discard for UM and AM data transfer, RLC re-establishment, and/or protocol error detection for AM data transfer.

Figure 45A:
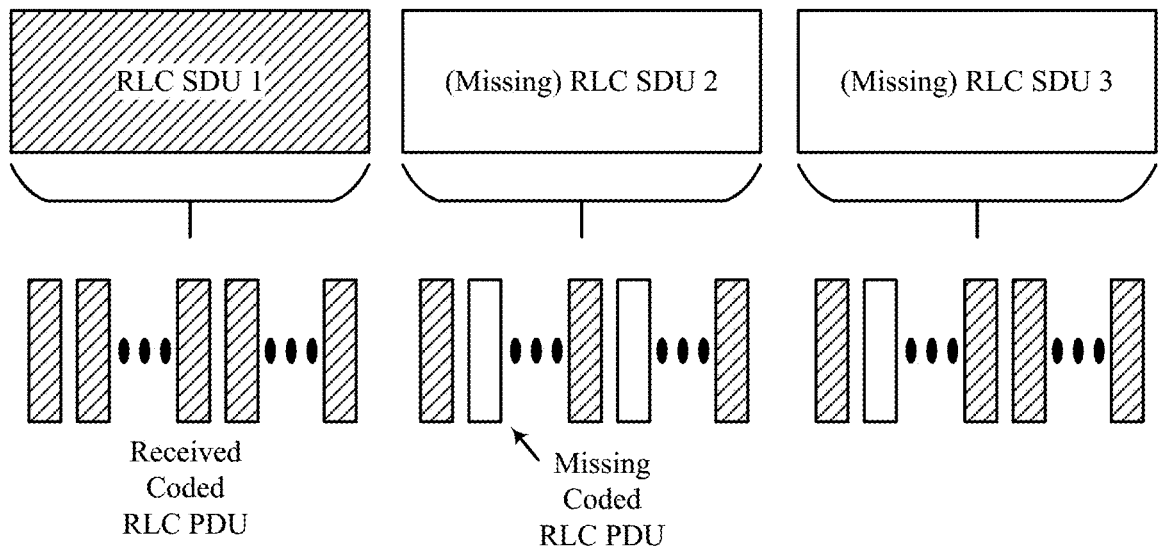
FIG. 45A shows an example of NCA RLC status feedback including RLC SDU level information for corresponding RLC SDUs according to some embodiments of the present disclosure.

FIG. 45A shows an example of NCA RLC status feedback including RLC SDU level information for corresponding RLC SDUs. The example of NCA RLC status feedback illustrated in FIG. 45A provides feedback of information of RLC SDU level (e.g., SN based) status in RLC STATUS PDU to indicate the RLC SDU level status. The RLC SDU level information of the example may, for example, include SN and SO (e.g., the segment of RLC SDU by SOstart/SOend) information for the corresponding RLC SDU determined to be missing.

Figure 45B:
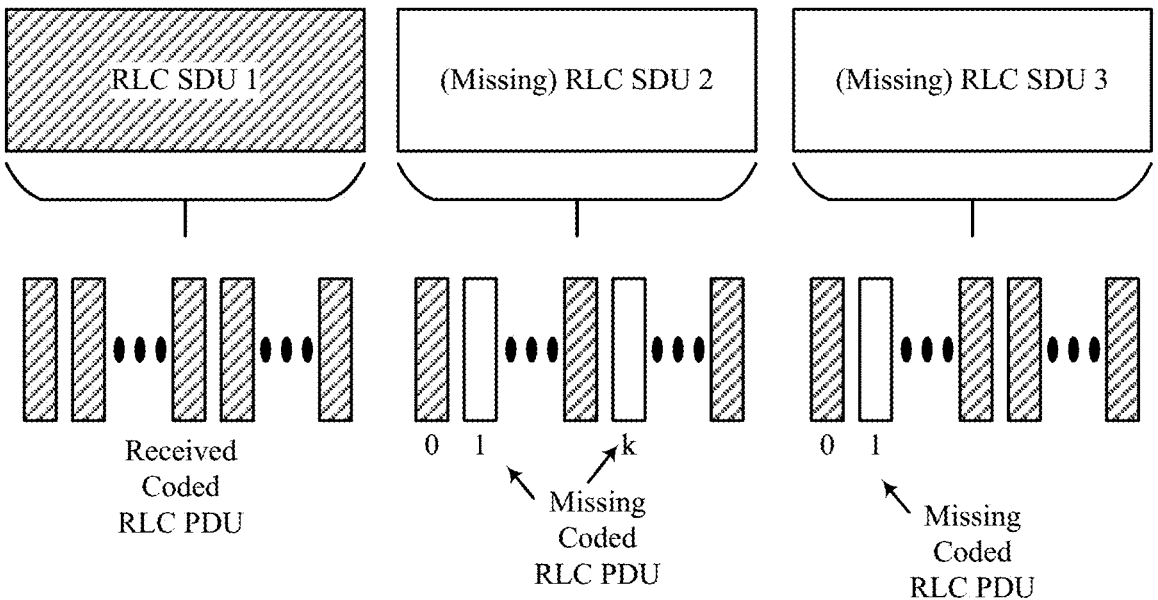
FIG. 45B shows an example of NCA RLC status feedback including RLC PDU level information for corresponding RLC SDUs according to some embodiments of the present disclosure.

FIG. 45B shows an example of NCA RLC status feedback including RLC PDU level information for corresponding RLC SDUs. The example of NCA RLC status feedback illustrated in FIG. 45B provides feedback of information of coded RLC PDU level (e.g., SN and sub-SN based) status in RLC STATUS PDU to indicate the encoded RLC PDU level status. The RLC PDU level information of the example may, for example, include SN, sub-SN, and SO (e.g., the segment of RLC PDU by SOstart/SOend) information for one or more encoded RLC PDU (e.g., encoded RLC PDUs missing or otherwise not received by the RLC receive entity) for the corresponding RLC SDU determined to be missing.

A portion of the RLC layer SDU payload may be retransmitted by the RLC transmit entity to the one or more RLC receive entities based upon the NCA RLC status feedback at block 4105 of flow 4100 of FIG. 41. For example, in the case of RLC SDU level NCA RLC status feedback, the RLC transmit entity may use the NCA RLC status feedback to identify RLC SDU(s) determined to be missing by one or more RLC receive entities for retransmission. In the case of RLC PDU level NCA RLC status feedback, the RLC transmit entity may use the NCA RLC status feedback to identify RLC PDU(s) determined to be missing by one or more RLC receive entities for retransmission.

Figure 46A:
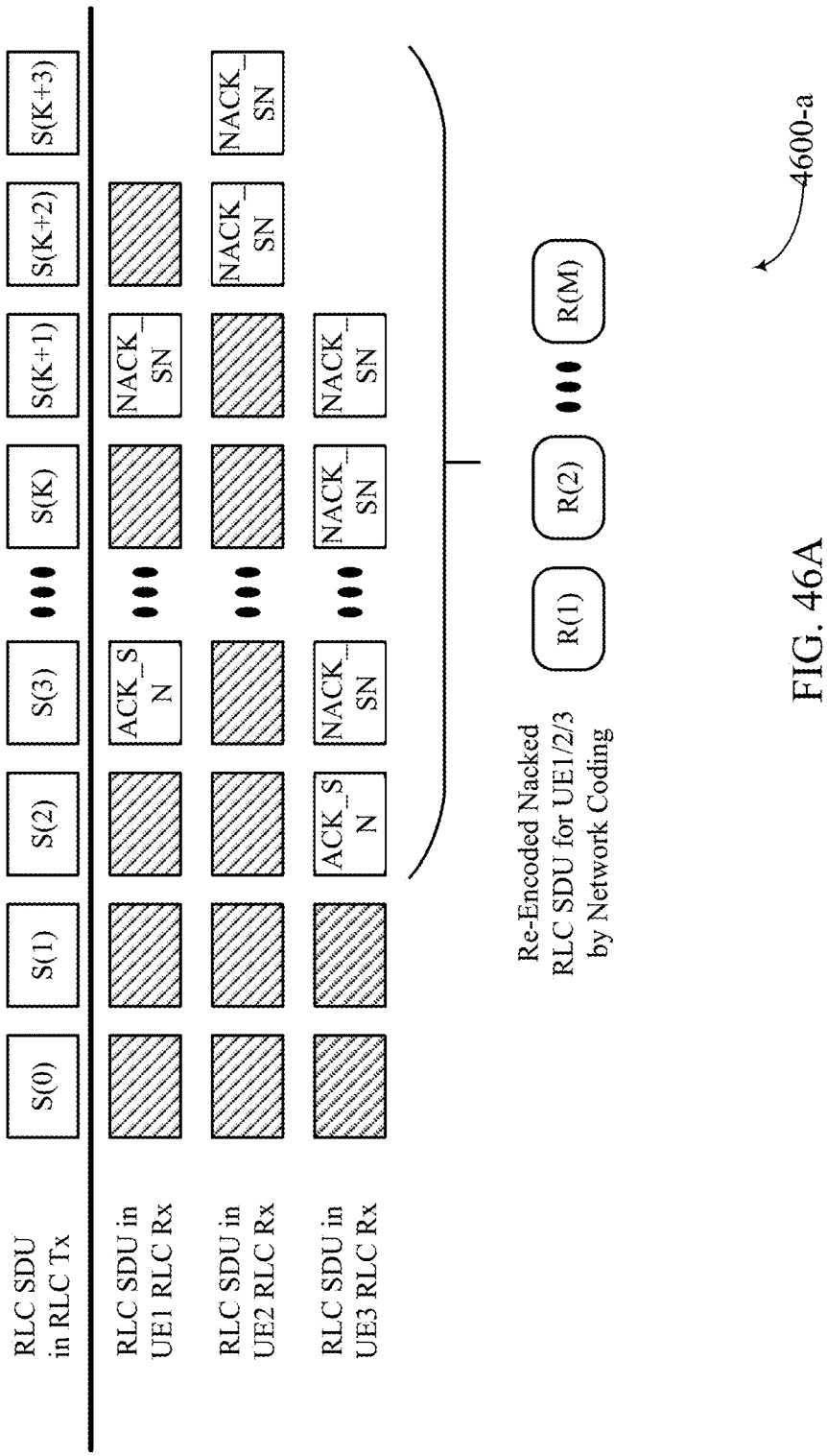
FIG. 46A shows an example of RLC SDU level retransmission where a RLC transmit entity retransmits missing RLC SDUs based on NCA RLC status feedback according to some embodiments of the present disclosure.

FIG. 46A shows an example of RLC SDU level retransmission where a RLC transmit entity retransmits missing RLC SDUs based on NCA RLC status feedback. In the example illustrated in FIG. 46A, the ACKed/NACKed RLC SDU level information of the NCA RLC status feedback (e.g., provided in RLC STATUS PDU) assists the RLC transmit entity to retransmit/re-encode missing RLC SDUs. For example, the RLC transmit entity may retransmit the corresponding RLC SDU(s) by re-encoding the corresponding RLC SDU(s) to provide a plurality of re-encoded RLC PDUs for the corresponding RLC SDU(s) determined to be missing and retransmitting the corresponding RLC SDU(s) as the respective plurality of re-encoded RLC PDUs. In this example, the re-encoding and retransmission is applied at the RLC SDU level by the RLC transmit entity.

Figure 46B:
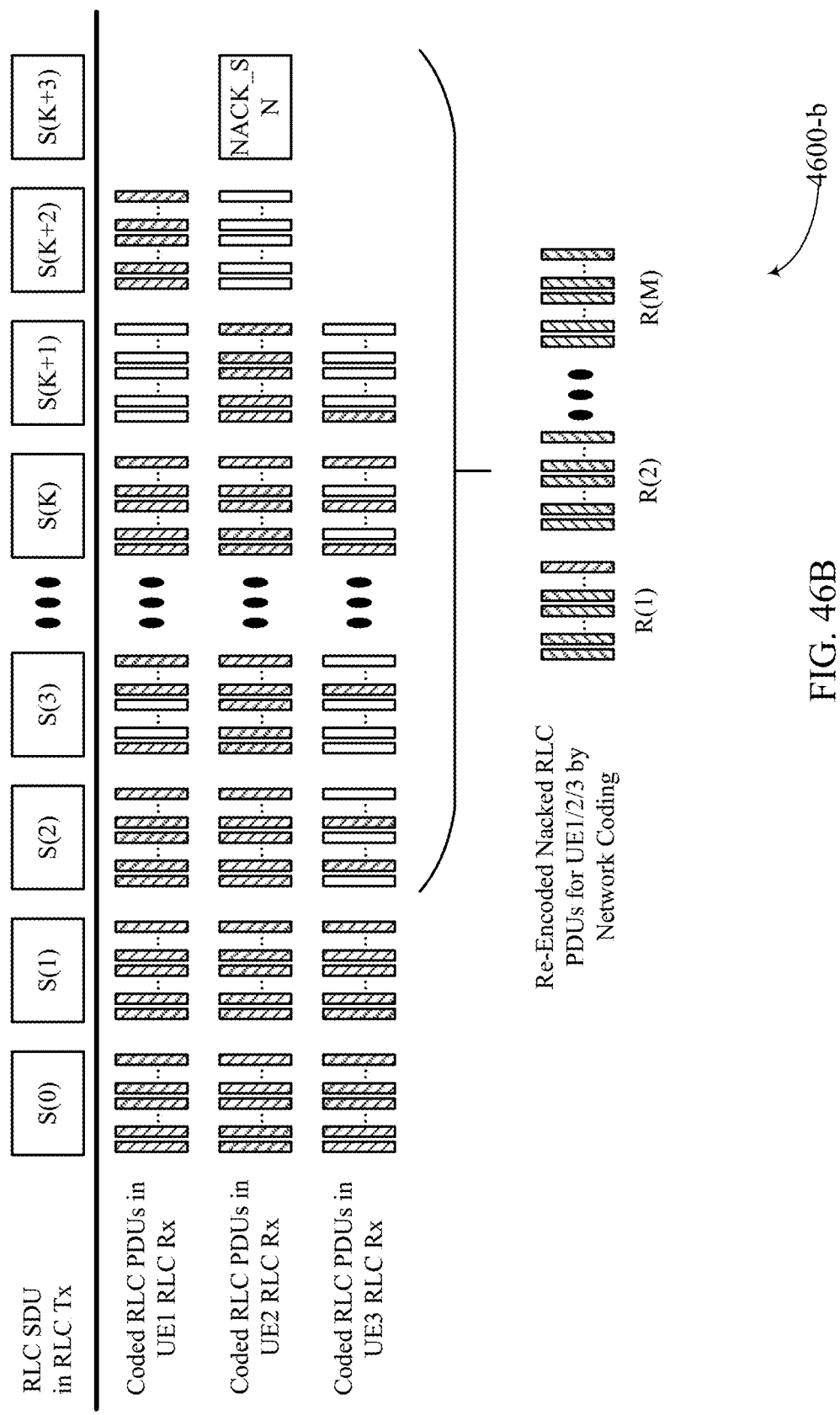
FIG. 46B shows an example of RLC PDU level retransmission where a RLC transmit entity retransmits missing RLC PDUs based on NCA RLC status feedback according to some embodiments of the present disclosure.

FIG. 46B shows an example of RLC PDU level retransmission where a RLC transmit entity retransmits missing RLC PDUs based on NCA RLC status feedback. In the example illustrated in FIG. 46B, the RLC PDU level information of the NCA RLC status feedback (e.g., provided in RLC STATUS PDU) assists the RLC transmit entity to retransmit/re-encode missing RLC PDUs for corresponding missing RLC SDUs, without retransmitting/re-encoding the complete missing RLC SDUs. For example, the RLC transmit entity may retransmit the missing RLC PDUs by re-encoding one or more RLC PDUs of corresponding RLC SDU(s) determined to be missing and retransmitting the re-encoded one or more RLC PDUs. In this example, the re-encoding and retransmission is applied at the RLC PDU level by the RLC transmit entity.

Figure 47:
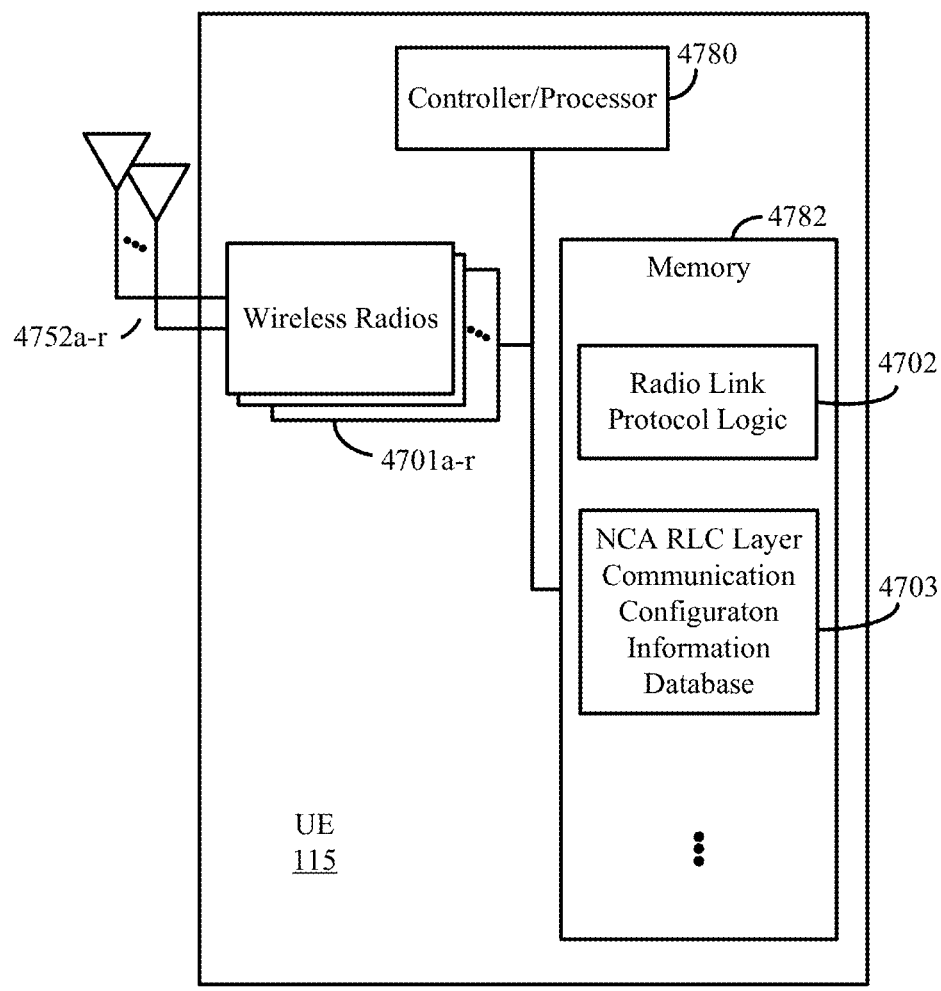
FIG. 47 is a block diagram conceptually illustrating a design of a UE configured for NCA RLC layer communication according to some embodiments of the present disclosure.

FIG. 47 is a block diagram illustrating UE 115 configured according to one aspect of the present disclosure. UE 115 includes the structure, hardware, and components as illustrated for UE 115 described herein. For example, UE 115 includes controller/processor 4780, which operates to execute logic or computer instructions stored in memory 4782, as well as controlling the components of UE 115 that provide the features and functionality of UE 115. UE 115, under control of controller/processor 4780, transmits and receives signals via wireless radios 4701*a-r* and antennas 4752*a-r*. Wireless radios 4701*a-r* include various components and hardware, as described herein for UE 115, including modulator/demodulators, MIMO detector, receive processor, transmit processor, and TX MIMO processor.

UE 115 of the example shown in FIG. 47 includes radio link protocol logic 4702 and NCA RLC layer communication configuration information database 4703 configured for performing functions as described herein with respect to NCA RLC layer communication operation according to some aspects of the present disclosure. Where, for example, UE 115 operates as a RLC transmit entity, radio link protocol logic 4702 may include code for performing functions of flow 4100 of FIG. 41. Where UE 115 operates as a RLC receive entity, radio link protocol logic 4702 may include code for performing functions of flow 4200 of FIG. 42. NCA RLC layer communication configuration information database 4703 may include various parameters and/or other information utilized in providing NCA RLC layer communication by radio link protocol logic 902. For example, NCA RLC layer communication configuration information database 4703 may store information regarding a form of network coding selected or designated for use, network coding parameters, NCA RLC status feedback parameters, NCA feedback configuration, configuration parameters used by a RLC receive entity, configuration parameters used by a RLC transmit entity, etc.

Figure 48:
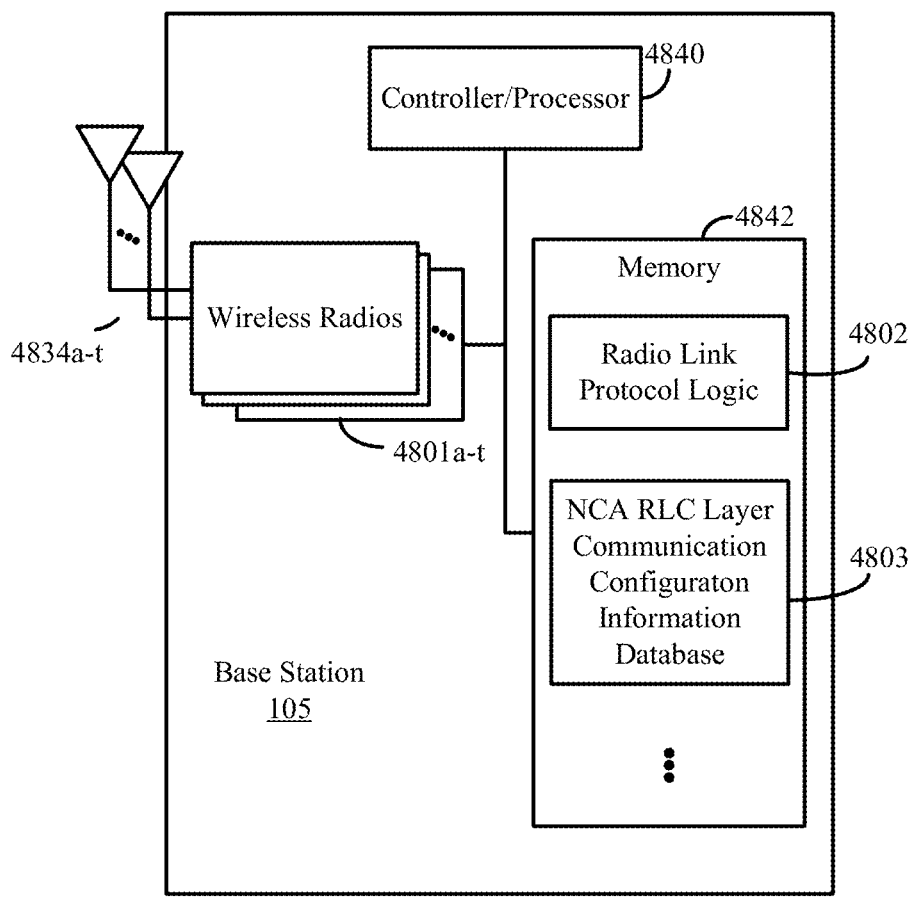
FIG. 48 is a block diagram conceptually illustrating a design of a base station configured for NCA RLC layer communication according to some embodiments of the present disclosure.

FIG. 48 is a block diagram illustrating base station 105 configured according to one aspect of the present disclosure. Base station 105 includes the structure, hardware, and components as illustrated for base station 105 described herein. For example, base station 105 includes controller/processor 4840, which operates to execute logic or computer instructions stored in memory 4842, as well as controlling the components of base station 105 that provide the features and functionality of base station 105. Base station 105, under control of controller/processor 4840, transmits and receives signals via wireless radios 4801 *a-t* and antennas 4834a-t. Wireless radios 4801 a-t include various components and hardware, as described herein for base station 105, including modulator/demodulators, MIMO detector, receive processor, transmit processor, and TX MIMO processor.

Base station 105 of the example shown in FIG. 48 includes radio link protocol logic 4802 and NCA RLC layer communication configuration information database 4803 configured for performing functions as described herein with respect to NCA RLC layer communication operation according to some aspects of the present disclosure. Where, for example, base station 105 operates as a RLC transmit entity, radio link protocol logic 4802 may include code for performing functions of flow 4100 of FIG. 41. Where base station 105 operates as a RLC receive entity, radio link protocol logic 4802 may include code for performing functions of flow 4200 of FIG. 42. NCA RLC layer communication configuration information database 4803 may include various parameters and/or other information utilized in providing NCA RLC layer communication by radio link protocol logic 4802. For example, NCA RLC layer communication configuration information database 4803 may store information regarding a form of network coding selected or designated for use, network coding parameters, NCA RLC status feedback parameters, NCA feedback configuration, configuration parameters used by a RLC receive entity, configuration parameters used by a RLC transmit entity, etc.

The following provides an overview of aspects of the present disclosure:

Aspect 1: A method for wireless communication at a transmitting device, comprising: receiving one or more SDUs at an L2 layer of the transmitting device; encoding, at the L2 layer, the one or more SDUs according to one or more network coding parameters to obtain at least one encoded PDU, the one or more network coding parameters comprising a rateless code; generating, for the at least one encoded PDU, at least one corresponding PDU header; and outputting the at least one encoded PDU and the at least one corresponding PDU header from the L2 layer to a lower layer of the transmitting device for transmission to one or more receiving devices.

Aspect 2: The method of aspect 1, further comprising: segmenting an SDU of the one or more SDUs into a set of PDUs at the L2 layer, wherein; encoding the one or more SDUs to obtain the at least one encoded PDU comprises encoding the set of PDUs according to the one or more network coding parameters to obtain a set of encoded PDUs; generating the at least corresponding PDU header comprises generating, for the set of encoded PDUs, a corresponding set of PDU headers; and outputting the at least one encoded PDU and the at least one corresponding PDU header comprises outputting the set of encoded PDUs and the corresponding set of PDU headers from the L2 layer to the lower layer.

Aspect 3: The method of aspect 2, further comprising: performing, at the L2 layer and before the encoding, an integrity protection and ciphering function on the SDU.

Aspect 4: The method of any of aspects 2 through 3, wherein the set of PDUs comprises a set of source PDUs; and encoding the set of PDUs comprises encoding the set of source PDUs to obtain a set of encoded source PDUs and a set of encoded parity PDUs.

Aspect 5: The method of any of aspects 2 through 4, wherein the one or more network coding parameters include a minimum code rate for the set of encoded PDUs, and a quantity of encoded PDUs included in the set of encoded PDUs is based at least in part on the minimum code rate.

Aspect 6: The method of any of aspects 2 through 4, wherein generating the set of PDU headers comprises: setting, within each PDU header of the set of PDU headers, a field indicating an index for an associated encoded PDU corresponding to the SDU, wherein the index corresponds to an ordering for the set of encoded PDUs.

Aspect 7: The method of any of aspects 2 through 6, wherein generating the set of PDU headers comprises: setting, within a PDU header of the set of PDU headers, a flag indicating that an associated encoded PDU is a last encoded PDU of the set of encoded PDUs corresponding to the SDU.

Aspect 8: The method of any of aspects 2 through 7, wherein generating the set of PDU headers comprises: setting, within each PDU header of the set of PDU headers, a repair field indicating whether an associated encoded PDU is a repaired PDU.

Aspect 9: The method of any of aspects 2 through 8, wherein the L2 layer comprises a PDCP layer or an RLC layer.

Aspect 10: The method of any of aspects 1 through 9, further comprising: receiving, from the receiving device, an indication of a quantity of encoded PDUs used by the receiving device to obtain the SDU; and adjusting a code rate of the one or more network coding parameters based at least in part on the indicated quantity of encoded PDUs.

Aspect 11: The method of any of aspects 1 through 10, wherein the one or more SDUs comprise a set of SDUs; encoding the one or more SDUs to obtain the at least one encoded PDU comprises encoding the set of SDUs according to the one or more network coding parameters to obtain a set of encoded PDUs; and outputting the at least one encoded PDU and the at least one corresponding PDU header comprises outputting the set of encoded PDUs from the L2 layer to the lower layer.

Aspect 12: The method of aspect 11, further comprising: performing, at the L2 layer and after the encoding, an integrity protection and ciphering function on the set of encoded PDUs.

Aspect 13: The method of any of aspects 11 through 12, wherein encoding the set of SDUs comprises: segmenting an SDU of the set of SDUs into a set of sub-protocol data units (sub-PDUs), each sub-PDU having a same size; encoding the set of sub-PDUs using the rateless code to obtain a set of source sub-PDUs; and encoding at least a subset of the sub-PDUs using the rateless code to obtain a set of parity sub-PDUs, the set of source sub-PDUs and the set of parity sub-PDUs collectively comprising an encoded PDU of the set of encoded PDUs.

Aspect 14: The method of aspect 13, further comprising: receiving a report indicating a quantity of sub-PDUs the receiving device decoded and used to attempt to reassemble the SDU; and adjusting a code rate of the encoding using the rateless code based at least in part on the report.

Aspect 15: A method for wireless communication at a receiving device, comprising: receiving, at an L2 layer of the receiving device, one or more PDUs and one or more corresponding PDU headers from a transmitting device, the one or more PDUs and the one or more corresponding PDU headers corresponding to one or more SDUs; decoding, at the L2 layer, at least a subset of the one or more PDUs based at least in part on one or more network coding parameters and the one or more corresponding PDU headers, the one or more network coding parameters comprising a rateless code; generating a report based at least in part on the decoding, wherein the report indicates whether an SDU of the one or more SDUs was obtained via the decoding; and transmitting the report to the transmitting device.

Aspect 16: The method of aspect 15, wherein receiving the one or more PDUs and the one or more corresponding PDU headers comprises receiving a set of PDUs and a corresponding set of PDU headers, the set of PDUs and the corresponding set of PDU headers corresponding to the SDU; and decoding at least the subset of the one or more PDUs comprises decoding at least a subset of the set of PDUs and is based at least in part on the corresponding set of PDU headers.

Aspect 17: The method of aspect 16, further comprising: determining that at least a minimum quantity of PDUs of the set of PDUs has been received, wherein the decoding is based at least in part on determining that at least the minimum quantity of PDUs has been received.

Aspect 18: The method of aspect 17, further comprising: receiving an indication of the minimum quantity of PDUs in the set of PDUs via radio resource control signaling.

Aspect 19: The method of any of aspects 16 through 18, further comprising: identifying, within each PDU header of the set of PDU headers, a field indicating an index for an associated PDU corresponding to the SDU, wherein the set of PDUs are decoded based at least in part on an ordering corresponding to the index.

Aspect 20: The method of any of aspects 16 through 19, further comprising: identifying, within a PDU header of the set of PDU headers, a flag indicating that an associated PDU is a last PDU of the set of PDUs corresponding to the SDU.

Aspect 21: The method of any of aspects 16 through 20, further comprising: identifying, within each PDU header of the set of PDU headers, a repair field indicating whether an associated PDU is a repaired PDU.

Aspect 22: The method of any of aspects 16 through 21, wherein the one or more network coding parameters include a minimum quantity of PDUs of the set of PDUs for receipt prior to decoding, the method further comprising receiving an indication of the minimum quantity of PDUs via radio resource control signaling.

Aspect 23: The method of any of aspects 15 through 22, further comprising: performing, at the L2 layer and after decoding at least the subset of the one or more PDUs to obtain the at least one SDU, an integrity verification and deciphering function on the at least one SDU.

Aspect 24: The method of any of aspects 15 through 23, further comprising: performing, at the L2 layer and before the decoding, an integrity verification and deciphering function on the one or more PDUs.

Aspect 25: The method of any of aspects 15 through 24, further comprising: obtaining the SDU from the subset of the one or more PDUs via the decoding; and refraining from decoding a remaining subset of the one or more PDUs based at least in part on obtaining the SDU.

Aspect 26: The method of any of aspects 15 through 25, wherein the report includes an indication of a quantity of PDUs used by the receiving device to obtain the SDU, a bitmap indicating for each PDCP SDU in a set of PDCP SDUs having a sequence number greater than the sequence number of the PDCP SDU whether the receiving device was able to successfully obtain or was not able to obtain a respective PDCP SDU, or both.

Aspect 27: The method of any of aspects 15 through 26, wherein, where the receiving device is unable to obtain a set of SDUs included in the one or more SDUs, the report includes a sequence number of the SDU based at least in part on the SDU having a lowest sequence number among the set of SDUs that the receiving device is unable to obtain.

Aspect 28: The method of any of aspects 15 through 27, wherein the one or more PDUs comprise a set of sub-PDUs corresponding to the SDU, the set of sub-PDUs received at the L2 layer from a lower layer of the receiving device, and the SDU is obtained via the decoding based at least in part on the set of sub-PDUs and without one or more additional sub-PDUs corresponding to the SDU being received at the L2 layer.

Aspect 29: The method of any of aspects 15 through 28, wherein the L2 layer comprises a PDCP layer or an RLC layer.

Aspect 30: An apparatus for wireless communication at a transmitting device, comprising a processor; memory coupled with the processor; and instructions stored in the memory and executable by the processor to cause the apparatus to perform a method of any of aspects 1 through 14.

Aspect 31: An apparatus for wireless communication at a transmitting device, comprising at least one means for performing a method of any of aspects 1 through 14.

Aspect 32: A non-transitory computer-readable medium storing code for wireless communication at a transmitting device, the code comprising instructions executable by a processor to perform a method of any of aspects 1 through 14.

Aspect 33: An apparatus for wireless communication at a receiving device, comprising a processor; memory coupled with the processor; and instructions stored in the memory and executable by the processor to cause the apparatus to perform a method of any of aspects 15 through 29.

Aspect 34: An apparatus for wireless communication at a receiving device, comprising at least one means for performing a method of any of aspects 15 through 29.

Aspect 35: A non-transitory computer-readable medium storing code for wireless communication at a receiving device, the code comprising instructions executable by a processor to perform a method of any of aspects 15 through 29.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a transmitting device, comprising:
    receiving one or more service data units (SDUs) at a layer two (L2) layer of the transmitting device;
    segmenting an SDU of the one or more SDUs into a set of protocol data units (PDUs) or a set of sub-PDUs at the L2 layer;
    encoding, at the L2 layer and after segmenting the SDU into the set of PDUs or the set of sub-PDUs, the set of PDUs or the set of sub-PDUs according to one or more network coding parameters to obtain a set of encoded PDUs or a set of encoded sub-PDUs, the one or more network coding parameters comprising a rateless code;
    generating, for the set of encoded PDUs or the set of encoded sub-PDUs, at least one corresponding PDU header; and
    outputting each encoded PDU in the set of encoded PDUs or each encoded sub-PDU in the set of encoded sub-PDUs and the at least one corresponding PDU header from the L2 layer to a lower layer of the transmitting device for transmission to one or more receiving devices via a bearer.

2. The method of claim 1, wherein:
    segmenting the SDU of the one or more SDUs comprises segmenting the SDU into the set of PDUs at the L2 layer;
    encoding the set of SDUs to obtain the set of encoded PDUs comprises encoding the set of PDUs according to the one or more network coding parameters to obtain the set of encoded PDUs;

generating the at least corresponding PDU header comprises generating, for the set of encoded PDUs, a corresponding set of PDU headers; and outputting each encoded PDU in the set of encoded PDUs and the at least one corresponding PDU header comprises outputting the set of encoded PDUs and the corresponding set of PDU headers from the L2 layer to the lower layer.

3. The method of claim 2, further comprising:
performing, at the L2 layer and before the encoding, an integrity protection and ciphering function on the SDU.

4. The method of claim 2, wherein:
the set of PDUs comprises a set of source PDUs; and
encoding the set of PDUs comprises encoding the set of source PDUs to obtain a set of encoded source PDUs and a set of encoded parity PDUs.

5. The method of claim 2, wherein the one or more network coding parameters further comprise a minimum code rate for the set of encoded PDUs, and wherein a quantity of encoded PDUs included in the set of encoded PDUs is based at least in part on the minimum code rate.

6. The method of claim 2, wherein generating the set of PDU headers comprises:
setting, within each PDU header of the set of PDU headers, a field indicating an index for an associated encoded PDU corresponding to the SDU, wherein the index corresponds to an ordering for the set of encoded PDUs.

7. The method of claim 2, wherein generating the set of PDU headers comprises:
setting, within a PDU header of the set of PDU headers, a flag indicating that an associated encoded PDU is a last encoded PDU of the set of encoded PDUs corresponding to the SDU.

8. The method of claim 2, wherein generating the set of PDU headers comprises:
setting, within each PDU header of the set of PDU headers, a repair field indicating whether an associated encoded PDU is a repaired PDU.

9. The method of claim 2, further comprising:
receiving, from the receiving device, an indication of a quantity of encoded PDUs used by the receiving device to obtain the SDU; and
adjusting a code rate of the one or more network coding parameters based at least in part on the indicated quantity of encoded PDUs.

10. The method of claim 1, wherein:
the one or more SDUs comprise a set of SDUs; and
encoding the set of PDUs or the set of sub-PDUs to obtain the set of encoded PDUs or the set of encoded sub-PDUs comprises encoding the set of SDUs according to the one or more network coding parameters to obtain the set of encoded PDUs or the set of encoded sub-PDUs.

11. The method of claim 10, further comprising:
performing, at the L2 layer and after the encoding, an integrity protection and ciphering function on the set of encoded PDUs or the set of encoded sub-PDUs.

12. The method of claim 10, wherein encoding the set of PDUs or the set of sub-PDUs comprises:
encoding the set of sub-PDUs using the rateless code to obtain a set of source sub-PDUs; and
encoding at least a subset of the set of source sub-PDUs using the rateless code to obtain a set of parity sub-PDUs, the set of source sub-PDUs and the set of parity sub-PDUs collectively comprising an encoded PDU.

13. The method of claim 12, further comprising:
receiving a report indicating a quantity of sub-PDUs the receiving device decoded and used to attempt to reassemble the SDU; and
adjusting a code rate of the encoding using the rateless code based at least in part on the report.

14. The method of claim 1, wherein the L2 layer comprises a packet data convergence protocol (PDCP) layer or a radio link control (RLC) layer.

15. A method for wireless communication at a receiving device, comprising:
receiving, at a layer two (L2) layer of the receiving device, each encoded PDU in a set of encoded protocol data units (PDUs) or each encoded sub-PDU in a set of encoded sub-PDUs and one or more corresponding PDU headers via a bearer from a transmitting device, each encoded PDU in the set of encoded PDUs or each encoded sub-PDU in the set of encoded sub-PDUs and the one or more corresponding PDU headers corresponding to a segmented service data unit (SDU) from among one or more SDUs;
decoding, at the L2 layer, at least a subset of the set of encoded PDUs or the set of encoded sub-PDUs based at least in part on one or more network coding parameters and the one or more corresponding PDU headers, the one or more network coding parameters comprising a rateless code;
generating a report based at least in part on the decoding, wherein the report indicates whether the segmented SDU of the one or more SDUs was obtained via the decoding; and
transmitting the report to the transmitting device.

16. The method of claim 15, wherein:
receiving each encoded PDU in the set of encoded PDUs or each encoded sub-PDU in the set of encoded sub-PDUs and the one or more corresponding PDU headers comprises receiving the set of encoded PDUs and a corresponding set of PDU headers, the set of encoded PDUs and the corresponding set of PDU headers corresponding to the segmented SDU; and
decoding at least the subset of the set of encoded PDUs is based at least in part on the corresponding set of PDU headers.

17. The method of claim 16, further comprising:
determining that at least a minimum quantity of encoded PDUs of the set of encoded PDUs has been received, wherein the decoding is based at least in part on determining that at least the minimum quantity of encoded PDUs has been received.

18. The method of claim 15, wherein the one or more network coding parameters comprise a minimum quantity of encoded PDUs of the set of encoded PDUs or a minimum quantity of encoded sub-PDUs of the set of encoded sub-PDUs for receipt prior to decoding, the method further comprising:
receiving an indication of the minimum quantity of encoded PDUs or the minimum quantity of encoded sub-PDUs via radio resource control signaling.

19. The method of claim 15, further comprising:
performing, at the L2 layer and after decoding at least the subset of the set of PDUs or the set of encoded sub-PDUs to obtain the segmented SDU, an integrity verification and deciphering function on the segmented SDU.

20. The method of claim 15, further comprising:
obtaining the segmented SDU from the subset of the set of PDUs via the decoding or the set of encoded sub-PDUs; and
refraining from decoding a remaining subset of the set of PDUs or the set of encoded sub-PDUs based at least in part on obtaining the segmented SDU.

21. The method of claim 15, wherein the report comprises:
an indication of quantity of encoded PDUs or encoded sub-PDUs used by the receiving device to obtain the segmented SDU, a bitmap indicating for each SDU in a set of SDUs having a sequence number greater than the sequence number of the segmented SDU whether the receiving device was able to successfully obtain or was not able to obtain the SDU, or both.

22. The method of claim 15, wherein:
the receiving device is unable to obtain a set of SDUs included in the one or more SDUs; and
the report comprises a sequence number of the segmented SDU based at least in part on the segmented SDU having a lowest sequence number among the set of SDUs that the receiving device is unable to obtain.

23. The method of claim 15, wherein:
the set of encoded sub-PDUs received at the L2 layer from a lower layer of the receiving device; and
the segmented SDU is obtained via the decoding based at least in part on the set of encoded sub-PDUs and without one or more additional encoded sub-PDUs corresponding to the segmented SDU being received at the L2 layer.

24. The method of claim 15, wherein the L2 layer comprises a packet data convergence protocol (PDCP) layer or a radio link control (RLC) layer.

25. An apparatus for wireless communication at a transmitting device, comprising:
at least one processor;
memory coupled with the at least one processor; and
instructions stored in the memory and executable by the at least one processor to cause the apparatus to:
receive one or more service data units (SDUs) at a layer two (L2) layer of the transmitting device;
segment an SDU of the one or more SDUs into a set of protocol data units (PDUs) or a set of sub-PDUs at the L2 layer;
encode, at the L2 layer and after segmenting the SDU into the set of PDUs or the set of sub-PDUs, the set of PDUs or the set of sub-PDUs according to one or more network coding parameters to obtain a set of encoded PDUs or a set of encoded sub-PDUs, the one or more network coding parameters comprising a rateless code;
generating, for the set of encoded PDUs or the set of encoded sub-PDUs, at least one corresponding PDU header; and
output each encoded PDU in the set of encoded PDUs or each encoded sub-PDU in the set of encoded sub-PDUs and the at least one corresponding PDU header from the L2 layer to a lower layer of the transmitting device for transmission to one or more receiving devices via a bearer.

26. The apparatus of claim 25, wherein:
to segment the SDU into the one or more SDUs, the instructions are executable by the at least one processor to cause the apparatus to segment the SDU of the one or more SDUs into the set of PDUs at the L2 layer;
to encode the set of SDUs to obtain the set of encoded PDUs, the instructions are executable by the at least one processor to cause the apparatus to encode the set of PDUs according to the one or more network coding parameters to obtain the set of encoded PDUs;
to generate the at least corresponding PDU header, the instructions are executable by the at least one processor to cause the apparatus to generate, for the set of encoded PDUs, a corresponding set of PDU headers; and
to output each encoded PDU in the set of encoded PDUs and the at least one corresponding PDU header, the instructions are executable by the at least one processor to cause the apparatus to output the set of encoded PDUs and the corresponding set of PDU headers from the L2 layer to the lower layer.

27. The apparatus of claim 26, wherein the instructions are further executable by the at least one processor to cause the apparatus to:
perform, at the L2 layer and before the encoding, an integrity protection and ciphering function on the SDU.

28. The apparatus of claim 25, wherein:
the one or more SDUs comprise a set of SDUs; and
to encode the set of PDUs or the set of sub-PDUs to obtain the set of encoded PDUs or the set of encoded sub-PDUs, the instructions are executable by the at least one processor to cause the apparatus to encode the set of SDUs according to the one or more network coding parameters to obtain the set of encoded PDUs or the set of encoded sub-PDUs.

29. An apparatus for wireless communication at a receiving device, comprising:
at least one processor;
memory coupled with the at least one processor; and
instructions stored in the memory and executable by the at least one processor to cause the apparatus to:
receive, at a layer two (L2) layer of the receiving device, each encoded PDU in a set of encoded protocol data units (PDUs) or each encoded sub-PDU in a set of encoded sub-PDUs and one or more corresponding PDU headers via a bearer from a transmitting device, each encoded PDU in the set of encoded PDUs or each encoded sub-PDU in the set of encoded sub-PDUs and the one or more corresponding PDU headers corresponding to a segmented service data unit (SDU) from among one or more SDUs;
decode, at the L2 layer, at least a subset of the set of encoded PDUs or the set of encoded sub-PDUs based at least in part on one or more network coding parameters and the one or more corresponding PDU headers, the one or more network coding parameters comprising a rateless code;
generate a report based at least in part on the decoding, wherein the report indicates whether the segmented SDU of the one or more SDUs was obtained via the decoding; and
transmit the report to the transmitting device.

30. The apparatus of claim 29, wherein:
to receive each encoded PDU in the set of encoded PDUs or each encoded sub-PDU in the set of encoded sub-PDUs and the one or more corresponding PDU headers, the instructions are executable by the at least one processor to cause the apparatus to receive the set of encoded PDUs and a corresponding set of PDU headers, the set of encoded PDUs and the corresponding set of PDU headers corresponding to the segmented SDU; and to decode at least the subset of the set of encoded PDUs, the instructions are executable by the at least one processor to cause the apparatus to decode at least a subset of the set of encoded PDUs and based at least in part on the corresponding set of PDU headers.

* * * * *